United States Patent [19]

Castillo et al.

[11] Patent Number: 5,379,337
[45] Date of Patent: Jan. 3, 1995

[54] METHOD AND SYSTEM FOR PROVIDING EMERGENCY CALL SERVICE

[75] Inventors: Michael J. Castillo, Boulder; Lisa M. Neal, Denver; Michael J. Nelson, Broomfield; John R. Rice, Englewood, all of Colo.

[73] Assignee: U S WEST Advanced Technologies, Inc., Boulder, Colo.

[21] Appl. No.: 747,151

[22] Filed: Aug. 16, 1991

[51] Int. Cl.$^6$ .......................................... H04M 11/04
[52] U.S. Cl. .......................................... 379/45; 379/49
[58] Field of Search .............................. 379/39, 42–45, 379/46, 47, 49, 201, 207, 210, 212, 206, 219, 220, 221, 266

[56] References Cited

U.S. PATENT DOCUMENTS

| | | | |
|---|---|---|---|
| 3,881,060 | 4/1975 | Connell et al. | 379/45 |
| 4,682,354 | 7/1987 | Vanacore | 379/266 |
| 4,689,811 | 8/1987 | Lennström et al. | 379/45 |
| 5,249,223 | 9/1993 | Vanacore | 379/45 |

OTHER PUBLICATIONS

Bell Communications Research, E911 Public Safety Answering Point: Interface Between a 1/1AESS ™ Switch and Customer Premises Equipment, Technical Reference TR-TSY-000350, Issue 1, Nov. 1987.

AT&T System 85 Reference Manual, vol. 2, Issue 1, 1987.

Primary Examiner—Wing F. Chan
Attorney, Agent, or Firm—Timothy R. Schulte; Chester E. Martine

[57] ABSTRACT

An emergency call routing system includes a platform having a call router and a processor for identifying destinations to which such router directs emergency calls. The processor receives administration commands from administrators, some of which are at a public safety answering point (PSAP) to which the router directs calls for handling and redirection to emergency service providers (ESPs). Some of such administration commands relate to defining intervals during which a particular PSAP is, according to an administered night service schedule, to be inactive with respect to handling emergency calls. Other of such commands relate to administrative operations to place such PSAPs into such inactive state earlier than the schedule. Others of such commands relate to administrative directions to withdraw such PSAP from such inactive state before the scheduled time. Interfaces between attendants/administrators and workstations used with such processor are provided to facilitate ease of administering such schedule and those overrides.

105 Claims, 95 Drawing Sheets

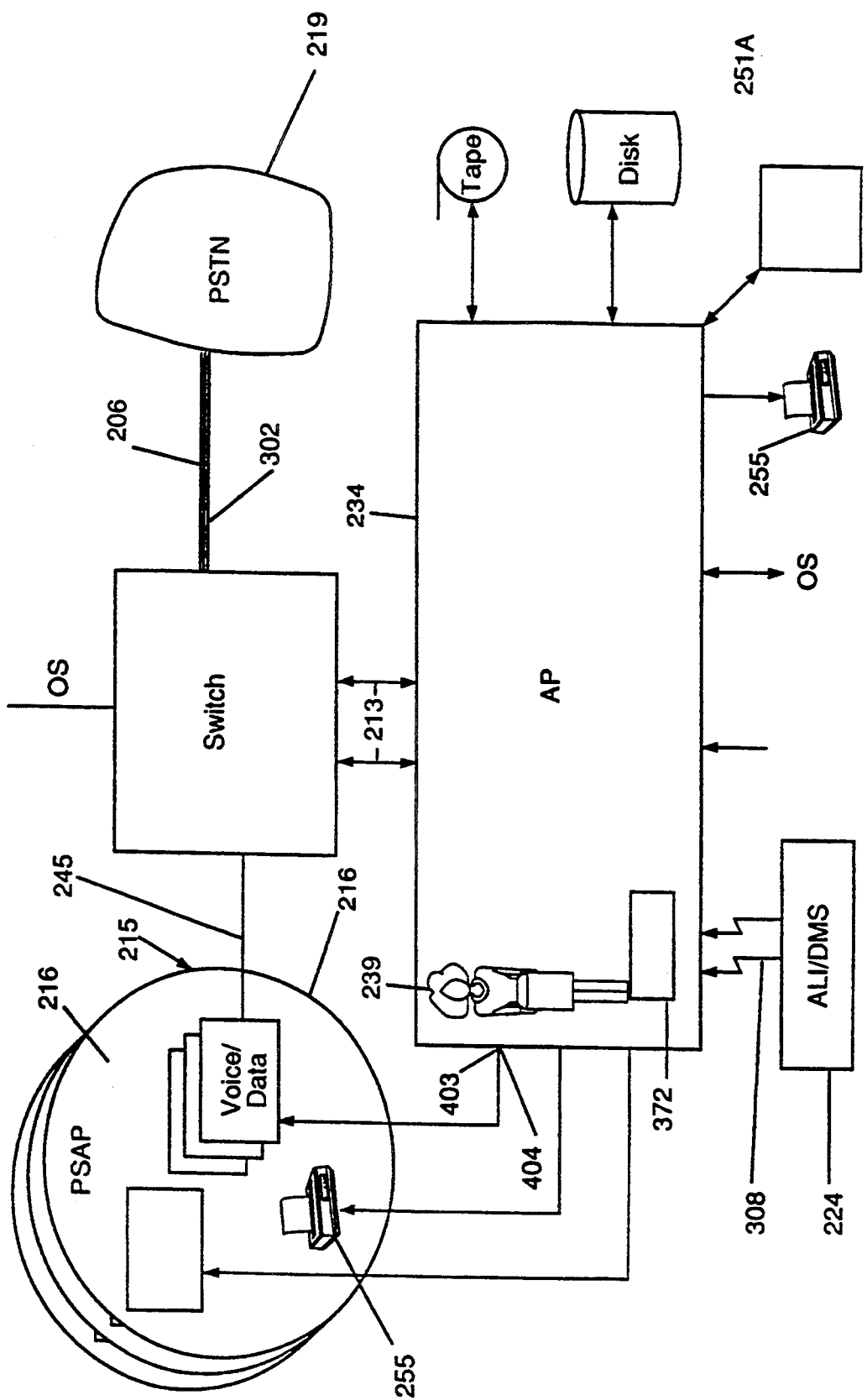

FIG. 15(a)

```
Mil PSAP: Active                    E-9-1-1 Emergency Service
                                    Position 04    W/S State: Not Receiving Calls
Line Status: XFR in Use                                             Caller on Hold
                   EMERGENCY CALL WAITING                                  Working
Call History
Incoming TN: 930-5-15    AAAAAAAAAAAAAAAAAAAAAAAA
BBB CCC-DDDD               EEEE                 FF/GG       HH:I
JJJJJJJJJJJJJJJJJJJJ  OOOOOOOOOOOOOOOOOOOOOOOO PPPPPPPPPPPPPPPPP
LLLLLLLMMM NN         OOOOOOOOOOOOOOOOOOOOOO
OOOOOOOOOOOOOOOOOO RR SSSSSSSSSSSSSS
1. TTTTTTTTTTTT    2. UUUUUUUUUUUUUUUU 3. VVVVVVVVVVVVVVVV 4. WWWWWWWWWWWW
   TTTTTTTTTTTT       UUUUUUUUUUUUUUUU    VVVVVVVVVVVVVVVV    WWWWWWWWWWWW Call from XXXXXXXXXXXXXXXXX     TRNK GRP: YY    NODE ID: ZZ
PSAP=aaaa bbbbbbbbbbbbb         TRNK ID: ccc    ESN: ddd
                                PSAP ID: ee     PILOT #: fff-cggg
                                ESCO ID: hhh    NPD: i Message line
```

| | | | | | | | | |
|---|---|---|---|---|---|---|---|---|
| Mill PSAP Active | | E9-1-1 Emergency Service | Position 04 | Status Receiving Calls | | | | |
| Line Status: XFR Allowed | | | | EMERGENCY CALL WAITING | | Active | | |
| Incoming TN: 303 930-5415 | | | New Call | | | | | |
| 303 930-5415 | | | | | | | | |
| LAST NAME FIRST NAME | | | | | | | | |
| 6200 #D SO QUEBEC | | | | RESI | | | | |
| LITTLETON | | | | | | | | |
| | | | CO | FREE FIELD | | SUITE 3000 | | |
| 1 JEFFCO SD | 2 BANCROFT ED | | | 3 BANCROFT RESCUE | 4 AUXILLARY | | | |
| 850-2221 | 289-4137 | | | 289-7843 | 11/11 23:06 | | | |
| | | | | Call Features Menu | | | | |
| *** Not Provisioned *** | | | | | | | | |
| Message Line | | | Line Not Used | | | | | |

263 → EMERGENCY CALL WAITING
222 (outer frame)
225
288A

FIG. 17

| | | | | | | | | |
|---|---|---|---|---|---|---|---|---|
| Mil PSAP: Active | | E9-1-1 Emergency Service | | | | | | |
| Line Status: XFER Allowed | | Position 04 | | W/S Status: Receiving Calls | | | | |
| | | EMERGENCY CALL WAITING | | | | Active | | |
| Police | Fire | Transfer Directory | | | | Page 1 of 2 | | |
| | | Medical | | Local | | Additional | | |
| 01. Bates Police 1 | | 303/654-2312 | | 08. Montross Police 1 | | 787-2312 | | |
| 02. Bates Police 2 | | 303/654-2310 | | 09. Montross Police 2 | | 787-9089 | | |
| 03. Coates Police 1 | 789-4637 | | | 10. Niwot Police 1 | | 431-6666 | | |
| 04. Coates Police 2 | | 231-4938 | | 11. Niwot Police 2 | | 431-8976 | | |
| 05. Delmar Police | | 342-8989 | | 12. Niwot Police 3 | | 431-5546 | | |
| 06. Evans Sheriff | | 303/654-0976 | | 13. Wythe Police 1 | | 645-7969 | | |
| 07. Minturn Police | | 220-0257 | | 14. Wythe Police 1 | | 651-8989 | | |
| TAB or ARROW key: Highlight a destination | | | | | | RETURN: Initiate call | | |
| SPACE BAR: Change groups | | | | Line Not Used | | | | |
| Message Line | | | | | | | | |

222

288A

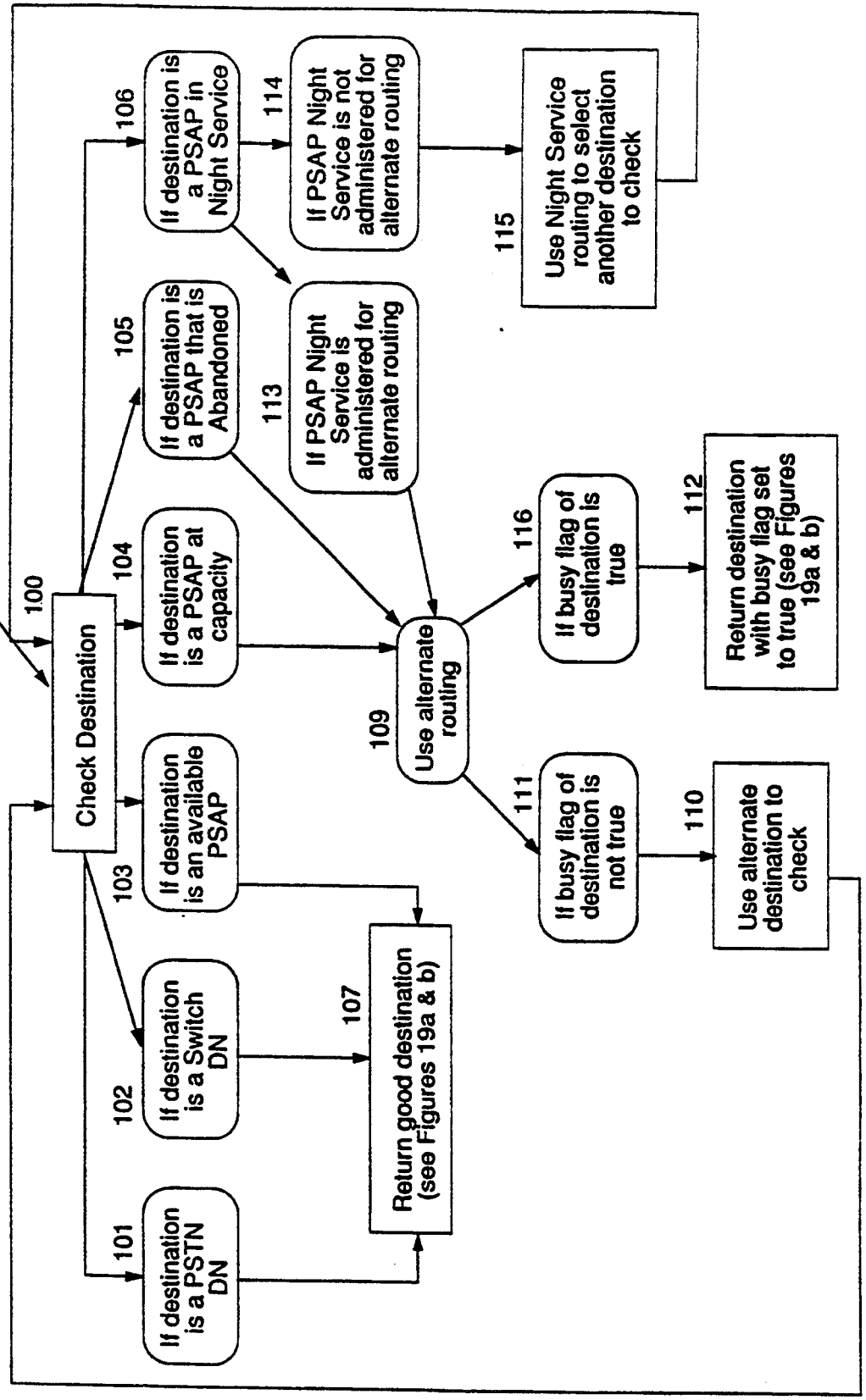

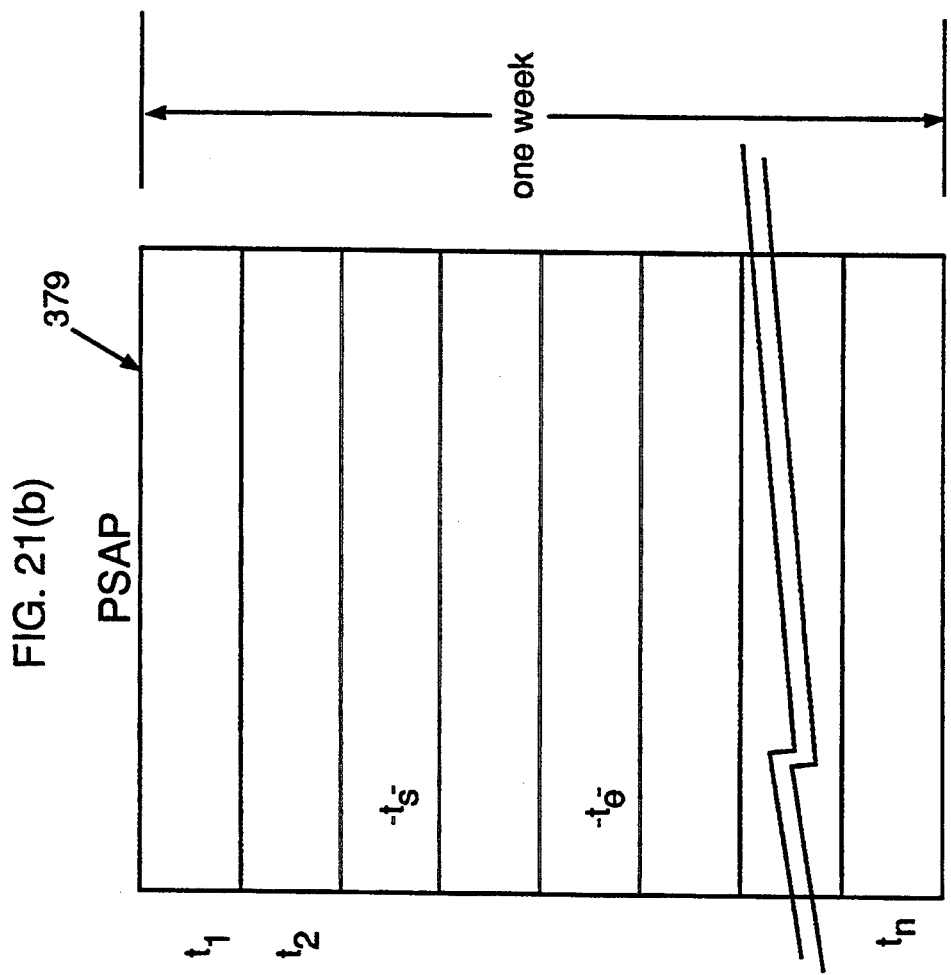

FIG. 24

| Adams County Emer. Comm. System | | | | Application Data Administration |
|---|---|---|---|---|
| PSAP AFF1 | Afton Fire 1 | Active | | |

Night Service Schedule Form

Destination Selection Window — 514, 222

```
001  Aktkinson Fire.
002  Bledsoe SD
003  Denver Fire Dept
004  Farmington CC
005  Henrico Police
006  Kittridge Fire
007  Lewisville PD
008  Milton Police
009  Newington PD
010  Oberlin PD RETURN: Select       CTRL-x: Exit
```

| Time | Sun | Mon | Tues | Wed |
|---|---|---|---|---|
| 00:00 | | | | |
| 02:00 | | | | |
| 04:00 | | | | |
| 06:00 | | 6:45 | 6:45 | 6:45 |
| 08:00 | | | | |
| 10:00 | | | | |
| 12:00 | | | | |
| 14:00 | | | | |
| 16:00 | | 17:00 | 17:00 | 17:00 |
| 18:00 | | | | |
| 20:00 | | | | |
| 22:00 | | | | |

Night Service Calls routed to [007] Lewis...
CTRL-c: Display command help        Line Not Used    CTRL-x: Exit Message Line — 288A

FIG. 25

```
   1         10        20        30        40        50        60        70        80
 1 |Adams County Emer. Comm. System               Application Data Administration
   |                                   PSAP Features Form
 5 |PSAP [AFF1] [Afton Fire 1    ]
   |                          PSAP Mode: [ON-LINE  ]      Primary Notification Line: [NXXXXXX]
   |                        PSAP Status: [NIGHT SERVICE]   Backup Notification Line: [NXXXXXX]
10 |    PSAP NPD: [0]                                            PSAP Hunt Group: [NXXXXXX]
   |Call Capacity: [UNLIMITED]                          Call Distribution: [ANY STATION ANSWER]
   |Call Capacity Depth: [12]
   |
15 |New ALI Retrieval: [DISABLED]
   |
   |Computer Aided Dispatch (CAD) link: [DISABLED]
   |
   |
20 |
   |TAB or ARROW key: Highlight a data field                            CRTL-x: Exit
   |SPACE BAR: Cycle through valid data entries
   |
25 |Message Line
```

222 (form outline)
288A (message line area)

FIG. 27

Adams County Emer. Comm. System    Application Data Administration
                                                            Page 1 of 45
                Selective Transfer Table
          Destination      Selective XFR       Selective XFR
Num.  ID    Label            Label 1             Label 2
---  ----  -------------   ---------------    ------------------
000  [234] [Destination label] [Empire Cty PD] [SWAT Unit        ]
001  [234] [Destination label] [Empire Cty PD] [303 788-3243     ]
002  [234] [Destination label] [Empire Cty PD] [303 788-3243     ]
003  [234] [Destination label] [Empire Cty PD] [303 788-3243     ]
004  [234] [Destination label] [Empire Cty PD] [Bomb Disposal    ]
005  [234] [Destination label] [Empire Cty PD] [303 788-3243     ]
006  [234] [Destination label] [Empire Cty PD] [Hostage Intrven  ]
007  [234] [Destination label] [Empire Cty PD] [303 788-3243     ]
008  [234] [Destination label] [Empire Cty PD] [303 788-3243     ]
009  [234] [Destination label] [Empire Cty PD] [303 788-3243     ]

TAB or ARROW Key: Highlight a selective transfer point
CTRL-C: Display command help                          CTRL-x: Exit
Message Line

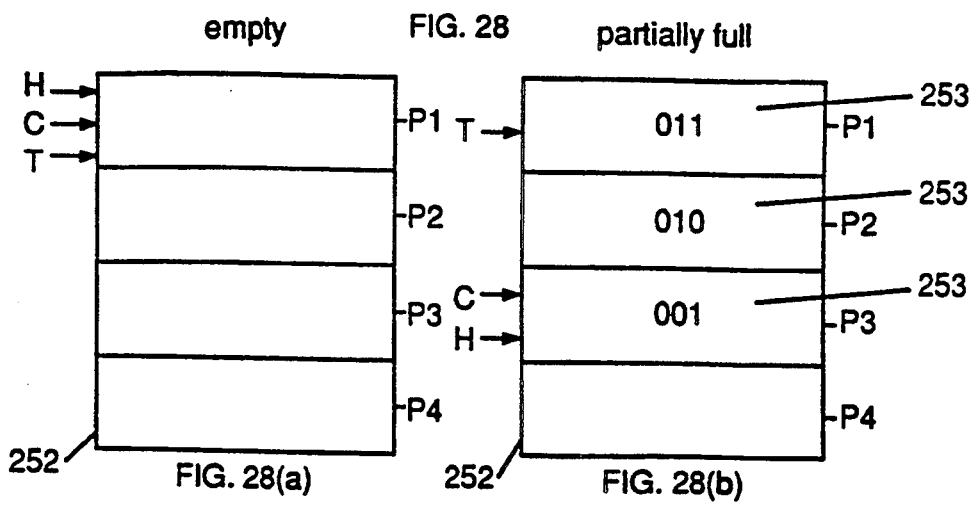
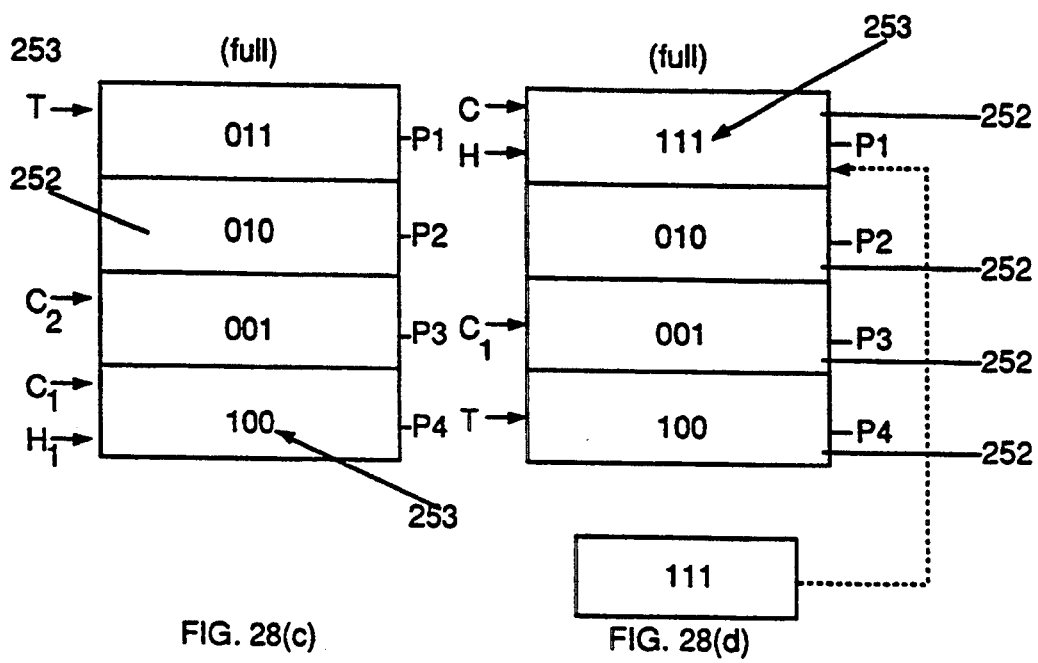
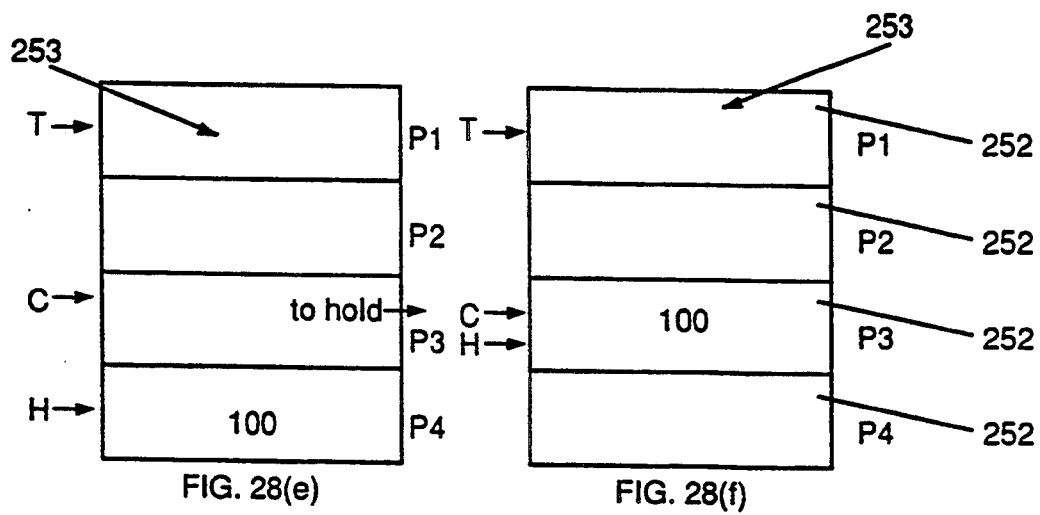
FIG. 28

FIG. 29

```
1. PSAP in night service
     at _____ (day) and
     _____ (time).

2. PSAP exiting NS at _____ (time).
```
⬈ 408

FIG. 30

```
    1         10        20        30        40        50        60        70        80
    Adams County Emer. Comm. System              Application Data Administration
    ..................................................................................
                          Platform Configuration Menu Select a category of Platform Parameters to administer:

┌─────────────────────────┐
    │ 01. ALI/DMS Interface Form │   07. Phantom Directory Number Table
    └─────────────────────────┘
    02. Destination Table          08. Printer Administration Table 03. ESCO Table                 09. Selective Transfer Table 04. ESN Table                  10. TN/ESN Table 05. Misc. Platform Parameters Form   11. Incoming 9-1-1 Trk Group Table 06. NPD/NPA Translation Form   12. Incoming 9-1-1 Trunk Table TAB or ARROW key: Highlight a menu option
    RETURN: Activate the highlighted menu option           CTRL-x: Exit Message Line
```

| Mill PSAP: Active | E9-1-1 Emergency Service |
| Line Status: Idle | Position 04: W/S State Not Receiving Calls |
| | EMERGENCY CALL WAITING | Caller on Hold |

PSAP Administration Submenu

1. Administer the Transfer Directory
2. Administer the Night Service Schedule
3. Change Password
4. Print PSAP Reports Print Reports

[x] PSAP Report    [x] Workstation Reports

Dates: [ 8/18/89] to [ 8/23/89]

CTRL-x: Print report(s) or exit

Message Line | Line Not Used

FIG 32

```
Adams County Emer. Comm. System          Application Data Administration
                        ALI/DMS Interface Form ALI Format: [MOUNTAIN BELL]

Data          Data Trans
  LinePair  Port       Baud Rate    Parity      StopBits
  ---       ---        ---          ---         ---
  1.    [    ]         [1200]       [SPACE]     [1]

TAB or ARROW key: Highlight a data field
SPACE BAR: Cycle through valid data entries.         CTRL-x: Exit Message Line
```

FIG. 33

```
Adams County Emer. Comm System          Application Data Administration
                                Destination Table                Page 1 of 24
Num
---
001 Dest Destination Label        ] Cmt:[Destination Comment Field    ]
    Type [PSAP    ][ LRT1      ]    Alt.:[001] Destination Label   /[ ] Busy
002 Dest Destination Label        ] Cmt:[Destination Comment Field    ]
    Type [SWITCH DN][ 1202    ]    Alt. [001] Destination Label    /[ ] Busy
003 Dest Destination Label        ] Cmt:[Destination Comment Field    ]
    Type [PSTN DN ][ 860-3434 ]    Alt. [    ] Destination Label   /[ ] Busy
004 Dest Destination Label        ] Cmt:[Destination Comment Field    ]
    Type [PSAP    ][ MU1      ]    Alt. [001] Destination Label    /[ ] Busy
005 Dest Destination Label        ] Cmt:[Destination Comment Field    ]
    Type [SWITCH DN][ 1203    ]    Alt. [001] Destination Label    /[ ] Busy TAB or ARROW key: Highlight a Destination ID
CTRL-c: Display command help                              CTRL-x: Exit
Message Line
```

| Adams County Emer. Comm. System Application Data Administration |
|---|
| Destination Table — Page 1 of 24 |

```
Num
---
001  Dest   Destina  [          ]                    /    [ ] Busy
     Type   PSAP                                     /    [ ] Busy
002  Dest   Destina  [          ]                    /    [ ] Busy
     Type   SWITCH
003  Dest   Destina  [          ]                    /    [ ] Busy
     Type   PSTN DN
004  Dest   Destina  [          ]                    /    [ ] Busy
     Type   PSAP
005  Dest   Destina  [          ]                    /    [ ] Busy
     Type   SWITCH
```

```
          Command Help

CTRL-a: Add new entry

CTRL-e: Edit an existing entry

CTRL-d: Delete an existing entry

CTRL-j: Display previous page

CTRL-k: Display next page

Press any key to continue.
```

TAB or ARROW key: Highlight a Destination ID
CTRL-c: Display command help                                    CTRL-x: Exit
Message Line

FIG. 35

```
Adans County Emer. Comm. System         Application Data Administration
                      Destination Table                 Page 1 of 24
 Num
 ---
 001 Dest Destina                                          [/] Busy
     Type PSAP
 002 Dest Destina                                          [/] Busy
     Type SWITCH
 003 Dest Destina                                          [/] Busy
     Type PSTN DN
 004 Dest Destina                                          [/] Busy
     Type PSAP
 005 Dest Destina                                          [/] Busy
     Type SWITCH DN11    12031  Alt. [001 Destination ID
 TAB or ARROW key: Highlight a Destination Label
 CTRL-c: Display command help                              CTRL-x: Exit
 Message Line
```

Command Help

TAB     : Move cursor from field to field
ARROW   : Move cursor within a field
BSPACE  : Delete character under cursor
RETURN  : Save changes and leave add/edit mode
CTRL-u  : Undo changes to leave add/edit mode Press any key to continue.

```
Adams County Emer. Comm. System        Application Data Administration
                          ESCO Table                      Page 1 of 1

Num.    ESCO                          Num.    ESCO
001   [Capitol Hill CO    ]           016   [Pottsville CO   ]
002   [Dry Creek CO       ]           017   [Rangun CO       ]
003   [Valdalia CO        ]           018   [Leimen CO       ]
004   [Macintosh CO       ]           019   [Parker CO       ]
005   [Thornton CO        ]           020   [Riverton CO     ]
006   [Arvada CO          ]           021   [Fremont CO      ]
007   [Brazelton CO       ]           022   [Pacific Grove   ]
008   [Remington CO       ]           023   [Mannheim CO     ]
009   [Tienamen Sq. CO    ]           024   [Cleveland CO    ]
010   [Handshuhsheim CO   ]           025   [Niwot CO        ]
011   [Kefar Blum         ]           026   [Dolomite CO     ]
012   [Kirat Shemona CO   ]           027   [Interlocken CO  ]
013   [Boulder CO         ]           028   [El Paso CO      ]
014   [Lafayette CO       ]           029   [Roosevelt CO    ]
015   [Minot CO           ]           030   [Castle Rock CO  ]

TAB or ARROW key: Highlight a data field
CTRL-c: Display command help                              CTRL-x: Exit Message Line
```

```
Adams County Emer. Comm. System          Application Data Administration
Num.      ESCO              ESCO Table                     Page 1 of 1
                            Num.     ESCO
                            016    [Pottsville CO ]
                            017    [Rangun CO     ]
          Command Help      018    [Leimen CO     ]
                            019    [Parker CO     ]
CTRL-a: Add new entry       020    [Riverton CO   ]
                            021    [Fremont CO    ]
CTRL-e: Edit an existing entry  022 [Pacific Grove ]
                            023    [Mannheim CO   ]
CTRL-d: Delete an existing entry 024 [Cleveland CO ]
                            025    [Niwot CO      ]
CTRL-j: Display previous page  026 [Dolomite CO   ]
                            027    [Interlocken CO]
CTRL-k: Display next page   028    [El Paso CO    ]
                            029    [Roosevelt CO  ]
       Press any key to continue.  030 [Castle Rock CO]

TAB or ARROW key: Highlight a data field
CTRL-c: Display command help                              CTRL-x: Exit Message line
```

222 (screen outline)
288A (message line area)

FIG. 38

```
     1         10        20        30        40        50        60        70        80
    Adams County Emer. Comm. System              Application Data Administration
                                      ESN Table                          Page 1 of 22
    Num.
    001  Comment [ESN Entry Comment Field                    ]
         Destination [NNN] Busy Signal
         Sel. XFR 1: [023] JEFFCO SO    Sel. XFR 2: [893] Bancroft FD
         Sel. XFR 3: [783] Bancroft Rescue  Sel. XFR 4: [   ]
    002  Comment [ESN Entry Comment Field                    ]
         Destination [NNN] Busy Signal
         Sel. XFR 1: [023] JEFFCO SO    Sel. XFR 2: [893] Bancroft FD
         Sel. XFR 3: [783] Bancroft Rescue  Sel. XFR 4: [   ]
    003  Comment [ESN Entry Comment Field                    ]
         Destination [NNN] Busy Signal
         Sel. XFR 1: [023] JEFFCO SO    Sel. XFR 2: [893] Bancroft FD
         Sel. XFR 3: [783] Bancroft Rescue  Sel. XFR 4: [   ]

TAB or ARROW key: Highlight an ESN                       CTRL-x: Exit
    CTRL-c: Display command help
    Message Line
```

Adams County Emer. Comm. System        Application Data Administration

NPD/NPA Translation Form

```
NPD   NPA
---   ---
 0   [303]
 1   [505]
 2   [719]
 3   [402]
```

TAB or ARROW Key: Highlight a data field                    CTRL-x: Exit

Message Line

FIG. 40

Adams County Emer. Comm System          Application Data Administration

Miscellaneous Platform Parameters Form

Platform Title: [Adams County Emer. Comm. System]

Switch 'Busy-Tone' Trunk Group Telephone Number: [8897722]

Printer Name

Printer

Reports

TAB or ARROW key: Highlight the data field.          CTRL-x: Exit

Message Line

FIG. 41

| Adams County Emer. Comm System | Application Data Administration |
|---|---|
| Phantom Directory Number (PDN) Table | Page 1 of 2 |

| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |
| [XXX-XXXX] | [NXX-XXXX] | [NXX-XXXX] | [NXX-XXXX] | [NXX-XXXX] | [NXX-XXXX] |

TAB or ARROW keys: Highlight a data field.
CTRL-c: Display command help                CTRL-x: Exit Message line

FIG. 42

Adams County Emer. Comm System          Application Data Administration

NPD (0-3): [0]   Starting TN: [555-1212]   Range (1-20): [20]

| NPD | TN | ESN | | NPD | TN | ESN |
|---|---|---|---|---|---|---|
| 0 | 555-1212 | 032 | | 0 | 555-1222 | 067 |
| 0 | 555-1213 | 032 | | 0 | 555-1223 | 067 |
| 0 | 555-1214 | 032 | | 0 | 555-1224 | 068 |
| 0 | 555-1215 | 032 | | 0 | 555-1225 | 068 |
| 0 | 555-1216 | 045 | | 0 | 555-1226 | 070 |
| 0 | 555-1217 | 045 | | 0 | 555-1227 | 070 |
| 0 | 555-1218 | 045 | | 0 | 555-1228 | 070 |
| 0 | 555-1219 | 045 | | 0 | 555-1229 | 070 |
| 0 | 555-1220 | 045 | | 0 | 555-1230 | 070 |
| 0 | 555-1221 | 045 | | 0 | 555-1231 | 070 |

TAB or ARROW key: Move cursor          CTRL-x: Exit
RETURN: Display data
Message line

FIG. 43

| | | | | | | | | |
|---|---|---|---|---|---|---|---|---|
| Adams County Emer. Comm System | | | Application Data Administration | | | | | |
| Incoming 9-1-1 Trunk Group Table | | | | | | Page 1 of 10 | | |
| Switch Trnk Group ID | ESCO Trunk Group ID | ESCO Code | | ESCO Label | | | Status | |
| [000] | [000] | [NNN] | [NNNNNNNNNNNNN NNNN NNN] | | | | [ON-LINE] | |
| [001] | [001] | [NNN] | [NNNN NNNN NNNN NNN] | | | | [OFF-LINE] | |
| [002] | [002] | [NNN] | [NNNNN NNNN NNNN NN] | | | | [ON-LINE] | |
| [003] | [003] | [NNN] | [NNNNN NNNNN NNN NN] | | | | [OFF-LINE] | |
| [004] | [004] | [NNN] | [NNNNN NNNNN NNN NN] | | | | [OFF-LINE] | |
| [005] | [005] | [NNN] | [NNNNN NNNNN NNN NN] | | | | [OFF-LINE] | |
| [006] | [006] | [NNN] | [NNNNN NNNNN NNN NN] | | | | [ON-LINE] | |
| [007] | [007] | [NNN] | [NNNNN NNNNN NNN NN] | | | | [OFF-LINE] | |
| [008] | [008] | [NNN] | [NNNNN NNNNN NNN NN] | | | | [ON-LINE] | |
| [009] | [009] | [NNN] | [NNNNN NNNNN NNN NN] | | | | [ON-LINE] | |

TAB or ARROW key: Highlight a data field.
SPACE BAR: Cycle through valid entries                    CTRL-x: Exit Message line

FIG. 44

```
     1        10        20        30        40        50        60        70       80
    ┌──────────────────────────────────────────────────────────────────────────────────┐
 1  │ Adams County Emer. Comm System            Application Data Administration       │
 2  │                                                                                  │
 3  │ PSAP AFF  Afton Fire 1 Active                                                    │
 4  │                                                                                  │
 5  │                        PSAP Parameters Menu                                      │
 6  │                                                                                  │
 7  │         Select a category of PSAP Parameters to administer:                      │
 8  │                                                                                  │
 9  │        ┌──────────────────────┐                                                  │
10  │        │ 1. PSAP Features Form│      4. PSAP User Access Privileges Form         │
11  │        └──────────────────────┘                                                  │
12  │         2. Night Service Schedule Form    5. PSAP Printers Form                  │
13  │                                                                                  │
14  │         3. Transfer Directory Table       6. PSAP Workstation Parameters Table   │
15  │                                                                                  │
16  │                                                                                  │
17  │                                                                                  │
18  │                                                                                  │
19  │                                                                                  │
20  │                                                                                  │
21  │                                                                                  │
22  │ TAB or ARROW key: Highlight a menu option.                                       │
23  │ RETURN: Activate the highlighted menu option.                    CTRL-x: Exit    │
24  │ Message line                                                                     │
25  └──────────────────────────────────────────────────────────────────────────────────┘
```

222 (screen)
288A (message line area)

FIG. 45

| Adams County Emer. Comm System | | | Application Data Administration |
|---|---|---|---|
| | Incoming 9-1-1 Trunk Table | | Page 1 of 12 |

| Switch Trunk Number | Switch Trunk Grp ID | ESCO Trunk Grp ID | ESCO Trnk ID | ANI Flag | Select. Routing | NPD | Default Destination ID | Label | Trunk Status |
|---|---|---|---|---|---|---|---|---|---|
| NNNN | NNN | NNN | NNN | NO | DISABLED | 0 | NNN | AAAAAAAAAA | OFF |
| NNNN | NNN | NNN | NNN | ANI | ENABLED | 1 | NNN | AAAAAAAAAA | ON |
| NNNN | NNN | NNN | NNN | ANI | DISABLED | 0 | NNN | AAAAAAAAAA | OFF |
| NNNN | NNN | NNN | NNN | NO | ENABLED | 2 | NNN | AAAAAAAAAA | OFF |
| NNNN | NNN | NNN | NNN | ANI | ENABLED | 0 | NNN | AAAAAAAAAA | OFF |
| NNNN | NNN | NNN | NNN | NO | ENABLED | 2 | NNN | AAAAAAAAAA | OFF |
| NNNN | NNN | NNN | NNN | ANI | DISABLED | 1 | NNN | AAAAAAAAAA | ON |
| NNNN | NNN | NNN | NNN | NO | ENABLED | 1 | NNN | AAAAAAAAAA | ON |

TAB or ARROW key: Highlight a data field.
CTRL-c: Display command help                                CTRL-x: Exit
Message line

FIG. 46

| Adams County Emer. Comm System | Application Data Administration |
|---|---|
| PSAP Selection | Page 1 of 2 |

Select a PSAP to administer:

| PSAP | Status | | PSAP | Status |
|---|---|---|---|---|
| AFF1 Afton Fire 1 | Night S. | | PULL Pullman Fire | Active |
| LRT1 Lorton Police 1 | Active | | RTP1 Reston Police 1 | Active |
| LRT2 Lorton Police 2 | Active | | RTP2 Reston Police 2 | Active |
| MLT1 Milton Fire 1 | Abandon | | REF1 Revena Fire 1 | Active |
| MLT2 Milton Fire 2 | Night S. | | REF2 Revena Fire 2 | Night S. |
| MLT3 Milton Fire 3 | Off-line | | REF3 Revena Fire 3 | Active |
| MLT4 Milton Fire 4 | Active | | REF4 Revena Fire 4 | Off-line |
| NTFD Nutfield Fire | Active | | SMYF Smythe Fire | Off-line |
| OLDH Oldham Police | Night S. | | SUTP Sutter Police | Off-line |
| PNFD Pennfield Fire | Active | | TACF Tacno Fire | Off-line |

PSAP status as of mn/dd/yy hh mm:ss

TAB or ARROW keys: Highlight a PSAP.       CTRL-c: Display command help
RETURN: Select a PSAP                      CTRL-x: Exit Message line

FIG. 47

| Adams County Emer. Comm System | | | Application Data Administration |
|---|---|---|---|
| PSAP AFF Afton Fire 1 Active | | | |
| | | Administer Transfer Directory | Page 1 of 2 |
| | Fire | Medical | Local Additional |
| Police | | | |
| 01. Bates Fire 1 | 1 | 303/654-2312 | |
| 02. Bates Fire 2 | 1 | 303/654-2310 | |
| 03. Coates Fire 1 | | 789-4637 | |
| 04. Coates Fire 2 | | 231-4938 | |
| 05. Delmar Fire | | 342-8989 | |
| 06. Evans Fire | 1 | 719/564-9876 | |
| 07. Minturn Fire | | 220-0257 | |

```
           Editing Commands

CTRL-a:    Add New Service Provider
CTRL-e:    Edit Service Provider
CTRL-d:    Delete Service Provider
CTRL-o:    Sort Directory Group
CTRL-g:    Edit Group Titles
CTRL-u:    Undo Changes
SPACEBAR:  Change Group Press any key to continue
```

TAB or ARROW key: Highlight a destination    SPACE BAR: Change groups    RETURN: Initiate call
CTRL-c: Display editing commands                                         CTRL-x: Exit
Message line                              Line Not Used

FIG. 49

```
Mil PSAP: Active          E-9-1-1 Emergency Service
                          Position 04:  W/S State Not Receiving Calls
Line Status: Idle                                  Caller or Hold
                    EMERGENCY CALL WAITING
                    [Fire]
                  Administer Transfer Directory           Page 1 of 2
  Police                        Medical         Local        Additional
01. Bates Fire 1    1 303/654-2312    08. Montrose Fire 1    819-7272
02. Bates Fire 2    1 303/654-2310   [09. Montrose Fire 2    787-9089]
03. Coates Fire 1     789-4637        10. Niwot Fire 1       434-6665
04. Coates Fire 2     231-4938        11. Niwot Fire 2       434-8976
05. Delmar Fire       342-8989        12. Niwot Fire 3       434-5515
06. Evans Fire      1 719/564-9876    13. Wythe Fire 1       615-7868
07. Minturn Fire      220-0257        14. Wythe Fire 2       654-8989
TAB or ARROW key: highlight a destination        RETURN: Initiate call
CTRL-C: Display editing commands                 CTRL-x: Exit
Message line                  Line Not Used
```

222 (screen)
288A (arrow)

FIG. 50(a)

```
Mil PSAP: Active              E9-1-1 Emergency Service
                              Position 04:    W/S State Not Receiving Calls
Line Status: Idle                                       Caller on Hold
                       EMERGENCY CALL WAITING PSAP Administration 1. Cancel/Activate Night Service 2. Perform Restricted PSAP Administration 3. Abandon/Activate PSAP TAB or ARROW key: Highlight a menu option         CTRL-x or ADMIN key Exit
RETURN: Activate a highlighted menu option
Message line                                    Line Not Used
```

FIG. 50(b)

```
Mil PSAP: Active           E9-1-1 Emergency Service
                           Position 04:   W/S state Not Receiving Calls
Line Status: Idle                                    Caller on Hold

EMERGENCY CALL WAITING

PSAP Administration

1. Cancel Night Service y/n?

2. Activate Night Service y/n?

TAB or ARROW key: Highlight a menu option.
RETURN: Activate a highlighted menu option.   CTRL-x or ADMIN key Exit
Message line                                  Line Not Used
```

FIG. 51

```
Mll PSAP: Active          E-1-1 Emergency Service
                          Position 04:  W/S State Not Receiving Calls
Line Status: Idle         EMERGENCY CALL WAITING          Caller or Hold PSAP Administration ┌─────────────────────────────────┐
                    │ 1. Administer the Transfer Directory │
                    └─────────────────────────────────┘
                       2. Administer the Night Service Schedule 3. Change Password 4. Print PSAP Reports TAB or ARROW key: Highlight a menu option.
RETURN: Activate a highlighted menu option              CTRL-x: Exit
Message line
```

| W/S | Dir. Number | Data Port | Type | Baud | Parity | S/B | Call State | Status |
|---|---|---|---|---|---|---|---|---|
| 01 | 3038 9574 | AAAAAAAAAA | VT220 | 1200 | SPACE | 1 | NOT RECEIV. | OFF-LINE |
| 02 | 3038 9574 | AAAAAAAAAA | PC | 2400 | MARK | 2 | RECEIVING | ON-LINE |
| 03 | 3038 9574 | AAAAAAAAAA | VT220 | 2400 | NONE | 1 | NOT RECEIV. | OFF-LINE |
| 04 | 3038 9574 | AAAAAAAAAA | VT220 | 1200 | ODD | 2 | RECEIVING | ON-LINE |
| 05 | 3038 9575 | AAAAAAAAAA | PC | 4800 | EVEN | 1 | RECEIVING | ON-LINE |
| 06 | 3038 9575 | AAAAAAAAAA | PC | 4800 | SPACE | 2 | RECEIVING | OFF-LINE |
| 07 | 3038 9575 | AAAAAAAAAA | VT220 | 1200 | ODD | 1 | NOT RECEIV. | ON-LINE |
| 08 | 3038 9575 | AAAAAAAAAA | VT220 | 1200 | ODD | 1 | RECEIVING | ON-LINE |
| 09 | 3038 9575 | AAAAAAAAAA | PC | 1200 | SPACE | 1 | RECEIVING | OFF-LINE |
| 10 | 3038 9575 | AAAAAAAAAA | VT220 | 1200 | EVEN | 1 | RECEIVING | ON-LINE |

Adams County Emer. Comm System    Application Data Administration

PSAP AFF Afton Fire 1 Active

PSAP Workstation (W/S) Parameters Table    Page 1 of 2

PSAP workstation status as of: 06/19/90    08:35:23

TAB or ARROW key: Highlight a data field.    CTRL-c: Display Command Help
SPACE BAR: Cycle through valid data entries.    CTRL-x: Exit Message line

FIG. 53

```
┌─────────────────────────────────────────────────────────────────────┐
│ Mil PSAP: Active        E-9-1-1 Emergency Service    W/S State: Not Receiving Calls │
│ Line Status: Idle       Position 04:                 Caller on Hold │
│                         EMERGENCY CALL WAITING                      │
│                         Administer Transfer Directory  Page 1 of 2  │
│  Police      [Fire]     Medical        Local          Additional    │
│ 01. Bates Fire 1   1 303/654-2312 ┌─────────────────────────────┐   │
│ 02. Bates Fire 2   1 303/654-2310 │    Editing Commands         │   │
│ 03. Coates Fire 1    789-4637     │                             │   │
│                                   │ CTRL-a: Add New Service Provider│
│ 04. Coates Fire 2    231-4938     │ CTRL-e: Edit Service Provider  │
│                                   │ CTRL-d: Delete Service Provider│
│ 05. Delmar Fire      342-8989     │ CTRL-o: Sort Directory Group   │
│                                   │ CTRL-g: Edit Group Titles      │
│ 06. Evans Fire     1 719/564-9876 │ CTRL-u: Undo Changes           │
│                                   │ SPACE BAR: Change Group        │
│ 07. Minturn Fire     220-0257     │                             │   │
│                                   │  Press any key to continue  │   │
│                                   └─────────────────────────────┘   │
│ CTRL-c: Display editing commands            CTRL-x: Exit            │
│ Message line                      Line Not Used                     │
└─────────────────────────────────────────────────────────────────────┘
```

FIG. 56

```
Adams County Emer. Comm System          Application Data Administration
PSAP AFF Afton File 1      Active PSAP User Access Privileges Form PSAP Login: [AFF1]

Set PSAP Password to: [    ] and press RETURN

Verify Password: [    ] and press RETURN

CTRL-x: Exit
Message line
``` step 51
$t_{ia}$ not in $\Delta t_{ns}$ step 52
$t_c$ after $t_{ia}$ but not in $\Delta t_{ns}$

FIG. 68(a)

| PSAP 216 | timer event_label |
|---|---|
| PSAP$_1$ start label xxx<br><br>.<br>.<br>.<br><br>PSAP$_n$ start label yyy | event_label xxx |

| Timer Requests |
|---|
| 0600  8/16/91 |
| 0700  8/16/91 |
| 0800  8/16/91 |

640

METHOD AND SYSTEM FOR PROVIDING EMERGENCY CALL SERVICE

BACKGROUND OF THE INVENTION

1. Field of the Invention

This invention relates to a telephone system for emergency calls and more particularly to a system which facilitates the administration of off-hour scheduling of a public safety answering point (PSAP), and routing of emergency calls according to such off hour scheduling.

2. Discussion of Prior Art

In the field of telephony, equipment and services for routing emergency telephone calls (911 Calls) have been associated with the universal telephone number (TN) "9-1-1", abbreviated herein as "911" and referred to as an emergency service number ("ESN"). These equipment and services are herein respectively designated "911 Equipment" and "911 Services".

Prior 911 Equipment has generally been provided for large metropolitan areas which are served by a public switched telephone network (PSTN) generally having more than one-hundred fifty thousand subscriber lines. The PSTN is divided into service areas, each of which may have over 150,000 subscriber lines. Each subscriber's telephone number (TN) in a particular service area is assigned to a particular ESN, and is served by a specific end office (EO). The EO routes a 911 Call that is on a particular one of its subscriber lines to the 911 Equipment via trunks. The trunks are generally capable of carrying automatic number identification ("ANI") codes. Those trunks having such capability are referred to herein as "ANI trunks." ANI code is in the form of eight bits, including a seven digit TN and one information bit that represents the numbering plan digit, or area code, within which the call originated.

Each ESN represents a geographic region within the service area where all subscribers in that region are served by the same primary group of emergency service agencies (ESPs). The groups could, for example, include a fire department, a police department and a hazardous material recovery department of a particular municipality.

In the past, the 911 Equipment has been used to provide 911 Services. The 911 Services are separately provided for each service area by PSAP equipment which responds to 911 Calls having the same ESN. Because so many subscriber lines (e.g., over 150,000) are served by the EO for a given urban service area, the PSAP for the given urban service area (an "urban PSAP") is staffed by attendants on a twenty-four hour a day basis. Such an urban PSAP is generally always ready to receive 911 Calls, and is thus generally always "active", as compared to a PSAP which has suspended its 911 Services and which is referred to as being "inactive."

Attendants are people who are trained to handle 911 Calls using the particular 911 Equipment at the PSAP according to the procedures that have been established at that PSAP. Such procedures may include how the PSAP is designated. A PSAP may be designated "first choice" or "alternate", which refers to the order in which 911 Calls are directed to the PSAP to be answered. First choice PSAPs are the first PSAPs which should receive 911 Calls from the service area. Alternate PSAPs are PSAPs which receive 911 Calls when some event prevents the first choice PSAP from receiving the 911 Call. For example, the alternate PSAP may receive the 911 Call as a transfer from a first choice PSAP or directly from subscribers or the public via subscriber lines when the first choice PSAP to which the 911 Call is assigned is experiencing power failure, doesn't answer the 911 Call within a specified time, or when all routes to the first choice PSAP are busy. These and other situations at the first choice PSAP result in overflow of 911 Calls to the alternate PSAP.

The PSTN includes a feature that automatically provides the caller's ANI Code. When a 911 Call is received at a PSAP via an ANI Trunk, it will be received with the ANI code.

The ALI/DMS also includes a feature that automatically provides the caller's address and other pertinent details, referred to as the automatic location identification (ALI) feature. Via ALI, when a 911 Call is received at a PSAP it is received with such details, which is referred to as the ALI code. However, in existing 911 Equipment the database for producing the ALI code is generally stored in the PSTN at a central location for a very wide geographic area. For example, for the states of Arizona, Colorado, New Mexico and Wyoming in one PSTN, the ALI database for the ALI code for a relatively small area in Wyoming is stored in Denver, Colo. To provide the ALI Code for a 911 Call in that area in Wyoming, a long distance call must be made to Denver, and redundant long distance lines must be kept available to assure reliability. This increases the cost and time required to provide the ALI code for 911 Calls in remote areas.

911 Equipment known to Applicants provides incoming 911 Call data to the PSAPs in the form of a string of data. This data is unrelated to the first choice PSAP and to the trunk that carries the 911 Call to the 911 Equipment. The ALI code is obtained from an ALI/DMS host which is part of the PSTN. Neither the ALI/DMS nor the 911 Equipment organizes that code into a format that is efficiently and quickly useful to the PSAP attendant for determining why the 911 Call was not properly and quickly routed to the first choice PSAP or another PSAP.

In one example of prior 911 Equipment, only information identifying the trunk that is carrying the 911 Call is sent to the first choice PSAP. A remote system provides for the display of the ANI and NPD of the incoming 911 Call. However, because such system is remote from the first choice PSAP, problems arise from queuing and transmission delays.

The existing 911 Equipment, such as that used in connection with the trademark "1A ESS" by the AT&T Company ("1A 911 Equipment), includes features for rendering a PSAP inactive and has been the standard for emergency call switching since the 1960s. In the use of the 1A 911 Equipment, when a community subscribes to E9-1-1 service its local telephone company works with the community public safety agencies to determine which PSAP(s) will be designated as first choice and which will be designated as secondary and/or alternate PSAP(s). Having determined the community's desires as regards routing 911 Calls, the telephone company enters commands into a router of the 1A 911 Equipment so that the desired routing is given to 911 Calls once the 1A 911 Equipment is operational. Customers can, for a fee, arrange to have their routing designations reprogrammed by the telephone company. This procedure requires some time lag since the proper paper work and service order processes must be prepared in order to complete the desired change(s) and to ensure correct telephone company billing for the changes.

Once the router of the 1A 911 Equipment is programmed, a PSAP can also subscribe to "Night Service," which is a feature in which the PSAP will not receive 911 Calls from the router of the 1A 911 Equipment. Telephone companies provide this feature by deploying a trunk group make busy arrangement. Such an arrangement provides for a separate and dedicated private line circuit between the PSAP and the 1A 911 Equipment router. At the PSAP end of the circuit a "make busy key," or a normally-open type switch, is installed. At the 1A 911 Equipment router end of the circuit, a trunk group make busy unit is installed between the 1A 911 Equipment router and an outgoing E9-1-1 PSAP trunk group.

Should a PSAP wish to enable this type of night service, it need only set the make busy key to the "closed" position. This sends a signal over the dedicated private line circuit which causes the trunk group make busy unit to make the PSAP trunk group appear busy to the 1A 911 Equipment router. In this way, whenever the 1A 911 Equipment router receives a 911 Call that should be routed to that PSAP, the 1A 911 router sees the trunk group busy condition and invokes "Alternate Routing" as programmed in the routing/transfer software.

From the telephone company's perspective, this is a reliable approach since the same mechanical arrangement (make busy key and arrangement) doubles as a PSAP Abandonment feature of existing 1A 911 Equipment. Limitations of such an arrangement are (1) that should there be a cable cut (severing of the facilities between the 1A 911 router and the PSAP, which includes the trunk group and the dedicated private line make busy circuit), the 1A 911 router cannot perceive trunk group status without a substantial investment by the telephone company in additional monitoring equipment at the 1A 911 router, and (2) the PSAP cannot affect alternate routing activation for any purpose.

SUMMARY OF THE PRESENT INVENTION

Existing urban PSAPs in high density service areas are more likely to be operated economically to provide 911 Services because, in part, the high density results in substantial minimum numbers of 911 Calls at all hours of a twenty-four hour day. Therefore, at least one attendant is generally required at all times at any given PSAP to handle this relatively high minimum number of 911 Calls. The 911 Equipment operates at high capacity and the relatively high cost thereof is spread over the relatively large number of subscriber lines in the service area. This can render the 911 Service economical on a per-subscriber-line basis.

On the other hand, problems have been experienced in attempting to provide high quality, reliable, and cost-effective 911 Services for PSTNs having relatively few subscriber lines (compared to urban areas) in a service area (i.e., "low density"). Applicants' studies indicate that because of the low density, the average number of 911 Calls per hour from such low density service areas during peak 911 calling hours are often substantially less than the minimum average number of 911 Calls per hour at off-peak 911 calling hours experienced by high density service areas. Such studies indicate that as a result, the 911 Equipment that is suitable for a high density service area would be too costly for low and very low density service areas. Further, the low average number of 911 Calls per hour at off-peak 911 calling hours indicates to Applicants that it is not economical to provide PSAP staff, for example, on a twenty-four hour per day basis at all PSAPs in such very low or low density service areas.

These studies indicate to Applicants that different 911 Equipment must be used for such very low and low density service areas, and that improvements are required in the operational methods performed by PSAPs of 911 Equipment servicing such service areas. Such different 911 Equipment is considered as being enhanced and 911 Calls received by such different 911 Equipment are referred to as E9-1-1 calls.

As an example of such improvements in operational methods and equipment, the present invention avoids the limitations of the prior art in that no make busy key nor separate dedicated private line circuit for a trunk group make busy arrangement is required. Rather, a Night Service feature is provided using the existing lines between an applications processor and a switch which routes incoming E9-1-1 Calls.

Additionally, the Night Service feature may be administered to provide a schedule of Night Service intervals during which a particular PSAP is to be unavailable for handling incoming E9-1-1 Calls. As a result, none of the PSAP personnel need be involved at any particular time to place the PSAP in Night Service. Rather, the PSAP is placed in the Night Service state automatically. When one or more night service schedules are administered for a particular PSAP, night service destinations may also be selected, and selected on an individual basis with respect to each Night Service interval. As a further aspect of the Night Service feature of the present invention, in case a current situation or event at a particular PSAP requires that the PSAP be immediately placed in Night Service, or if that PSAP is in the Night Service state and must be immediately taken out of the Night Service state, one of an in early override or an out early override may be set. This initiates operations to determine whether the PSAP should be immediately taken out of the Night Service state or placed in the Night Service state.

This Night Service feature is implemented in a number of ways during operation of the system. First, upon initialization of the system, a determination is make as to whether each PSAP of the system should immediately be in the Night Service state. If not and if a night service interval has been set, a timer is set to initiate the next night service interval. Second, after initialization of the system, if a timer signal indicates that a night service event has occurred, a determination is made as to whether such signal indicates the start or the end of a night service interval. If the timer indicates the start of an interval, then a further determination is made as to whether there was an in early override for the particular PSAP. If so, the timer is set to indicate the end of a night service interval. If the timer signaled the end of the night service interval, a further determination is made as to whether there was an out early override.

When invoking the Night Service state, a determination is made as to whether the PSAP was already in the Night Service state as a result of an in early override. If so, then such override is disabled and the timer is set to signal the end of the Night Service interval $\Delta t_{ns}$.

A sequence of instructions controls the ending of the Night Service state. This includes determining whether the particular PSAP is Abandoned. Further, if the PSAP was in condition to enter the Night Service state soon, a timer related to entering the Night Service state soon is canceled.

Two types of administration have an impact on the Night Service state. This is when an administrator changes a Night Service schedule and either modifies, adds to or deletes Night Service intervals $\Delta t_{ns}$. Also, administration may change a Night Service override condition. Additionally, when a PSAP becomes Active by being removed from an Abandoned state, a determination is made as to whether the PSAP should be in the Night Service state immediately after abandonment.

An object of the present invention is to provide methods of and systems for scheduling intervals during which an emergency call handling facility is inactive.

Another object of the present invention is to enable a scheduled interval of inactivity for an emergency call handling facility to be overridden and render such facility active.

Still another object of the present invention is to enable authorized users of a public safety answering point (PSAP) to define preset schedules during which such PSAP is active and inactive, and to permit authorized workers at such PSAP to override both the scheduled active states and inactive states of such PSAP.

Yet another object of the present invention is to provide a workstation interface for use by authorized administrators in conjunction with a workstation keyboard for defining a night service schedule during which one public safety answering point (PSAP) of a community emergency response service system may be placed in a night service state and emergency calls which normally would be routed to such PSAP may be routed to a selected night service destination.

A further object of the present invention is to provide a workstation interface usable by an authorized attendant to override an activity/inactivity schedule for a public safety answering point (PSAP), wherein an in early override places such PSAP in a Night Service state before such schedule would otherwise place such PSAP in such Night Service state, and an out early override administered during such Night Service state is effective to remove such PSAP from such Night Service state before such schedule would otherwise remove such PSAP from such Night Service state.

A still further object of the present invention is to provide a method of initializing a community emergency response service system, wherein upon initialization of the system determinations are made as to whether public safety answering points (PSAPs) should immediately be in a Night Service state.

One further object of the present invention is to provide a timer control process which generates a signal, and to provide a night service administration program which determines whether such signal represents the start or the end of a Night Service state of a particular PSAP.

An additional object of the present invention relates to a program for placing a public safety answering point (PSAP) in a Night Service state after selected delays which enable emergency calls enroute to such PSAP to be handled prior to the effective time at which such PSAP is initially in such Night Service state.

An ongoing object of the present invention is to provide a method of responding to a signal indicating an intended end of a Night Service state of a public safety answering point (PSAP), wherein a timer is set to indicate the start of a next Night Service state.

One additional object of the present invention relates to providing separate facilities for placing a public safety answering point (PSAP) in an Abandoned state and in a Night Service state, wherein when such PSAP exits from such Abandoned state a determination is made as to whether such PSAP should be in such Night Service state immediately.

A yet further object of the present invention is to provide a method of and systems for determining, after administration of a night service schedule or an override for such night service schedule, whether such PSAP should immediately undergo a change in its state either to or from a Night Service state.

DESCRIPTION OF THE DRAWINGS

Other objects, features and advantages of the present invention will be apparent from an examination of the following detailed descriptions which include the attached drawings in which:

FIG. 5 is a schematic diagram of the switch and the platform, showing interfaces of each with other components of the C.E.R.S. system;

FIG. 15($a$) is a diagram of a screen of a workstation with a "key" which denotes what information may be displayed for an incoming E9-1-1 call;

FIG. 15(b) is a diagram of the screen shown in FIG. 15A, illustrating information for an incoming E9-1-1 call;

FIG. 17 is a diagram of a screen of the workstation used for transferring an incoming E9-1-1 call to an emergency service provider;

FIG. 20 is a flow chart illustrating how call handling destinations are checked to determine their availability to handle an incoming E9-1-1 call during the routing steps shown in FIGS. 19(a)–(d);

FIG. 21(b) is a schematic diagram of a table for storing time interval information representing night service schedules during a one week period;

FIG. 24 is a diagram of the screen shown in FIG. 23, adding a destination selection window for identifying call handling destinations to which an incoming E9-1-1 call is to be routed with the primary public safety answering point is in Night Service;

FIG. 25 is a diagram of a screen of the workstation in an administration mode, illustrating various features of a PSAP which may be administered;

FIG. 27 is a diagram of a screen of a workstation, indicating a list of call handling destinations from which four may be selected and entered in an ESN table indicating selective transfer identifications;

FIG. 28(a)–28(f) are schematic diagrams indicating the transfer of records among four call history logs according to various activities taken by the attendant;

FIG. 29 is a schematic diagram of system log files of C.E.R.S. system;

FIG. 30 is a diagram of a screen which enables a platform to be configured;

FIG. 31 is a diagram of a screen which enables night service states to be administered;

FIG. 32 is a diagram of a screen indicating an ALI/DMS interface;

FIG. 33 is a diagram of a screen providing call handling destination information from a destination table;

FIG. 34 is a diagram of the screen shown in FIG. 33 with a command help window;

FIG. 35 is a diagram of the screen of FIG. 33 with a further command help window;

FIG. 36 is a diagram of a screen showing various ESCOs;

FIG. 37 is a diagram of a screen similar to that shown in FIG. 36 with a command help window shown;

FIG. 38 is a diagram of a screen showing data from an ESN Table;

FIG. 39 is a diagram of a screen indicating translations from NPD to NPA;

FIG. 40 is a diagram of a screen showing various platform parameters which may be administered;

FIG. 41 is a diagram showing a screen for administering phantom directly numbers of the C.E.R.S. system;

FIG. 42 is a diagram of a screen showing data from a TN/ESN table;

FIG. 43 is a diagram of a screen illustrating selections for incoming trunk groups;

FIG. 44 is a diagram of a screen indicating further administration information for incoming trunks;

FIG. 45 is a diagram of a screen showing a parameters menu which may be used to administer public safety answering points;

FIG. 46 is a diagram of a screen showing various public safety answering points which may be administered at a given platform;

FIG. 47 is a diagram of a screen showing data for administering a transfer directory;

FIG. 49 is a diagram of a screen used for further administration of a transfer directory;

FIG. 50(a) is a diagram of a screen showing a PSAP administration menu for administering a public safety answering point;

FIG. 50(b) is a diagram of a screen showing a sub-menu for administering night service overrides for a public safety answering point;

FIG. 51 is a diagram of a screen for administering a PSAP, wherein a password is required to gain access for administration;

FIG. 52 is a diagram of a screen showing parameters for use at a public safety answering point workstation;

FIG. 53 is a diagram of the screen shown in FIG. 47, illustrating an "editing commands" window;

FIG. 56 is a diagram of a screen showing information for limiting users' access to the C.E.R.S. system.

FIG. 68(a) is a table showing data for alarm events which control night service events;

FIG. 68(b) is a schematic diagram of a table for recording in chronological order various timer requests;

OVERVIEW OF C.E.R.S. SYSTEM 200

Figure 1:
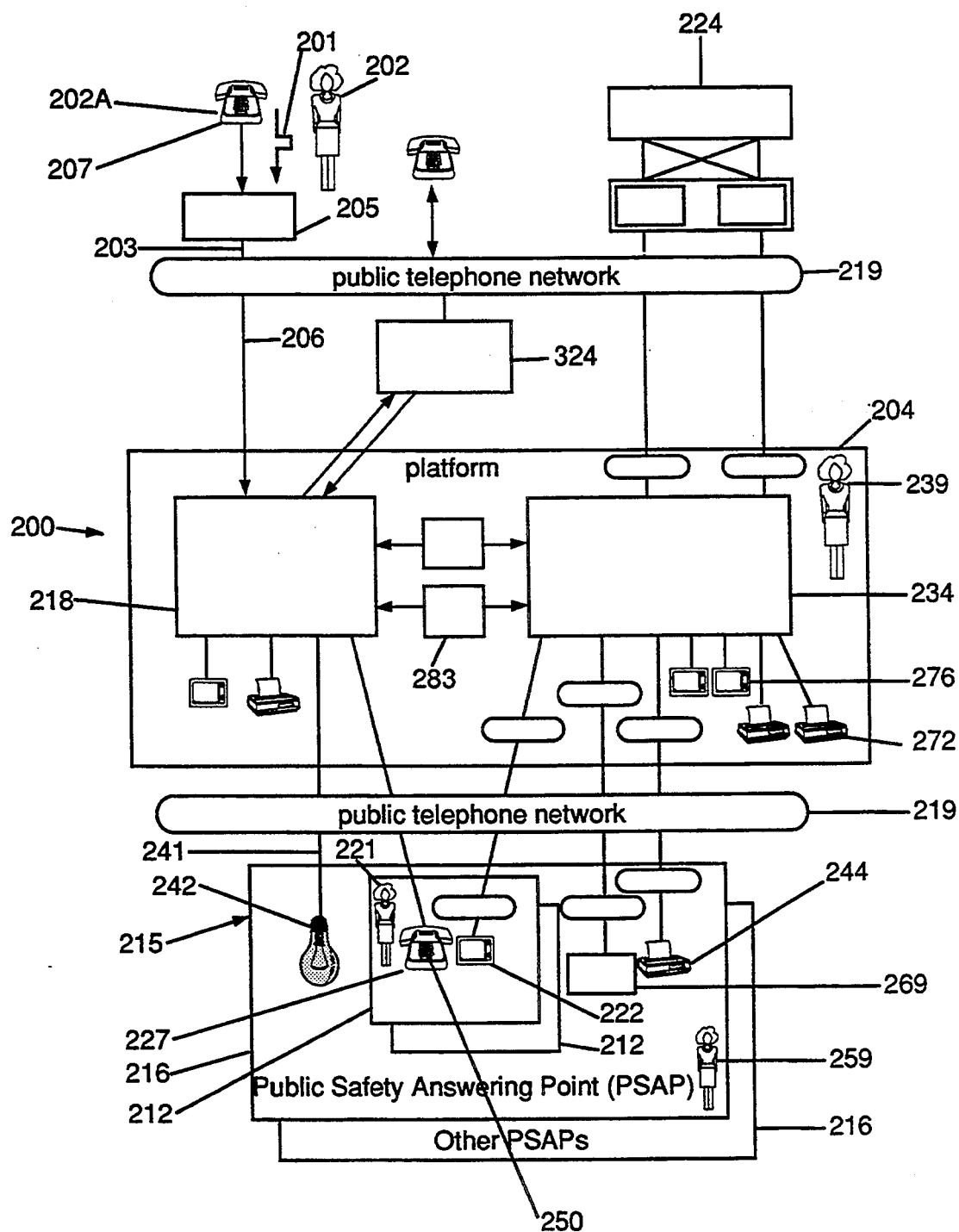
FIG. 1 is a schematic diagram showing a community emergency response service (C.E.R.S.) system having a platform for routing an incoming E9-1-1 call to a public safety answering point (PSAP) where the call is directed to an emergency service provider.

Emergency Calls: Referring to FIG. 1, an overview of a community emergency response service (C.E.R.S.) system 200 starts with emergency calls (E9-1-1 calls) 201 originated at a telephone by a caller which may be a subscriber, referred to as an emergency service requestor (ESR) 202, having a telephone set 202A. The E9-1-1 calls 201 on subscriber lines 203 serviced by an E9-1-1 platform 204 are routed from serving end offices 205 to the platform 204 via emergency service or incoming (ES) trunks 206. These trunks 206 carry only E9-1-1 traffic, using signaling techniques that are capable of forwarding the telephone number (TN) of the ESR 202 originating the E9-1-1 call 201 to the platform 204.

Figure 14:
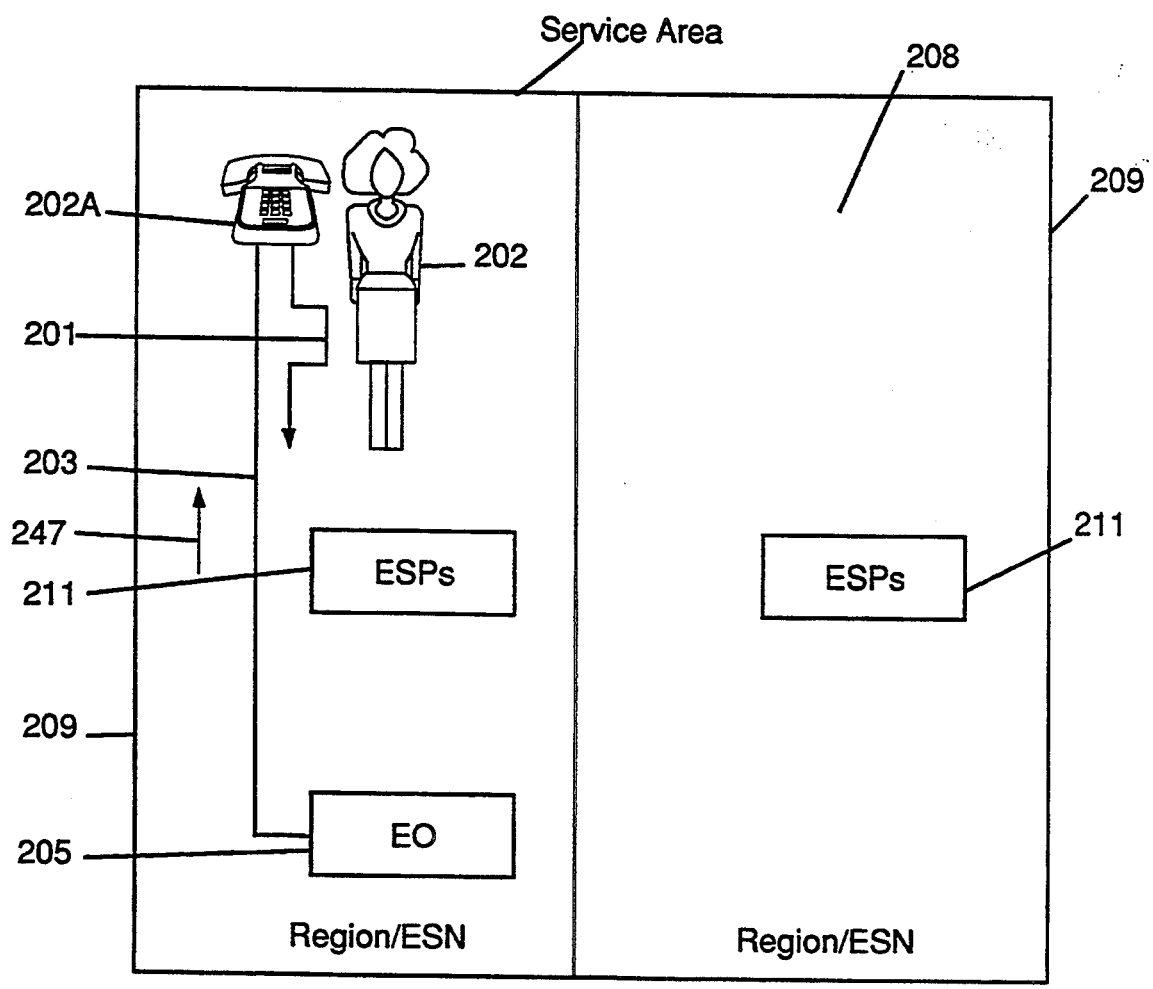
FIG. 14 is a schematic diagram illustrating an E9-1-1 service area having geographic regions therein to which an emergency service number (ESN) is assigned.

Service Area: Each subscriber's telephone number in an E9-1-1 service area 208 is assigned to an emergency service number (ESN) (FIG. 14). Each ESN represents a geographic area or region 209 within the service area 208 where all subscribers 202 in that region 209 are served by the same primary group of emergency service agencies or emergency service providers (ESPs) 211. ESNs are established by municipal agencies in cooperation with the telephone company which provides the C.E.R.S. platform 204. After each telephone number (TN) has been assigned to an ESN, a TN/ESN table 213 (FIG. 10) is developed and maintained such that each subscriber's TN is properly associated with the appropriate ESN.

Figure 3:
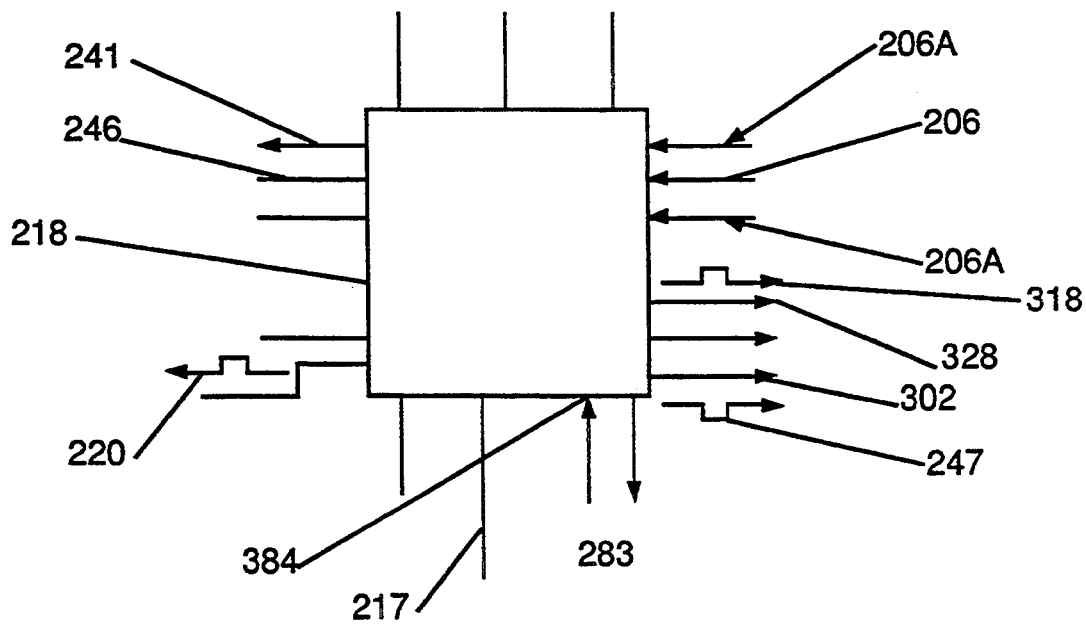
FIG. 3 is a schematic diagram of the switch of the platform, illustrating interfaces of the switch.

Call Handling Destination: When an E9-1-1 call 201 arrives at the platform 204, the TN/ESN table 213 is searched using the telephone number associated with the ESR 202 and identification of the incoming ES trunk 206. The incoming trunk 206 provides information that determines the area code or numbering plan digit (NPD) of the ESR 202 and the default method of routing the E9-1-1 call 201 to an appropriate call handling destination 215. Once the ESN is found, the E9-1-1 call 201 is routed to the call handling destination 215 that has been assigned the responsibility of handling emergency (or E9-1-1 requests) for that ESR's TN. Assignment of such call handling destinations 215 for each ESN is administered and stored on the platform 204. These call handling destinations 215 may be public safety answering points (PSAPs) 216, a line 217 connection to a call routing switch 218 of the platform 204 (FIG. 3), other destinations within a public switched telephone network (PSTN) 219, or a busy signal 220. The call handling destinations 215 are to be distinguished from the emergency service providers 211, FIG. 14 which are the ultimate destination to which the ESR 202 wishes to be connected upon dialing "9-1-1."

Figure 10:
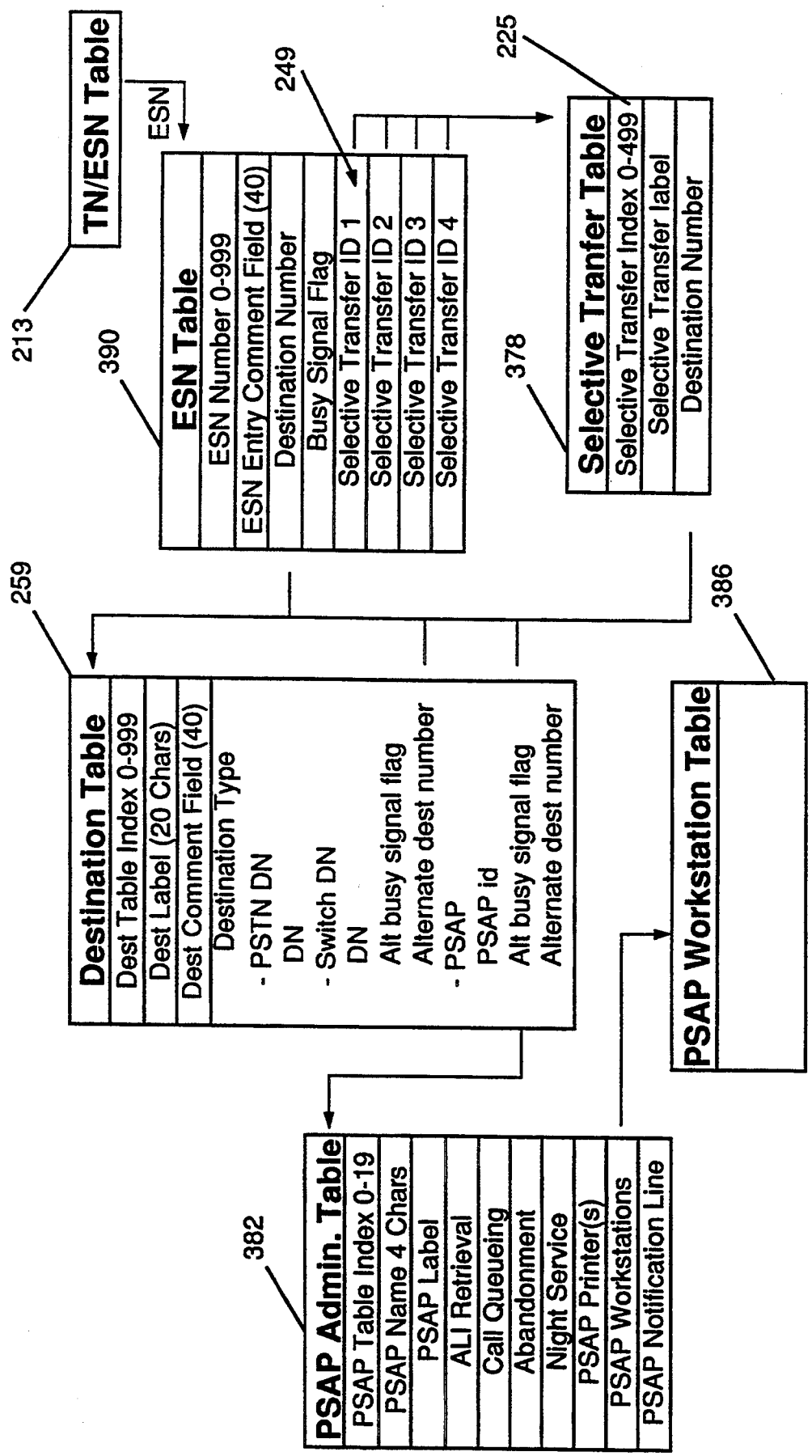
FIG. 10 is a diagram of tables in the AP for storing data used in routing the E9-1-1 calls to various PSAPs.

Routing the E9-1-1 Call: E9-1-1 calls 201 routed to a PSAP 216 by the platform 204 are sent to a common notification line 241 at the PSAP 216. Any attendant 221 at the PSAP 216 can pick up the E9-1-1 call 201 from the notification line 241. The attendant's screen 222 of its workstation 212 is then updated with information associated with the ESR's telephone number. Depending on the context, the word "screen" is used to refer to (1) the video (or display) portion of the workstation 212, and (2) information displayed or presented on that video portion in a specific format for viewing, such as by the attendant 221 or another administrator who uses the system 200. The attendant's screen 222 displays call origin information (Chart ALI1, FIG. 15B), including the caller's telephone number, the call routing reason, the inbound trunk 206 the call arrived on, information such as the ESR's name and street address assigned to the ESR's telephone number by an external (ALI/DMS) database system 224, and selective transfer points 225 (FIG. 10). A maximum of four selective transfer points can be assigned to an ESN. These transfer points 225 are usually ultimate call destinations associated with commonly called emergency service providers 211 (police, fire, medical, etc.) (FIG. 14) that are assigned by the local jurisdiction to serve the ESR's geographic region 209. Information about these selective transfer points 225 is displayed on the screen 222 with other E9-1-1 call information when a match within the TN/ESN table 213 has been found for the NPD and the TN of the ESR 202. Via a single operation performed by the attendant 221, the established E9-1-1 call 201 can then be transferred to the appropriate emergency service provider 211 without the attendant 221 having to determine and manually dial the digits of the ESP's telephone number.

Figure 16A:
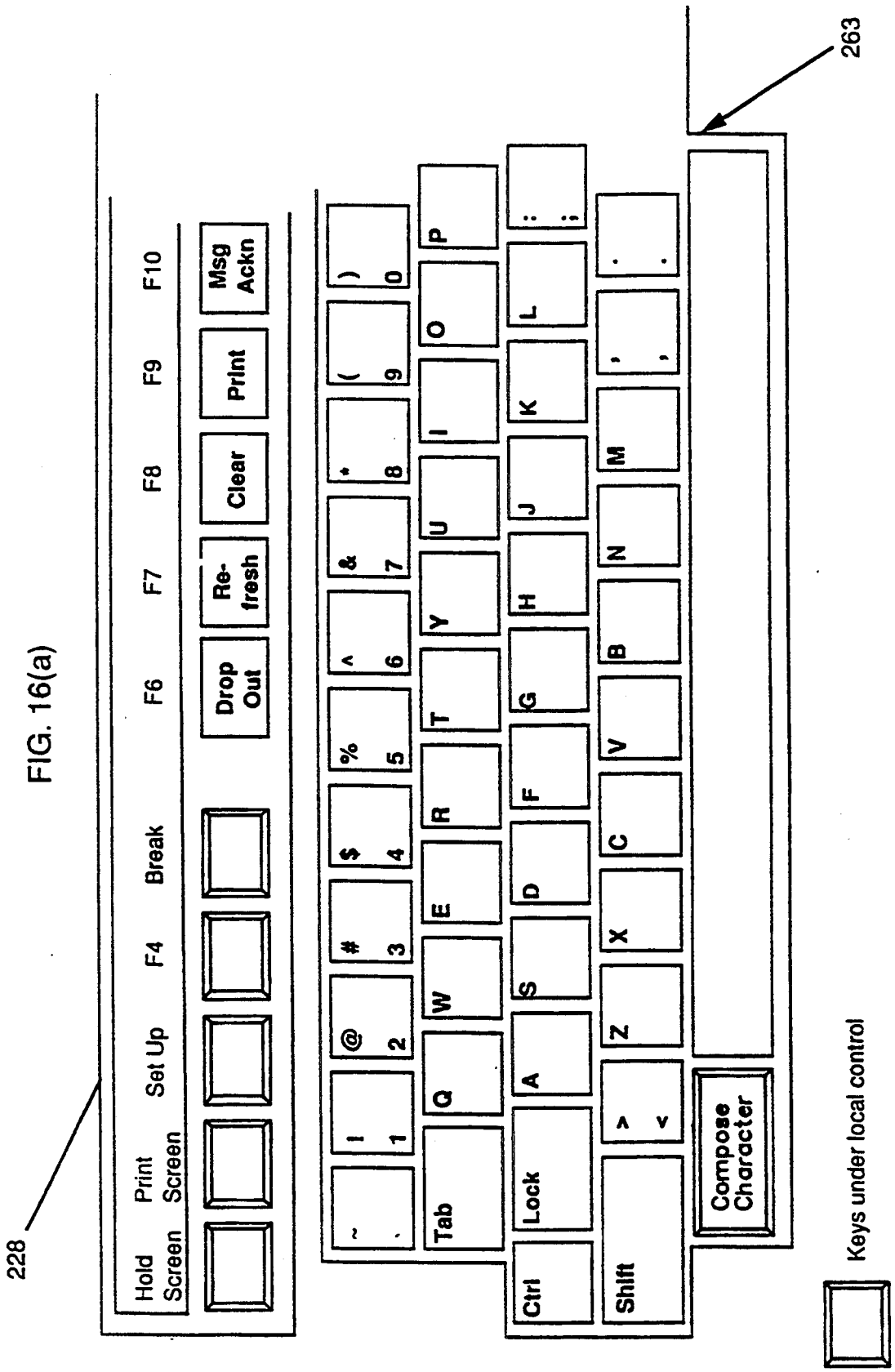
FIGS. 16(a) & 16(b) when connected at their respective right and left margins form a plan view of a workstation keyboard showing keys for use by an attendant.
Figure 16B:
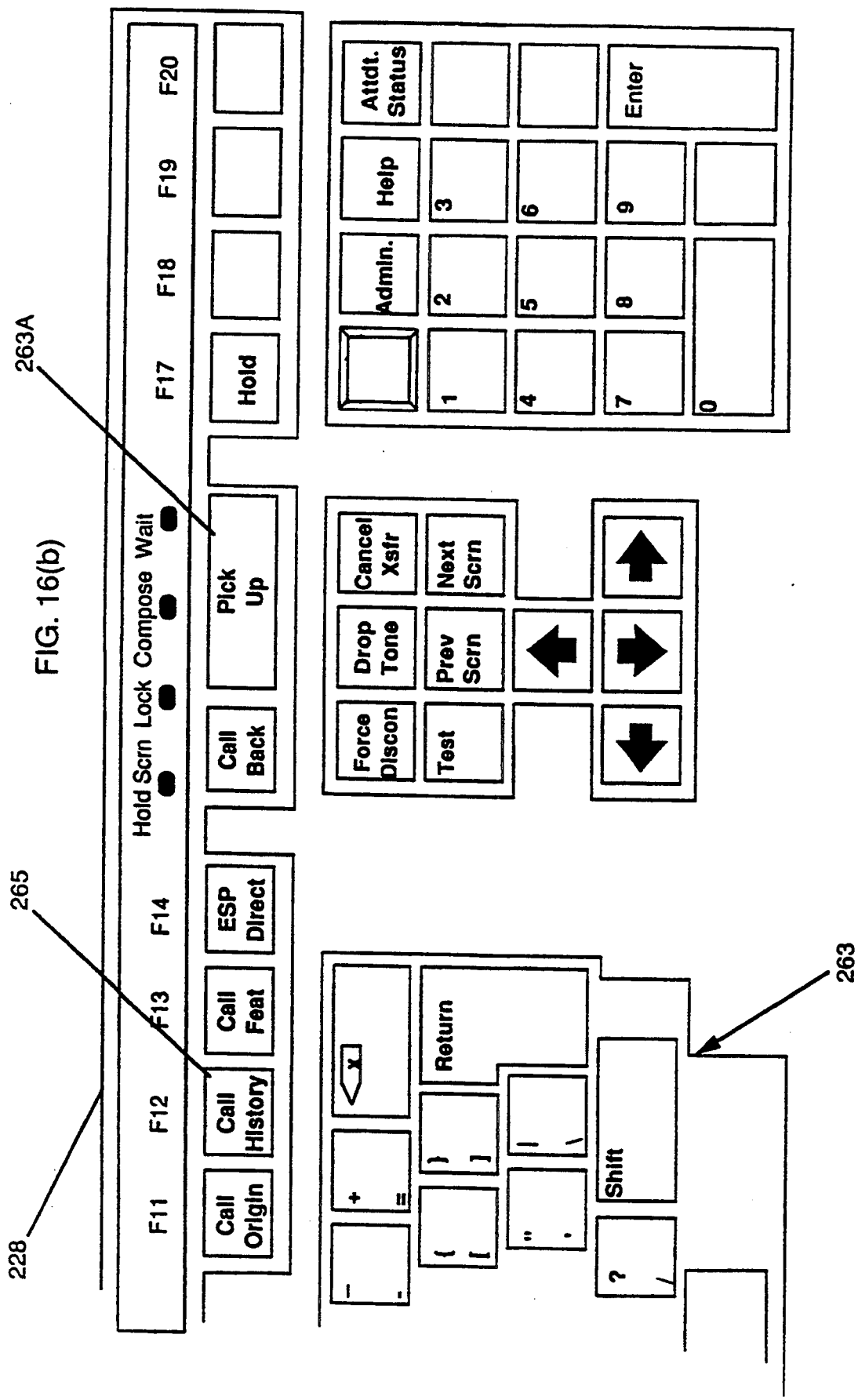

The attendant 221 can also use fixed or manual transfer features to connect an E9-1-1 call 201 to an ESP 211 if the ESP 211 needed is not one of the four selective transfer points 225 assigned to the ESN. The fixed transfer feature is provided by an auxiliary directory screen display (FIG. 17) that can be used to look up, generate, or transfer E9-1-1 calls 201 to other emergency service providers 211. Manual transfers are done by manually dialing a telephone number on a workstation telephone set 227 or by manually entering a telephone number at a workstation keyboard 228 (FIG. 16).

Figure 18:
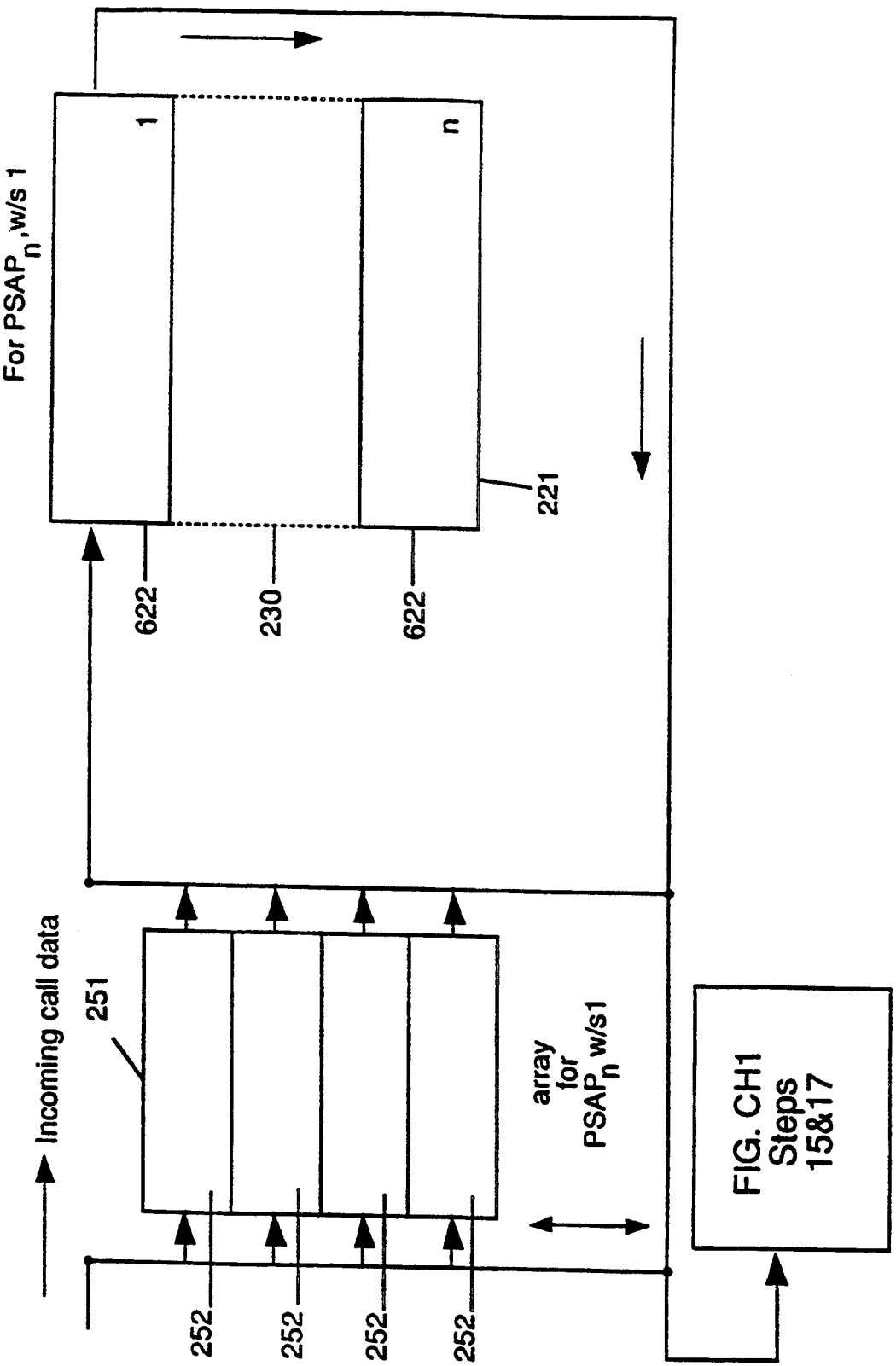
FIG. 18 is a schematic diagram of a call history log and a hard held storage location, where such logs stores records for four incoming E9-1-1 calls and such location stores a record for one E9-1-1 call placed on hard hold.

Call History/Call Back: When a first attendant 221 transfers an E9-1-1 201 call to a second attendant 221, calling information is presented on both attendants' screens 222. After the transfer is complete, the first attendant 221 originating the transfer can remain on the line until the E9-1-1 call 201 is complete or disconnected. If the first attendant 221 chooses to disconnect, the connection between the ESR 202 and the second attendant 221 is maintained. Attendants 221 can handle two E9-1-1 calls 201 simultaneously by placing one on hold in a hard hold storage facility 229 (FIG. 18) and (1) working the other, or (2) reviewing call history information about prior E9-1-1 calls answered and attempting to reestablish a call to the ESR 202 which originated a prior E9-1-1 call (call back).

Routing E9-1-1 Calls 201 /Administration: Still referring to FIGS. 1 and 13, operations, telephony facilities, and data used by the platform 204 during normal operations are as follows. Routing an E9-1-1 call 201 consists of recognizing that an E9-1-1 call 201 has been received over one of the E9-1-1 inbound ES trunks 206 and controlling the E9-1-1 call 201 until it has been directed to a call handling destination 215, handled by that destination 215, or connected to the busy-tone 220. The routing method applied to an E9-1-1 call 201 is determined by administration, attributes of the E9-1-1 call 201, and previous attempts to route the E9-1-1 call 201 (FIGS. 19 and 20). Administration includes administrable parameters for the ES trunk 206 on which the E9-1-1 call 201 was received. Attributes of an E9-1-1 call 201 that influence the selection of the routing method include whether or not automatic number identification (ANI) was received successfully. The routing methods supported include Selective Routing, Alternate Routing, Default Routing, Switch-Controlled Default Routing, Night Service Routing, and Last Chance Routing (FIGS. 19 and 20).

Workstation Interface: Information on the screen 222 of the attendant's workstation 212, the functions performed by the keyboard 228 and uses of the PSAP telephone sets 227 result in "workstation interfaces" which are used for call handling, administration, and for call routing. The screens 228 shown in FIGS. 15 and 17, for example, are part of that interface.

When an E9-1-1 call 201 is re-directed to a different call handling destination 215 from the PSAP 216 to which such E9-1-1 call 201 was originally directed, the platform 204 can be administered to print a call entry at the PSAP 216. This allows the original PSAP 216 to track E9-1-1 calls 201 that it would normally handle. This E9-1-1 call entry is only made if a PSAP 216 was the first choice destination for that E9-1-1 call 201.

Selective Routing: The Selective Routing method (FIG. 19, Step 2) automatically routes an incoming E9-1-1 call 201 to the appropriate call handling destination 215 based upon information retrieved from the TN/ESN table 213 (FIG. 10). To accomplish Selective Routing, a trunk group 206A (FIG. 3) that received the incoming E9-1-1 call 201 must be provisioned to provide ANI. When an E9-1-1 call 201 arrives at the platform 204, an applications processor (AP) 234 searches a trunk group translations table 235 (FIG. 10) for a match with the number of the ES trunk 206 over which the E9-1-1 call 201 arrived. When a match is found, the AP 234 retrieves the NPD assigned to the ES trunk 206. The AP 234 next searches the TN/ESN table 213 (FIG. 10) for a match using the combination of the NPD assigned to the receiving trunk 206 and the ANI telephone number. When a match is found, the platform 204 retrieves the ESN associated with the NPD-telephone number combination. Using the ESN, the platform 204 directs the E9-1-1 call 201 to the destination 215 associated with the ESN. If the combination of the NPD and ANI telephone number does not derive a call handling destination 215 ESN from the TN/ESN table, Default Routing (FIG. 19, Step 15) is applied.

Alternate Routing: An alternate destination may be another call handling destination 215 or the busy signal 220. Alternate Routing (FIG. 19, Step 13) is used under any of the following conditions: (1) the first call handling destination 215 to which an attempt is being made to route the E9-1-1 call 201 ("current destination") cannot receive the E9-1-1 call 201 due to facility failure or improper system translations (FIG. 19, Step 12), (2) that current destination 215 is an Abandoned PSAP 216 (FIG. 20, Step 105), (3) that current destination 215 is a PSAP 216 in Night Service (FIG. 20, Step 106) and Alternate Routing is the designated routing method (FIG. 20, Step 113), or (4) that current destination 215 is a PSAP 216 that has reached call capacity (FIG. 20, Step 104). If that current destination 215 cannot receive the E9-1-1 call 201, the platform 216 attempts to route the E9-1-1 call 201 to one of the alternate destinations (FIG. 20, Step 109) administered specifically for the current destination. This alternate destination becomes the new current destination for the E9-1-1 call 201. For destinations that are telephone numbers in the PSTN 219, an alternate destination is not specified.

States of PSAPs: The status or state of a PSAP 216 can be changed to Abandoned (FIG. 21) at any time. When this occurs, Alternate Routing (FIG. 20, Step 109) is applied to all E9-1-1 calls 201 that would have been directed to this PSAP 216 by another routing method. In this event, the platform 204 changes the destination of the routing attempt from the current destination to the alternate destination specified for that E9-1-1 call 201. Other PSAP states are described below and include Night Service, Active, Busy and at call capacity.

Default Routing: The Default Routing process (FIG. 19, Step 18) directs an E9-1-1 call 201 to a call handling destination 215 based on the ES trunk 206 on which the E9-1-1 call 201 was received. Default Routing is used when any of the following conditions (FIG. 20, Step 100) exist: (1) an incoming E9-1-1 call 201 is not accompanied by the telephone number of the ESR 202, (2) the telephone number of the ESR 202 is not received correctly, (3) the NPD-telephone number combination is not found in the TN/ESN table 213, (4) the platform 204 attempted to route the E9-1-1 call 201 to a destination 215 that was not administered on the platform 204, (5) Selective Routing has been disabled for the ES trunk 206, (6) no alternate was specified when the platform 204 attempted to perform alternate routing or (7) a loop was detected while doing alternate routing. The Default Routing process is based on the ES trunk 206 over which the E9-1-1 call 201 is received. Because each ES trunk 206 is associated with one end office 205, a general conclusion can be reached as to the probable locations of appropriate emergency service providers 211 for the caller 202. When Default Routing is used, the platform 204 uses the default destination administered for the trunk 206 that received the E9-1-1 call 201.

Figure 22:
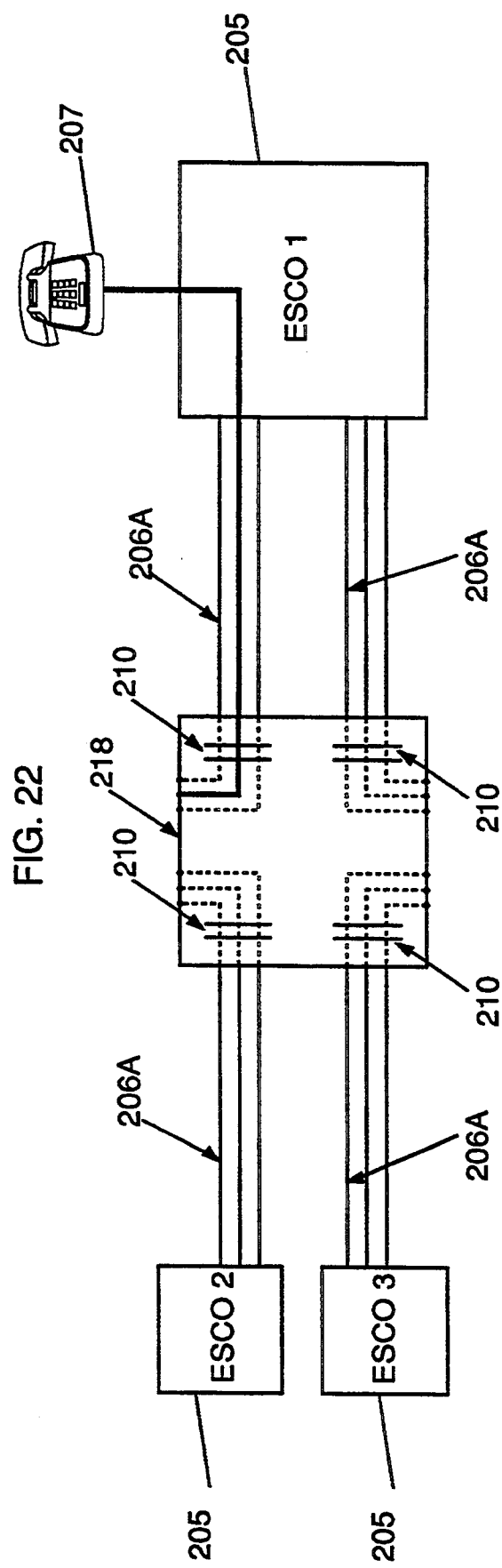
FIG. 22 is a schematic diagram of a switch which performs switch default routing.

The Switch-Controlled Default Routing (FIG. 22) process is an abnormal condition-handling mechanism. It is used when the platform's switch 218 does not receive from the AP routing instructions for a new E9-1-1 call 201 within a specified period of time. The switch 218 directs the E9-1-1 call 201 to a switch platform destination 215.

A manager of the platform (platform or system administrator 239) should ensure that the platform's switch default telephone number for a particular trunk 206 is the same as the telephone number associated with the default destination for the same trunk 206 as is administered on the AP 234.

Night Service Routing: Night Service routing (FIGS. 23, and 71–90) allows all E9-1-1 calls 201 which normally would be routed to a particular PSAP 216 to be automatically forwarded to another destination 215 based upon the day of the week and the time of day at which the E9-1-1 calls 201 are received by the platform 204. When the platform 204 attempts to route the E9-1-1 call 201 to a destination 215 that is "in" Night Service, the night service destination 215 (FIG. 24) becomes the current destination to which the platform 204 attempts to route the E9-1-1 call 201. The destination 215 can be a PSAP 216, a telephone number on the switch 218, a telephone number in the PSTN 219, or the busy-tone 220. A Night Service destination 215 can either be specified directly (administered/FIG. 24) or designated as the same destination as the alternate destination. Night Service routing can affect the destination of a selective transfer attempt from a PSAP 216.

Last Chance Routing: Last Chance routing (FIG. 19, Step 27) is used when the platform 204 has failed to reach a destination 215 via all other forms of routing. The platform 204 first attempts to route the E9-1-1 call 201 to any PSAP 216 that is available. If no PSAPs 216 are able to handle the E9-1-1 call 201, the platform 204 attempts to route the E9-1-1 call 201 to any non-PSAP PSAP destinations 215 that are TNs on the switch 218 (FIG. #LC 1, Step 2). If no TNs on the switch 218 are available to handle the E9-1-1 call 201, the platform 204 attempts to route the E9-1-1 call 201 to telephone numbers on the PSTN 219 (FIG. #LC_, Step 3). If Last Chance routing fails to route the E9-1-1 call 201 to a destination 215, the E9-1-1 call 201 is routed to the busy signal 220, and an entry in the system call log 244 is created. If Last Chance Routing is used to route an incoming E9-1-1 call 201, a minor system alarm is generated, including a log message at a platform printer 255.

Check Destination: The AP 234 directs the processing of an incoming E9-1-1 call 201, except under Switch Default Routing. The call handling destination 215 to which an E9-1-1 call 201 is ultimately directed is determined by a series of table searches and destination inspections, as illustrated in FIGS. 19 and 20. Data in a destination table 259 (FIG. 10) is subject to the following conditions. A physical destination can be represented more than once in the destination table 259. This allows varying the alternate destination handling. An alternate destination 215 is not specified for destinations that are administered as telephone numbers on the PSTN 219. An alternate destination 215 (table 259, FIG. 10) should be specified for each destination entry that is identified as either a PSAP 216 or a telephone number on the switch 219. The alternate and current destinations 215 cannot be the same. Instead of another destination 215, a destination's alternate can be the busy signal 220, PSAP 216, a PSTN 219 or platform TN.

Referring to FIG. 20, the platform 204 inspects the status of a destination 215 before attempting to route an E9-1-1 call 201 to the destination. If the current destination 215 is replaced by a new destination 215 during the inspecting process, the process of status inspection is repeated. If the destination is a PSAP 216, the platform 204 inspects the following status information before routing the E9-1-1 call 201. If the PSAP 216 is defined to be Abandoned (FIG. 21), the E9-1-1 call 201 is handled according to alternate routing (FIG. 20, Steps 105 and 109). If a PSAP Night Service schedule 262 (FIG. 23) coincides with the current date and time current $t_c$, the E9-1-1 call 201 is handled according to Night Service routing. If the PSAP 216 is administered to limit the number of E9-1-1 calls 201 directed to the PSAP 216 and a call capacity limit is met (FIG. 20, Step 104), the current destination 215 is replaced by the alternate destination 215.

For all destinations 215 including PSAPs 216, the platform 204 inspects the following status information before routing the E9-1-1 call 201. If the destination 215 is not administered, the platform 204 selects the default destination 215 assigned to the E9-1-1 call 201 and attempts to route the E9-1-1 call 201 to that destination 215 (FIG. 19, Step 16). If the switch 218 fails to route the E9-1-1 call 201 because of a lack of resources on the switch 218, or an invalid request by the AP 234 (such as redirecting to a DN that does not exist), the E9-1-1 call 201 is re-submitted for routing using the alternate route if not using last chance routing. If using last chance routing then next PSAP, DN or DN on PSTN is used depending upon what type of destination is currently being inspected.

The destination 215 associated with a selective transfer operation (FIG. 19, Step 2) is subject to destination inspection and the appropriate routing steps. A check for destination validity is performed. If the call handling destination 215 is in Night Service or is Abandoned or is at administered call capacity (FIG. 20), the C.E.R.S. system 200 attempts to route the E9-1-1 call to an alternate destination 215. If the alternate is a PSAP 216 that is Abandoned, administered or in Night Service, the C.E.R.S. system 200 continues to search for the next possible alternate. In the case that the alternate is not a PSAP 216 (is a TN), then the destination checks are not performed. The transfer search will continue until all possible alternate transfer scenarios are exhausted. There is a message 240 placed on the attendant's screen 227 showing that an alternate was chosen. The last transfer of the E9-1-1 call 201 is to the busy signal 220 (FIG. 19, Step 34).

PSAP Workstation Call Handling Operations: Call handling operations performed at each PSAP workstation 212, and the information displayed when those operations are performed, are described below. These operations include handling an incoming E9-1-1 call 201, handling the emergency, and connecting the E9-1-1 call 201 to the ESP 211. Incoming E9-1-1 calls 201 are directed to the PSAP 216 using an any station answer call distribution feature. This feature sends all incoming E9-1-1 calls 201 destined for a given PSAP 216 to the notification line 241 (FIGS. 1 and 4), a single telephone line terminated within the given PSAP 216. This line 241 is attached to an audible and/or visual notification device 242 (FIG. 1) so that all attendants 221 at the given PSAP 216 can easily perceive the arrival of incoming E9-1-1 calls 201 to the given PSAP 216. E9-1-1 calls 201 are queued (first in/first out) in a hunt group queue 243 (FIG. 4) if they are directed to the PSAP 216 when the notification line 241 is busy. The oldest E9-1-1 call 201 in the hunt group queue 243 is directed to the notification line 241 when the E9-1-1 call 201 on the notification line 241 is answered. Any attendant 221 at a PSAP 216 can answer E9-1-1 calls 201 directed to this notification line 241 by performing a call pick up operation (FIG. 16). The total number of E9-1-1 calls 201 waiting to be handled at a PSAP 216 can be limited by administration (FIG. 25). When this call capacity limit is met or exceeded, all subsequent E9-1-1 calls 201 are redirected to the alternate destination 215 until the limit is no longer met or exceeded.

An attendant 221 (second) can receive transferred calls 201 from an attendant 221 (first) at another PSAP 216 or at the same PSAP 216. These calls 201 are answered when the second attendant 221 goes off-hook. The calling party (or ESR) information for transferred calls displayed at the second attendant's destination 215 matches the information displayed for the first attendant 221 initiating the transfer. The workstation screen 222 (FIG. 13) of the second attendant 221 answering the transfer also contains information that identifies the PSAP 216 and the first attendant 221 initiating the transfer.

Figure 26:
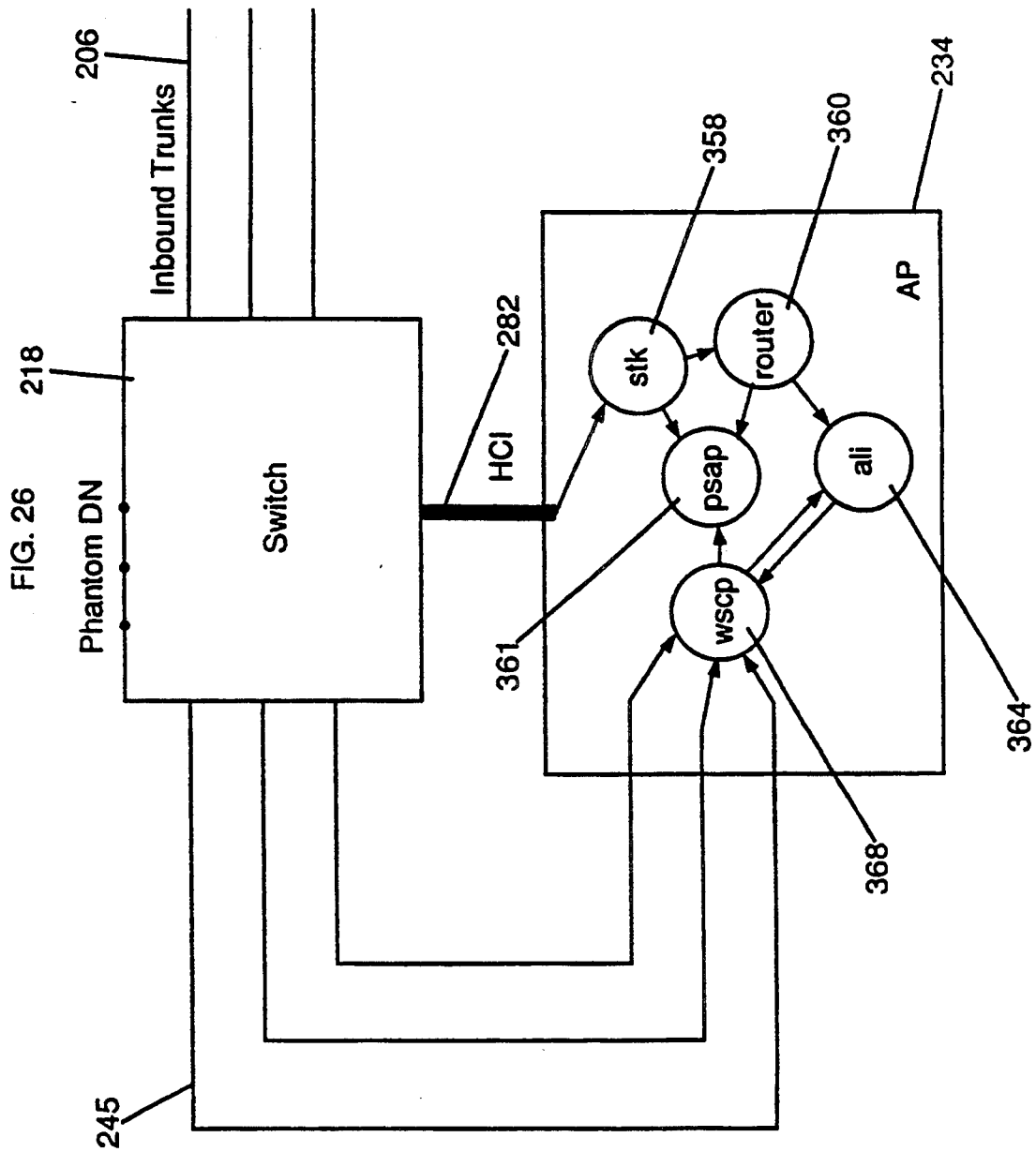
FIG. 26 is a schematic diagram of the platform of the C.E.R.S. system, illustrating the switch and attendant lines therefrom to the AP.
Figure 48:
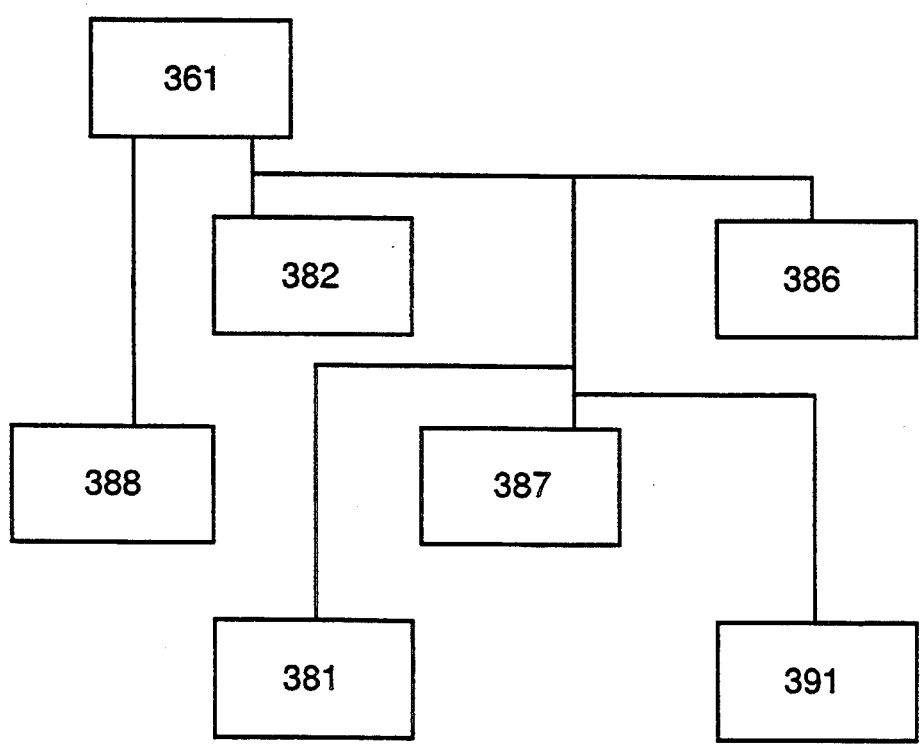
FIG. 48 is a schematic diagram of various tables used by a psap process.
Figure 54:
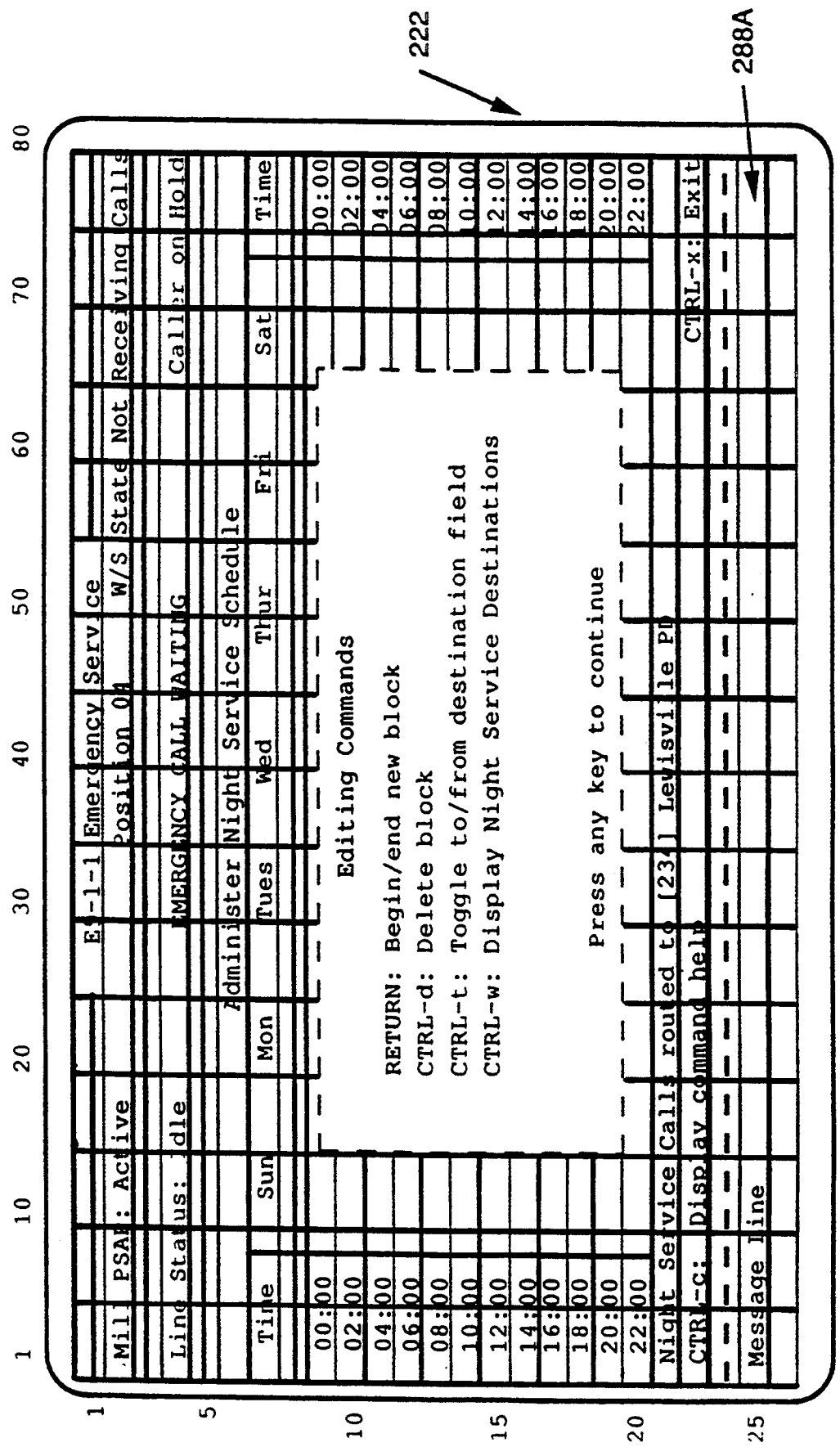
FIG. 54 is a diagram of a screen showing an "editing commands" window.
Figure 55:
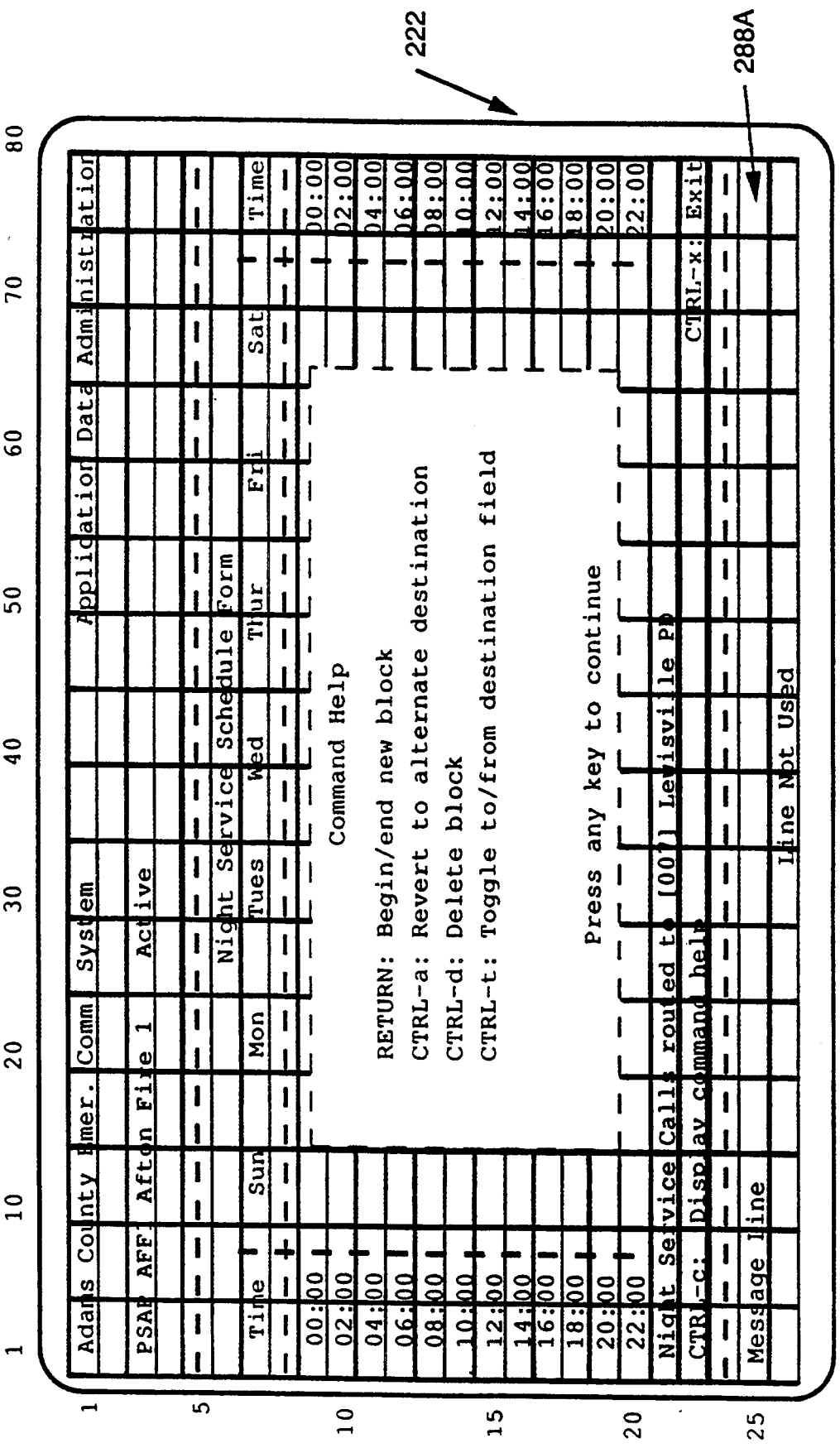
FIG. 55 is a diagram of a screen showing the screen shown in FIG. 23, illustrating a "command help" window.

Incoming 9-1-1 calls 201 in which the caller 202 hangs up prematurely are classified by the platform 204 as abandoned. The platform 204 further classifies abandoned E9-1-1 calls 201 as (1) E9-1-1 calls 201 abandoned before the attendant 221 answers, where the 9-1-1 caller (ESR) 202 hangs up before the E9-1-1 call 201 can be answered by an attendant 221; and (2) E9-1-1 calls 201 abandoned after the attendant 221 answers, where the 9-1-1 caller 202 hangs up during an established E9-1-1 call 201 before all other parties in the E9-1-1 call 201 disconnect. In both types, if the E9-1-1 call 201 is routed to a PSAP 216, a low-tone 247 is used to indicate to the attendant that the caller 202 abandoned (all tones are generally indicated by the reference number 247-see FIG. 3). The low tone 247 is present on the line 203 for a short period of time. The volume of the low-tone 247 is not high enough to prevent audible conversation between parties connected while the low-tone is present. The low-tone 247 is removed from an attendant's line 246 (FIG. 26) if the attendant 221 performs any call operations that change the calling state of a voice line 245 (i.e., when the attendant 221 disconnects, initiates a new call 318 (FIG. 3), or attempts a call back operation).

When an E9-1-1 call 201 is abandoned by an E9-1-1 caller 202 before it can be answered, the E9-1-1 call 201 is held up by the platform switch 218 and the low tone 247 is provided when answered. When the AP 234 is running, the ES trunk 206 is held for two minutes. The trunk 206 is dropped if not answered within that time and a message 288 is logged at the PSAP call log printer 255 (FIG. 5). All attendants 221 at the PSAP 216 will get a message 240 on their screen 222 (FIG. 15B, line twenty-four) with respect to the E9-1-1 call 201. If the ANI was not provided by the PSTN 219 or the E9-1-1 call 201 was routed to this PSTN 219 or to a telephone number on the switch 218, then the E9-1-1 call 201 is dropped immediately.

If the AP 234 is down, the ES trunk 206 will be held up (active) until an attendant 221 answers. If the AP 234 restarts and the E9-1-1 call 201 is not answered within two minutes after restart, an alarm is raised. The ESP 202 answering the E9-1-1 call hears the low-tone 247. If the ESP 202 is a PSAP attendant 221, the attendant's terminal screen 222 contains call information (FIG. 15(b)) based on ANI received with the E9-1-1 call 201 and caller abandoned notification. The call information is recorded in the call log 244 when the attendant 221 disconnects. No actions are performed by the platform 204 for an E9-1-1 call 201 if the caller 202 hangs up before ANI can be collected.

When an E9-1-1 call 201 is abandoned by an E9-1-1 caller 202 after the E9-1-1 call 201 has been answered by an attendant 221, the PSAP attendants 221 receive visual indication on their terminal screens 222 that the E9-1-1 call 201 has been abandoned (FIG. 15, shown at line 24).

E9-1-1 calls 201 received at a workstation 212 from sources other than ES trunks 206 are known as "anonymous calls". An anonymous call is received at a workstation 212 as a result of the dialing of the seven-digit telephone number assigned to the workstation 212 or the PSAP 216. It is referred to as an anonymous call because caller location information does not accompany the E9-1-1 call 201. An anonymous call can be received at the workstation telephone 227 from two different sources; a location in the PSTN 219, or telephone lines connected to the serving switch 324 (FIG. 1). Anonymous calls can be received at a PSAP 216 or at a PSAP workstation 212 from non-E9-1-1 trunks. Any telephone directly connected to the serving switch 324 can be dialed from any other telephone also connected to the serving switch 324.

PSAP Attendant Call Routing Operations

Call handling operations are performed by PSAP attendants 221 through their workstation interfaces using the keyboards 228 and/or the telephone sets 227. These operations include the following.

Call Pick Up: An attendant 221 directs a next E9-1-1 call 201 to his or her workstation 212 from the notification line 241 by using pickup capabilities provided by the workstation interface (FIG. 16). This pick up operation can be performed at any time except (1) when the workstation telephone set 227 has been taken out of service by the switch 218, (2) the workstation telephone set 227 is ringing while on-hook, (3) a previous E9-1-1 call 201 is in process while attendant 221 is off hook answering the other E9-1-1 call or (4) another party is on consultation-hold.

No audible feedback is given for the first three items. However, the attendant 221 will hear a tone 247 (reorder tone) if the pick up operation is performed while a caller 202 is on consultation hold. The attendant 221 will also hear the reorder tone 247 if the pick up operation is performed when no E9-1-1 call 201 is present at the notification line 241. The attendant's telephone set 227 rings when the pick up operation is performed while the telephone set 227 is on-hook. When the attendant 221 goes off-hook, the E9-1-1 call 201 on the notification line 241 is directed to the attendant workstation 212. If the operational status of a workstation 212 is currently Not Receiving Calls, it is automatically changed to Receiving Calls when the call pick up operation is performed (see screen 222 in FIG. 15, line 2 "receiving calls").

Figure 13:
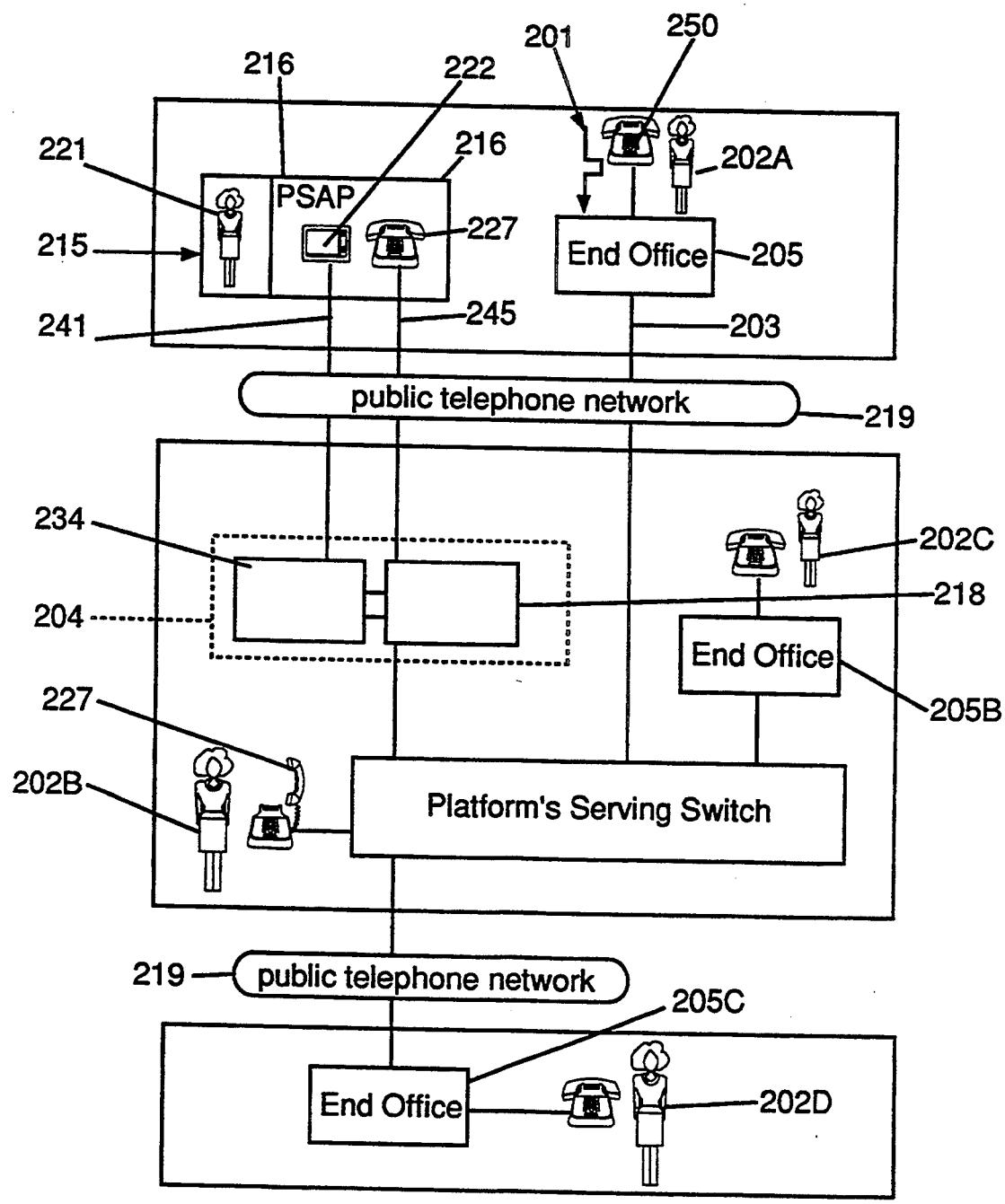
FIG. 13 is a schematic diagram showing a platform providing community emergency response services to three geographic regions.

Referring to FIGS. 4 and 13, the following special conditions exist if there is one E9-1-1 call 201 at the notification line 241, at least one E9-1-1 201 call in the hunt group queue 243, and more than one attendant 221 attempts to perform a call pick up: (1) one attendant 221 is allocated the E9-1-1 call 201 at the notification line 241, and (2) E9-1-1 calls 201 in the hunt group queue 243 are directed to the attendants 221 which request call pick up until all E9-1-1 calls 201 have been allocated or all outstanding pick up requests have been satisfied. Those attendants 221 not allocated an E9-1-1 call 201 will hear the reorder tone 247.

Selective Transfer: This method enables the PSAP attendant 221 to quickly transfer an incoming E9-1-1 call 201 to one of the four possible transfer points 225 displayed with an E9-1-1 call 201 (FIG. 10). The PSAP attendant 221 initiates a selective transfer with a single operation, e.g., Arrow Key to the transfer "label" corresponding to the desired destination 215, followed by "RETURN," or press a number key 263 (1 through 4) followed by "return" (FIG. 16). The selective transfer operation has the following characteristics:

1. Only one selective transfer by any one attendant 221 at the same PSAP 216 can be performed at a time.

2. Each attendant 221 involved in an E9-1-1 call 201 has the capability to perform a selective transfer. In this manner, multiple emergency service providers 211 can be bridged onto an E9-1-1 call 201 by a process of call chaining. For example, call chaining is accomplished when attendant #1 adds attendant #2 to a E9-1-1 call 201, after which attendant #2 adds attendant #3 to the E9-1-1 call 201, and so on.

3. The selective transfer destination(s) displayed at the workstation screen 222 (FIG. 27) are always based on the ESN derived from the TN/ESN table 213 translations, regardless of the particular PSAP 216 that is handling the call E9-1-1201.

4. If an ESN for an E9-1-1 call 201 cannot be derived from the TN/ESN table 213 translations, the PSAP attendant 221 is not allowed to invoke a selective transfer during the E9-1-1 call 201.

5. The E9-1-1 call 201 can be transferred to one of the alternate destinations that is different from the current one selected by the attendant 221 if the current call handling destination 215 is a PSAP 216 on the platform 204 and the current destination 215 is in one of the Abandoned or Night Service states (FIG. 21), or if the incoming call capacity limit (FIG. 25, lines 11 and 12) has been reached. When one of the above states exists for the current destination 215 the attendant 221 performing the transfer is notified that the E9-1-1 call 201 is being transferred (or redirected) to an alternate destination.

6. Additional selective transfers cannot be performed by the attendant 221 until the party added to the E9-1-1 call 201 via a previous transfer has been dropped from the E9-1-1 call 201 or has disconnected.

7. Selective transfer can also be performed after the caller 201 has disconnected. In this situation, an E9-1-1 call 201 is placed to the transfer point destination. The caller information on the attendant's screen 222 is displayed at the destination if the destination is another PSAP 216.

For all transfers (selective, fixed or manual), the parties in the E9-1-1 call 201 will hear (1) the busy signal 220 (FIG. 19, Step 34) if physical switching facilities are not available to complete the E9-1-1 call 201 or (2) the reorder tone 247 if the destination 215 selected or dialed is not a valid telephone number. E9-1-1 calls 201 transferred to the PSTN 219 will receive tones or recorded announcements 247 provided by the PSTN 219 if the E9-1-1 call 201 cannot be completed because of resource problems within the PSTN 219. The selective transfer label and telephone number (may be an ESP number) are administered on the AP 234.

Fixed Transfer: In this method, the PSAP attendant 221 can transfer an E9-1-1 call 201 by selecting a fixed transfer destination 215 from a directory 249 (FIG. 10) of commonly used telephone numbers displayed at the workstation 212 and administered separately for the PSAP 216. Any E9-1-1 calls 201 transferred using the fixed transfer operation are directed to the number found in the directory 249. No alternate routing is available for this feature. The fixed transfer directory 249 can also be used to generate a call when no call is active from the PSAP 216.

Manual Transfer: If the attendant 221 chooses to transfer an E9-1-1 call 201 to a telephone number that is not provided by the selective transfer or fixed transfer functions, the attendant can perform a manual transfer by entering a telephone number using the terminal interface provided by the workstation 212 or using the telephone set keypad 250 (FIGS. 1 and 13).

Consultation Hold: E9-1-1 calls 201 can be placed on consultation (or "soft") hold by the attendant 221 performing a flash-hook action on the workstation telephone set 227. The same E9-1-1 call 201 can be retrieved when the attendant 221 performs a second flash-hook. Call pick up cannot be performed while an E9-1-1 call 201 is on consultation hold. If the ESR 202 abandons the E9-1-1 call 201 while on consultation hold, the call connection is held for two minutes. If the E9-1-1 call 201 is attempted to be retrieved after the caller 202 abandoned, the low tone 247 stays on the line 203 for five seconds after the retrieval attempt. After two minutes the connection is dropped and a message 263 is displayed on the screen 222 of the attendant's terminal 222 (line 24).

Hard Hold: By placing an established E9-1-1 call on hard hold, the attendant 221 can drop the voice path with an ESR 202, but retain the ability to reestablish the connection. Once an E9-1-1 call 201 has been put on hard hold, the attendant 221 can use the call pick up operation or dial telephone numbers to set up calls with other parties, including three-way calls. A dial tone 247 is heard immediately on the attendant's line 245 after the E9-1-1 call 201 has been placed on hard hold, and does so by pressing a HOLD key 266 of the keyboard 228. Each attendant 221 can place one E9-1-1 call 201 on hard hold. The functionality provided by hard hold is similar to consultation hold, except that a flash-hook does not restore the voice connection with the party on hard hold. The voice connection can only be re-established using the hard hold retrieval operation provided by the platform 204. The workstation telephone set 227 rings if the attendant 221 attempts to retrieve the E9-1-1 call 201 from hard hold while on-hook. The retrieval operation can only be performed after all connections have been dropped, except for the hard-held connection.

Callers 202 whose E9-1-1 calls 201 are placed on hard hold hear silence. The E9-1-1 customer 202 has the option of buying devices (not shown) that provide some type of announcement to callers 202 on hard hold. If a caller 202 whose E9-1-1 call 201 has been placed on hard hold disconnects before the attendant 221 retrieves the E9-1-1 call 201 and the attendant 221 attempts to retrieve the now-abandoned E9-1-1 call 201, a message 263 appears on the screen 222 (FIG. 17, line 24) of the attendant's workstation 212 indicating that the caller 202 has disconnected. If the caller 202 abandons while on hard hold (FIG. 17, line 4 of screen 222), the E9-1-1 call connection will be held for two minutes. If the E9-1-1 call 201 is attempted to be retrieved after the caller abandoned, the low tone 247 stays on the line 203 for five seconds after the retrieval attempt.

Any of the attendant operations can be performed while a party is on hard hold, with the following exceptions:

1. Parties that are active in a conference (e.g., three-way) call cannot be placed on hard hold.

2. An E9-1-1 call 201 cannot be placed on hard hold if another E9-1-1 call 201 is currently on consultation hold.

3. An E9-1-1 call 201 cannot be retrieved from hard hold if another E9-1-1 call 201 is on consultation hold.

ALI Fetch/New ALI Fetch Operations: The platform 204 provides the attendant 221 with the ability to make additional on-demand requests for automatic location identification (ALI) and selective transfer destination data. This functionality allows the attendant 221 access to such data when the attendant 221 determines that the information presented on the screen 222 is insufficient, incorrect or does not match the location of the emergency. This functionality is provided by ALI Fetch and New ALI Fetch operations, as follows:

1. The ALI Fetch operation re-retrieves ALI information associated with the telephone number currently displayed on the attendant's screen 222.

2. The New ALI Fetch operation allows the attendant 221 to enter a telephone number at the workstation 212 and retrieve New ALI and selective transfer information for the telephone number entered.

The following characteristics are common to both types of on-demand retrieval of call information:

1. If a "clear screen" operation is performed after making the request for retrieval of call information, the attendant's screen 222 is repainted.

2. The attendant's screen 222 is not updated if the attendant 221 is viewing information from the workstation's call history log 251 when the response from the ALI/DMS system 224 is received.

3. A count of the number of on-demand retrievals of call information performed by the platform 204 is kept. This count can be accessed via reports produced for the platform 204.

Via ALI Fetch, the attendant 221 can ask the E9-1-1 platform 204 at any time to re-retrieve ALI information associated with the telephone number displayed with the ALI information on the screen 222. An attendant 221 may wish to make this ALI Fetch if the ALI information being viewed on the screen 222 is believed to be incorrect because of transmission errors. The information received in the response to ALI Fetch replaces the ALI information associated with the E9-1-1 call 201. The ALI information displayed on the attendant's screen 222 when the request was performed is replaced by data retrieved from the ALI Fetch request.

New ALI Fetch: The New ALI Fetch function allows an attendant 221 to enter a telephone number and receive the associated ALI and selective transfer points 225. There are two factors considered in sequencing what happens to the call history log 251 when an ALI Fetch is performed. These involve whether or not there is an active (active voice connection) E9-1-1 call 201 (FIG. 15, line 4) present in the workstation's call history log 251 when the ALI Fetch is performed. The workstation's call history log 251 (FIGS. 18 and 28) has four positions 252 for call records 253 or entries. As more New ALI Fetch operations are performed, the active E9-1-1 call 201 is identified as a later and later received E9-1-1 call 201 in the call history log 251 may be removed from the call history log 251 even though such E9-1-1 call 201 is active.

The E9-1-1 platform 204 searches the TN/ESN table 213 (FIG. 10) for the telephone number entered and displays the selective transfer points assigned to the ESN associated with the new telephone number. The E9-1-1 platform 204 also sends a request to the ALI/DMS system 224 for ALI information. When there is no match found, a message 263 displays the condition that ALI data is not available. If the attendant 221 is viewing the same screen 222 that was viewed when the New ALI Fetch was performed, the New ALI information is displayed on the screen 222 (FIG. 15) when received. If the attendant 221 is viewing a different screen 222 from the screen 222 which was being viewed when the New ALI Fetch was initiated, a message 263 indicates the fact that the data has been received on the screen 222. The attendant 221 returns to the screen 222 that was viewed when the New ALI Fetch was performed to view the new ALI information. The information received in response to a New ALI Fetch is distributed to the call history log 251 (FIG. 18) and/or the call log 244. That New ALI information may be inserted in both the call history log 251 and to a PSAP ALI printer 254 (if ALI printing is activated). The selective transfer information is inserted only in the call history log 251.

An entry is made in a system call file 251A (FIG. 5) and, if administered, at a PSAP call printer 255 (FIG. 5) when an attendant 221 enters a new telephone number for an E9-1-1 call 201 currently being handled. This information contains the telephone number (via ANI) originally received with the E9-1-1 call 201, the telephone number entered by the attendant 221, the time at which the request was made, and the position number associated with the workstation 222 making the request. The ANI information originally received for the E9-1-1 call 201 is always displayed on the attendant's screen 222, This information is not overwritten when a new telephone number is entered and is displayed on the screens 222 of all attendants 221 attached to the E9-1-1 call 201. The ability to perform the New ALI Fetch function may be disabled for each PSAP 216.

Clear/Refresh Screen: Clearing the screen 222 is accomplished with a CLEAR SCREEN key 264 (FIG. 16) of the keyboard 228. When data on an attendant's screen 222 becomes garbled because of transmission problems between the AP 234 and the attendant workstation 212, the attendant 221 can request re-transmission of all data by employing a refresh screen function. This operation does not cause a new ALI request to be submitted.

Call History: Information for (1) E9-1-1 calls 201 and/or (2) New ALI Fetch operations previously handled at a workstation 212 can be quickly viewed on the workstation screen 222 by the attendant 221 at anytime by employing a call history function. These E9-1-1 calls 201 accessible via the call history function include the last "n" calls which were previously handled by the attendant 221. In the preferred embodiment of the C.E.R.S. system 200, "n"=four. In the embodiment described, data representing these last "n" E9-1-1 calls 201 are stored in the four positions 252 of the call history log 251. To perform any call routing function with respect to a particular E9-1-1 call 201, a record 253 representing such E9-1-1 call 201 is read from the call history log 251 and is displayed on the screen 222 at the workstation 212. An E9-1-1 call 201 is added to the call history log 251 if its characteristics meet certain criteria. Generally, ALI data for an E9-1-1 call 201 that is incoming to the particular workstation 212 arrives after the E9-1-1 call 201. Therefore, the later arriving ALI data for a given E9-1-1 call 201 in the call history log 251 is matched to such E9-1-1 call 201 and added to the call history log 251. An E9-1-1 call 201 that has been placed on hard hold at the workstation 212 already has such ALI data, so when such E9-1-1 call 201 is taken off hard hold it is again added to the call history log 251 with its ALI data.

A particular E9-1-1 call 201 in the call history log 251 may be displayed on the screen 222 by use of a CALL HIST key 265 (FIG. 16) of the keyboard 228. Repeated use of this key 265 results in paging through and sequentially displaying on the screen 222 all of the E9-1-1 calls 201 currently in the call history log 251. When the desired or "selected" E9-1-1 call appears on the screen 222 (FIG. 15), then that selected E9-1-1 call 201 may be handled by the attendant 221.

Call Back: Having used the CALL HIST key 265 to select and currently display a particular E9-1-1 call 201 previously handled at the workstation 212, the attendant 221 may initiate placing a return call 318 (FIG. 3) to the caller 202 who placed that particular E9-1-1 call 201. That return call 318 (or "call back") is initiated by a single operation, namely the attendant 221 pressing a CALL BACK key 267 of the keyboard 228 (FIG. 16). The return or call back call 318 is then placed to the TN which is in the call history record 252 of that particular E9-1-1 call 201 and which is currently displayed on the screen 222. If New ALI Fetch has been performed, the telephone number used in the call back operation is the telephone number which has been entered in the call history log 251 based on the New ALI Fetch operation. The call back function causes the displayed TN to be checked, and if it is valid, causes the switch 218 to place the call 318 back to that caller (ESR) 202 who may still be at the telephone set 207 (FIG. 1) to which such TN is assigned. The call back function enables the attendant 221 to quickly, in a single operation without leaving the workstation 212, recall such caller 202 and obtain current information as to the status of the emergency which initially prompted the caller 202 to place the E9-1-1 call 201. Having done that, the attendant 221 may quickly take further action on that emergency call 201, or quickly attend to handling another E9-1-1 call 201.

Drop Out: This function allows the PSAP attendant 221 to disconnect from either a two-party or a three-party E9-1-1 call. This function enables the attendant 221 to handle another E9-1-1 call 201 or perform other operations. When the attendant 221 is connected to either a two-party or three-party E9-1-1 call and invokes the drop out function (key 267A, FIG. 16), the E9-1-1 platform 204 disconnects the attendant 221 and returns a dial tone 247 to the attendant 221. When the attendant 221 is in a three-party E9-1-1 call and invokes the drop out function, the E9-1-1 platform 204 leaves the remaining parties in a two-party call.

Drop Transfer: This function allows the attendant 221, with a single action (key "CNCL XFR", FIG. 16), to drop all parties added to an E9-1-1 call 201 after the attendant 221 has initiated a three-way call. Once the drop transfer function is performed, the attendant 221 and the original calling party remain connected. The drop transfer function is allowed only for three-way calls.

Forced Disconnect: This function allows the PSAP attendant 221 to release the incoming ES trunk 206 to which the PSAP attendant 221 was connected (connected trunk) even though the calling party has not yet hung up. The forced disconnect function prevents blockage of incoming ES trunks 206 to the platform. The forced disconnect function has the following characteristics:

1. The forced disconnect function is only available when the attendant 221 is connected with an E9-1-1 call 201 over an incoming ES trunk 206. The function is not available for other types of connections.

2. When the attendant 221 is in a two-party E9-1-1 call 201 and invokes the forced disconnect function, the platform 204 releases the incoming ES trunk 206 and returns dial tone 247 to the attendant 221.

3. When the attendant 221 is in a three-party E9-1-1 call and invokes the Forced Disconnect function, the platform 204 releases the incoming ES trunk 206 and leaves the attendant 221 in a call with the remaining parties.

Receiving/Not Receiving Call State of Attendant's Position: The term "attendant's position(s)" identifies a particular one of the many workstations 212 at a given PSAP 216. At any time an attendant 221 can remove or insert a particular workstation 212 from the workstations which are available at the given PSAP 216 for picking up incoming E9-1-1 calls 201. These available workstations 212 may be considered as a "pool." Workstations 212 in the pool are considered Receiving Calls (FIG. 15, line 2 of screen 222), while those removed from the pool are treated as Not Receiving Calls. Thus, an attendant's position has the same condition ("Receiving Calls" or "Not Receiving Calls" as the workstation 212 at such position). The conditions of Receiving Calls/Not Receiving Calls of each attendant's workstation 212 have the following characteristics:

1. An electronic Do Not Disturb condition (message line 24, FIG. 15) is placed on the attendant's workstation DN line 257 while the workstation 212 is Not Receiving Calls. This condition prevents callers 202 from ringing the attendant's telephone set 227. Any party calling the workstation telephone set 227 during the Not Receiving Calls state hears a special busy-tone 247, The Do Not Disturb condition is removed when the attendant's position is returned to the Receiving Calls state.

2. If incoming E9-1-1 call capacity is limited (FIG. 25, line 12) for a given PSAP 216, the number of workstations 212 of such given PSAP 216 currently Receiving Calls is used to determine the number of E9-1-1 calls 201 that can be directed to that given PSAP 216 (FIG. #LC3, Steps 14–16).

3. All workstation operations are available to the attendant while the position is Not Receiving Calls.

4. All attendant positions are initialized in the Not Receiving Calls state when the C.E.R.S. system 200 is restarted or initialized. Attendants 221 are responsible for enabling their positions following such initialization. A Do Not Disturb condition is not placed on the voice lines 245 when the AP 234 restarts in case the attendant 221 is in the process of handling E9-1-1 calls 201 when the AP 234 becomes operational. In this case, any E9-1-1 calls 201 sent to the attendant's telephone set 227 while it is disabled can be answered by the attendant 221 and information for that E9-1-1 call 201 is displayed on the attendant's screen 222.

5. Failure to re-activate the workstation 212 could cause E9-1-1 calls 201 to be sent by alternate routing to other PSAPs 216 (e.g., if incoming call capacity for the notification line 241 is limited, FIG. 25, line 12).

6. An attendant 221 can change the workstation 212 to the Not Receiving Calls state while connected in an E9-1-1 call 201. When the Not Receiving Calls state is activated, the Do Not Disturb condition is placed on the workstation voice line 245 immediately and the number of workstations 212 used to calculate the limit for incoming call capacity is reduced by one. However, the E9-1-1 call 201 which is currently in progress remains established until the attendant 221 terminates the connection.

Manual Operations: In the event that the AP 234 is not operational, several operations are manually available to the attendant 221. Administrable access codes permit call pick up, hard hold, and removing the Do-Not-Disturb condition. In addition, the attendant 221 can perform a manual transfer of an E9-1-1 call 201 by executing the following sequence: (1) A flash-hook, (2) dial digits for the transfer destination, and (3) a second flash-hook.

Computer Aided Dispatch Interface: The C.E.R.S. system 200 supports an interface to computer aided dispatch (CAD) system equipment 269 (FIG. 1). This provides a link between the AP and CAD equipment 269 (FIG. 1) provided by the user of the C.E.R.S. system 200.

Information Displayed On Attendant Screen 222

In general, referring to FIGS. 15(a) & 15(b), the following information may be displayed on the screen 222 of each attendant's workstation 212.

Call Waiting: Referring to line 4 on the screen 222, the displays of all attendant positions at a PSAP 216 are updated when an E9-1-1 call 201 arrives at the notification line 241 associated with that PSAP 216. The "EMERGENCY CALL WAITING" message 263 presented gives attendants 221 visual indication that an E9-1-1 call 201 is waiting. The message 263 remains on the screen 222 until the E9-1-1 call 201 has been picked up or until the E9-1-1 caller 201 has disconnected.

ANI Data: The ANI information collected for a particular E9-1-1 call 201 is always displayed at the workstation 212 until the attendant 221 clears the screen 222 (line 7 on the screen 222 in FIG. 15). This seven digit number is preceded by the area code of the caller's serving end office 205. When any of the following conditions exist, the telephone number normally supplied via ANI for incoming E9-1-1 calls 201 is not received by the platform 204:

1. E9-1-1 calls 201 arriving over a trunk 206 that is not capable of forwarding ANI data.
2. E9-1-1 calls 201 arriving from subscribers 202 on party lines.
3. Transmission errors occurring on ES trunks 206 between the end office 205 and the platform 204.

In these situations, the ANI is displayed as "Area Code-911 -OXXX" where XXX is the number of the emergency service central office (ESCO) 205 assigned to the telephone office which serves the caller 202.

ALI Data: Referring to FIGS. 15a & b, the following data is retrieved from the ALI/DMS system 224 and displayed when either an E9-1-1 call 201 is picked up from the notification line 241 or an incoming E9-1-1 call 201 has been transferred from another PSAP attendant 221:

Chart ALI 1

| Line No. of Screen 222 | Data |
| --- | --- |
| 10 | The area code assigned to the telephone number used to retrieve ALI information. |
| 10 | The seven-digit telephone number. |
| 10 | The class of service assigned to telephone number |
| 10 | The time stamp for ALI retrieval (date and time). |
| 11-12 | Customer name and street address information assigned to telephone number. |
| 12 | Location information (e.g., apartment number, suite number, etc.) |
| 13 | The city and state in which the telephone number is located |
| FIG. 15, lines 19-22 | The identifier of the ALI/DMS node receiving and responding to the request. This information can be used ALI/DMS personnel to track ALI/DMS retrieval problems. |
| CO | The PSAP identifier. Because the connections from the ALI/DMS system 224 to the system 200 are at the platform 204, this field is used to identify the connection pair 308 (FIG. 5) used to transport the data between the platform 204 and the ALI/DMS system 224. |
| CO | The ESN assigned to a telephone number. |
| CO | Pilot number (billing telephone number) |

-continued

Chart ALI 1

| Line No. of Screen 222 | Data |
| --- | --- |
| | assigned to the telephone number. |
| 13 | Free field information (a 15-character field for additional information useful to an attendant 221). |

The ALI information described above is not displayed on the screen 222 if the NPD plus the ANI associated with the E9-1-1 call 201 is not found in the ALI/DMS database 224 or the E9-1-1 call 201 is received with out the ANI information. However, the information displayed is generated by the ALI/DMS system 224 and indicates to the attendant 221 that the information stored in the ALI/DMS system 224 is incomplete.

Selective Transfer Points: Referring to FIGS. 15a & b, line 15 and 16, the display on the workstation screen 222 contains information for up to four of the selective transfer points 225, which are determined by the ESN number assigned to the subscriber's telephone number in the TN/ESN table 213. The selective transfer points 225 are displayed when an E9-1-1 call 201 is initially answered by an attendant 221. When an E9-1-1 call 201 is transferred to another PSAP 216, the same selective transfer points 225 are also displayed at the workstation 212 of the PSAP attendant 221 to which the E9-1-1 call 201 has been transferred. The telephone number labels for each selective transfer point 225 displayed on the workstation screen are determined by the platform administrator 239.

Call Origination Information: Referring to FIGS. 15a & b, lines 19-22, information about the ES trunk 206 carrying the incoming E9-1-1 call 201 can be displayed at the discretion of the workstation attendant 221. This information is used by maintenance personnel to isolate problems in the ES trunks 226. The call origination information consists of the name of the end office 205 serving the caller 202, the trunk group number as administered at the end office 205, and the member number of the trunk 206 within the trunk group 206A.

Call On Hard Hold: Referring to FIG. 17, line 4, an E9-1-1 call 201 on hold is indicated on a workstation screen 222 only when the E9-1-1 call 201 is placed on hard hold. The hard hold function causes the workstation 212 to display (1) an indication that an E9-1-1 call 201 received by the workstation 212 has been placed on hard hold, and (2) a visual reminder while the attendant goes on-hook.

Workstation Status: Referring to FIGS. 15a & b, line 2, the current state ("Receiving Calls" or "Not Receiving Calls") of an attendant's position is always displayed. A "Yes/No" confirmation message 263 appears on the attendant's screen 222 when the workstation 212 is the only one at a PSAP 216 that is in the Receiving Calls state and an attempt is made to take the last workstation 212 out of service. If confirmation is received, the workstation 212 is put into the Not Receiving Calls state and the state of the PSAP 216 is changed to Abandoned. To re-activate the PSAP 212, the PSAP 259 manager or attendants 221 at the PSAP 216 can perform PSAP abandonment administration.

PSAP Status: Referring to FIGS. 15a & b, at line 2, the current state of the PSAP (Active, Abandoned or Night Service) is displayed on each workstation screen 222 in the PSAP 216 (e.g., "Mill PSAP Active).

Transfer Directory: Referring to FIGS. 17 and 29, the platform 204 provides the attendant 221 with data from the directory 249 of telephone numbers that can be used to transfer or originate E9-1-1 calls 201. The attendant 221 can display the directory 249 on the workstation 212 at any time. The transfer directory 249 has the following characteristics:

1. supports a maximum of 210 telephone numbers.
2. entries in the directory database can be sorted among five subdirectories. These sub-directories are viewed on the screen 222 separately.
3. entries are displayed in alphabetical order.
4. the directory display requires only one attendant 221 action to return to the previously viewed call information display.

Call History: Referring to FIGS. 15a & b, a visual indication is provided on the screen 222, revealing which E9-1-1 call 201 in the call history log 251 for that workstation 212 is currently being displayed on the screen 222. As described above, there are four positions 252 in the call history log 251 to hold call history information. With no active E9-1-1 call 201 present, the four positions 252 may be used to show the last four E9-1-1 calls 201 in their order of arrival. With an E9-1-1 call 201 active, there are three of those positions filled with call history data and the fourth position contains the active E9-1-1 call 201 information. All of the data in these positions 252 is kept in order of E9-1-1 call arrival, i.e., FIFO (first in first out). The call history display on the screen 222 (FIG. 15a) contains the following information:

| Call History-Display Chart CH1 | |
|---|---|
| Line # on Screen 222 | Data |
| 7 | The ANI data received with the call 201. |
| 10–14 | Any ALI information retrieved from the ALI/DMS for the E9-1-1 call 201. |
| 9 | The telephone number entered for ALI Fetch, if any |
| 19–22 | All call origination information |
| 15–16 | Selective transfer points 225 for the E9-1-1 call 201. |

Routing Information: Referring to FIG. 15, the workstation display on the screen 222 contains an indication of the route by which the E9-1-1 call 201 arrived at the attendant's position.

| Call Routing Display Chart | |
|---|---|
| Line # of screen 222 | Data |
| 8 | This display field indicates to the attendant 221 whether or not: The E9-1-1 call 201 is a transfer from another attendant. The E9-1-1 call 201 was routed to the PSAP 216 because of routing rules established for the C.E.R.S. system 200. Information displayed must distinguish between the following routing reasons: New call (Selective routing). Alternate routing. PSAP 216 Abandoned. Default routing. Night Service routing. Last Chance routing. Switch-controlled Default |

| Call Routing Display Chart | |
|---|---|
| Line # of screen 222 | Data |
| | routing. Attendant-initiated call (includes call back and calls initiated internally). Unknown. |

The information displayed pertains to the routing method last used to route the E9-1-1 call 201 to the call handling destination 215 receiving the E9-1-1 call 201.

Abandoned Calls: Referring to FIG. 15, line 24, a message 263 is displayed on the workstation screen 222 when the attendant 221 picks up an unanswered abandoned E9-1-1 201 call. A message 263 is also displayed when a caller 202 disconnects prior to the attendant 221 terminating the E9-1-1 call 201 (answered abandoned call).

Broadcast Messages: Each display on a screen 222 has space available for broadcast messages 288 from the platform administrator 239. These messages 288 can only be displayed when no E9-1-1 call 201 is active. If a message 288 is broadcast during an E9-1-1 call 201, it will be displayed when the E9-1-1 call 201 is terminated.

Management of C.E.R.S. System 200

Three C.E.R.S. system management capabilities are provided and are generally described as follows:

Administration: Referring to FIGS. 30, administration of the system 200 involves, among other things, the configuration of several different parameters (e.g. platform configuration that can be changed to control an individual PSAP 216 and those parameters that control features the functionality of which is the same over the entire platform 204. Administration by the PSAP manager 259 (FIG. 1) can only be performed at a PSAP workstation 212 that is Not Receiving Calls. Administration by the platform administrator 239 can be performed at an administration terminal 276 located at the platform 204 as well as a PSAP workstation 212 that is Not Receiving Calls.).

Reports: Reports (FIG. 31) are produced that assist in both the administration and maintenance of the C.E.R.S. system 200.

Operational Support Software: This allows connection of the system 200 to a remote operational support system for Network Elements (not shown).

Platform 204

The above description of FIG. 1 referred to hardware and software components used to configure the C.E.R.S. platform 204. The following describes the platform 204 to facilitate an understanding as to how the platform hardware and software form the C.E.R.S. system 200. Where reference numbers do not appear for a particular platform item, the particular item is not specifically shown, but is included in the platform 204 shown in FIG. 1.

The main components of the platform 204 are (1) the switch 218, (2) generic switch software, (3) a switch administration terminal, (4) switch maintenance printers, (5) the applications processor (AP) 234, (6) AP operating system software, (7) AP reports printers, (8) an AP log printer, (9) an AP system administration console or terminal, (10) an E9-1-1 administration console or terminal, (11) dial-up modems, (12) a host command interface, (13) datasets for host command interface (HCI) links, (14) the platform's PSAP modems and (15) C.E.R.S. applications software.

Switch 218: The platform 204 uses a Mitel GX5000 as the switch 218. The GX5000 switch 218 consists of four main components, (1) a main control section, (2) peripheral control sections, (3) digital service units (DSUs), and (4) peripheral interface cards (PICs). The main control section provides direct control of the peripheral control sections, the DSUs and indirect control of the PICs. It also provides the user interface for both maintenance and customer data entry (CDE) translations. The GX5000 switch 218 includes a main control processor which executes its operating system from random access memory (RAM). It also maintains a copy of the current switch activity, as well as system messages 288 (FIG. 1) used by the main control processor, to handle normal system operation. The Ram used by the switch 218 is split between a main control card (a PIC) and a control RAM II card (a PIC).

The incoming ES trunks 206 provide connections to the ESR's end offices 205 into the platform 204. The incoming ES trunks 206 for the platform 204 are standard message trunks and terminate on the switch 218. Outgoing trunks provide the PSAPs 216 with access to ESR's 202 and ESP's 211 in the public switched telephone network (PSTN) 219.

Two-wire dedicated private-line facilities 245 from the switch 218 connect the platform 204 to each telephone set 227 of each workstation 212 at each public safety answering point (PSAP) 216. The identical telephone line 241 is also provided for the notification device 242 at the PSAP 216. The telephone sets 227 and the notification device 242 at each PSAP 216 adhere to certain transmission, signalling, and loop requirements. These requirements are detailed in the Bell Communications Research document *LATA Switching Systems Generic Requirements* TR-TSY-00064 (PUB 48501).

Application Processor (Ap) 234: The applications processor 234, may be an IBM System/88 processor, a Stratus computer running the VOS operating system. The VOS operating system is a multi-process environment with IPC mechanisms, system events, time events, and supports a variety of file I/O mechanisms. The Stratus computer has duplicated hardware components and can be configured with parallel processors. It achieves a level of fault tolerance by comparing results from different hardware components. The Stratus hardware and VOS operating system makes the fault tolerance and parallel processing abilities transparent to software.

IBM System/88 operating system software provides operating system functions for the C.E.R.S. application software 287. Various circuits and the modems interconnect the AP 234 to the PSTN 219. Via the PSAP modems, the data circuits provide connectivity between the platform 204 and the PSAP workstations 212, and printers 255. The PSAP modems have the following parameters: CCITT V.22bis modems, which operate at 300, 1200 or 2400 bps., two-wire, full-duplex, dedicated (i.e., leased) line, and asynchronous.

Circuits provide connectivity between the platform 204 and the (ALI/DMS). The connection between the AP 234 and the All/DMS database 224 requires one pair of RS-232C physical connections between the AP 234 and ALI modems at the platform 204. Dedicated four-wire facilities between the platform's ALI modems and an ALI/DMS D line support the platform 204. The platform 204 supports one pair of the ALI retrieval lines. The ALI modems are two full-duplex, asynchronous modems running at 1200 bps.

The host command interface (HCI) links provide communications links between the AP 204 and the switch 218. The HCI allows both the AP 234 and the switch 218 to send and receive messages and commands. The HCI consists of two DNI cards on the switch 218 and two 2103 datasets (not shown), and two 1629 UCA cards on the AP 234. Twisted pairing wiring (not shown) connects the switch's DNI cards to the 2103 datasets by way of a CO main distribution frame. This wiring is connected between the 2103 datasets and CO main distribution frame, and between the CO main distribution frame and the DNI cards.

The C.E.R.S. Platform 204 and the PSTN 219: Proper interaction between the platform 204 and the PSTN 219 requires the following engineering considerations: (1) telephone numbering and dialing plan, (2) incoming E9-1-1 calls 201, (3) non-9-1-1 incoming calls from the PSTN 219, (4) outgoing calls from the platform 204 to the PSTN 219.

When an incoming E9-1-1 call 201 is answered by a PSAP attendant 221, the incoming E9-1-1 call 201 may be transferred to an ESP 211. If the ESP 211 is another C.E.R.S. system PSAP 216, the transfer is made internally by the platform 204 without interaction with the PSTN 219. Transfers from a PSAP 216 to an ESP 211 in the PSTN 219 are handled differently from transfers to other PSAPs 216. E9-1-1 calls 201 from a PSAP 219 to a public telephone ESP 211 are routed by the platform 204 to the switch 218. The switch 218 connects the E9-1-1 call 201 to the intended ESP 211 by utilizing normal PSTN connections.

There are provisions for direct inward dialing from the PSTN 219 to the platform 204. Service for non-9-1-1 calls from the PSTN 219 to the platform 204 are through existing local lines in the PSAP region 209 or in new PSAP sites through the addition of outside business lines (not shown).

The platform 204 can support up to one hundred attendant workstations 212 distributed over a maximum of twenty PSAPs 216. Each PSAP 216 is also equipped with the notification device 242 that requires a telephone number. Additionally, the platform 204 can support configurations in which only telephone lines (not shown) are connected to secondary emergency service providers (ESPs) 211, without accompanying data terminals. Any telephone number can be assigned to these extensions. PSAP attendants 221 can transfer calls from their workstation telephone sets 227 to other PSAPs 216 by simply dialing the telephone number assigned to the destination PSAP 216.

The switch 218 is administered so that PSAP attendants 221 can make E9-1-1 call 201 connections to ESR's 202 in the PSTN 219. If translations in the switch 218 determine that the call 201 is intended for a public telephone ESR 202, the E9-1-1 call 201 is routed by the platform 204 to a trunk connected to a switch in the PSTN 219. The switch 218 then routes the E9-1-1 call 201 to the intended ESP 202. The switch 218 is responsible for providing equal access.

Incoming E9-1-1 Calls 201 When an ESR 202 dials "9-1-1 ," the digits are interpreted as an emergency E9-1-1 call 201 by a switch (not shown) of the end office 205 that serves the ESR 202 (FIG. 1). The E9-1-1 call 201 is then forwarded from the end office 205 to the platform 204 by the ES trunks 206 which are designated by their traffic use code as emergency service trunks. FIG. 1(a) illustrates an incoming 9-1-1 call 201. Automatic number identification (ANI) accompanies most incoming E9-1-1 calls 201. The ANI is used by the platform 204 to determine the correct PSAP 216 to serve the E9-1-1 call 201 and to obtain the location of the telephone 207 of the ESR 202 placing the E9-1-1 call 201. The following Chart PSTN identifies the characteristics required of the PSTN 219 for the platform 204 to process incoming E9-1-1 calls 201 properly:

---

Chart PSTN

1. Routing tables of the end office 205 must be modified to direct all "9-1-1" call attempts to the ES trunk group dedicated to the platform 201.
2. Each wire center within the service area 208 served by the C.E.R.S. system 200 must provide ES trunks 206 to the platform 204.
3. Called party dialed digits are sent on all ES trunks 206 even though the called digits (i.e., "9-1-1") are always the same. This allows the platform 204 to distinguish between actual "9-1-1" calls and other types of seizures of the ES trunk 206, such as:
   a) false trunk seizures resulting from carrier facilities failure or from spurious noise.
   b) seizure for testing purposes.
   In either of these cases, the trunk seizure must not result in an E9-1-1 call 201 directed to a PSAP 216. Transmittal of called party information helps prevent these types of trunk seizures from being connected to the PSAPs 216. The called party digits which are sent can be "9-1-1", "1-1" or simply "1".
4. Incoming ES trunks 206 are configured to be one-way outbound trunks from each end office 205 to the platform 204. The trunks 206 are one-way to prevent the PSAP 216 from inadvertently blocking incoming E9-1-1 calls 201 with outbound telephone traffic from the PSAP 216.
5. Incoming ES trunks 206 must be designed to give the PSAP attendant 221 control of disconnect. This configuration allows the attendant 221 to better control the emergency situation. However, for a brief time period between the initiation of an E9-1-1 call 201 and the final connection to the PSAP attendant 221, the calling party (ESR) 202 still has control over disconnect.
6. If the platform 204 receives an E9-1-1 call 201 without ANI, the platform 204 will manufacture a fictitious ANI for that E9-1-1 call 201. The form of the fictitious ANI is a seven digit code: 911-OXXX, where XXX represents the ESCO number of the originating end office 205. ANI failure can occur for several reasons:
   a) Central office ANI equipment failure.
   b) When the 9-1-1 caller (ESR) 202 is on a multiparty line. E9-1-1 calls 201 from these party lines cannot be automatically identified and always require operator number identification (ONI).
   c) When the 9-1-1 caller (ESR) 202 is on a PBX line which does not support automatic identified outward dialing (AIOD).
   As discussed when an E9-1-1 call 201 arrive without accompanying ANI, the platform 204 directs the E9-1-1 call 201 to a PSAP 216 using default routing tables and information derived from the incoming trunk group.
7. The platform 204 only accepts ANI composed of seven digits.

---

Outgoing Calls from the Platform 204 to the PSTN 219: Outgoing calls from a workstation telephone 227 to subscribers 202 in the PSTN 219 are considered essential to E9-1-1 service. Outgoing calls to the PSTN 219 are generated at a PSAP 216 when an attendant 221 transfers an E9-1-1 call 201 to a destination 215 in the PSTN 219, or when the attendant 221 initiates a new call to a public telephone subscriber 202.

Modifications to AP 234 and Switch 218: Some of the features provided by the platform 204 are accomplished by using the platform equipment in a manner that is unusual for emergency call applications. Other aspects of the C.E.R.S. system 200 result from providing certain hardware configurations on the switch 218 that are not normal to a call routing switch such as the Mitel GX5000 switch 218.

Phantom Directory Numbers: An E9-1-1 call 201 that arrives at the switch 218 over an emergency service trunk 206 is placed in a temporary holding state. The temporary holding state is based on use of a phantom directory number (PDN), which allows the AP 234 to interact with the switch 218 and send the E9-1-1 call 201 to a destination based on the call routing features of the platform 204. The PDN is implemented using a signal party line (or SPL) circuit without an attached terminal device (i.e., no attached telephone). There must be at least one PDN circuit allocated for each emergency service trunk 206.

The incoming emergency service trunks 206 are organized into switch trunk groups based on their associated originating central office (CO) 205. These emergency service trunk groups are administered to direct E9-1-1 calls 201 that they receive to a hunt group DN. The hunt group DN has PDNs as members and is organized to selected an idle PDN by way of a circular selection pattern. All E9-1-1 calls 201 received from a CO can be directed to a unique PDN hunt group pilot DN. The PDN hunt group DN is administered to re-route the E9-1-1 call 201 to a switch-determined default destination 215 after a certain programmable period of time. This re-rerouting capability has the following features:

1. It allows the platform 204 to direct E9-1-1 calls 201 from a particular CO, or group of trunks from a CO, to a unique default call handling destination.
2. It is used to accomplish the switch default routing feature described below.
3. A second default call handling destination is administered in the PDN hunt group in case the first call handling destination is not available. ESRs hear ringing while they are connected to a PDN.

This time period of ringing is relatively short, less than two seconds. An extra PDN may be provided per emergency service trunk group. This extra PDN is used to ensure that the loss of a PDN single party line circuit will not result in fewer PDNs than incoming emergency service trunks 206. Also, PDNs in a particular PDN hunt group may be distributed across multiple switch single party line circuit cards.

PSAP Notification Lines 241: Each PSAP 216 has one of the notification devices 242 which signals the arrival of an E9-1-1 call 201 at the PSAP 216. These devices 242 are connected to the switch 218 by the single party line circuit. The switch 218 also provides an additional backup circuit in the event that this circuit fails. Ringing is applied to this line when the PSAP 216 receives an E9-1-1 call 201. The notification device 242 may be a common audible ringer or a visual notification device which uses ringing voltage to announce the arrival of an E9-1-1 call 201 on the notification line 241. The notification device 242 should be installed in or near the PSAP workstations 212 in an easily discernable location. Because a PSAP 216 can have more than one E9-1-1 call 201 directed to it at any particular time, the platform switch 218 implements a first-in, first-out call queue in front of the PSAP notification line 241.

The notification line 241 is the only member in a PSAP hunt group. This PSAP hunt group is administered to support queuing, to form a PSAP hunt group queue. Any E9-1-1 calls 201 sent to the PSAP 216 while the notification line 241 is occupied are queued by the switch 218 at the PSAP hunt group queue. When the notification line 241 is idle, the first E9-1-1 call 201 in the PSAP hunt group queue is moved to the notification line 241. The platform 204 removes the ringing voltage from the notification line 241 when the E9-1-1 call 201 is picked up by a PSAP attendant 221. This has the following consequences:

1. If there are no more E9-1-1 calls 201 in the PSAP hunt group queue, the notification device 242 will deactivate.

2. If the notification device 242 does not deactivate there are more incoming E9-1-1 calls awaiting being handled at the PSAP 216.

Figure 4A:
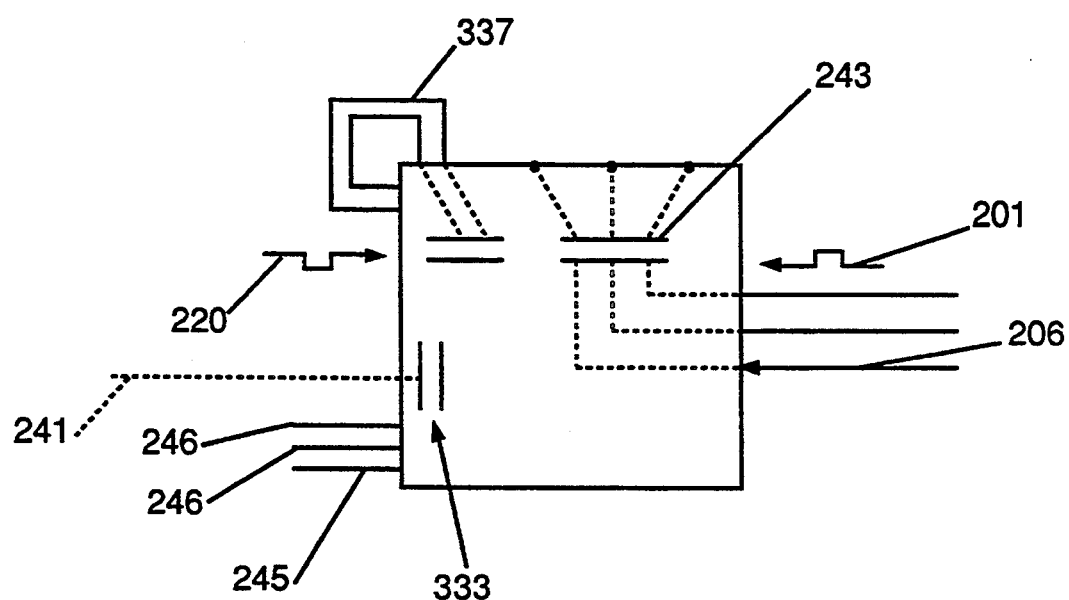
FIG. 4A is a schematic diagram of the switch, showing internal circuits for use in routing an incoming E9-1-1 call to a PSAP.
Figure 4B:
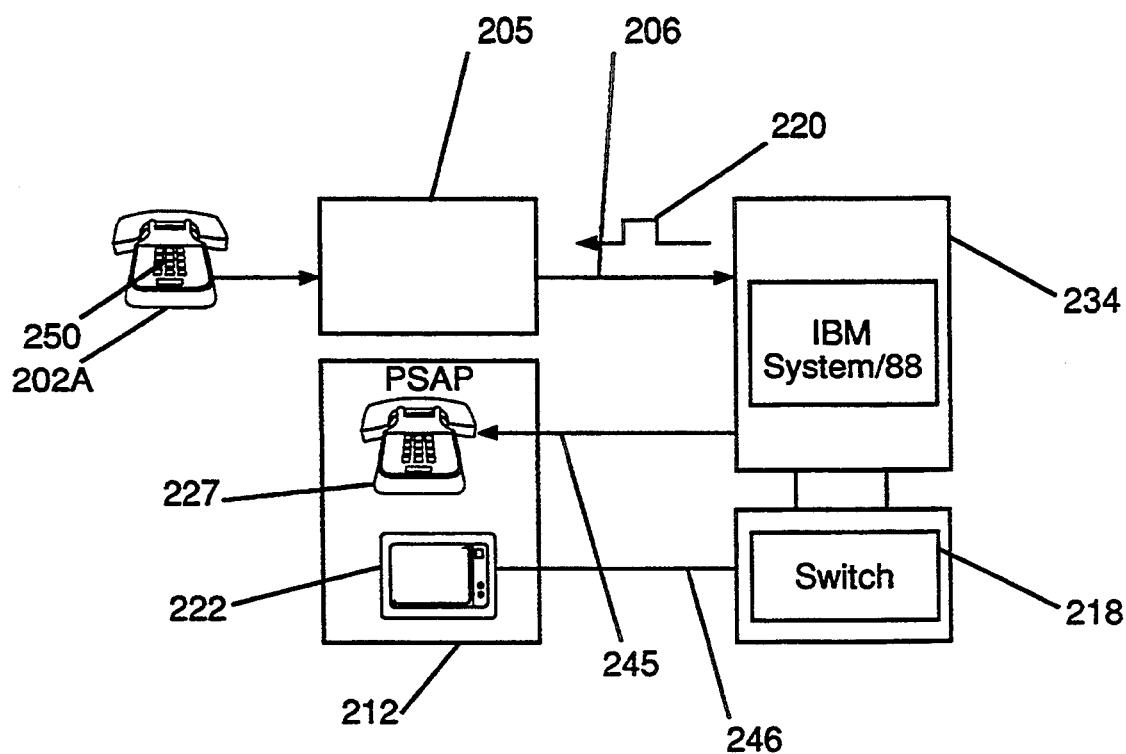
FIG. 4B is a schematic diagram illustrating an incoming E9-1-1 call being routed to the C.E.R.S. system.

Loop-Back Trunks for Busy Tone: Features of the platform 204 can require that an ESR 202 be connected to a busy tone 220 (FIG. 4B). To accomplish this, the platform 204 directs the E9-1-1 call 201 to a special outgoing or loop-back trunk group or outgoing busy-tone trunk group having outgoing trunks connected to loop-back trunks 337 (FIG. 4A).

When no outgoing busy tone trunks 337 are available, the platform 204 disconnects the E9-1-1 calls 201 that would have been routed to the busy tones 220. If no loop back trunks 337 are available the ESR 202 is disconnected and control is reverted to the ESR's end office 205. Incoming trunks 206 are administered such that E9-1-1 calls 201 to unknown DNs are given a busy signal 220.

In a preferred embodiment, a circular hunt group is configured on the switch 218 for the loopback trunks for the busy the tone. This circular hunt group has as members all of the outbound loop-back trunks used to provide busy tone.

Interaction of the Switch 218 and the AP 234: The switch 218 provides an interface to the AP 234 for the following devices:

1. the incoming trunks 206 to receive emergency calls 201 (combination of ANI and non-ANI capable trunks).

2. the outgoing trunks 302 to originate calls and transfer calls to TN of the PSTN 219.

3. control of the PSAPs common notification line 241 to the PSAP 216.

4. the telephone lines 245 to the PSAP attendants 221.

5. telephone lines to DNs connected to the switch 218.

6. special platform devices such as the PDNs 327.

The switch 218 allows the AP 234 to manipulate these devices (via the translate command) and receive notification (via the monitor command) when an event occurs on a DN or a trunk 206. A DN can be a line or a trunk. The translate command sent to the switch 218 from the AP 234 converts a DN into a logical equipment identifier (LID) and allows the AP 234 to manipulate these DNs. When an E9-1-1 call 201 is in progress on a monitored LID, the switch 218 sends the AP 234 a message 288 with a unique call reference numeric identifier. The call reference number is unique to a particular E9-1-1 call's LID and is used to track that instance of an active call on that particular LID. Two LIDs involved in the same E9-1-1 call generally have different call reference numbers. A device which is idle or unavailable has a nil (0) call reference number.

Architecture of C.E.R.S. System 200

Figure 6:
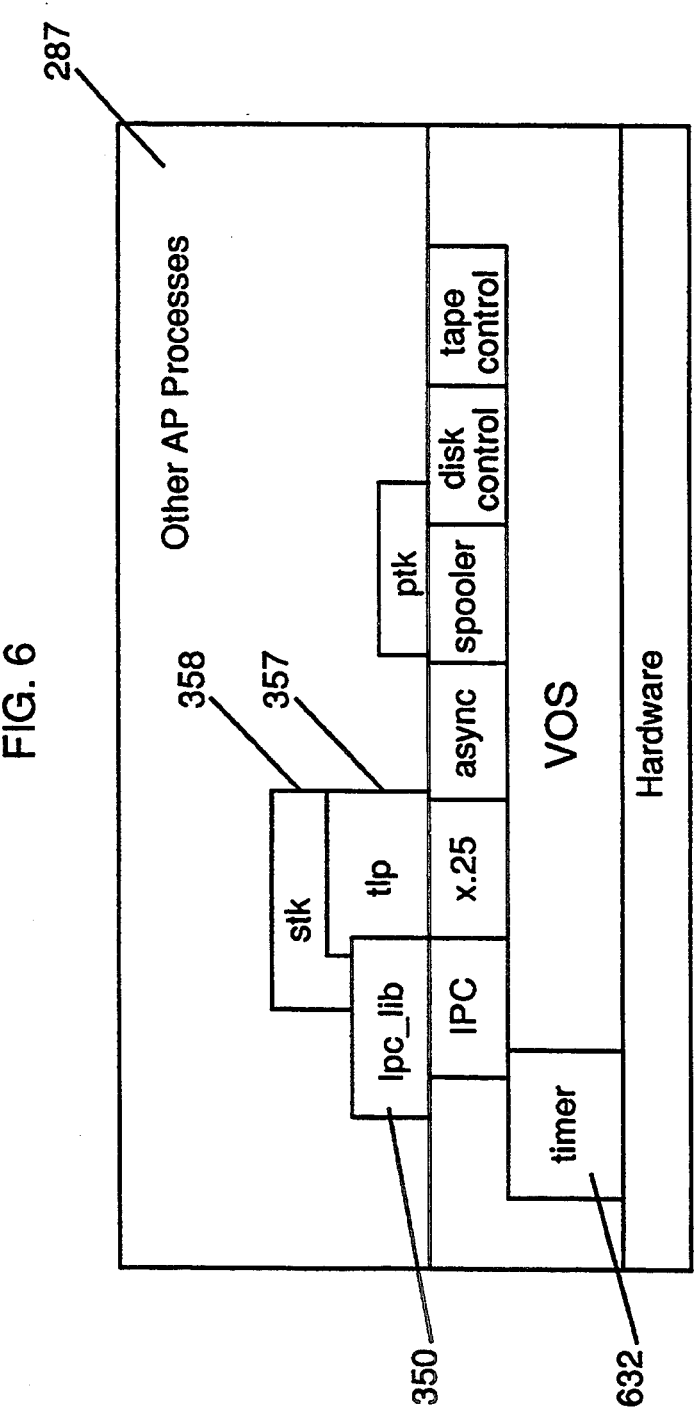
FIG. 6 is a schematic diagram of the interface layers of software used in the platform, including an stp process which interfaces with an HCI interface to the switch.

The C.E.R.S. system 200 is designed to interface with the PSTN 219 and other external systems to perform its function of establishing a voice connection from an ESR 202 on the PSTN 219 to an ESP facility 211. This function is provided by the platform 204 operating under the applications software 287. Referring to FIG. 6, service layer software 350 of the C.E.R.S. system 200 provides a generic foundation on which application software 287 is based. Included within the service layer software 350 are the following capabilities:

1. Initialization and shutdown of the system 200.
2. x.25 HCI link layer interface to the switch 218.
3. Switch application command interface and distribution of switch messages 288 to application processes 351 of the application software 287. Notification of switch 218 HCI link 283 status.
4. Measurements collection mechanism.
5. Inter-process communication facilities.
6. Interfaces to shared memory.
7. Process discrete and interval timing notification facilities.
8. Asynchronous inter-process communication and I/O port control via system event facilities.
9. Log message: ability to log files, console, and standard out. Allows severity classification of error messages, logging process id, and a system wide unique error number for each message 288. Used with system error and debugging/development messages 288.

In general, each application process 351 must provide:

1. Conform to the init process 352 interaction scenarios.
2. Dump metrics before exiting.
3. Close all IPC connections before exiting.
4. All log messages 288 must contain system-wide unique error numbers based on the process error base and contain sufficient information to determine what the problem is and what features or services are affected by the problem.
5. Message logging within a process 351 is designed such that a process 351 does not log the same message 288 repeatedly in a short period of time (30 minutes). Errors that can result in multiple instances are throttled within the controlling process 351.
6. Each process 351 declares certain global variables that are utilized by software libraries (not shown). Two of these libraries are Lib_err_num and Sys_err_num. Lib_err_num is set to a value based on the library's assigned numeric range in a cascade.h process (not shown). Sys_err_num is similarly set to any error value that is returned from an operating system provided call.
7. Processes 351 that have multiple other processes 351 connected to them ensure that an other process request to connect is not a duplicate request. (i.e. the process 351 terminated without disconnecting and is now reconnecting). If a duplicate connected request is determined, the server process 351 terminates the previous other process connection including disconnecting the old IPC connection and opening a new connection.

The software libraries and sub-components to processes 351 adhere to the following guidelines: generic libraries which do not log messages 288 other than of a class ML_TRACE_LIBRARY. The process 351 returns unique error numbers based on the assigned library log message base. The global variables Lib_err_num and Sys_err_num must both be set.

Figure 7:
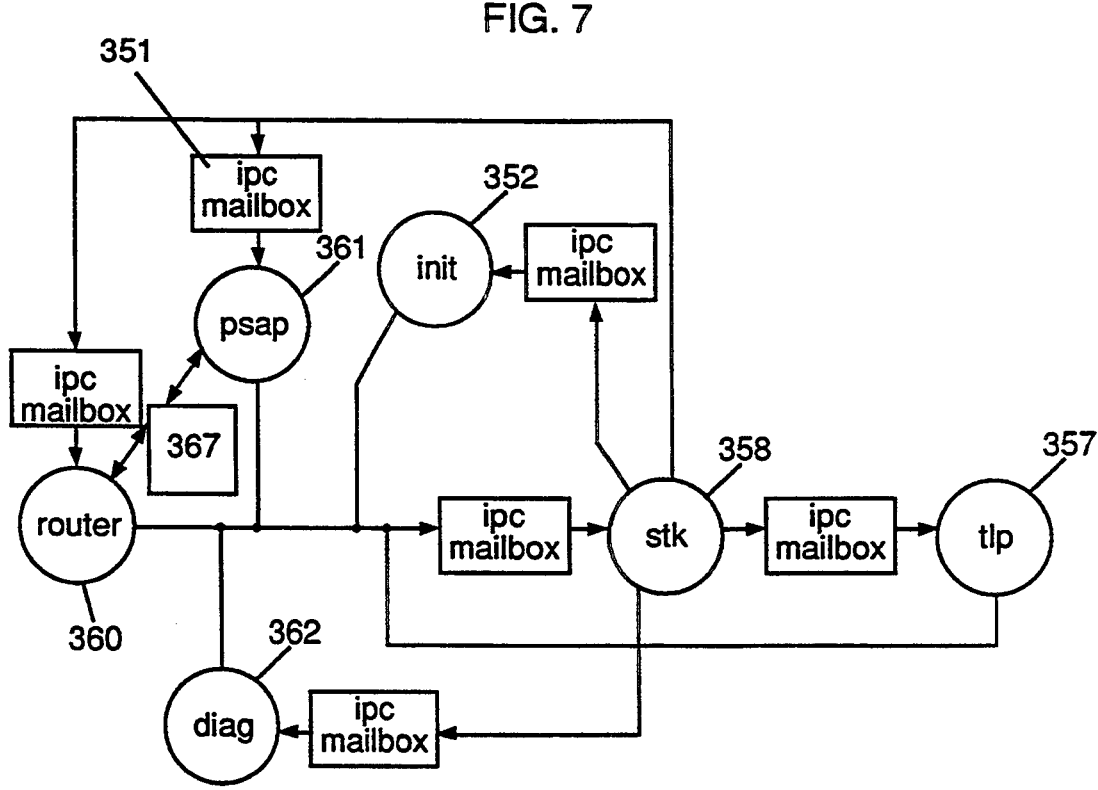
FIG. 7 is a schematic diagram showing other AP software processes with which the stk process functions, including router and psap processes.
Figure 8:
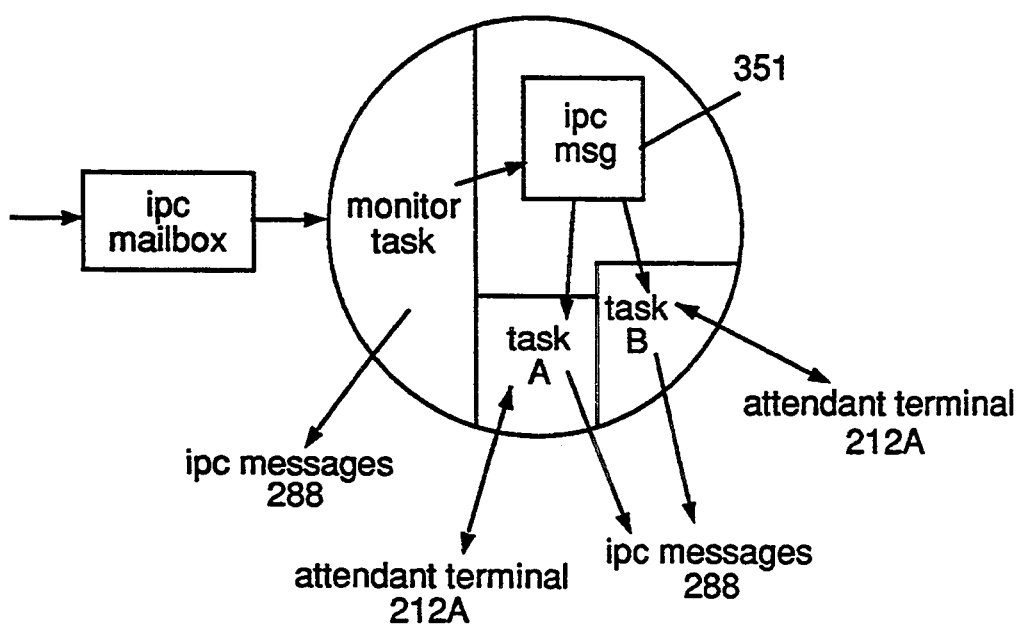
FIG. 8 is a schematic diagram of the internal architecture of the psap process.
Figure 9:
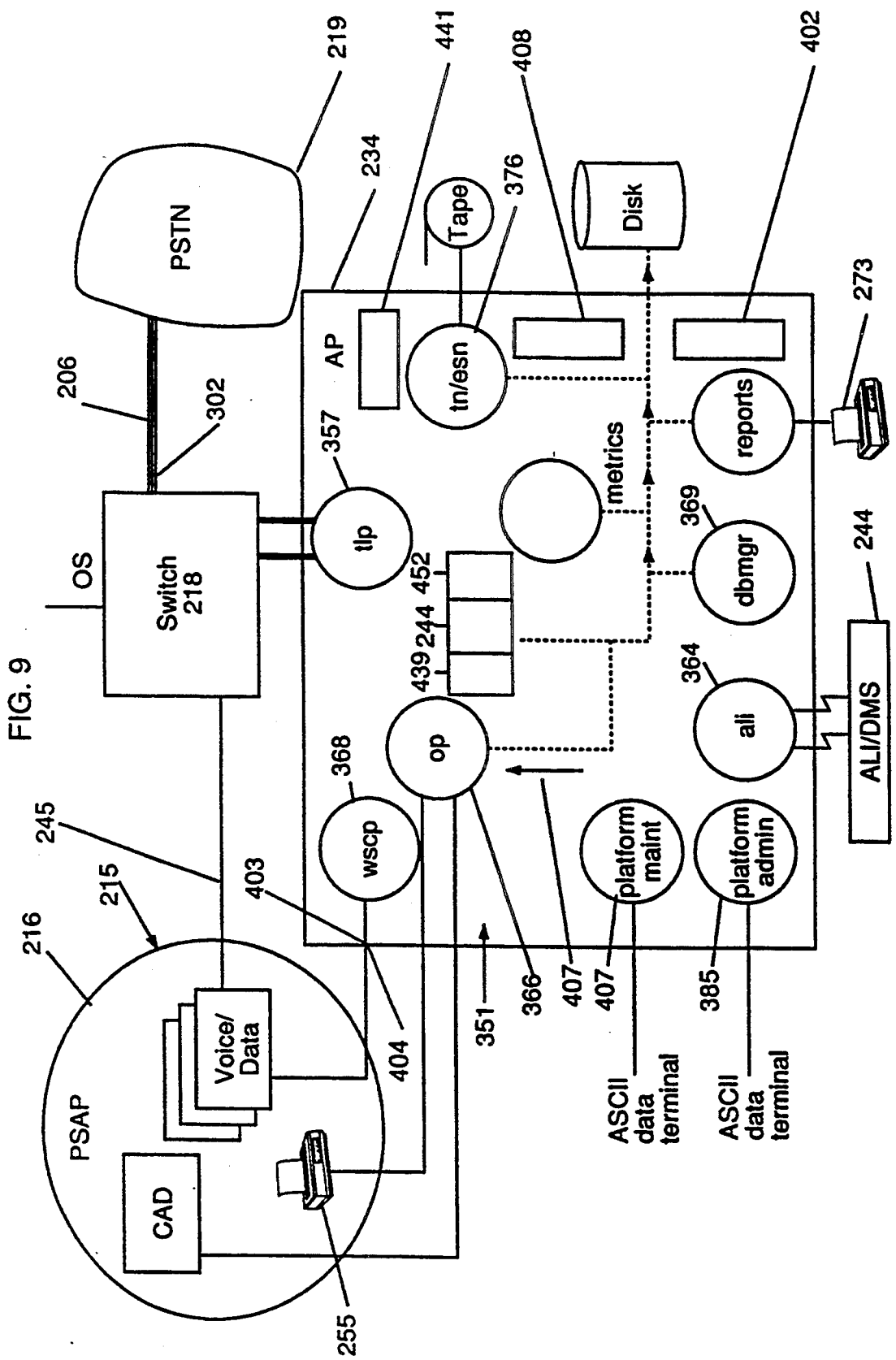
FIG. 9 is a schematic diagram of the external interfaces of the AP software used to route an incoming E9-1-1 call to a PSAP.

Overview of Applications Software 287: Referring to FIGS. 7, 8 and 9, processes 351 are either permanent or transient processes in the system 200. Permanent processes 351 are started at initialization of the system 200 and do not terminate normally unless the system 200 is brought down or is re-configured (i.e. another PSAP 216 is added). The application software 287 is started by executing the VOS command macro file e911.cm. e911.cm performs any environmental checks and associated setup. The command macro then starts the init process 352 which is the parent to all other permanent processes 351. When the AP software 287 is installed a batch job is established to invoke e911.cm. The batch job has the attribute that it is restarted if the AP 234 re-boots.

The following processes 351 are permanent processes that are started at initialization of the C.E.R.S. system 200:
1) init
2) tlp
3) stk
4) mtk
5) dbmgr
6) op
7) ali
8) router
9) psap
10) diag
11) fiso
12) cm
13) wscp (s) φ or more of these processes are started.

The following processes 351 are transient processes that are associated with a particular operation, such as system administration, maintenance, or report regeneration:

| |
| --- |
| 1) tmesn_tools |
| 2) adm_dbedit |
| 3) format_tmesn |
| 4) rpt |
| 5) init_shutdown |
| 6) ml_set_log |
| 7) dpsc |
| 8) platform_maint |
| 9) platform_admin |

Init Process 352 (FIG. 7): The init process 352 is a permanent process started by the e911.cm command macro. Init is the parent process for all other permanent processes (i.e. init starts all other permanent processes). The init process 352 performs the following duties: (1) permanent process start up, (2) monitoring for death of child processes, (3) constant monitor of each process for basic sanity, and (4) shutdown of all permanent processes.

The init process 352 determines what processes 351 to start by inspecting the proc_tbl.dat file. This file also indicates the start up order of the processes 351, each processes' associated command line arguments, and whether the process is critical to operations of the system 200. Each process 351 that init 352 starts is required to acknowledge successful start-up via an IPC message 288 back to init 352. Init 352 has an IPC connection to each permanent process 351 and each permanent process 351 has an IPC connection to init 352.

After all processes have been started init 352 waits for process termination, routinely monitors each processes' basic sanity, and waits for other command inputs. Child processes of init must respond with a positive acknowledgment message when init sends one a constant monitor message. If the child does not respond to several constant monitor messages init assumes that the process is no longer functioning correctly and takes corrective action.

Tlp Process 357 (FIG. 7).: A transport layer process (tlp) 357 is a permanent process that provides the AP x.25 message transport connectivity to the switch 218 via the HCI link 283. Two links are operated in tandem to provide redundancy. The tlp process 357 interfaces with an stk process 358 (FIG. 7) to provide client processes with a switch command interface. The tlp process 357 performs the following operations:

1. x.25 transport interface control between the AP 234 and the switch 218. The tlp process 357 interfaces with the AP x.25 interface board to provide the HCI 282 connectivity. Provides adherence to the transport methodology of the HCI link 283 including sending commands down one link and receiving responses on both links.
2. Monitoring and recovery of the two HCI links 283 between the AP 234 and the switch 218.
3. Message sequence number maintenance and recovery.
4. Collection of and forwarding of complete x.409 messages 288 to the stk process 358.
5. Reception of complete x.409 messages 288 from the stk process 358, x.25 packaging, and control of transporting to the switch 218.
6. Monitoring status of links 283 and reporting to the stk process 358.
7. Consideration to flow control of the HCI link 283.

The init process 252, and the stk process 358 connect (via IPC) with the tlp process 357.

Stk Process 358 (FIG. 7): The switch tool-kit (stk) process running on the AP 234 provides an interface to the switch 218 for all processes 351 desiring an interface with the application software 287. The stk process 358 converts LIDs from the switch 218 to switch identifiers (SIDs) when processing requests or sending status information to clients, and:

1. Completes the encoding of x.409 messages 288 before transport to the switch 218 and decoding after reception of messages from the switch 218.
2. Ensures that processes 351 eventually receive a reply from request.
3. Allows more than one process 351 to receive monitor information about a particular line without the overhead of multiple monitors to the switch 218.
4. Ensures that only one request per DN has been sent to the switch 218. The stk process 358 queues one outstanding requests per DN.
5. Notifies processes 351 of HCI link status.
6. Provides function primitives for processes 351 to access capabilities of the switch 218.
7. Provides a level of message filtering to processes 351.
8. Cooperates with the tlp process 357 to implement the end-to-end HCI transport service.
9. Recovery of translate and monitors on DNs in the event of an HCI link 283 failure.

The following processes connect (via IPC) with the stk process: (1) the init process 352, (2) the tlp process 357, (3) a router process 360, (4) a psap process 361, and (5) a diag process 362.

Mtk Process 363: A mtk (metric tool-kit) process 363 alerts and assists client processes to write measurement (or metric) data. These features are provided through the mtk process 363 and associated library routines.

The mtk process 363 allows its clients to connect to it and register the metrics type they will be collecting. The mtk process 363 matches this metric type with entries in a metrics_tbl.dat file to determine the data collection interval. It then sets system timer events (e.g., for Night Service (FIG. 24)) so that it can send an IPC message 288 to clients at the appropriate time. The client process write metrics to specific file based on metric type via utilities provided by the mtk process 363. The following processes connect with the mtk process 363 and write metrics: (1) the router process 360, (2) the psap process 361, (3) an ali process 364, and (4) the diag process 362.

The router Process 360: The router process 360 monitors activities on incoming ES trunks 206 and redirects E9-1-1 calls 201 received to an appropriate call handling destination 215. The router process 360 maintains an image of the TN/ESN table 213 within its process space. The router process 360 is based on a finite state machine design that is driven by the call processing messages 288 from the switch 218. The router process 360 is responsible for the following activities:

1. Selecting a call handling destination 215 to receive an E9-1-1 call 201. If the destination 215 is a PSAP 216 the router process 360 notifies the psap process and monitors call progress until it is answered by a PSAP attendant 221. This includes monitoring the status of PSAP destinations (i.e. night service abandonment, call capacity, etc.)
2. Routing E9-1-1 calls 201 via routing instructions of the router process 360. Selective Routing requires the router process 360 to tightly integrate with the TN/ESN table 213, for example.
3. Track all E9-1-1 calls 201 being handled within the platform 204 that originated on an inbound ES trunk 206.
4. Handling of abandoned E9-1-1 calls 201 before routing is completed.
5. Entering call entries in the call log 244 for E9-1-1 calls 201 that were not directed to a PSAP 216.
6. Participate with the psap process 361 to complete telephony operations, including Selective Transfer between PSAPs 216.
7. Monitoring and allocating C.E.R.S. system 200 resources used to provide routing and other functions.
8. Coordinating the timing for PSAPs 216 entering and leaving Night Service and Abandonment. The router process 360 maintains timer events that signal when a PSAP 216 is scheduled to enter and leave Night Service. The router process 360 also sends a PSAP state change to an op process 366 to be logged.
9. Collecting metrics that are used to report routing activity and trunk activity.
10. Participating in system integrity activities.

The router process 360 and the psap process 361 share a global memory 367 that is used to identify the state of the PSAP attendants 221 for each PSAP 216. The psap process 361 updates the global memory to indicate the status of each attendant workstation 212 (Receiving Calls or Not Receiving Calls). The router interfaces with the following processes 351 through IPC: (1) the init process 352, (2) the stk process 358, (3) the psap process 361, (4) the ali process 364, (5) a wscp (PSAP workstation control) processes 368, (6) a dbmgr (Data Base Manager) process 369, (7) an op (Output) process 366, (8) a TN/ESN Table formatting and run time update process 372, and (9) the mtk (Metrics Collection) process.

Figure 58:
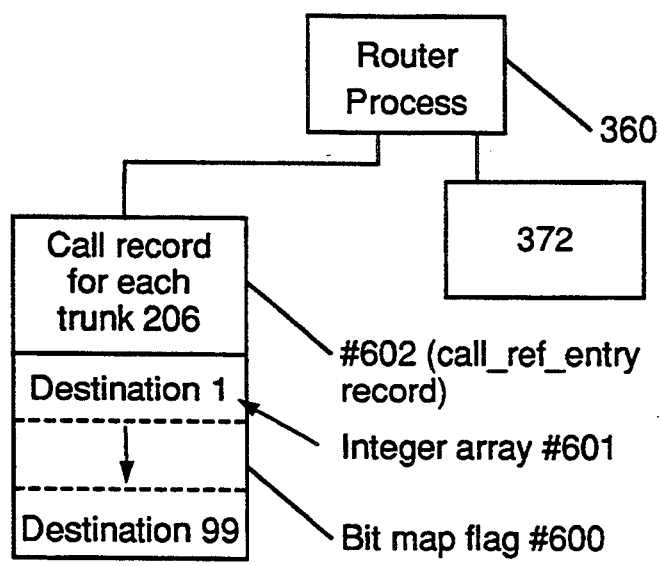

The router process 360 reads some administered data into memory 372 (FIG. 58) and it also maintains dynamic state tables, including (1) the ESN table 213, (2) a destination table 373, (3) a trunk table 374, (4) a trunk group table 377, (5) a selective transfer table 378, (6) a night service table 379, (7) a NPD/NPA translation table 387, a PSAP Table 382, and (8) a call table 383, which is a dynamic table that tracks every E9-1-1 call 201 being handled by the C.E.R.S. system 200, including the call state and call history (this information is used to detect abandoned E9-1-1 calls 201 and to notify PSAP attendants how an E9-1-1 call 201 arrived to them.

Figure 12:
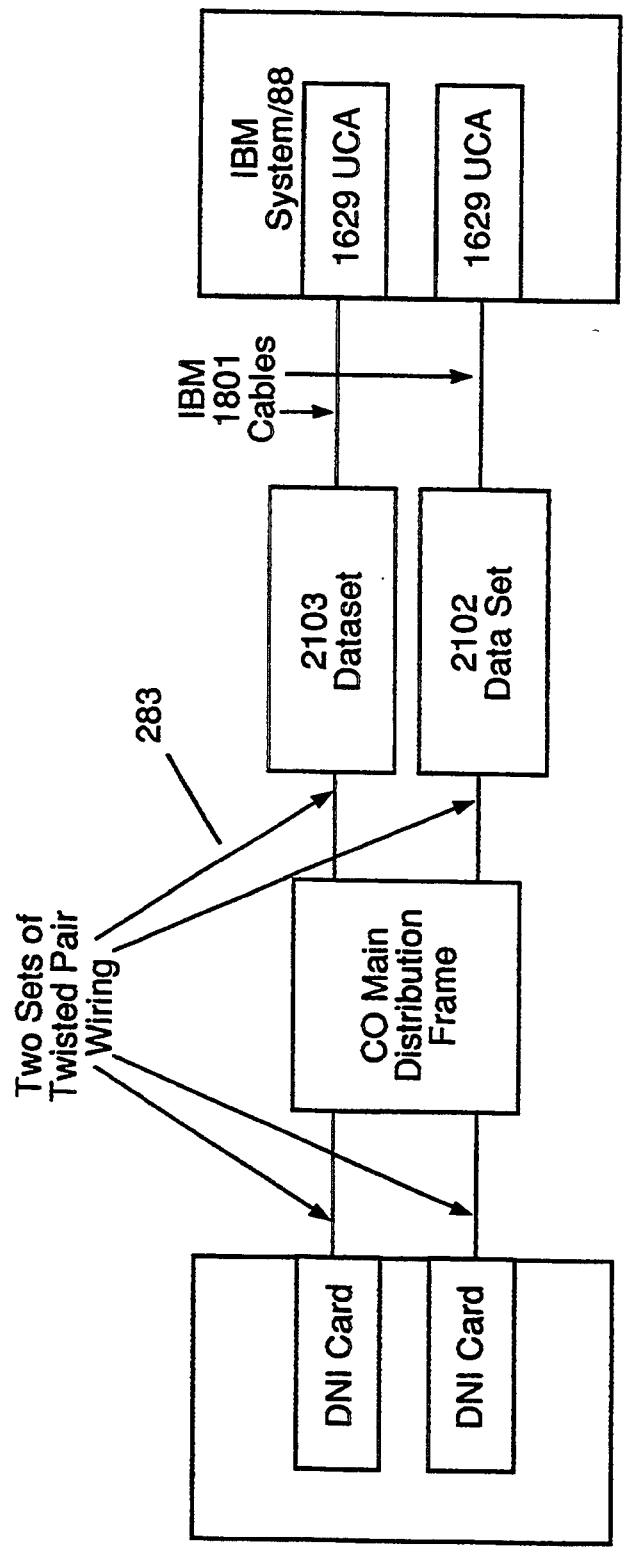
FIG. 12 is a schematic diagram showing a host command interface and its links for communicating between the AP and the call routing switch.

The router process 360 initiates translates and monitors on switch lines (e.g. HCI link 283, FIG. 12) and trunks 206 through the stk process 358. This enables the router process 360 to be notified of call events and ensure that E9-1-1 calls 201 are handled properly.

A PDN port 384 (FIG. 3) of the switch 218 is translated and monitored through the stk process 358 by the router process 360. This allows the router process 360 to transfer the E9-1-1 call 201 to a PSAP hunt group 333. The router process requests that the stk process 358 filter all messages 288 originated from the switch 218 by the monitor established on PDNs 333. The router process 360 also interfaces with incoming E9-1-1 trunks 206 (it is notified of incoming E9-1-1 calls 201 and transfers them to a PSAP 216). If the E9-1-1 call 201 is abandoned any time after it is received by the C.E.R.S. system 200, the router process 360 is notified. The router process 360 also interfaces with the outgoing trunks 302 (allows transfer of calls and origination of calls 318 out to the PSTN 219).

Figure 19A:
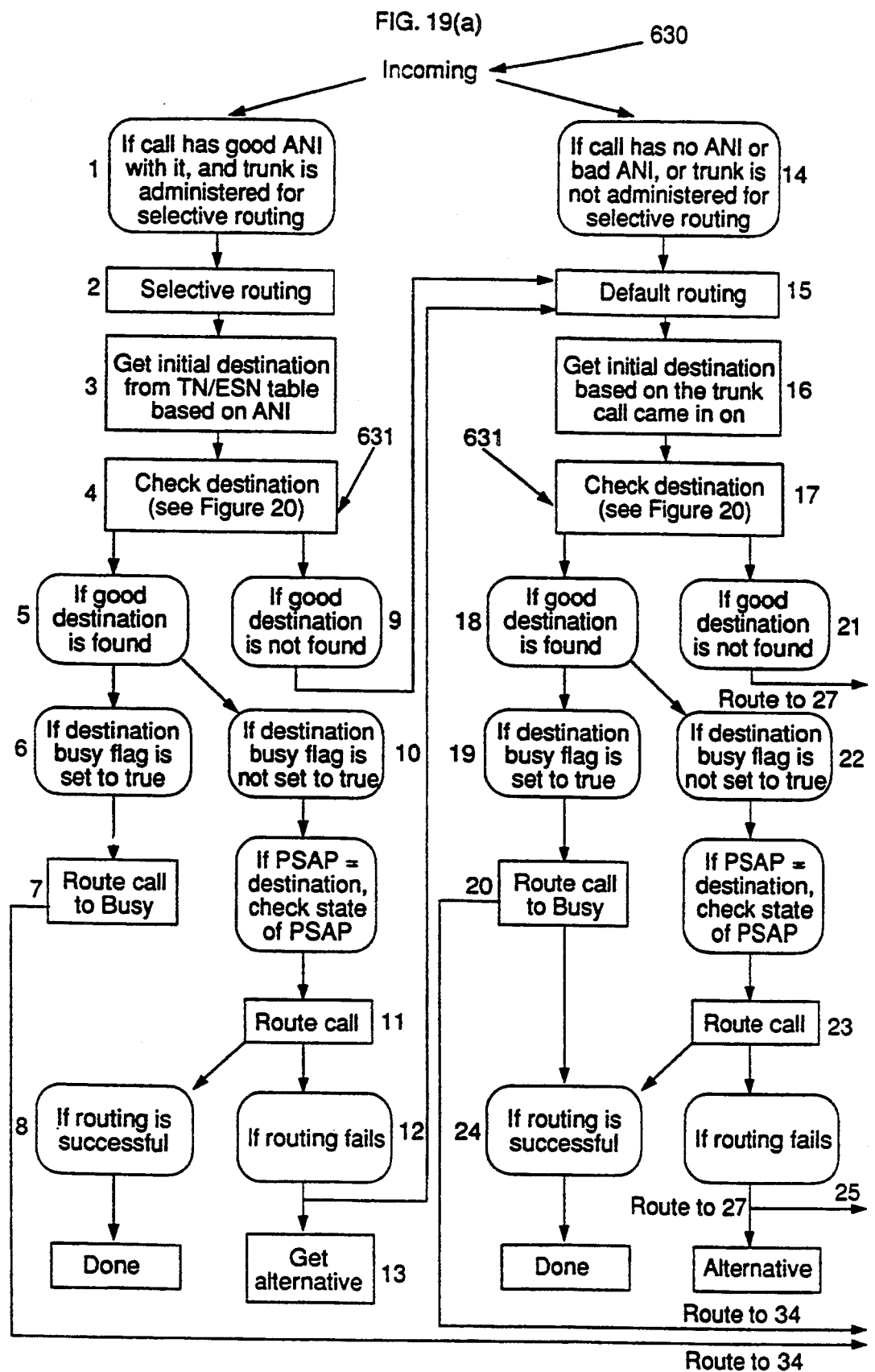
FIGS. 19a & 19b combine to form a flow chart indicating how the C.E.R.S. system uses Selective Routing, Default Routing and Last Chance Routing to route an incoming E9-1-1 call.
Figure 19B:
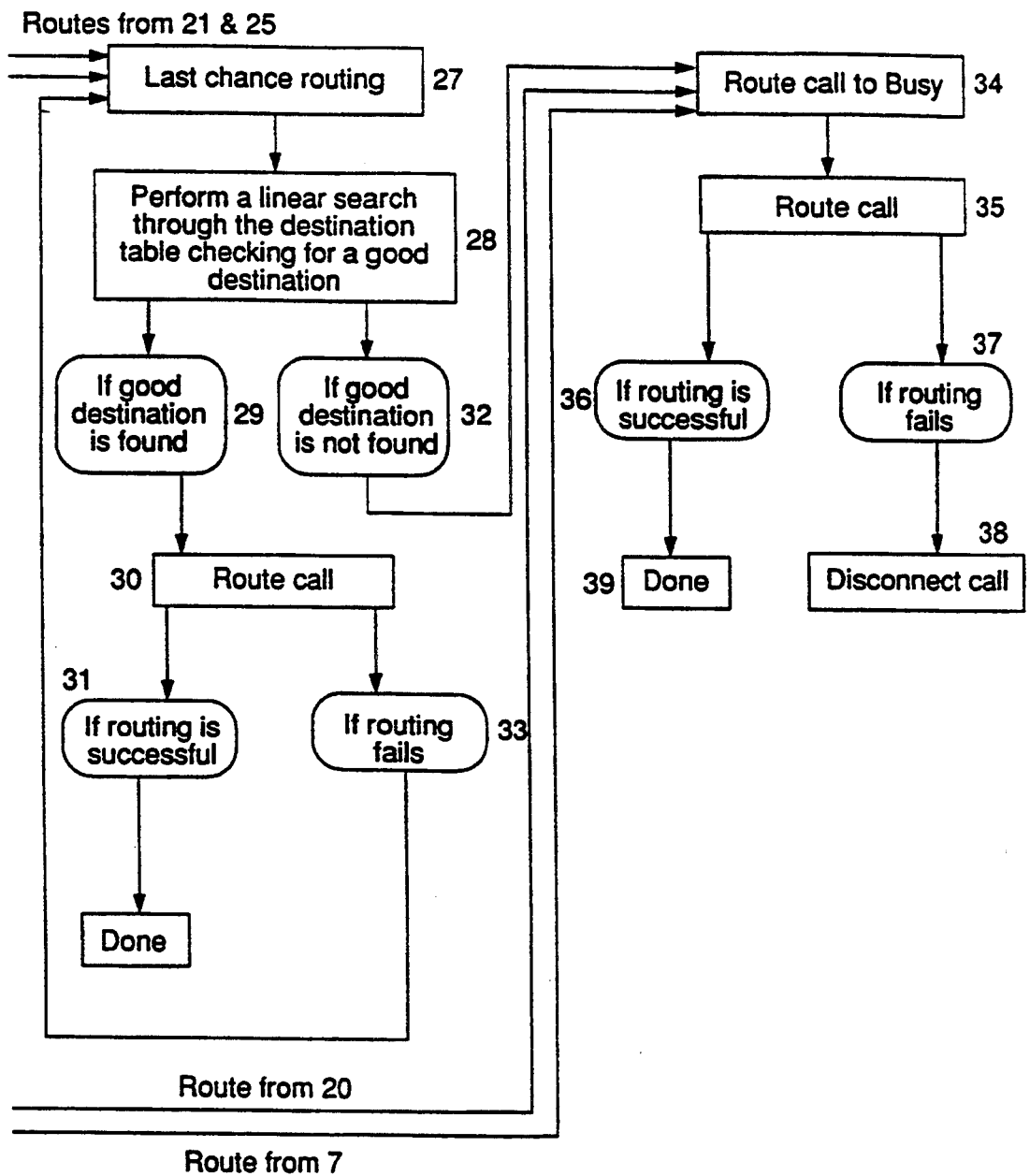

Reference is made to the "Routing Chart" below where the steps in FIGS. 19a, 19b & 20 are related to certain routing files and routines of the router process 360, which files and routines are set forth in the Microfilm Appendix.

| Ref | File | Routine | Line |
| --- | --- | --- | --- |
| 1 & 14 | route_call.c | determine_dest ( ) | 269 |
|  | route_call.c | determine_dest( ) | 275 |
|  | Determine ANI condition |  |  |
|  | rtr_call_status_msg.c | trunk_call_status_msg( ) | 192 |
|  | rtr_ani_rcvd.c | ani_rcvd( ) | 118 |
| 2 | route_call.c | determine_dest( ) | 301 |
| 3 | rtr_selective_routing.c | selective_routing( ) | 97 |
| 4 | rtr_selective_routing.c | selective_routing( ) | 105 |
| 5 | rtr_selective_routing.c | selective_routing( ) | 117 |
| 6 | rtr_selective_routing.c | selective_routing( ) | 129 |

-continued

| Ref | File | Routine | Line |
|---|---|---|---|
| 7 | rtr_selective_routing.c | selective_routing( ) | 134 |
| 8 & 24 & 31 & 36 | Routing successful is determined by the receipt of a route_determined message from the switch and a transition in the router state machine. | | |
| 9 | rtr_selective_routing.c | selective_routing( ) | 160 |
| 10 | rtr_selective_routing.c | selective_routing( ) | 139 |
| 11 & 23 & 30 & 35 | rtr_route_call.c | route_call( ) | 98 |
| 12 & 25 & 33 & 37 | Routing failed is determined by a receipt of a route_failed message from the switch and a transition in the route state machine. | | |
| 13 | rtr_redirect_failed.c | failed_to_dest( ) | 229 |
| 15 | rtr_default_routing.c | default_routing( ) | 43 |
| 16 | rtr_default_routing.c | default_routing( ) | 67 |
| 17 | rtr_default_routing.c | default_routing( ) | 84 |
| 18 | rtr_default_routing.c | default_routing( ) | 84 |
| 19 | rtr_default_routing.c | default_routing( ) | 96 |
| 20 | rtr_route_call.c | route_call( ) | 79 |
| 21 | rtr_default_routing.c | default_routing( ) | 90 |
| 22 | rtr_default_routing.c | default_routing( ) | 93 |
| 27 | rtr_route_call.c | last_chance_routing( ) | 118 |
| 28 | rtr_route_call.c | last_chance_routing( ) | 141 |
| 29 | rtr_route_call.c | last_chance_routing( ) | 163 |
| 34 | rtr_route_call.c | route_call( ) | 79 |
| 38 | rtr_route_call.c | route_call( ) | 81 |
| 100 | rtr_inspect_dest.c | inspect_loop( ) | 292 |
| 101 | rtr_inspect_dest.c | inspect_dest( ) | 454 |
| 102 | rtr_inspect_dest.c | inspect_dest( ) | 451 |
| 103 | rtr_inspect_dest.c | inspect_dest( ) | 385 & 417 |
| 104 | rtr_inspect_dest.c | inspect_dest( ) | 384 & 397 |
| 105 | rtr_inspect_dest.c | inspect_dest( ) | 335 |
| 106 | rtr_inspect_dest.c | inspect_dest( ) | 357 |
| 107 | rtr_inspect_dest.c | inspect_loop( ) | 144 |
| 108 | rtr_inspect_dest.c | inspect_loop( ) inspect_dest( ) | 115 399 |
| 109 | rtr_inspect_dest.c rtr_nite_srvc.c | get_next_dest( ) get_ns_dest( ) | 626 900 |
| 110 | rtr_inspect_dest.c | inspect_loop( ) | 115 & 102 |
| 111 | rtr_inspect_dest.c | get_next_dest( ) | 625 & 626 |
| 112 | rtr_inspect_dest.c | inspect_loop( ) | 89 & 142 |
| 113 | rtr_nite_srvc.c | get_ns_dest( ) | 885 |
| 114 | rtr_nite_srvc.c | get_ns_dest( ) | 872 |
| 115 | rtr_nite_srvc.c | get_ns_dest( ) | 879 |
| 116 | rtr_inspect_dest.c | inspect_loop( ) | 625 & 628 |

Interaction between the psap process 361 and the router process 360: The router process 360 interfaces with the psap process 361 which in turn interfaces with all wscp processes 368. The router process 360 notifies the psap 216 process 361 of (1) E9-1-1 calls 201 directed to a PSAP 216 including the reason and the selective transfer information, and (2) the PSAP status (i.e. queuing level, Night Service routing state).

If a PSAP 216 has call queuing enabled (via the PSAP queue 334), the router process 360 expects the psap process 361 to notify it of the status of the PSAP attendants 221. This information is used in the router process 360 to implement call queuing to the PSAP 216.

The router process 360 maintains the Night Service routing schedule 371 (FIG. 24) for each PSAP 216. When a given PSAP 216 is in the Night Service state the router process 360 notifies the PSAP 216 that Night Service Routing is in effect. As to all calls 201 that would be routed to that PSAP 216, the router process 360 directs them to the Night Service destination. The router process 360 interacts with a TN/ESN utility process 372 to coordinate updates and other run time accesses to the TN/ESN table 213.

The psap process 361: The psap process 361 is a permanent process that controls the telephony operations of all PSAP workstations 212 and PSAP notification lines. The psap is responsible for controlling the PSAP attendants' 221 call processing capabilities and additional capabilities provided at each PSAP 216.

The psap process 361 is based on a finite state machine design that is driven by the call processing messages 288 from the switch 218 and from inputs from the PSAP attendant keyboards 228.

The psap process 361 is responsible for:
1. Interacting with the wscp process 368 to provide the ability to each workstation 212 to answer and service E9-1-1 calls 201.
2. Controlling and monitoring PSAP workstation status and PSAP status.
3. Participating with the router process 360 to complete telephony operations, such as call transfers.
4. Participating with the router process 360 to define the system state with respect to routing requirements.

5. Participating in system integrity activities.
6. Distributing administration broadcast messages 240 to the wscp process 368.
7. Call status logging to the op process 366.
8. Metric collection for report generation.

The psap process 361 interfaces with the following processes: (1) the init process 352, (2) the stk process 358, (3) the router process 360, (4) the wscp process 368, (5) the dbmgr process 369, (6) the op process 366, (7) the mtk process 363, and (8) the platform_admin process 384, which sends administration broadcast messages to the psap process 361 for broadcast to all PSAP workstations 212.

The psap process 361 reads some administered data into memory 372 and it also maintains dynamic state tables, including those listed in Chart TABLES.

Chart PSAP TABLES
Dynamic state tables maintained by the psap process 361

1. PSAP table 382 (FIG. 10)
2. PSAP workstation table 386
3. ESCO (emergency service central office) table 387
4. PSAP state table 388, dynamic table that tracks PSAP status.
5. NPD/NPA table 381
6. Workstation state table 391, a dynamic table that tracks workstation status (Receiving Calls vs. Not Receiving Calls) and workstation telephony status.

The switch port(s) 384 are translated and monitored by the PSAP process for (1) PSAP attendant lines 512 (FIG. 3) which allow the psap process 361 to determine which PSAP attendant 221 answered an E9-1-1 call 201 and to implement restricted out dialing by PSAP attendants 221; and (2) the PSAP call notification line 241, which allows the psap process 361 to display on attendant screens 222 that E9-1-1 calls 201 are waiting to be answered (FIG. 15B, line 4).

The wscp Process 368: The wscp (workstation control) process 368 controls the workstations 212 of each PSAP 216. One copy of this wscp process 368 exists for each PSAP 216 administered. The wscp process 368 is implemented as a multi-tasking process to take advantage of a unique file descriptor scheme between tasks. Multi-tasking allows the wscp process 368 to control multiple workstations 212 and use a standard input/output device-based user interface package. There is one task responsible for over all process coordination and one task to interface to each PSAP workstation 212. The wscp process 368 uses AP user events from a monitor task to signal the receipt of an IPC message 288 to a particular workstation task. Twenty workstations 212 are supported per wscp process 386.

The wscp process 368 is responsible for controlling the PSAP attendant workstation interfaces, which include the commands entered by the attendant 221 using his or her keyboard 228, and the visual messages 240 on the workstation screen 222. This wscp process 368 interacts with the PSAP attendants' data display workstations 212 (which have the screens 222) and the keyboards 228 and coordinates activities with the psap process 361 which is controlling the voice lines 245. The attendant workstation interface is implemented using a third party user interface software package sold under the trademark JAM, marketed by JYACC Corp. under Model No. STRATUS.

Each wscp process 368 is assigned a unique name (used for IPC) to distinguish them. This assignment is made via command line parameters in a process initialization table 401. Each wscp process 368 is tightly coupled with a PSAP definition in an administration database 402.

The wscp process is responsible for:
1. Updating PSAP attendant screens 222 with ALI, call status, PSAP status, workstation status, and broadcast messages 288. In general, satisfying and implementing the requirements of the PSAP attendant workstation 212 from the standpoint of the workstation interface used by the attendants 221.
2. Implement the ability to initiate answering and servicing of E9-1-1 calls 201 through the PSAP attendant workstation 212.
3. Controlling and monitoring the status of PSAP workstations 212 and PSAPs 216 through interactions with the psap process 361.
4. Providing PSAP-specific administration capabilities through the PSAP attendant workstation interface.
5. Submit requests to the op process 366 to log ALI information from a PSAP 216.
6. Interacting with the ali process 364 and the router process 360 to implement the capability of doing a New ALI Fetch new and selective transfer points for a PSAP attendant-entered NPD and TN pair.
7. Participating in system integrity activities.

As shown in FIG. 8, the wscp process 368 interfaces with the following separate processes of the C.E.R.S. system 200: (1) the init process 352, (2) the router process 360, (3) the psap process 360, (4) the op process 366, (5) the ali process 364, and (6) the dbmgr process 369.

The wscp processes 368 do not communicate directly with each other. The psap process 361 and the router process 360 are an intermediary for all operations between wscp processes (i.e., transfer operations). The following data items are maintained within the wscp process:
1. PSAP administered configuration.
2. PSAP hunt group 333, DN of PSAP common notification line 241, the number of attendants 221 active at a PSAP 216, switch DN for each attendant's line port 403, an AP data port 404 for each attendant 221.
3. State of PSAP 216, e.g. Accepting calls, Abandoned, Night Service, current calls queued.
4. State of PSAP attendant workstation 212. Telephone line state, position state (active or inactive), current display screen state, etc.
5. The wscp process 368 interfaces with AP asynchronous RS232 device ports (not shown) for displaying and receiving data from the PSAP attendant workstations 212.

The ali Process 364: The ali 364 process is responsible for direct access to the remote ALI/DMS system 224. An NPD and TN pair are submitted to the remote ALI/DMS system 224 to retrieve ALI information. There are ALI/DMS process interface software module buffers (not shown) which receive ALI information and forward it to requesting clients 361. ALI information buffered is for some period of time in case another request is made for the same NPD and TN pair.

The ALI/DMS interface module interfaces with the (1) init process 352, (2) router process 360, to requests ALI information but not receive responses because the router processes' request initiates a request sent to the ALI/DMS system 224 before a PSAP attendant 221 answers the E9-1-1 call 201, (3) wscp process(es), which requests initial ALI information, re-fetches ALI on demand, and submits requests for new ALI information, the op process 366, to submit ALI/DMS broadcast messages directly to the op process 366 for logging at PSAP printers 355 and in the call log 244, (5) the dbmgr process 369, and (6) the mtk process 363.

The following data items are maintained by the ali process 364: (1) state of each ALI/DMS interface line and line pair 312, (2) requests pending from clients 361 that have been or will be submitted to the ALI/DMS system 224, and (3) received ALI information. The Ali process 364 is responsible for returning a response back to its clients 361 for every response received.

Figure 59:
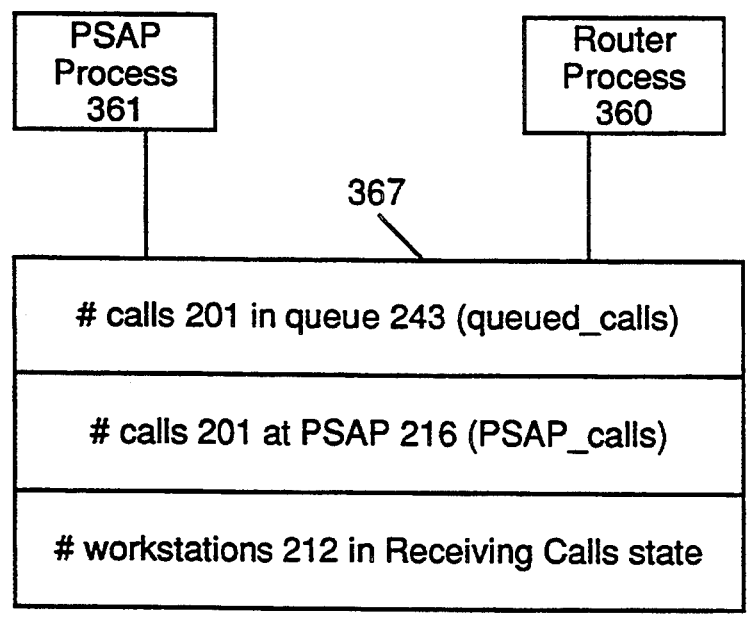

The op Process 366: The op (output) process 366 controls the interface to a system log file (FIG. 59) and the PSAP printers 255 (FIG. 5). The op process 366 interfaces with the AP asynchronous RS232 device ports 404 (FIG. 5) for printing call and ALI information at the PSAP 216. The call log information is optionally printed to the PSAP printer 255 and to the system log file 408. Because the AP 234 blocks processes 361 which write to disk, the output for the system log file 408 is centralized in the op process 366.

The op process 366 interfaces with (1) the init process 352, (2) the router process 360, (3) the psap process 361, (4) the wscp process(es) 368, (5) the ali process 364, which sends the ali broadcast message 407 (FIG. 9) to the op process 366 to be logged at the PSAP ALI printers 254 and in the E9-1-1 call log file 408 (FIG. 9), (6) the dbmgr process 369, (7) the platform_admin process 384, which reports log in failures to the op process 366 for logging and printing at a PSAP 216.

The following data items are maintained by the op process 366 (1) each PSAPs administered printing options, and (2) an array 409 containing each printer supported in the system.

Figure 57:
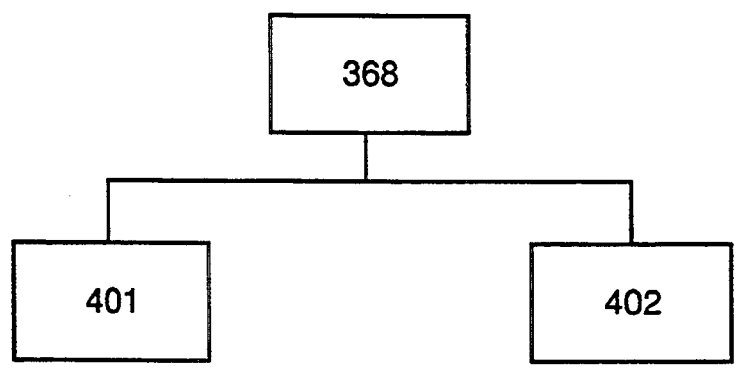
FIG. 57–59 are schematic diagrams showing various dynamic state tables administered by the wscp process and the router process and memory shared by the psap and router processes.

The dbmgr Process 369: The dbmgr (database manager) process 369 (FIG. 9) coordinates database updates. It provides a database locking scheme and a foundation for the implementation of run time updates (i.e. application reconfiguration such as adding PSAP workstations 212 or ES trunks 206. At initialization, client processes 361 connect to the dbmgr process 369 and report the database elements of which they have a copy. This registration for update notification allows centralized dynamic tracking of where information is in the run time process configuration. Processes 351 can dynamically request or relinquish write locks on data records or tables. The database manager process 369 handles contention between processes 351 for these locks and provides a scheme to recover a lock which has not been properly relinquished. All database updates are channeled through the dbmgr process 369. The dbmgr process 369 verifies the integrity of the data (i.e. relationship and range value checks) before sending acknowledgments back to the requesting process. The dbmgr process 369 notifies all processes 351 which have registered on data that the data has changed. A special update scheme, instant updates, is provide for data elements that cannot be subjected to possible lock rejects (i.e. such as the PSAP abandonment status in the PSAP definition record) (PSAP state table 388 (FIG. 57).

The C.E.R.S. system 200 limits the data items that can take effect during run time (the alternate is to restart the system 200 so all processes 351 read new versions of the databases). The dbmgr process 369 provides a structure for adding database elements that can be updated and take effect immediately.

The dbmgr process interfaces with (1) the init process 352, (2) the router process 360, (3) the psap process 361, (4) the wscp process 368, (5) the ali process 364, (6) the op process 366, and (7) the platform_admin process 384.

The cm Process 370: The cm (constant monitor) process 370 is a permanent process that coordinates the execution of automatic system diagnostics. The diagnostics include checks for loss of system resources such as the HCI link 283, disk space, and system printers 271. The cm process 370 interacts with the diag process 362 and a fiso process 283 in order to perform these functions.

The cm process 362 is responsible for (1) maintaining the schedule for tests, and (2) notifying the diag process 362 what test to perform and what resources to use in the test. The cm process interfaces 362 with the following processes via IPC: (1) the init process 352, (2) the diag process 362, and (3) the fiso process 375.

The following data items are maintained by the cm process 362: (1) a test schedule (the interval for diagnostic checks), (2) test resources, and (3) test results (the status of the last set of checks).

The diag Process 362: The diag (diagnostic) process 362 performs system diagnostics and executes tests as instructed by the cm process 370. The diag process 362 is implemented with an internal state table for determining proper test sequences and results. The diag process is responsible for:

1. monitoring sanity of the HCI link 283.
2. monitoring disk space usage.
3. monitoring the printer subsystem for printer status.
4. interfacing with the fiso process 375 to execute fault detection tests in the background that do not effect the primary system 200 feature responsibilities.
5. interfacing with a platform_maint process 410 to execute fault detection tests on demand.

The diag process 362 interfaces with the following processes via IPC: (1) the init process 352, (2) the stk process 358, (3) the cm process 370, and (4) the platform_maint file/routine.

The following data items are maintained by the diag process 362: (1) current test operations and results, (2) test resources such as trunks, lines, and printers and (3) statistics about the file and paging systems.

The diag process 362 invokes the transient process gps via the VOS s$start_process system call. gps is the process name that appears under a system process listing, the process is actually a VOS display_print_status command that the diag process uses to inspect the status of a system printer 272 (FIG. 1).

The fiso Process 375: The fiso process 375 performs recovery operations and problem isolation. The fiso process is notified of potential problems by the cm process 370 and by the platform_maint file. It interacts with the diag process 362 to perform additional tests to isolate the problem and test to ensure the problem has been corrected. The fiso process is responsible for interface with the diag process 362 to perform fault detection and isolation tests. The fiso process interfaces with: (1) the init process 352, (2) the diag process 362, and (3) the cm process 370.

The dpsc Process 411: The dpsc process 411 provides an interface with the diagnostic knowledge database. The dpsc process 411 is responsible for providing interface for other processes to the diagnostic knowledge database. The dpsc process 411 interfaces with: (1) the init process 352, (2) the fiso process 375, and (3) platform_maint process 410.

The TN/ESN Table Utility Process 376: The TN/ESN table 213 is received and converted into an internal AP structure that is used to support the Selective Routing feature. The TN/ESN table 213 is maintained in a disk file under the data directory. The data file is read by the router process 360 and maintained there for efficient run time access. The router process 360 can accept a run time update or individual entry update from the TN/ESN utility functions. The TN/ESN table 213 provides a mapping of an NPD and TN pair to an ESN. The ESN retrieved from the TN/ESN table 213 is used to access an AP administered ESN table 390 to determine the routing destination and selective transfer destinations. The TN/ESN table utility provides: (1) reformatting of the TN/ESN table 213 received from the ALI/DMS system 222 to an AP specific structure.

1. Updating the router process 360 with a new TN/ESN table 213, deleting any entries the router process 360 has that are not in the new TN/ESN table 213.
2. Adding TN/ESN entries to the router process 360.
3. Querying the router process 360 for up to twenty NPD-TN to ESN mappings at a time.

The TN/ESN table is audited to verify its structure and its ESN with the ESN table 390.

Administration Utility Process 384: The AP administration process 384 interacts with an administrator (e.g., the platform administrator 234) through several different types of terminals (e.g., the switch admin. terminal 270 or the AP admin. terminal 276).

The platform administration process 384 interacts with an administrator (not shown) to modify administration tables (not shown), generate reports, complete system backup and restore operations, inspect system status, or send broadcast messages 407 to PSAP attendants 221. Multiple instances of the platform_admin process 384 can exist. Some administration capabilities are distributed to the PSAP 216 through the PSAP attendant workstations 212.

The platform_admin process 385 provides the following capabilities: (1) update the AP administered data tables 402, (2) send a broadcast message 407 to all PSAP attendants 221 within a PSAP or to all PSAPs of the platform 204, and (3) generate system activity reports.

An adm_dbedit process is a transient process that can only be invoked from the V0S operating system. It provides the following capabilities: (1) dump an administered data table 402 to a printable file, and (2) restore an administered data table 402 from an ASCII file. In addition to the platform_admin process 384 and adm_dbedit process 412, there are utilities routines (not shown) used by the processes 351 to retrieve administered data from disk files and interact with the dbmgr process 369.

Report Utility Process 416: System activity reports 416 generated on demand from the data that is collected from system processes. A rpt process 419 reports system activity and reads the data that is deposited in files by system processes, formats the data, and creates an output file 418.

Init_shutdown Process 422: An init_shutdown process 422 can be invoked to have the init process 352 stop and restart all processes or gracefully terminate all C.E.R.S. processes 351. Graceful termination is accomplished by the init process sending out a broadcast message 407 to all processes 351 asking them to exit. If the processes 351 do not exit within a predetermined time period, the init process 352 stops them.

Set_class Process 423: A set_class process 423 is used to dynamically set the level of log messages 288 that are directed to debug files for each process 351 that has successfully initialized with the message logging shared memory 424. It is used during development testing.

Ml_set_log Process 427: A ml_set_log process is used to send log messages 288 to a specific file version number. It is used during development testing.

Shared Memory 367: The following shared memory segments 367 (FIG. 59) are utilities in the C.E.R.S. system 200. All processes 351 that utilize any of these shared memory segments 367 (FIG. 59) declare them in their bind control file. These segments 367 include:

1. ML Shared memory is used to keep the current log file version and entry count available to all processes who log system messages.
2. PSAP/router shared memory is used to keep the number of PSAP attendants status information quickly available to the router process for call routing purposes.
3. IPC_SHMEM. All processes that use IPC shared memory as their ipc mechanism and all processes 351 that connected to a process that use IPC shared memory must bin (??) a special shared memory segment that is used to store (?). Use of IPC shared memory is discouraged.
4. LOCK_PAGE. is a shared memory area that is used to control access to the band the IPC shared memory areas.
5. STK shared memory is used to store its LID/SID table (not shown) and translate and monitor information.
6. TP shared memory is used by the init process 352 to control the rate at which to send process monitors.

Run Time Directory Structure: The following directories 441 (FIG. 9) are used by the C.E.R.S. system 200 run time environment.

1. bin directory contains all executable processes. Also, any files that permanent processes must have their home directory reside in the bin directory. An example of a non-executable file that must reside in this bin directory are the JAM TM screen definition files that are used by the wscp process 368 and platform_admin processes 385.
2. data directory contains all delivered and AP administered data files. These files include: (1) cascade.abbrev, (2) proc_table.dat, (3) mes_init.dat, (4) tnesn_tbl.dat, (5) diag_data.dat, (6) ali.bin, (7) dest.bin, (8) esco.bin, (9) esn.bin, (10) fxdir.bin, (11) night .bin, (12) npa.bin, (13) pdn.bin, (14) platform.bin, (15) psap.bin, (16) trunk.bin, (17) trunk_group.bin, (18) wkst.bin, (19) xfr.bin
3. log Directory contains all system messages 288 activity logs, data logs and development debug logs. These log files automatically start new versions based on number of entries written to them or the current date. These logs include:
    a) system.log.x where x is a file version number. File where all log messages of type informational, critical alarm, major alarm, minor alarm, and clear alarm are written.
    b) debug.log.x (a file where all process log messages are written by convention).

c) E911 _call_m_d_y (where "m" is the numeric two digit month, "d" is days and "y" is year) is a system activity log file, all E9-1-1 calls 201 received by the system 200 have an entry made in this file. Also, all entries that can be printed at a PSAP printer 255 (i.e., PSAP state, ALI fetch requests, etc.) are written to this file. Each process that creates a file in the directory log is responsible for removing it.

d) metrics directory contains all files that are created from the metrics collection mechanism. Each file has a unique name that is controlled by the mtk subsystem. The mtk process 363 is responsible for removing old metric files from this directory. Metric files are deleted after sixty days.

e) queues Directory contains any files that are required related to the implementation of IPC and standard output of permanent processes 351. Files to support IPC pipes are created and stored in the queues directory.

Data/Data Tables: Data and data tables that support the C.E.R.S. system 200 include platform data files, as follows: (1) proc_tbl.dat file lists all processes that are started by the init. process 352, (2) mes_init.dat file lists all log file destinations, (3) metrics_tbl.dat file lists all metric file base names and the metric collection interval for each, (4) cascade.abbrev file contains all abbreviations used by the processes 351 (including defining the database directory log directory), and (5) diag_data.dat file describes the TNs of RADs 247 that are used to make maintenance and diagnostic test calls.

Figure 11:
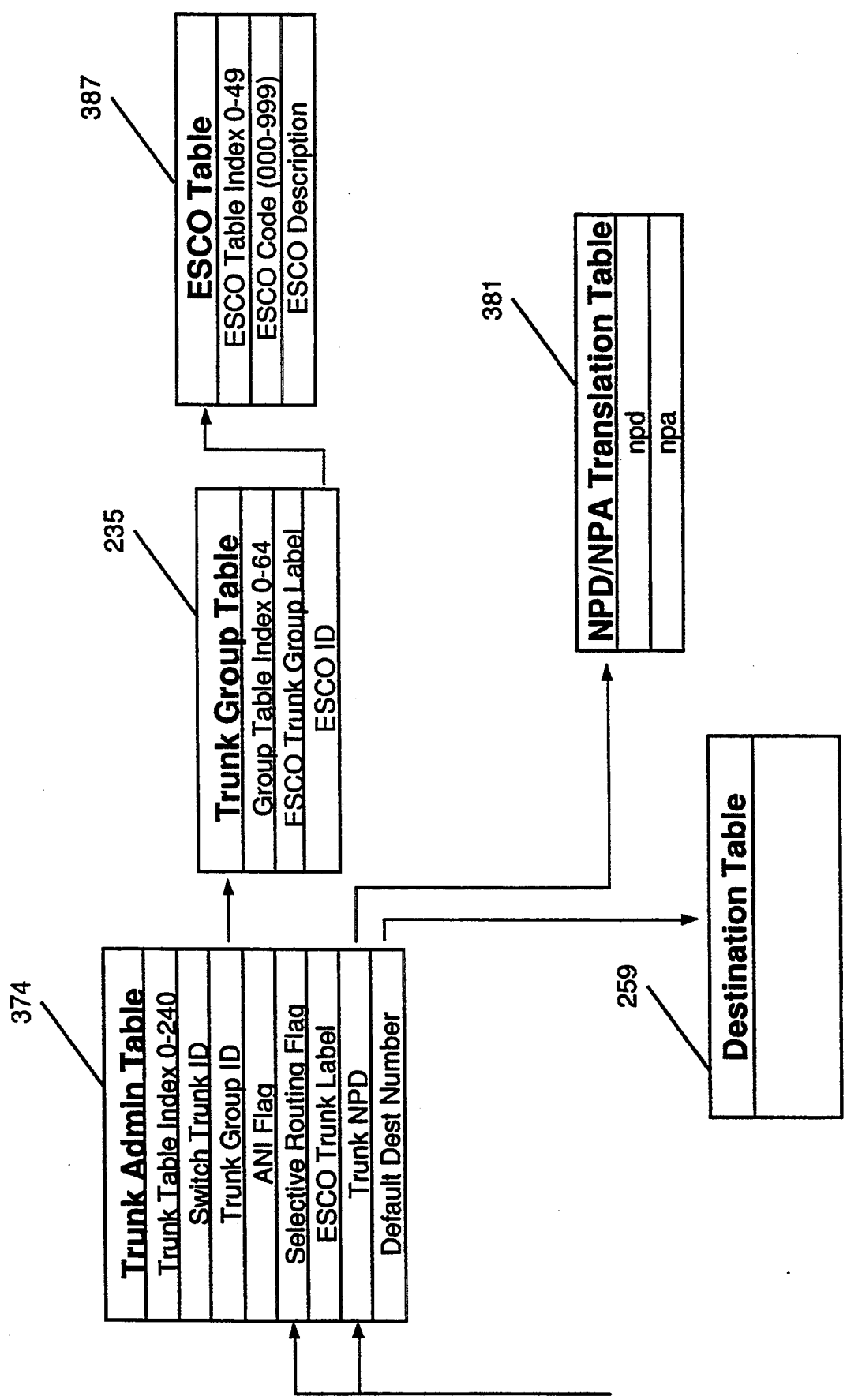
FIG. 11 is a diagram of additional tables of the AP for storing data relating to the incoming E9-1-1 calls.

Application Administered Databases: Administered databases are created from data entered by the system administrator 239. Referring to FIGS. 10 and 11, the data is grouped with related data to form logical tables which include the following.

1. ESN table 451 contains an entry for each ESN supported by the platform 204. The ESN table 451 points to the destination table 373 to define which call handling destination 215 to route an E9-1-1 call 201 to and points to the Selective Transfer table 378 to define the selective transfer points 225 to be displayed if the E9-1-1 call 201 is answered by a PSAP 378.

2. The destination table 373 defines the attributes of each call handling destination 215 that can receive an E9-1-1 call. The attributes include the destination type, telephone number, and alternate destination. If the call handling destination 215 is a PSAP 216, the destination table 373 points to the PSAP table 382. A reference in the destination table 373 to a particular PSAP 216 may occur more than once, but is distinguished in the utility provided by the alternate destination specification.

3. The PSAP definition table 395 specifies all the information that is required to define a PSAP 216 and implement the required features. The PSAP attributes include pointers into the PSAP workstation table 386.

4. The PSAP workstation table 386 contains an entry for each PSAP attendant workstation 212 defined on the platform 204.

5. The trunk definition table 398 specifies trunks as either incoming emergency call carrying trunks 206 or the outgoing transfer and PSTN origination trunks 302.

6. The TN/ESN table 213 table is received from a remote computer system via a nine-track tape over a dial up link (not shown). The TN/ESN table 213 is read into the AP 234 and converted into an internal structure to support fast access and minimal space consumption. The NPD and TN of an E9-1-1 call 201 with ANI is used to retrieve an ESN from the TN/ESN table 213. The table is update-controlled by a single process (which one?), but access is allowed by several processes as described above.

Call Log 244: The call log 244 (FIG. 9) contains various entry types related to processing E9-1-1 calls 201 by the platform 204. It contains an entry for every E9-1-1 call 201 received by the system 200 and reported to the AP 234 by the switch 218. The call log 244 is a super set of all the entries made to PSAP Call printers 255. The call log 244 also contains a copy of all administration broadcast messages 407 and the destinations to which it was sent. The op process 366 is the only process that writes to the system call log 244. System call log entries are initiated by the router process 360, the psap process 361, ali process 364, and the wscp process 368.

System Message Log: The system message log 439 (FIG. 9) is a standard element in the CASCADE architecture. All processes log abnormal or system significant events to this log 439. The system administrator 239 is able to review this log 439 and use its entries to identify abnormal system activity and system problems.

TN/ESN Update Log 452: The TN/ESN process 372 maintains a tn_update.log 452 which includes (1) every update to the TN/ESN table 213 that occurs, (2) the number of TN/ESN entries received and (3) the number of entries that were invalid. This log 452 is used to produce a system activity report.

Parameters Database 470

To enable the C.E.R.S. system 200 to adapt to the unique and time-varying demands of its emergency service area 208 dynamic altering of various parameters used by the applications software 287 is required. This requirement is implemented by (1) establishing a parameter (or application) database 470 which is accessible by the application processes 351, and (2) providing a database manager process 369 to manage updates to the database 470.

Design Approach: An authorized user of the C.E.R.S. system 200 (e.g. the administrator 239) can view, add, change and delete parameters which are used by application processes 351 to determine how to respond to E9-1-1 calls 201 (e.g., using screens 222 shown in FIGS. 33, 36, 49 and 50). Interaction involves viewing the current values of configurable parameters, changing the parameters in some way, and making the changed data available to the application processes 351. In addition, fault-tolerance considerations require that a starting (or restarting) application process 351 be capable of finding the current values of configurable parameters without help from a user (e.g. the administrator 239) or from another process 351.

The database 470 uses disk files 471 for storage. These files 471 are read directly by the application processes 351 which use the data, and are written by the database manager process 369. When the user changes a configurable parameter, the application process 351 providing the user interface asks the database manager process 369 to change the appropriate database file 471, and the database manager process 369 sends IPC messages 288 to affected application processes 351 informing them of the change. The application processes 351 also read the database files 471 to get current parameter values. This allows the processes 351 to initialize without cooperation from the database manager process 369.

Design Constraints: The following constraints were considered during the design of the application database 470:
1. The effect of access to the database 470 upon application processes 351.
2. Messages 288 are used to distribute database changes to application processes 351. The service layer software 350 limits the length of IPC message bodies to five hundred twelve bytes. Data structures are partitioned such that database changes are to be made via IPC using application data structures without exceeding this five hundred twelve byte limit. The only structure that exceeds this size is the one used to hold records of the fixed transfer directory 249.
3. A menu-based user interface (in the form of the various screens 222 and various keyboard 228 actions, is used to configure the application data base 470). This allows input of multiple parameter types in multiple functional areas.

Design Details: The application database 470 consists of a collection of logical data structures which are mapped to a physical disk file structure. The logical data structures define data items for each of the parameters. In addition, some of the structures have elements added to allow the application software 351 to handle certain "housekeeping" tasks. One example of this is that most structures have fields added which are used as an index, or a "key", which uniquely identifies each record in a file. The microfilm appendix includes these data structures which are described below in terms of "C" Language constructs, using typedefs, structure definitions, enums and #defines to logically assemble the data structures. Some of those constructs are used by several of the structures defined below, including:

```
Constants:
#define DAYS_IN_WEEK 7           /* days in week */
#define NS_INTVLS_DAY 3          /* number of night service intervals
                                    per day */
#define NS_INTVLS_WK NS_INVLS_DAY*DAYS_IN_WEEK; /* number of
        night service intervals per week */
#define PLAT_OVERRID −1          /* indicates platform overrodenight
                                    service */
Typedefs:
Selected type defs from the Microfilm Appendix are as follows:
typedef long TICKS               /* used to hold night service times */
typedef char PSAP_LABEL[PSAP LABEL_CHARS+1]; /* psap label */
typedef char PSAP_NAME[PSAP_NAME_CHARS+1]; /* psap name */
typedef int PSAP_NO;             /* psap id no. */
typedef int WKST_NO;             /* wkst id */
typedef char WS_NO_LABEL[WS_NUM_SIZE+1];      /* wkst id in
                                                  alpha */
typedef   char    XFR_LABEL[XFR_WIDTH*XFER_ROW    +    1];
        /* sel xfr label */
typedef int XFR_NO               /* sel xfr pt id */
Enums:
Selected enums from the Microfilm Appendix are as follows:
typedef enum {DEST_TYPE_PSAP = 0,
              DEST_TYPE_SW_DN = 1,
              DEST_TYPE_PSTN_DN = 2} DEST_TYPE;
                        /* allowed destination types */
typedef enum {ANY_STATION = 0,
              ACD = 1} PSAP_CALL_DIST; /* call distribution
                                          enum */
typedef enum {DISABLED = 0,
              IN_EARLY −1,
              OUT_EARLY = 2} OVER_TYPES;
typedef enum {ADM_DB_FIRST_TYPE = −1,
              ADM_DB_PSAP = 0,
              ADM_DB_NIGHT = 1,
              ADM_DB_WKST = 2,
              ADM_DB_DEST = 3,
              ADM_DB_XFR = 4
              ADM_DB_TRUNK = 5,
              ADM_DB_TRUNK_GROUP = 6,
              ADM_DB_ESCO = 7,
              ADM_DB_NPD = 8,
              ADM_DB_ALI = 9,
              ADM_DB_PDN = 10,
              ADM_DB_PLATFORM = 11,
              ADM_DB_FXDIR = 12,
              ADM_DB_ESN = 13,
              ADM_DB_MAINT = 14,
              ADM_DB_STATUS = 15, /* not currently used */
              ADM_DB_LAST_TYPE = 16} ADM_DB_TYPE;
                        /* database types */
```

Database types whose data is not accessed through the admin library functions (like the above data types are) are defined "with" the others so some of the database manager process 369 services can be provided for them. They are given in the enum below.

```
typedef enum {ADM_NONDB_FIRST_TYPE = ADM_DB_LAST_TYPE+1,
        ADM_NONDB_ALARMS,
        ADM_NONDB_PTK,
        ADM_NONDB_LAST_TYPE} ADM_NONDB_TYPE;
```

In addition, the data structures presented below also refer to constants which are described in system level include files, specifically stk.h and circe.h. These constants are: MAX_DESTINATIONS, MAX_ESCOS, MAX_TRUNKS, MAX_PDNS, MAX_PSAPS, MAX_XFR_PTS_ESN.

Workstation Table Data Structures: The administrable workstation parameters are used by the applications software processes 351 which need to know how each workstation 212 is configured. The format of the workstation data structure is defined below:

```
                  }   PSAP_WKST;
```

Fixed Transfer Directory Table Data Structures: The administrable fixed transfer directory 249 parameters are used by applications software processes 351 which need to know the contents of the fixed transfer directory 249 for a PSAP 216. The format of selected ones of the data structure for the fixed transfer directory 249 are below:

```
typedef struct {
        GROUP_NAME grp_name;        /* the name of the fxdir group */
        int grp_count;              /* current number of entries in the
                    group           */
        }   FXDIR_GROUP;
typedef struct {
        BOOLEAN delete;             /* delete flag */
        long update_time            /* the time of last update */
        PSAP_NO psap_no;            /* id of psap */
        LINE_FLAG line_flag         /* online/offline flag */
        FXDIR_GROUP GRP_headert[NUM_FXDIR_GROUPS];
                                    /* headers for each fxdir group */
        FXDIR_ENTRY entry[MAX_FXDIR_ENTRIES]; /* the fxdir
           entries */
        }     FXDIR;
```

Night Service Table Data Structure: Administrable night service parameters are used by applications software processes 351 which need to know the Night Service schedule 371 for a PSAP 216. The Night Service table does not store Night Service override information; this is stored in the PSAP table 382. The format of the night service data structures are defined below:

```
typedef struct {
        BOOLEAN delete;             /* delete flag */
        long update_time;           /* the time of last update */
        PSAP_NO psap_no;            /* id of psap */
        WKST_NO wkst_no;            /* id of workstation in
                                       PSAP */
        LINE_FLAG line_flag;        /* on-line/off-line flag */
```

```
typedef struct {
        TICKS start;  /* the starting time of a n.s. interval */
        TICKS end;    /* the ending time of a n.s. interval */
        ROUTING OPTION night_svc_rte_flag;    /* alternate(1) or
                                                 nite svc(0) routing
                                                 flag */
        DEST_NO dest_no;          /* the dest no to route to during
                                     n.s. interval */
        }   NIGHT_SCHED;
typedef struct {
        BOOLEAN delete;           /* delete flag */
        long update_time;         /* the time of last update */
        PSAP_NO psapno;           /* id of psap */
        LINE_FLAG lineflag;       /* on-line/off-line flag */
        NIGHT_SCHED night service[NS_INTVLS_WK];
                                  /* the weekly night service schedule */
        }   PSAP_NIGHT;
```

```
        DN dn;                       /* workstation voice line dn */
        STRATUS_PORT port;           /* workstation data port
                                        designator */
        TERM_TYPE term_type;         /* terminal type of
                                        attendant */
        PORT_SETUP port_setup;       /* parameters for the data
                                        port */
```

PSAP Table Data Structures: Administrable PSAP parameters are used by applications software processes 351 to control the routing and transfer of E9-1-1 calls 201 to PSAP attendant workstations 212. The format of the PSAP data structure shown in the microfilm appendix is illustrated below:

```
typedef struct {
        BOOLEAN delete;              /* delete flag */
        PSAP_NO psap_no;             /* psap id */
        PSAP_NAME name;              /* unique psap name */
```

```
      PSAP_LABEL label;            /* psap label */
      DN hunt_group_dn;            /* dn of psap hunt group */
      DN not_line_dn;              /* dn of psap notification line */
      BOOLEAN clear_screen;        /* flag for enabling clear screen
      feature */
      NPD npd; /* the npd for the psap */
      ALL_MATCH ali_match;         /* npd-nxx patterns to match for ali
      retrieval */
      BOOLEAN call_cpcty_flag;     /* is there a call capacity for
      the psap */
      int call_capacity;           /* the call capacity for a psap */
      BOOLEAN abandon_flag;        /* psap abandon (0-no 1-yes) */
      BOOLEAN abandon_rte_flag;    /* alternate(1) vs abandon(0)
      routing flag */
      DEST_NO abandoned_dest;      /* dest. for abandoned psap */
      WKSTNO who_abandoned;        /* the workstation attendant
                                      that abandoned the PSAP */
      WHO_OVERRID                  /* identifies who invoked ns
      who_overrid;
      override */
      OVER_TYPE ns_override;       /* for overriding night service */
      long ns_override_time;       /* when was ns override invoked */
```

Destination Table Data Structures: The parameters for the administrable destination table 373 are used by applications software processes 351 to control the routing of incoming E9-1-1 calls 201. The format of some of the destination table data structures used in the Microfilm Appendix are defined below:

```
typedef struct {
      DEST_NO alt_dest;   /* dest no to use if psap is
unavailable
      PSAP_NO psap_no;    /* id of destination psap */
      } DEST_PSAP;
typedef struct {
      DN dn; /* dn of esp */
      BOOLEAN busyflag;   /* does this dest entry represent a
busy */
      DEST_NO alt_dest;   /* dest no to use if psap is
unavailable */
      }   DEST_SWITCH;
```

ESN Table Data Structures: The parameters for the administrable ESN table 390 are used by applications software processes 351 to control the transfer of E9-1-1 calls 201 which are being handled by PSAP attendants 221. The format of the ESN table data structure is defined below:

```
typedef struct {
      BOOLEAN delete; /* the delete flag */
      long update_time; /* the time of last update for the
record */
      ESN_NO esnno; /* the esn of this entry */
```

```
      DEST_NO destno; /* the dest no for this esn */
      ESN_COMMENT comment; /* a comment field for this esn */
      XFR_NO xfr_point[MAX_XFR_PTS_ESN]; /* selective
                                 transfer points for
                                 the esn */
      BOOLEAN busyflag; tells if the esn represents a busy
      }    ESN_ENTRY;
```

Selective Transfer Table Data Structure: The parameters for the administrable Selective Transfer table 378 are used by applications software processes 351 to control the transfer of E9-1-1 calls 201 which are being handled by PSAP attendants 221. The format of the Selective Transfer table data structure is defined below:

```
typedef struct {
      BOOLEAN delete;        /* the delete flag */
      long update_time;      /* the time of last update for the
                                record */
      XFR_NO xfr_no;         /* xfr no for this entry */
      XFR_LABEL label;       /* sel xfr point label */
      DEST_NO dest_no;       /* dest no for this entry */
      }    XRT_ENTRY;
```

Trunk Table Data Structures: The parameters for the administrable trunk table 398 are to define trunk information which is used to route E9-1-1 calls 201 and display information at PSAP attendant workstations 212. The format of the trunk table data structure is defined below:

```
typedef struct {
      BOOLEAN delete; /* the delete flag */
      long update_time;        /* the time of last update for the
                                  record */
      TRNK_NO trnk_no; /* trunk id for indexing */
      LINE_FLAG line_flag;     /* on-line (1) vs off-line (0)
                                  flag */
      TRNK_ID switch_id;       /* trunk id used in mitel switch
                                  admin */
      TRNK_GRP_NO trnk_grp_id; /* id of trunk group for this
                                  trunk */
      TRNK_LBL esco_label;     /* esco label for trunk */
      BOOLEAN ani_flag;        /* ani (1) vs no ani (0) capability
                                  flag */
      NPD npd; /* npd for calls on this trunk */
      BOOLEAN sel_rte_flag;    /* selective route on(1)/off(0)
                                  for trunk */
```

```
        DEST_NO default_dest;    /* dest no to use for default
                                     routing */
    }   TRUNK;
```

Trunk Group Table Data Structures: The parameters for the administrable trunk group table 377 define trunk group information which is used to route E9-1-1 calls 201 and display information at PSAP attendant workstations 212. The format of the trunk group table data structure is defined below:

```
typedef struct {
    BOOLEAN delete; /* the delete flag */
    long update_time; /* the time of last update for the record */
    TRNK_GRP_NO trnk_grp_no; /* trunk grp id */
    LINE_FLAG line_flag; /* on-line (1) vs off-line (0) flag */
    ESCO_NO esco; /* id for esco originating this trunk group */
    TRNK_GRP_LBL esco_label; /* esco label for trunk group */
}   TRUNK_GROUP;
```

ESCO Table Data Structures: The parameters for the administrable ESCO table 387 define ESCO names and IDs and are used to display the ESCO from which an E9-1-1 call 201 originated. The format of the ESCO table data structure is defined below:

```
typedef struct {
    BOOLEAN delete; /* the delete flag */
    long update_time; /* the time of last update for the record */
    ESCO_NO escono; /* esco no. (used as index) */
    ESCO_ID code; /* esco code (user input) */
    ESCO_SITE_LBL name; /* esco name */
}   ESCO;
```

NPD/NPA Translation Table Data Structures: The parameters for the administrable NPD/NPA translation table 389 are used by the PSAP process 361 when implementing the Call Origination feature. The format of the NPD/NPA Translation table data structure is defined below:

```
typedef struct {
    char digits[MAX_NPA_CHAR+1]; /* storage for npa digits */
}   NPA;
typedef struct {
    BOOLEAN delete; /* the delete flag */
    long update_time; /* the time of the last update for the record */
    NPA npa_tbl[MAX_NPDS]; /* array for npas */
}   NPA_TBL;
```

ALI/DMS Parameter Data Structures: The parameters for the administrable ALI/DMS table 474 are used by the ali process 364 to control the ALI/DMS interface to the ALI/DMS system 224. The format of the ALI/DMS parameter data structure is defined below:

```
typedef struct {
    BOOLEAN delete; /* the delete flag */
    long update_time; /* the latest update time for this record */
    ALI_LINE_NO ali_line_no;    /* id of ali line pair */
    STRATUS_PORT port_a;         /* path to first port of line pair */
    STRATUS_PORT port_b;         /* path to second port of line pair */
    PORT_SETUP port_setup; /* the parameters for the data ports */
    ALI_FORMAT ali_format;       /* format flag (defined per
                                    line pair to save creating
                                    extra file */
}   LINE_PAIR;
```

PDN Parameter Data Structure: The administrable PDN parameters are used by applications software processes 351 to provide phantom DNs. The PDN table 480 consists of PDNs with the following structure:

```
typedef struct {
    BOOLEAN delete; /* the delete flag */
    long updatetime; /* the time of the last update to the record */
    PDN_NO pdnno; /* the index for this record */
    DN dn; /* the dn for this pdn */
}   PDN;
```

Application Database Disk Pile Layout: The application database 470 is stored in fifteen physical disk files of Stratus "Sequential" type. Each file contains only one record (structure) type. The individual files of the application database 470 are discussed below.

PSAP File: This file contains one record for each PSAP 216 administered on the platform 204. The record contains most parameters related to the PSAP 216. Fixed transfer directory, Night Service and workstation parameters are each stored in separate database files.

Night Service File: This file contains one record for each PSAP 216 administered on the platform 204. The record contains the weekly Night Service schedule 371, and some routing information, for each PSAP 216.

Fixed Transfer Directory File: This file contains one record for each PSAP 216 administered on the platform 204. The record contains fixed transfer directory parameters for each PSAP 216.

PSAP Workstation File: This file contains one record for each workstation 212 administered on the platform 204. The record contains all parameters related to the workstation 212.

Destination File: This file contains one record for each call handling destination 215 administered on the platform 204. The record contains all parameters related to the destination 215.

ESN File: This file contains one record for each ESN administered on the platform 204. The record contains all parameters related to the ESN.

Selective Transfer File: This file contains one record for each Selective Transfer Point 225 administered on the platform 204. The record contains all parameters related to the Selective Transfer Point 225.

Trunk File: This file contains one record for each trunk 205 administered on the platform 204. The record contains all parameters related to the trunk 205.

Trunk Group File: This file contains one record for each trunk group 206A administered on the platform 204. The record contains all parameters related to the trunk group 323.

ESCO File: This file contains one record for each ESCO (Emergency Service Central Office) 205 administered on the platform 204. The record contains all parameters related to the ESCO 205.

NPA File: This file consists of one record which contains the NPD/NPA mappings for the four NPDs administered on the platform 204.

Application Process/Application Database Interfaces: In general, applications processes 351 use data from the application database 470 to determine how E9-1-1 calls 201 should be processed and reported. The applications processes 351 receive this data from one of three sources. The first source is a message 288 (via IPC) from a process other than the database manager process 369. For instance, the router process 360 sends an Incoming Call message 288 to the psap process 361 when an E9-1-1 call 201 is routed to a PSAP 216, and this Incoming Call message 288 contains application data such as trunk id, ESCO label, etc. In cases such as this, neither the application database 470 nor the database manager process 369 is involved in the transfer of the data.

The second source of application data for an application process 351 is direct access of the application database 470 from disk by the applications process 351 itself. This type of access is used at initialization by each process 351 which uses application data without receiving it from another process.

The third source of application data for an application process 351 is a message 288 (via IPC) from the database manager process 369. Such a message 288 contains information about changes to the application database 470. This requires that application processes 351 register with the database manager process 369 for the data they want to be notified about changes made to. A data transfer of the first type is not considered to create an interface between the process which uses the application data and the application database 470. Transfers such as this are defined in process-to-process interfaces. Data transfers of the second and third type are discussed below.

Process/Disk File Interfaces: The application library functions were created to provide a standard interface to the application database 470 on disk. These functions completely shield user processes 451 from the physical details of the application database 470 implementation by allowing the user processes 451 to specify a logical table to open, read, and close. Some functions should not be used by application processes 451. Specifically, any function that writes or deletes a database record should not be used by any process 351 other than the database manager process 369. Functions that application processes can use include the different functions to read the database, the functions to open and close a database table, and some other miscellaneous functions.

There are five different functions that can be used to read database records.

1. adm_read_rec—Most application processes 351 use this function to read database records. It reads the next sequential record (from the current file pointer) that is not marked as logically deleted or off-line.
2. amd_read_raw_rec—Reads the next sequential record from a database file that is not marked as deleted. This function will read records marked off-line.
3. amd_read_all_recs—Reads the next sequential record regardless of if it is marked as deleted or off-line.
4. adm_read_rec_num—Reads the record that is in a desired position (not the next sequential record). It reads the record regardless of if it is marked as deleted or offline.
5. adm_read_keyed_rec—Reads the record with a desired key value. It will not read records that are logically deleted, but it will read records that are marked offline.

Real-Time Impact: Several steps minimize the performance impact of accessing the application database 470 upon those real-time processes which require the data. First, since disk access imposes the most severe performance penalty, the processes 351 are designed to keep copies of the application data they require in memory 372 local to each process 351 (FIG. 5). These copies are read from disk during initialization, and only updated when the application data changes while the process 351 is executing.

Second, the design of the database manager process 369 ensures that when a given data element in the application database 470 changes, only those processes 351 which have need of the data will be informed of the change. Further, the IPC message used to inform a real-time process that a change has occurred in the application database 470 contain, the changed data itself (unless the record that was changed was a fixed transfer directory record, in which case the record must be read from the database). This allows the processes 351 to update their internal copies of the database without requiring disk access.

Finally, some of the files are ordered so that certain records can be directly read (only one read system call is required) from the database file without having to read through all records, searching for the desired record. Ordering database files, and providing special library functions that take advantage of this ordering, help improve performance significantly in cases where database files are very large, such as the files of the fixed transfer directory 249.

Database Manager Process Functionality

The database manager process 369 is responsible for updating the administration database 470, and for keeping data consistent among all processes 351 in the C.E.R.S. system 200. The database manager 369 implements concurrency control (1) because multiple processes 351 can update the database 470 at the same time, and (2) to notify the necessary processes 351 after the database 470 has been updated to provide runtime update notification. The database manager process 369 does not provide any of the user interface part of administering the database. Database editing is done by workstation attendants 221, by PSAP managers 259, and by platform administrators 239. The user interface to these users is provided by processes, such as the wscp process —, other than the database manager process 369. These processes communicate with the database manager process 369 to change the database 470. All updates of the database 470 are done through the database manager process 369.

The database 470 may be edited by more than one process 351 at the same time. The database manager process 369 provides runtime update notification for all data in the applications database 470.

Database Updates: There are three types of database updates available for application processes; add a record, delete a record, and change (modify) a record. Two of these update types require the updating process 351 to obtain a database lock 499 on the data that will be updated. This lock 499 is required to insure that data is only being updated by one process 351 at any given time. Database locks 499 are used to provide concurrency control for the database 470.

When a process 351 requests a record lock 506, if another process 351 holds the same record lock 506, or if another process 351 holds a table lock 507, the requesting process 351 is informed that the lock is busy. When a process 351 requests a table lock 507, if another process 351 holds the table lock 506, or if another process 351 holds a record lock 506 on any of the records in the table, the requesting process 351 will be told that the lock is busy. When a lock is busy, a process 351 can wait and try to obtain the lock later.

Of the three types of database updates, only two, deleting and changing (modifying) database records, require the updating process 351 to obtain record locks 506 or table locks 507 on the data being updated (except for instant updates). Adding a database record does not require the use of locks 499.

After obtaining a lock 499, if required, a process 351 calls the update library routine 500 of the database manager process 369, passing some update information and the new data (record). The database manager process 369 updates a system database 500 and informs the requesting process 351 of the outcome of the update. The database manager process 369 also informs other processes 351 using the changed data of the change.

Runtime Update Notification: The database manager process 369 coordinates dynamic data updates. Dynamic data updates differ from other updates in that changes made to data are delivered to processes 351 that use the data immediately after the changes are made. Without dynamic updates processes 351 would never see the new, changed data until the system 200 was reinitialized. The database manager process 369 is responsible for informing the appropriate processes 351 of any changed data. Processes 351 wishing to receive runtime update notifications "register" with the database manager process 369. All data in the application database 470 may be dynamically updated. Runtime update notification is provided for all database files in the application database 470.

Detailed Description: The database manager process 369 provides update notification with a resolution down to the field level (so that when a field of a structure is changed, any process interested in only that field, and not the whole record, would be notified if it was changed by another process).

Concurrency Control: The database manager process 369 provides concurrency control by locking database records that are out for editing. Locking is provided at two levels, (1) database records and (2) database tables. Locking at a database record level prevents editing of a database record by more than one process 351 at the same time. It allows different processes 351 to simultaneously edit different records from the same database table. Locking at a table level (e.g., the PSAP table 382) allows the process holding the lock 499 to update any records of eh table, but prevents updates by other processes 351 wishing to update any of the table's records. Concurrency control uses record keys and locks.

Database Record Keys. The concurrency control mechanism prevents two processes from simultaneously editing the same 'piece' of data. This is done by restricting access to data that will be updated to one process at a time. The "granularity" at which data access will be restricted is down to the level of a database record, since a database record is the unit of data transfer when using the admin library to access the system database 500. Data access restricted at the database record level of granularity means that the smallest 'piece' of data that can be locked is a record (it is the 'finest' granularity of locking). In addition to locking database records, processes are able to lock database tables, e.g., the PSAP table 382.

Database record keys 502 are a way to uniquely identify each record in the database 470 to restrict access to them. A database record is uniquely identified by two things; (1) a record type and (2) a record key 502 uniquely identify any record in the database. The type of record is passed to all database access library routines, and identifies what kind of record the process is interested in. Then, database record's key 502 is used to identify a particular record of a given type.

The key 502 is a field in the database record that is used as an index for the record. It is a field that is used internally to the database manager process 369 to identify record instances to the processes 351 that use them. The following are the keys 502 that are used for all application database types.

| | |
|---|---|
| ADM_DB_ALI | ali_line_no |
| ADM_DB_DEST | dest_no |
| ADM_DB_ESN | esn_no |
| ADM_DB_ESCO | esco_no |
| ADM_DB_FXDIR | psap_no |
| ADM_DB_NIGHT | psap_no |
| ADM_DB_NPA | no key (only one record) |
| ADM_DB_PDN | pdn_no |
| ADM_DB_PLATFORM | no key (only one record) |
| ADM_DB_PSAP | psap_no |
| ADM_DB_TRUNK | trnk_no |
| ADM_DB_TRUNK_GROUP | trnk_grp_no |
| ADM_DB_MAINT | dev_channel * MAX_ENTS_PER_CHN + dev_entry |
| ADM_DB_WKST | psap_no * MAX_WKSTS_PER_PSAP + wkst_no |

-continued

| ADM_DB_XFR | xfr_no |
|---|---|

Response messages 288 respond to update and lock requests between the database manager process 369 and updating processes 351. These messages 288 include the key 502 of the data being updated so that the updating processes 351 knows which record a particular response message 288 is for.

Database Write Locks: Processes are restricted from accessing data that is being updated by other processes 351. This restriction is done using database write locks 503. Two levels of locking are provided by the database manager process 369. The first, record locking, is the lowest level at which the data can be locked. Even if a process 351 is changing only one field of a record, it must lock the entire record, preventing other processes 351 from updating other fields of the record. The second level of locking, table locking, allows a process 351 to lock an entire database table. Holding a table lock 507 is almost equivalent to holding individual record locks on all records in the table. Certain types of data are accessed, and updated, on a per table basis, and the ability to lock an entire database table (database type) is useful in these cases.

Both types of locks, record 506 and table 507, are obtained by requesting them from the database manager process 369 through the library routines 500. Once a process 351 obtains a lock 499, it can keep it for as long as it wishes, but it must respond to lock inquiry messages 288 sent to it from the database manager process 369 in a specified period of time. Lock inquiry messages 288 are sent to processes 351 holding locks 499 when another process 351 wants the lock 499. The process 351 holding the lock 499 may respond by telling the database manager process 369 (1) that it still needs the lock 503, or (2) to release the lock 503. If the process 351 gives up the lock 499, it must abort its update transaction. If it keeps the lock 499, it may proceed with its update transaction. If a process 351 does not respond to a lock inquiry message 288 in a specified period of time (e.g., two seconds), it loses its lock 499 and aborts its update. Therefore, processes 351 hold a lock 503 for as short a time as possible, especially if other processes 351 are trying to get the lock 503 (when they receive lock inquiry messages). Processes 351 interacting with users may give up the lock 503 if the editing user has not shown any activity on its workstation 212 for a certain length of time.

Record Locks: Record locks 506 are used to prevent simultaneous editing of a database record. When a process 351 holds a write lock 503 on a database record, other processes 351 will be prevented from editing (changing or deleting) the record. A process 351 requesting a record lock 506 might not get it if another process 351 holds a record lock 506 on the same record, or if another process 351 holds a table lock 507 on the database table in which the record resides.

Any process 351 that holds a lock on a particular record will be informed when another process 351 wants the same lock, or wants a lock on the table the record is in. This notification comes in the form of a lock inquiry IPC message 288. A process requesting a record lock 506 that is already being held (the record the process 351 wants a lock for is already locked, or the table the record is in is already locked) will be given the lock if the holding process responds to its lock inquiry with a 'release lock'. If the process 351 holding the lock responds with a 'lock still busy', then the requesting process 351 will be told the record is busy. A lock request for a record that does not exist in the database will fail. Locks are only used to prevent simultaneous editing of existing database records.

When a process requests a record lock 506, it must supply the update time of its copy of the record that it is requesting the lock for. This time is a field in all database records. The database manager process 369 compares this time with the update time of the database copy of the record to determine if the process 351 requesting the lock needs to read an up-to-date version of the record before updating it. A read flag is set in the message 288 that grants a process 351 a record lock 506 when the process 351 needs to read a new copy of a record before editing it. Database updates that attempt to modify a record with one that is out-of-date could corrupt the database, and thus are not allowed. A process 351 that will be deleting a record can ignore the read flag. It is used only for processes 351 that will be modifying a database record. When a process 351 changes or deletes a database record, it should release the write lock 503. Once again, locks are not required for adding records to a database table.

Table Locks: When a process 351 holds a write lock 503 on a database table, other processes 351 are prevented from changing or deleting any of the records in the database table. However, processes 351 are able to add new records to this table. Any processes 351 that have registered for runtime updates on a database table are informed of these record additions. Any process 351 that holds a lock 499 on a database table is informed when another process 351 wants the table lock 507, or when another process 351 wants a lock 499 on a record in the locked table. This notification comes in the form of a lock inquiry IPC message 288.

A process requesting a table lock 507 that is already being held will be given the lock 507 if the process 351 holding the table lock 507 releases it in response to its lock inquiry message 288. If the process 351 holding the table lock 507 responds to the lock inquiry message 288 with a 'lock still busy', then the requesting process 351 will be told the record is busy. A process 351 requesting a table lock 507 on a database table which has one or more of its records already locked will be given the lock only if all the processes holding record locks respond to their lock inquiry messages with a 'release lock', otherwise the requesting process 351 will get a lock busy message 288. Table locks 507 must be explicitly released by the process 351 holding them when they are done editing records of a database table.

Database updates: As described above, any process 361 wishing to edit (update) the application database 470 does so through the database manager process 369. Updating processes 351 first open a connection to the database manager process 369 (usually done at process initialization time). For updates involving deleting or changing records, obtaining locks 499 are required before an update request will be accepted. Updates are done by calling the database manager process 369's update library routine 500, passing the new data, and other update information. All database updates are done at a record granularity (an entire database record is changed, deleted or added per update transaction). Even though a process 351 is only updating one field of a database record, it is considered to be editing the whole database record, preventing any other process 351 from editing the same record.

Database Record Additions: Adding a record to the database 470 is the simplest update operation. No locks 499 are required for a process 351 to add a record to a database table. The process 351 adding a record calls the database manager update library routine 500, giving the record that is to be added and the database table that it is to be added to. The 'key' field of the record being added can contain a value selected by the calling process 351, or it can contain an ALLOCATE_KEY value. When a process 351 tries to add a record with a key of ALLOCATE_KEY, it is asking the database manager process 369 to find a free key, and to return it to the process 351 trying to add the new record. This is used in cases where the process 351 adding the record does not know which keys are available. There can only be one record in a database table with any given key. If a process 351 fills in the key field of the record with a nonnegative value (a valid key), the database manager process 369 verifies that the key is not already being used. If the key is already being used, the update will fail.

The database manager process 369 takes the record and the type of database (passed to it by the update library routine via an IPC message 288), and tries to write the record to the appropriate database file. If the write is successful, it returns an IPC message 288 with the message type set to UPDATE SUCCESSFUL. If there was an error while adding the record, the database manager process 369 responds with an UPDATE FAILED message 288. The update can fail because of a system or internal error (e.g., the write system call fails), or the updating process could be attempting to add a database record that already exists.

Database Record Modifications: Database record modifications require first obtaining a lock 499 on the record (or the table the record is in). When a process 351 requests a lock 499, it must give the update time of the record (a field in the record) for which it is obtaining a lock 499. If this time is older than the update time of the record in the database 470, the updating process 351 has to read a new copy of the record before doing the update. A process 351 is notified that its copy of a record is out-of-date by examining a read flag contained in the LOCK GRANTED message 288 sent by the database manager process 369 in response to a lock request. If this flag is set, the updating process 351 reads a new copy of the record. It will not be able to successfully modify the record (have it written to the database) unless it reads a update version of the record, and integrates its changes into it. Once a process 351 obtains a lock 499, the update time of the record is not changed since other processes 351 are prevented from modifying the record, so whatever the read flag indicates at lock allocation time is valid until the process 351 releases the lock 499 (i.e., the process obtaining the lock 499 does not have to worry about its copy of the record going out-of-date once it gets an up-to-date copy after obtaining the lock 499).

If the process 351 can not obtain the lock 499 (because some other process already has it), it must abort its update attempt, and maybe retry later. Once a process 351 obtains the lock 499, it can modify the record as it wishes, then have the database manager process 369 write the updated (modified) record to the appropriate database file.

The database manager process 369 attempts to write the record to the database, and if successful, will respond with an IPC message 288 to the updating process 351 with the message type set to UPDATE SUCCESSFUL. The updating process releases the record lock 506 if it is done modifying the database record, or releases the table lock 507 if it is done modifying records of the database table. If the write to the database fails because of a system error or some other internal error, the requesting process 351 receives an IPC message 288 from the database manager process 369 with the message type set to UPDATE FAILED. If the process 351 doesn't hold a lock 499 on the record that it is modifying, it will receive an UPDATE NO LOCK message. If the process 351 tries to update the database with an out-of-date record, it receives an UPDATE OUT OF DATE message 288.

Database Record Deletions: Deleting a record from the database 470 is similar to changing a database record. Both require that the updating process 351 first obtain a lock 499 on the record, or the table the record is in, that it wishes to update. If the record the updating process 351 is interested in is already locked, the process 351 will have to retry later.

After the requesting process 351 receives the lock 499, it can call the update request database manager library routine 500, passing it the database type and the key of the record that it wants to delete. After deleting the record, the process 351 should release the record lock 506. If the process 351 had a table lock 507, it should release the table lock 507 only if it is done editing all records of the table. The database manager process 369 responds with an UPDATE SUCCESSFUL message 288 if the record was successfully deleted, or an UPDATE FAILED IPC message if there was an internal or system error. If the process 351 does not hold a lock 499 on the record it is deleting, it will receive an UPDATE NO LOCK message 288. The update can also fail because a process 351 is trying to delete an only record that must exist (the npd and platform records).

Instant Updates: Instant updates are database updates which change (modify) database records without requiring the updating process 351 to hold a lock 499 on a record. They are required in situations where a process 351 must change some data, regardless of whether it is out for editing by another process 351. The only two updatable objects that are 'instantly updatable' are the Night Service override and PSAP Abandonment. If a workstation attendant 221 pushes a key 511 that is supposed to put the PSAP 516 into Night Service early, the attendant 221 does not want to be told that another process 351 is already editing the database record, and that the PSAP 511 can not go into Night Service.

In addition to not requiring locks 499, instant updates differ from normal updates in that the timestamp of the passed record is not used to see if the record is up-to-date before allowing the update to proceed. The entire record, except the fields that contain the instantly updated data, is ignored and the database manager process 369 changes the fields in the database copy of the record with the instantly updated data.

If a process 351 does an instant update, and the record being modified is not locked by another process 351, then the modification proceeds similar to normal updates (i.e., when a lock 499 is first obtained on a record). If another process 351 holds a lock 499 on the record being instantly updated, when the process 351 that holds the lock 499 tries to update the record, the update fails because the process's record is out-of-date (because the instant update updated the record and the update time was increased). Even though the updating process 351 had an up-to-date record when it got the lock 499, the record has gotten out-of-date. Processes 351 that are doing updates handle an UPDATE OUT OF DATE message 288 from the database manager process 369. If the processes 351 get this message 288, and they have a record that was up-to-date when they were granted a lock 499 on the record being updated, some other process 351 has done an instant update, and the processes 351 read a fresh record from the database and integrate their changes into it before trying the update again.

Runtime Update Notification: Runtime update notifications are available on the entire application database 470 and for data files that are not a part of the application database. Data for which processes 351 can receive runtime update notifications is said to be dynamically updatable. Data that is dynamically updatable differs from other data because any changes made to this data are distributed to the appropriate processes 351 as soon as they are made; the system 200 does not have to be re-started for processes 351 to get a copy of the new data. The runtime update mechanism provided by the database manager process 369 allows data to be dynamically updated.

Updatable Objects: When a 'piece' of data in the system database 501 is changed by one process 351, all other processes 351 that rely on that data must be informed of the change. Processes 351 are told about changes made to an item of data to which they knew exactly how to respond without having to do any computing to figure out what changed. This 'piece', or item, of data is an updatable object. An updatable object is the smallest unit of data for which a process 351 can be notified about changes. It is the 'piece' of data which if changed a process tells (register) the database manager process 369 it is interested in knowing about.

Registering For Runtime Update Notifications: Runtime update notifications require that processes 351 first register with the database manager process 369. Processes 351 must register to receive runtime update notifications on all changed updatable objects. The database manager process 351 builds a table, using information collected when processes 351 register with it, that allows it to inform the necessary processes 351 about changes made to data.

Processes 351 register for runtime update notifications as part of their initialization (after connecting to the database manager process 369), before they read any data. However, the database manager process 369 allows registration at any time, and acts as soon as the runtime update notification registration information is received and incorporated into the update table of the database manager process 369. Processes 351 are not notified of changes made to any data until they have registered for runtime update notifications on that data.

When a process 351 changes some data in a record, all processes 351 that have registered for runtime update notifications on updatable objects that were changed within that record are informed of the change. Generally, processes 351 will be given a copy of the new record (or are told to read a new record from the database if the record is too large to send in an IPC message 288). Other information included in the update notification message 288 is the database type, and which updatable objects of the record were changed.

Processes 351 register for runtime update notifications using the database manager library routine 500 (see the dbmgr_update_notif_reg( ) routine). For each library function call, the calling process 351 specifies the database type, the record key, and the record objects of the specified record in which it is interested. Registration generally occurs on a per database record basis (a process 351 registers for runtime update notifications on one record in each library function call). All record objects of a record are specified in one library function call. If a process 351 registers for runtime update notifications on a record for which it has already registered, the old registration information is replaced by the new information (i.e., the record objects that it had registered for runtime update notifications on before are lost, and are replaced by the record objects given in the most recent registration function call).

Any processes 351 that have registered for runtime update notifications on all records of a database record are notified of any changes made to the specified record objects of any record in the database table 259 for which the registration was made. In addition, the process 351 is notified when a new record is added to the database table (type) for which registration was made. Any processes 351 that have registered for runtime update notifications for all record objects of a record are notified of changes made to any record object of the specified record. Any processes 351 that have registered for runtime update notifications on an updatable object that incorporates both specified record objects and new record objects are notified of changes made to any record object of any record in the specified database table (database type).

Changing an Updatable Object: After an updating process 351 has changed its local copy of a database record, it calls the database manager process 369's update library routine 500. Parameters to the update library routine 500 include a copy of the changed record, and information about all the updatable objects that were changed in the passed record. This information includes the database type, the record key, and a variable that indicates all the record objects of the record that were changed. Another parameter gives the update type, which would be "change." The database manager gets a message from the library routine 500, and attempts to write the changed record to the database. It then reads from its update table, and using the information about which updatable objects were changed (passed to the update library function 500 by the updating process 351), informs the necessary processes 351. To do this, it sends a message 288 to all processes 351 that have registered their interest in any of the changed updatable objects. Included in this message 288 is a copy of the new (changed) record (except for records that are too large to fit in an IPC message 288, in which case the process 351 reads the new record from the database), the database type to which the record belong, the record's key, and a variable telling all the updatable objects that were changed in the record. With the information in this message 288, the process 351 receiving it should be able to update its copy of the data, and take any other necessary actions.

Dynamic Data Updates: Deleting a Record: Updatable objects are not deletable. Only database records are, thus dynamic updates where a record is deleted are handled as if all record objects of that record have been deleted, and any processes 351 that have an interest in any of those updatable objects are notified that the record was deleted. The process 351 that is deleting the record calls the database manager process 369's update library function 500. Other parameters to this function are the database type and the record key for the record it wishes to delete. The process 351 does not need to worry about setting the record object element. The database manager process 369 attempts to delete the record, and if successful, it reads from its update table all processes 351 that have an interest in the record that was just deleted. The process 369 sends all these processes 351 a message 288 indicating that the record was deleted. The message 288 includes the database type of the record and the record's key. The process 351 that requested the delete will be sent a message 288 indicating the success of the update.

When a process 351 is informed of a dynamic update, and the message 288 indicates that the update type was a record delete, it should know to only look at the database type and record key elements of the updatable object. The record object is set to "all," but the process 351 does not need to read it since a delete always infers all record objects.

Dynamic Data Updates: Adding a Record: Updates of type add operate on records, and not on updatable objects (new fields can not be added to structures). When a process 351 wishes to add a record to the database, it calls the update library routine 500. The parameters it must pass include the new record, the database type of the record, the key of the record (set to AL-LOCATE_KEY if the process 351 doesn't know what the key is), and the update type, which is set to add. The process 351 can set the record object to all, but this is not required since the update type implies this.

When the database manager process 369 receives an update request message with the update type set to add (sent by the update library routine 500), it attempts to add the record to the appropriate database table. It will read from its update table any processes 351 that have registered an interest in this record. Since the record is new, there will be no processes 351 that have registered for updates on the record (identified by a record key) that was just added, however, it is likely that there is a process 351 that is interested in the database table (the database type) to which this record was added. This is indicated in the update table by a process 351 registering its interest in a record of this database type with a key of all_recs. The key of all_recs indicates that the process 351 is interested in updates to any records of a given type, including new records added.

When a process 351 is informed of a dynamics update, it determines that it is an "add" type of update and determines the database type of the record. It then adds the new record to its copy of the data, and performs any necessary actions.

Restrictions/Limitations: Dynamic data updates to fixed directory database records are handled differently from updates to other database records due to their large size (approximately 6000 bytes). With other types of database records, the record that is to be updated is passed along with the IPC message 288 that tells processes 351 an updatable object they have registered for has been changed by another process 351. Since the maximum size of an IPC message 288 is smaller than the size of a fixed directory database record, the changed record will need to be read from the database 470.

Even though locking takes place at a record (or possibly table) level, it is desirable to inform processes 351 of data changes at a finer granularity than a record. Only a limited number of parameters (which usually correspond to a field in a database record) are able to be dynamically updated. When a process 351 changes any of this data, all processes 351 that are interested in (have registered for runtime update notifications with the database manager process 369) that data are notified. This notification tells them all the updatable objects within the changed record that were modified. Dynamic updates could take place over a broader range of data.

Applications Data Administration

In order to allow any particular C.E.R.S. system 200 to be adapted to the unique and time-varying demands of its service environment, the capability of dynamically altering various parameters used by the applications software 287 is required. In addition, the C.E.R.S. system 200 must allow the administrator 239 to initiate and control audit, maintenance, backup and reporting functions.

Administrable Parameters: Due to the number of features provided in the C.E.R.S. system 200, different configurable parameters must be administrable. Administration is described below in connection with FIGS. 23–25, 27, 30, 32–47, 50A & B-56. Administration includes the following data administration:

1. PSAP Data Administration. (FIG. 44) PSAP data administration functions allow the administrator 239 to view and change the configurable parameters associated with PSAPs 216 and PSAP attendant workstations 212.
2. Table Data Administration. (FIGS. 27, 33, 36–48). AP Applications software 287 utilizes a variety of information which is manipulated in tabular form. Table data administration allows the administrator 239 to view and edit certain tables, including the following (FIGS. 10 and 11): TN/ESN Table 213, the Destination table 259, ESN Table 451, Selective Transfer Table 378, ESCO Table 387, and NPD/NPA translation table 381.

User Access Administration: It is required that only authorized users (e.g., the administrator 239) have access to applications data administration functions. The PSAP manager is able to edit a limited subset of data associated with the PSAP 216 only if the manager 259 knows the correct login/password. The platform administrator 239 is able to edit any system parameters if the administrator 239 knows the correct login/password. Applications data administration provides the administrator 239 with the capability of viewing and editing (add/change/delete, as necessary) parameters including the following:

PSAP Data Administration.: (FIGS. 50A & B). Each C.E.R.S. system 200 may support from zero to twenty PSAPs 216. For each PSAP 216, the following parameters are configurable.

PSAP Abandonment: (FIG. 50B, Line 12). The PSAP state (Active or Night Service) may be overridden by declaring the PSAP 216 to be Abandoned. A Psap abandoned flag (see entry in table 382) is provided. When a PSAP 216 is administered to be Abandoned, E9-1-1 calls 201 which would normally be routed to the PSAP 216 are re-routed using alternate routing. The PSAP Abandoned flag is a configurable PSAP Abandonment parameters.

Figure 21A:
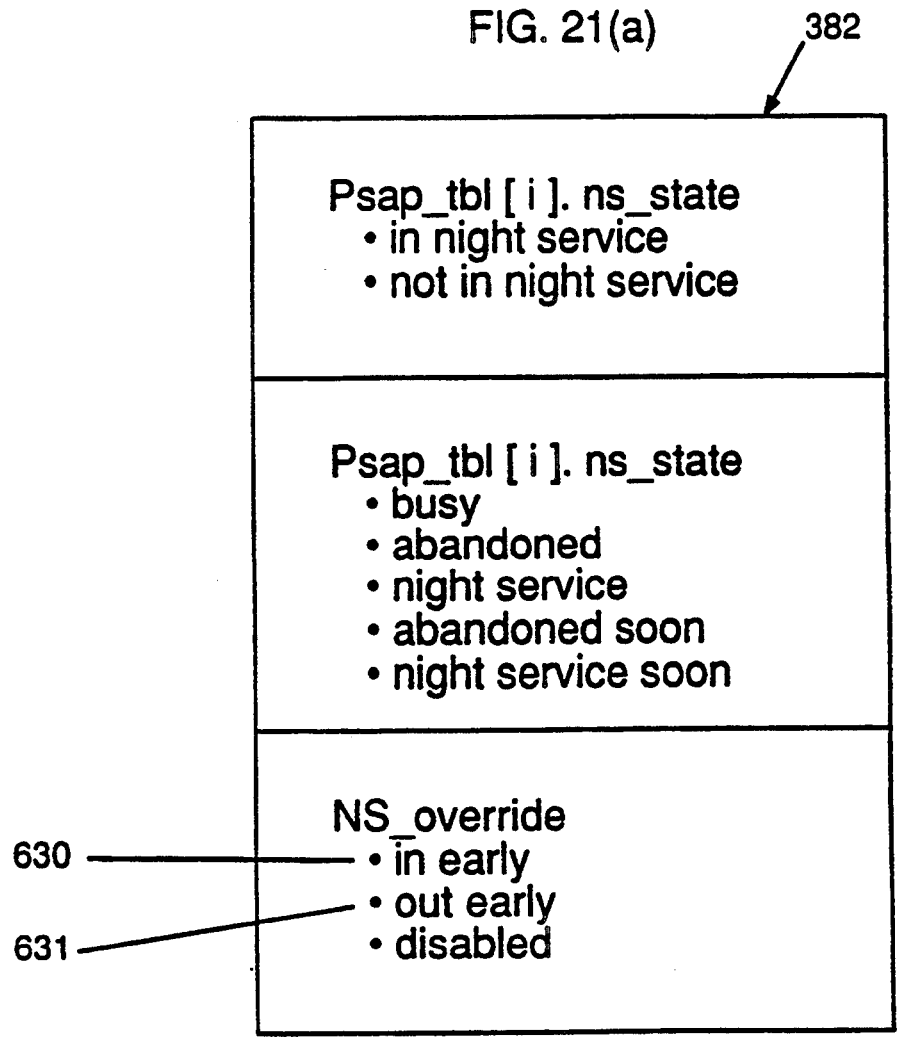
FIG. 21(a) is a diagram of a table for indicating information for a PSAP, including night service state and override information.

PSAP Night Service Parameters: (FIGS. 24, Lines 8+; 54, 55). When a PSAP 216 is in 'Night Service', E9-1-1 calls 201 which would normally be routed to the PSAP 216 are rerouted. The configurable PSAP night service parameters include the Night Service table 379 (FIG. 21B). For each PSAP 216, the table 379 provides time intervals $t_1$ through $t_n$, where there are less than fifteen minutes in each time interval $t_1$ and $t_2$, for example. Entries in the table 379 denote $t_s$, the time at which a night service interval $\Delta t_{ns}$ starts, and $t_e$, the time at which a night service interval $\Delta t_{ns}$ ends. Each table 379 stores all night service intervals for a given PSAP 216 for one week. There may be up to twenty-one night service intervals in the table 379. Thus, up to twenty-one Night Service intervals $\Delta t_{ns}$ may be scheduled in one week. The entry following the last defined night service interval $\Delta t_{ns}$ contains a "−1" starting time to indicate that there are no more night service intervals defined for the week. If there are no night service intervals $\Delta t_{ns}$ defined for a PSAP 216, the first entry of the night service table 379 has a "−1" start time. Each night service table entry consists of the following configurable parameters:

1. Night Service start time $t_s$: The starting time $t_s$ of a night service interval $\Delta t_{ns}$ is stored here. It is the number of minutes since midnight on Saturday.
2. Night Service end time $t_e$: The end time $t_e$ of a night service interval $\Delta t_{ns}$ is stored here. It is the number of minutes since midnight on Saturday.
3. Night Service routing option: This flag defines whether E9-1-1 calls 201 which are currently (at time $t_c$) being routed during a night service interval $\Delta t_{ns}$ should be routed via the night service destination number (described below), or via alternate routing. {Default is 'Night Service'}.

Night Service Destination Number: (FIG. 24, Window). This is the destination entry in the destination table 373 to use during the specified night service interval $\Delta t_{ns}$ when the PSAP Night Service routing option is set to 'Night Service'. The applications software 287 uses this table 373 to determine when to transition a PSAP 216 into and out of the Night Service state. The times are assumed to be local times with respect to the platform 204.

Night Service Override: (FIG. 50B, Line 8). Night service override allows a PSAP 216 to get into Night Service, or get out of Night Service, early, and requires the following parameters:

1. Night Service Override Indicator. This indicator tells whether a PSAP 216 has been placed in Night Service early, whether a PSAP 216 has been taken out of Night Service early, or whether Night Service override has not been invoked. {In Early, Out Early or Disable; default is Disable).
2. Night Service Override Time. This holds the time ($t_{ia}$ or $t_{oa}$) at which the Night Service override feature was invoked. This time includes enough information to distinguish both the time of day, and the day that the night service override was invoked. There is no default, and this value is not configurable, but is set by the PSAP manager 259 or the workstation attendant 221.
3. Who Override. This parameter is set by the application software 287 to identify which party (e.g., PSAP manager 259 or attendant 221) invoked the Night Service override. {An 'int' giving the workstation number of the attendant 221 executing night service override.}

PSAP Call Capacity Parameters: (FIG. 25, Line 12). The router process 360 re-routes E9-1-1 calls 201 when a PSAP 216 is determined to be busy (at call capacity, FIG. 20, Step 104). One of the determinants used in this decision is the status of the hunt group queue 243 of E9-1-1 calls 201 at the PSAP 216 waiting to be handled. The configurable parameters pertaining to the call capacity are (FIG. 25):

1. Call Capacity Enable. (Limited/Unlimited; default is 'Unlimited')
2. Call Capacity. {1–99, required if call capacity enabled, default is twice the number of active PSAP workstations 212)

ALI Retrieval: For a New ALI Fetch, an ALI retrieval parameter is used. It is a flag indicating if it will be allowed by PSAP workstation attendants 221. It enables or disables new ALI retrieval {Default is Disable}

Other PSAP Configuration Parameters: (FIG. 44, Line 13, #6). Several other parameters are necessary to completely configure a PSAP 216, including:

1. PSAP ID. A unique reference number used to identify the PSAP 216. {0–19, no default—entry is required}
2. PSAP Name. A four character mnemonic which is displayed at the PSAP attendant workstations 212. {1-4 chars, no default—entry is required}
3. PSAP On-Line/Off-Line. This flag controls how any particular PSAP 216 is treated by other applications software processes 351. When the flag is set to 'OnLine', the PSAP 216 is considered to be a functioning part of the system 200. When the flag is set to 'OffLine', it is assumed that the PSAP 216 is not a functioning part of the system 200 and therefore should be ignored by the other applications software processes 351. This allows the user to edit and check PSAP configuration parameters while the PSAP 216 is in the 'Off-Line' state. When editing is complete and the user is satisfied as to the correctness of the PSAP parameter settings, the flag is changed to 'OnLine' and the PSAP 216 is made part of the functioning system 200. {Default is 'Off-Line'}
4. PSAP Hunt Group DN. The DN of the hunt group 333 to which E9-1-1 calls 201 to the PSAP 216 are routed when the PSAP 216 is in any station answer routing. {DN format—twelve dial-able characters, no default—entry is required}
5. PSAP Common Notification Line DN. When E9-1-1 calls 201 are routed using any station answer routing, the
E9-1-1 calls 201 are first sent to the common notification line 241. This parameter specifies the DN of that line 241. {DN format—12 dial-able characters, no default-entry is required}

Destination Table: (FIGS. 33 & 35). The destination table 259 (FIG. 10) holds information about all possible call handling destinations 215 administered for the system 200. Entries in this table 259 are "pointed" to (via the destination number) by entries in several other database tables, including PSAP table 395, night service table 389, ESN table 390, trunk table 374, and selective transfer tables 378. Each destination table entry contain the following configurable items:

1. Destination Number. A number that uniquely identifies each destination entry. It is used as an index.

2. Destination label. A label that identifies the destination entry {1–20 characters long, no default, an entry is required for each destination table entry}.
3. Destination Comment. This comment field provides more information about the destination entry {1–40 characters long; no default-no entry is required}
4. Destination Type. A flag describing the Destination Type. There are three possible destination types {no default—entry is required}: PSAP, Switch DN, and PSTN DN.

In addition, depending on the destination type, the following items are configurable:
1. For destination types "Switch DN" and "PSTN DN," a destination DN is specified. The destination DN is the DN to which E9-1-1 calls 201 for this destination should be routed.
2. For destination types "PSAP" and "Switch DN," an alternate destination number is specified. This is the destination number to use if the primary destination number is unavailable.
3. For destination types "PSAP" and "Switch DN," a busy flag is specified. This flag tells if a call should be routed to the busy signal 220, or to the Alternate Destination if the primary destination number is unavailable.
4. For destination type "PSAP," a PSAP ID is specified. This is the reference number of the PSAP 216 to which this destination number is associated.

ESN Table: When the system 200 receives an E9-1-1 call 201, the E9-1-1 call 201 will be routed to a destination represented by an ESN selected from the TN/ESN table 213. The ESN Table 213 contains an entry for at least each ESN in the TN/ESN Table 213 (numbered from 0 to 999, or 1000 entries maximum). ESN table 390 entries contain the configurable items shown in FIG. 10.

Selective Transfer Table: (FIG. 27). Each ESN can have from zero to four selective transfer points 225 associated with it. The selective transfer table 378 contains up to 500 selective transfer point entries which are referenced by ESNs in the ESN table 39. Each Selective Transfer Point entry contains the configurable parameters shown in FIG. 10.

Trunk Table: (FIG. 43). Information on all trunks 206 administered for the system 200 is stored in a trunk table 374. For each trunk 206 in this table 374 the parameters shown in FIG. 10 are configurable.

In addition to the limitation of fifty trunk groups 206A, there is a physical limit to the number of inbound trunks 206 a switch 218 can handle. For the switch 218, this physical limitation is two hundred fifty trunks.

Interactions: Application data administration interacts with other system 200 features both directly and indirectly. Application data administration interacts directly with such features to the extent that when any of the referenced parameters are altered, application data administration and the other features interact to ensure that the change takes effect automatically. Application data administration interacts indirectly with such other features to the extent that the values of such configurable parameters affect the manner in which E9-1-1 calls 201 are handled by such other features.

Call Distribution

The call distribution feature defines how E9-1-1 calls are distributed among attendants 221 at a PSAP 216 and the selection of an attendant 221 after the E9-1-1 call 201 has been routed to a particular PSAP 216.

Referring to FIG. 4, a hunt group directory number is assigned to each PSAP 216 of the C.E.R.S. system 200. Each hunt group has one member, the PSAP notification line 241. The notification device 242 is attached to the notification line 241 at the PSAP 216. The notification device 242 is activated and an "Emergency Calls Waiting" label flashes on all screens 222 at the PSAP 216 when an incoming E9-1-1 call 201 seizes the notification line 241.

A E9-1-1 call 201 directed to the PSAP 216 is immediately sent to the notification line 241 by the switch 218 if a E9-1-1 call 201 is not occupying that line 241. If there is a E9-1-1 call 201 occupying the notification line 241, the E9-1-1 call 201 is put into the queue 243 until the E9-1-1 call 201 comes to the front of the queue and the notification line 241 is unoccupied. When an E9-1-1 call 201 at the notification line 241 is answered or the ESR 202 hangs up, the switch 218 automatically directs the first E9-1-1 call 201 in the queue 243 to the notification line 241.

Attendants 221 can answer E9-1-1 calls 201 on the notification line 241 by making "Pick Up" requests from their workstation 212. The "Emergency Calls Waiting" label is removed from all screens 222 at a PSAP 216 when the E9-1-1 call 201 at the PSAP notification line 241 has been answered or the ESR 202 has disconnected. The notification device 242 and the label remain inactive until another E9-1-1 call 201 is directed to the notification line 241 by the switch 218.

Attendants 221 are also responsible for handling E9-1-1 calls 201 that have been deliberately directed to their workstation 212 (transfers or direct dialed E9-1-1 calls 201 from other subscribers 202 on the switch 218. For example, an attendant 221 may transfers a E9-1-1 call 201 to another attendant 221 because the native language of the ESR 202 is French and the answering attendant 221 does not speak French. The answering attendant 221 transfers the E9-1-1 call 201 by dialing the phone number assigned to the attendant 221 who can speak French or using the fixed transfer directory 249.

Each PSAP destination supported by the C.E.R.S. system 200 is assigned two phone numbers. One of the phone numbers is referred to as the PSAP hunt group 333 and does not represent a physical circuit on the switch 218. This is the phone number used by the AP 234 to route E9-1-1 calls 201 to the PSAP 216. It is also used as the default destination within switch administration for incoming trunks 206 when the AP 234 cannot route an incoming 9-1-1 call 201 within the allowed time and the PSAP 216 is the default destination for E9-1-1 calls 201 received on those trunks 206. This phone number is administered on the switch 218 as a hunt group pilot number and queuing of E9-1-1 calls 201 is enabled.

Each PSAP 216 is also equipped with the primary notification line 241, which represents a physical line, the second phone number assigned to a PSAP. The line 241 is one member of the PSAP hunt group 333. If the E9-1-1 call 201 cannot be sent to the notification line 241, the E9-1-1 call 201 is put into the queue 243. The E9-1-1 calls 201 remain in the queue 243 with the ESR 202 hearing ring-back until the notification line 241 becomes available.

Because the notification line 241 is the only member of the PSAP hunt group 333, all E9-1-1 calls 201 sent to the PSAP hunt group 333 are sent to the notification line 241 before they can be answered. The notification line 241 is administered to be a single party line on the switch 218. Therefore, when an E9-1-1 call 201 is routed to the notification line 241, the switch 218 applies ringing to the notification line 241 and activates the notification device 242 at the PSAP 216. Attendants 221 at the PSAP 216 either see and/or hear activation of the notification device 242 and at the same time see an "Emergency Calls Waiting" label appear on their screens 222.

Attendants 221 can answer an E9-1-1 call 201 at the notification line 241 by selecting the "Pick Up" key 263A on their keyboard 228. This selection causes the AP 234 to send a "Directed Call Pickup" request to the switch 218 for the notification line 241. The switch 218 redirects the E9-1-1 call 201 that is at the notification line 241 to the attendant 221 making this request. A voice connection 245 between the ESR 202 and the attendant 221 is established if the switch 218 successfully redirects the E9-1-1 call 201 to the attendant's DN.

The selection of the "Pick Up" key 263A can be made while the attendant's phone 227 is on-hook or when it is off-hook, but no voice exists with other parties and the attendant 221 is listening to any of the following tones 247: dial-tone, reorder, low-tone, or receiver off-hook.

A low-tone 247 is added to a E9-1-1 call 201 when the ESR 202 making the E9-1-1 call 201 hangs up before the attendant 221 hangs up. The low-tone 247 remains on an attendant's line 245 for five seconds. If no other parties remain on the E9-1-1 call 201 after the low-tone 247 is removed, the attendant 221 hears silence on its line for ten seconds. The ten second interval is the default value used when the switch 218 is installed. A dial-tone 247 is put on the line after this ten second period expires. A "Pick Up" key selection can be made during this ten second interval of silence.

The attendant 221 will be informed that his or her selection was ignored if the attendant 221 makes a "Pick Up" key selection while not listening to one the tones 247 previously mentioned and does not have a voice connection to another party or the selection is not made within such ten second silence interval. This key 263A is also ignored if a selection is made while the attendant 221 is executing administration from the workstation 212.

The attendant's phone 227 rings if it is on-hook when this request is made. The phone 227 rings three times. If the attendant 221 fails to go off-hook before these three rings have expired, the request is ignored. The switch 218 does not redirect the E9-1-1 call 201 to the attendant's line 245 until the attendant 221 has gone off-hook.

Attendants 221 receive a "re-order" tone 247 and a message 240 appears at the bottom of their screens 222 telling them that their request failed if they attempt to pickup a E9-1-1 call 201 and there is no E9-1-1 call 201 present at the notification line 241 to their PSAP 216.

Multiple attendants 221 might simultaneously submit requests to pickup the same E9-1-1 call 201 at the notification line 241 when there are E9-1-1 calls 201 in the queue 243 for the notification line 241. When this occurs, only one of the requests from the attendants 221 is submitted to the switch 218 and the remaining requests are placed in the pick up queue (not shown).

The next pickup request in the pick up queue is sent to the switch 218 when (1) the switch 218 notifies the AP 234 that the E9-1-1 call at the notification line 241 has been directed to the attendant 221 associated with the last pickup request sent to the switch, and (2) a E9-1-1 call 201 from the hunt group queue 243 has been sent to the notification line 241 by the switch 218. If there were no E9-1-1 calls 201 queued in the hunt group queue 243 for the notification line 241, the attendant 221 associated with this last request will receive a "re-order" tone 247. Otherwise, a voice connection 245 between the ESR 202 and the attendant 221 is established. This procedure continues until the AP 234 recognizes that all E9-1-1 calls 201 queued in the PSAP hunt group queue 243 for the notification line 241 have been picked up or there are no outstanding pickup requests from attendants 221. Any outstanding requests after all E9-1-1 calls 201 queued in the hunt group have been picked up, are sent to the switch 218. These requests may or may not fail to receive a reorder tone 247. The outcome depends on whether any additional E9-1-1 calls 201 are sent to the notification line 241 before a request is sent to the switch 218 and after the last E9-1-1 call 201 was picked up from the notification line.

Information about the E9-1-1 call 201 is displayed on the screen 222 after making the voice connection with the E9-1-1 call 201. At the same time, the "Emergency Call Waiting" label is removed from all attendant screens 222. This label may reappear shortly after being cleared if there are E9-1-1 calls 201 in the PSAP hunt group queue 243 for the notification line 241. Otherwise, the label does not reappear until a new E9-1-1 call 201 is directed to the notification line 241.

The attendant may hear "low-tone" 247 over the voice connection 245 when it picks up an E9-1-1 call 201. This is an indication that the ESR 202 disconnected after ANI information for the E9-1-1 call 201 was collected but before the attendant 221 could answer it (i.e. pick the call up from the notification line 241). Information on the disconnected E9-1-1 call 201 is displayed on the screen 222, including the information retrieved from the ALI/DMS. Low-tone 247 can also be heard when the E9-1-1 call 201 is disconnected after the voice connection 245 has been established but before the attendant 221 disconnects. This is an indication to the attendant 221 that the caller 202 has hung up. Low-tone 247 is present on the line for five seconds. After five seconds, the tone 247 is dropped and replaced with silence. The silence on the voice line 245 is replaced with a dial-tone 247 after ten seconds of silence.

E9-1-1 calls 201 that are directed to a PSAP workstation 212 by another attendant 221 activate an internal telephone ringer on the attendant's phone 227. These E9-1-1 calls are answered by the second attendant 221 when it picks up the second attendant's workstation handset 227 and information on the call 201 is displayed on the attendant's screen 222. If the call is a transfer of an E9-1-1 call 201 information on the E9-1-1 call 201 is displayed along with information on the transfer originator if the transferor is an attendant 221 at a PSAP 216 administered on the system 200. If the call was originated by another attendant 221, the ALI and ANI information displayed on the screen 222, of the second attendant 221 answering the E9-1-1 call 201 matches the ALI and ANI found on that of the first attendant 221 originating the call.

Administration of C.E.R.S. System 200

Reviewing the foregoing description, in general, the term "administration" is used to define the set of tasks (or the process) by which the C.E.R.S. system 200 is configured so as to function as intended. Configuration of the C.E.R.S. system 200 relates to the switch 218, the applications processor 234 and applications data administration generally described above. Configuration may include defining how many workstations 221 are at, and in operation (active) at, a given PSAP 216, and when such PSAP 216 is to be inactive, such as by being Abandoned or in Night Service.

Applications Data Administration: As generally described above, applications data administration relates primarily to administration performed locally at the terminal 276 attached directly to the AP 234 (FIG. 1). Remote administration from a PSAP workstation 221 is also described below. Remote administration via a modem (FIG. 1) connected to the AP 234 may also be performed.

Application Data Administration Organization: The applications data administration processes are organized in a menu oriented hierarchy that provides access to data and actions within the system 200. Menu items are objects. Actions, such as add, delete, or change, are performed on the selected objects via direct commands. Administration video display screens that appear on the terminal 276 monitor are forms oriented, with data displayed in labeled fields or tables. Platform administrators 239 navigate among the data fields and, assuming appropriate permissions have been obtained, platform administrators 239 can edit or change the data values presented on the screen 222.

Selection or activation of a system action (e.g., add, change, delete) causes the system 200 to apply a set of consistency rules to the object data prior to committing the action against the administration database 402 (FIG. 9). The platform administrator 239 is informed of the occurrence and outcome of the consistency rule check.

Core Navigational Commands Are:

N1. Select (Return Key). Requests the system 200 to display the submenu or data form at the next lowest level of the hierarchy (e.g., FIG. 51).

N2. Previous Page (Control-j). Requests the system 200 to display the previous page of data in a multi-paged table.

N3. Next Page (Control-k). Requests the system 200 to display the next page of data in a multi-paged table.

N4. Data Field Highlighting (Tab and Arrow Keys). Requests the system 200 to move the highlighting from one field to the next in a logical manner.

N5 Screen Refresh (Control-r). Requests the system 200 to resend the last screen 222 of information delivered to the terminal 276.

N6. Selection Window 514 (Control-w). Requests the system 200 to present a window 514 (e.g., FIG. 24) from which a selection may be made. The data item selected from this window 514 will be automatically placed in the data field on the screen 222. Making a selection initiates two actions to occur: the window 514 is removed revealing the underlying screen 222, and the selected data is placed in the appropriate highlighted field.

N6. Exit (Control-x). Requests the system 200 to save all changes made to a particular form and to display the next highest form of menu of the hierarchy. Requires a confirmation before execution if changes to a screen 222 have been made. Exiting from the main menu logs the user out of the ADA interface.

Core Functional Commands Are:

F1. Add (Control-a). Requests the system 200 to display the appropriate data input form with each field blank or displaying a default value.

F2. Edit (Control-e). Allows the administrator 239 to edit the fields of an existing record of object.

F3. Delete (Control-d). Removes from the database 402 the administrative record or object currently displayed. Requires a confirmation.

F4. Undo (Control-u). Requests the system 200 to redisplay the data contained in a record or form when the last save occurred.

F5. Order (Control-o). Requests the system 200 to order or sort the records of a table in a logical manner. Requires a confirmation.

F6. Command Help (Control-c). Presents a text window 514 of the editing commands available on a specific screen and their actions. This window 514 serves to declutter the screen presentation. Pressing any key 263 removes the window 514 from the screen 222 and places the cursor back on the same location where it was originally.

F7. Selection Window 514 (Control-w). Presents a window 514 of valid entries (e.g., FIG. 24) from which the platform administrator 239 may select. Highlighting an entry within the window 514 and pressing the Return Key serves to remove the window 514 from the screen and placed the highlighted object in the data field.

For those commands requiring a confirmation before execution, (exhibit, order, and delete), the confirmation will be presented to the administrator 239 as a yes/no/cancel question on the message line 288A of the screen 222.

Administration Screens 222: The administration screens 222 are based on a 24 line by 80 column display format. The screens 222 are character mapped and are presented in a model shown in FIG. 15A, where the following Screen Format Chart presents a key to the letters used in FIG. 15A.

| Screen Format Chart |
|---|
| Format of Screen 222 (FIG. 15A) |
| A = Method by which call arrived at PSAP |
| B = NPA |
| C = NXX |
| D = Telephone Number |
| E = Class of Service |
| F = Month |
| G = Day |
| H = Hour |
| I = Minute |
| J = Customer Name |
| L = House Number |
| M = House Number Suffix |
| N = Direction |
| O = Street Name |
| P = Location Information |
| Q = Community |
| R = State |
| S = OTC (Free Field) |
| T = Selective Transfer - Police (Name and Number) |
| U = Selective Transfer - Fire (Name and Number) |
| V = Selective Transfer - Medical (Name and Number) |
| W = Selective Transfer - Auxiliary (Name and Number) |
| X = ESCO |
| Y = Trunk Group |
| Z = Node ID |
| a = PSAP Name |
| b = Locality |
| c = Trunk Number |
| d = ESN |
| Screen Format Chart |
| e = PSAP ID |
| f = Pilot Billing Number NXX |
| g = Pilot Billing Number Telephone Number |
| h = ESCO ID |
| i = Numbering Plan Digit |

The screens 222 are composed of the following general areas:

S1. Platform Label. Presented on line 1 of all screens 222. Provides the administrator identification of any screen 222 in the system.

S2. Administration Label. Presented on the line 1 of all screens 222, this is a fixed label.

S3. Screen Title. A descriptive name for the screen 222 that describes the general functionality. This title is the only information on line three. The format of the title is described more fully below.

S4. Line Graphic. A series of four lines joined to form a rectangle. This rectangle defines the boundaries of the workspace.

S5. Workspace. The area of the screen 222 where data entry, menu choices, and system data are displayed. The workspace area consists of lines 4 through 22.

S6. Message Line 288A. Line 24 of the display. Provides informational messages 240 and contextual confirmation.

All unique screens 222 accessible from the user interface contain a title. All screens are titled and centered on line two of the display, with the major words of the title appearing in initial caps. Data entry fields are the areas where the platform administrator 239 enters system required and other data. The fields look and act as follows:

Field 1. Fields are laid out as "Field label [data]", with a label to the left of the data field or with the label directly above the data field. Fields are denoted by open and close brackets ([]).

Field 2. The extent of the active data field is indicated by high intensity reverse video denoting the maximum valid number of characters that can be entered into the field. Error trapping can prevent the platform administrator 239 from leaving a mandatory data field without submitting a valid entry. The terminal 276 beeps and a message 240 will appear on message line 288A, screen line twenty-four indicating that entry in this data field is required.

Field 3. Much of the data is displayed in table form. A table is defined as having one or more records. A record is a logical group of data fields that are saved as a single entity. For each record there may be several configurable parameters that are displayed on from one to several lines. To distinguish a record as a single entity, each administrable field for that record is placed in low intensity reserve video except for the field in which the cursor is located. That field is placed in high intensity reverse video.

Field 4. Cyclical data fields include data in UPPERCASE lettering or numbers to distinguish it from text data entered into other data fields. For such fields a default entry always exists. Pressing a Space Bar 263A will forward cycle the possible alternatives for the specific field one position per keystroke. Attempting to type in data to such fields results in an error message: "Cyclical field—Use Space Bar."

Field 5. A text cursor can be positioned in the field such that the platform administrator 239 can enter characters into the field. The platform administrator 239 moves the text cursor from field to field by Tab or Arrow Keys 263. Once on a text field, the Arrow keys 263 move the cursor one character position at a time. From the last character position in a field, the cursor jumps to the next field. The cursor is always positioned at character position 1 in a field unless the field is cyclical where no character-by-character editing is permitted.

Field 6. Data entry fields within a form are organized into a visit order. In general, the visit order establishes the sequence of field access by the cursor as the user presses the tab key 263. The sequence is, in general, from left to right and top to bottom on the display for forms and from top to bottom along the left-most column for tables. The specifics of the displayed data should dictate a reasonable visit order of fields. From the last data entry field on a screen 222, pressing the down Arrow Key 263 will move the cursor to the first field at the top of the screen in cyclical fashion.

There are exceptions to the visit order. On tables that contain more than one page of data, pressing tab key 263 or the down Arrow key 263 from the last data field on a screen 222 presents the next full page of data entries. When in edit mode on a record, tab or arrow keys 263 work in cyclical fashion but only within those data fields associated with the selected record. In addition, on tables with multiple pages of records, pressing the Tab key 263 for the down Arrow key 263 from the last record on the last screen 222 will not return the cursor to the first record on the first page. Instead, the cursor remains on the last field and beeps to indicate to the platform administrator 239 that this is the end of the table. To move backwards from the last record of the table, the Up cursor key 263 is available.

Field 7. Data entry in a field is terminated by the platform administrator 239 pressing the Tab or Arrow key 263. These events cause the system 200 to perform rudimentary validity checks on the entered data, such as data type (e.g., alpha vs. numeric data), then move the text cursor to the next data field in the visit order.

Field 8. Data fields, in a set of fields on the screen 222, are left justified and are functionally grouped, i.e., related fields are close together. See the section below for a picture of the organization of data fields and their labels.

Choice fields have predetermined sets of correct entries that can be successively displayed by pressing the Space Bar 263A. The data in these fields is distinguished from other data entry fields by the fact that they are always in UPPERCASE lettering. There is always a default entry for each of these fields. When the cursor is placed on such a field, the entire field is displayed in high intensity reverse video. All data entry fields are labeled. The format for these labels are that all labels begin with a capitalized word, and labels in a set of labels are left justified. The administration system uses a blinking block cursor that is readily distinguishable from surrounding text.

Menus 513 (e.g., FIG. 51) are displayed in the workspace area of the screen 222. Each menu option is numbered and the first or default option is highlighted (low intensity reverse video). Platform administrators 239 can place the highlighting on the desired menu option using Tab, Space Bar or the cursor positioning keys 263. Pressing Return activities the selected menu option.

Display Attributes: The following display attributes are used in the interface:

D1. Normal: Used to denote labels and other static text.

D2. High Intensity Reverse Video. Used to display data of an editable field in which the cursor is located. Also used to display the cyclical fields of a record when the cursor is placed on that field.

D3. Low Intensity Reverse Video. Used to display data of an editable field or the same record upon which editing is being done.

Ordering lists of menu options are numbered from 1 to n. Options do not begin with item zero. However, table data is indexed beginning with zero.

Keyboard Mapping: The following keys 263 of the keyboard 228 and their functions are supported:

K1. Tab. Moves the text cursor forward in the field visit order. The visit order includes all data entry fields and all menu items in a menu.

K2. Return. On a menu screen 222, the Return key 263 selects a menu option. When editing a record, the Return key 263 takes the user out of edit mode and save any changes to the record.

K3. Space Bar 263A. Moves the cursor one spaced to the right in a data field. In a cyclical field, pressing the Space Bar 263A cycles through the fixed set of alternatives.

K4. Cursor Keys 263. These keys 263 allow the user to move quickly in either a horizontal or vertical fashion through data entry fields or menu choices. On the table screens 222, only the up and down cursor keys are available until the platform administrator 239 enters the edit mode.

K5. Backspace. Deletes the character just to the left of the text cursor. If the cursor is at the leftmost boundary of a data entry field, Backspace has no effect.

Editing: Data entry fields are edited as follows:

E1. The text cursor is positioned over the first character currently in the field. Character input from the keyboard replaces the character directly under it with the character keyed.

E2. The left and right cursor keys 263 move the cursor within the data field if the platform administrator 239 wishes to make only a partial change to existing characters in a field. However, pressing the left cursor key 263 from the first character position or the right cursor key 263 from the last character position in a field will cause the cursor to jump to the previous or next field in the visitation order respectively.

E3. Backspace erases the character just to the left of the cursor. The Backspace (Delete) key 263 cannot make the cursor jump to the previous data field from the first character position.

Screen Types: The ADA interface consists of three distinct screen types:

SC1. Menu Screen (FIG. 17). This type of screen 222 presents the user with a menu 513 of options. Selecting one of the options removes the selection screen 222 and present the first screen 222 of the option selected.

SC2. To select an option, the platform administrator 239 moves the highlighting to the desired option and presses the Return key 263. In addition, the platform administrator 239 may input the 1- or 2-digit number associated with the option to move quickly to the first screen 222 of the option selected.

SC3. Form Screen (FIG. 52). Forms are used in defining the parameters for the hardware configuration of the platform 204 and equipment for a PSAP 216. These forms differ from tables in that each field is uniquely labeled and all the fields associated with a form are displayed on one screen 222. With the forms screens 222, the administrator 239 is automatically placed in edit mode. By placing the cursor on a field, the data located can be changed. The visitation pattern of the cursor on the forms screen is: pressing the Tab key 263 repeatedly moves the cursor in a general left to right pattern and top to bottom. Every editable field on the form is visited. To quickly reach a desired field, the user may also use the directional cursor keys 263.

SC4. Table Screen (FIG. 27). The table screens 222 consist of many records that are associated with the same label in a uniform presentation. The records are indexed by ascending number. A particular table may often contain multiple pages of records. With these screens 222, the platform administrator 239 is not automatically placed in edit mode. A purposeful action must be performed to go from the default search mode to edit mode. In search mode, the Tab key 263 moves the highlighted cursor down the index column which is the first column to the far left of the screen 222. In this mode, only the up and down cursor keys 263 are available. Once the record to be edited is located, initiating edit mode (Control-e) highlights all the data fields associated with the record and which run horizontally to the right of the index number. In the edit mode, the platform administrator 239 may use the left or right cursor keys 263 to select the specific field(s) to be edited. Pressing the Return key 263 returns the application to the search mode. On the tabular screens 222, the platform administrator 239 is also able to delete or add records.

Windows: Throughout the ADA interface, several types of windows 514 (FIG. 24) are either invoked automatically or on demand by the user. Some windows 514 provide assistance to the administrator 239. Others provide a means by which the administrator 239 can select a piece of data from another screen 222 to be placed into a data field on the primary work screen. For elements that appear on more than one screen 222, each will have a home screen 222 on which the labels are editable. When these elements are called as a window 514 from another screen 222, they can only be selected to be represented on the present screen. The basic types of windows that will appear as part of the ADA interface include:

W1. Command Help Window 514 (FIG. 34). Used as a reference to aid the administrator 239 in performing editing tasks. There are two windows 514 of command help that appear depending on the state invoked on the screen 222. The first command help appears when the uses presses Control-c while is selection mode. This listing of command help informs the user of tasks that can be performed on a specific screen, such as add, delete, edit, sort, etc. The other command help window 514 appears only when Control-c is pressed while the user is editing a field. This listing of command help informs the user of the editing capabilities available on a field, such as Backspace, Return, Tab, etc.

W2. Selection Window 514 (FIG. 24). Presented when invoked by the administrator 239. This window 514 contains data fields that can be selected and represented on the appropriate data field on the underlying screen 222. Paging within this window 514 is possible. The border around the entire window 514 serves to distinguish the window 514 from the underlying screen 222.

Interface Mechanisms: The following interface mechanisms are central to the navigation functions of the system 200:

I1. Menus 513: Menus 513 consist of sets of functionally organized and hierarchically arranged system objects. When an object is selected, the system 200 either presents a lower level menu 513, a form, or a table.

I2. Forms: When a menu object is selected, the system 200 presents another level of menu 513, either a form or a table. The form contains data entry fields for the platform administrator 239 to enter either data to be used to query the database 402 for an existing record or data to be used to create a new database record. The system 200 determines the intended function by the platform administrators 239 choice of action. All changes to a form are made when the platform administrator 239 moves to leave the screen 222 by pressing Ctrl-X. The form is saved as a single entity. In addition, the form consists only of one screen 222. There is no paging involved.

I3. Tables: In the ADA user interface, there are several administrable areas that are displayed as tables. These tables may include several pages of data all with the same format. Changes to the data on these table screens 222 is saved on a per record basis and not when the administrator 239 moves to the next highest level in the interface hierarchy. To make any changes on these screens 222, the platform administrator 239, after selecting a record, must first invoke the editing state (add/delete/modify). Invoking one of the change states, creates a form for that record in which changes to the fields associated with the record may be made. Pressing the Return key 263 terminates the change state and saves the changes to the database. A confirmation message appears on message line 288A, screen line 24: "Entry Updated".

I4. Workspace: Menus 513, forms, and selection tables are presented in the workspace area of the screen 222. Fields are arranged in a visit order such that successive Tab characters move the text cursor around the set of fields. Entry and exit of the cursor into and out of fields does not effect the data displayed in the field.

User Actions: To perform application data administration, certain actions by the platform administrator 239 are required to perform particular task. These actions are described in terms of the screen(s) 222 that are displayed. The screens 222 logically present the data that must be administered for the C.E.R.S. system 200 to function properly. Navigational and operational command strategies are consistent.

Figure 60:
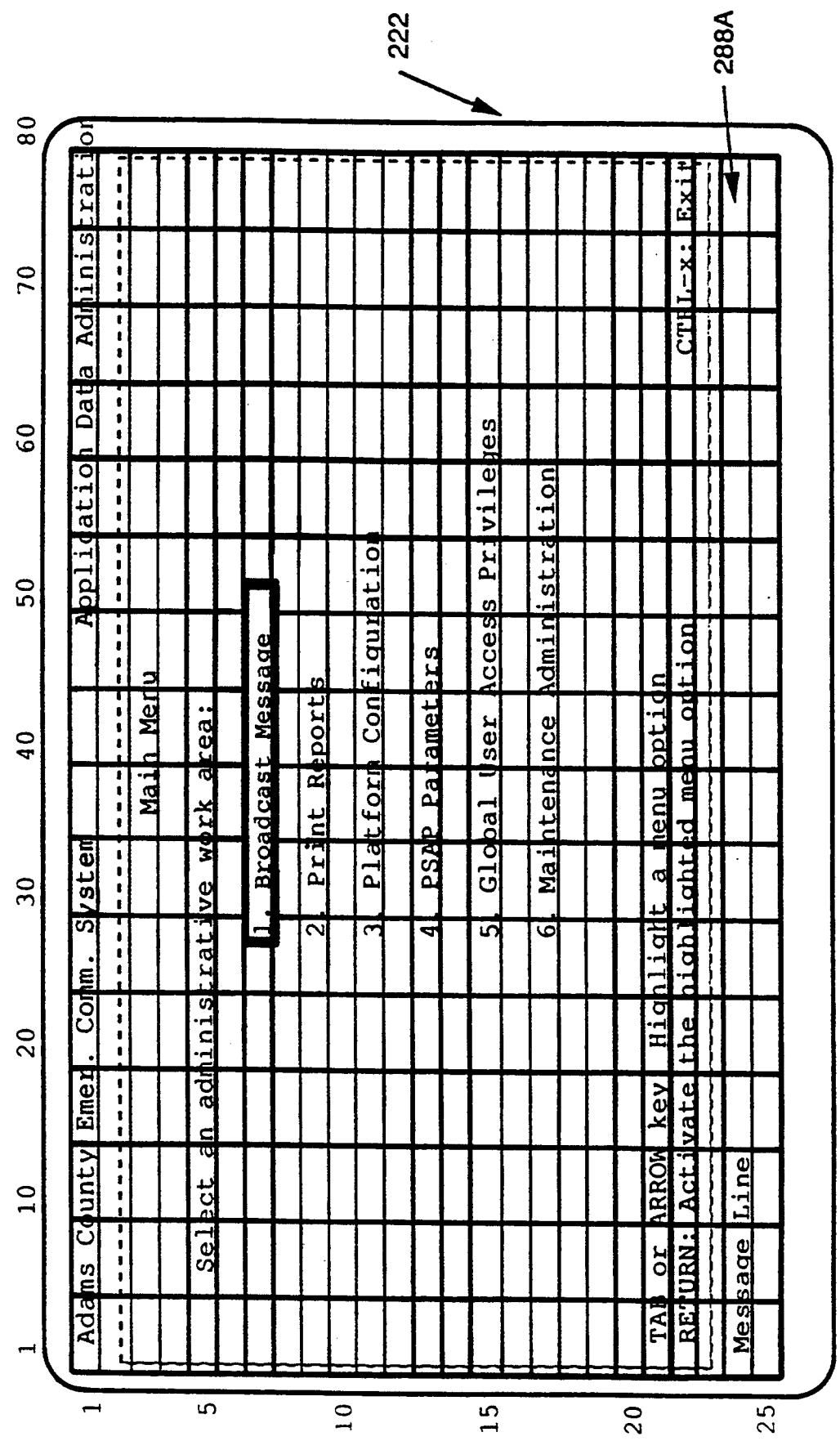
FIG. 60 is a diagram of a screen for use in administering the platform.

ADA Terminal Access: Before entering the ADA interface, the administrator 239 must first log onto the applications processor 234 by inputting both a valid log-in name and password (FIG. 56); and then "platform_admin." This action displays the ADA Main menu (FIG. 60). From here the administrator then selects the first area of the database to administer.

User Interface Organization: The screen 622 of the main menu 513 (FIG. 60) contains the six major sections that the administrator 239 needs to properly configure and maintain the system 200. To select a menu option, the administrator 239 uses the tab and cursor keys 263 to place the highlighting on the desired option.

Platform Configuration: The platform configuration portion of the ADA interface allows the administrator 239 to configure both the hardware components of the platform 204 and the numerous software labels that determine the routing of each E9-1-1 call 201 originating in the area 208 served. The screens 222 for this portion of the interface have been logically grouped into 12 categories, including:
ADA02. Destination Table
ADA04. ESN Table
ADA09. Selective Transfer Table
ADA10. TN/ESN Table The "platform configuration option" is the third option on the ADA main menu 513. Selecting this option presents another selection screen 222 labeled Platform Configuration (FIG. 30) which contains twelve options.

Destination Table (FIGS. 33-35): From FIG. 30, selection of the destination table portion of the interface allows the administrator 239 to define the parameters of each location where E9-1-1 calls 201 are routed initially by the system 200. This table may consist of up to 1000 (000-999) entries. The editable fields for each entry are displayed on four lines. Each page of the table contains three entries. The user is provided the capability to add new destinations and delete or edit existing destinations.

The platform administrator 239 is placed in selection mode when the screen 222 is displayed. In selection mode, pressing Tab or the up/down cursor keys 263 moves the high intensity cursor bar from one index number to the next.

To perform the various editing tasks on a destination (add/modify/delete), the platform administrator 239 invokes the desired state. Pressing Control-c presents a window 514 of command helps (not shown) so that these commands need not be committed to memory. To add a new destination entry to the table, the administrator 239 presses Control-a. This action invokes the presentation of a data form (window 514) which pushes the original record and all following records down one position. This form presents each administrable field in low intensity highlight; those fields with default values are displayed. Once in change mode, pressing Control-c provides a window 514 of help commands (FIG. 35) that is specific to the editing mode as opposed to the selection mode and describes the editing operations. The visitation order for each destination entry begin on line one of the entry with a destination label, followed by a destination comment field. Once these fields are completed, the administrator 239 classifies the destination entry as either a PSAP 216, Switch-controlled directory number (DN), or PSTN DN. Each of those destination types has a selection field to the left of it on lines two-four of the entry. To select the appropriate type, the platform administrator 239 places the highlighting on the field using the Tab-Shift-Tab key 263 or up and down arrow keys 263 and presses the Space Bar 263. This action places an "X" in the selected field and moves the cursor to the next field on the line of the destination type selected.

If the administrator 239 selects the destination to be a PSAP 216, the cursor moves to the four character field name of the PSAP 216. The administrator 239 may key-in the name or may display a pop-up selection window 514 and select a PSAP 216 from the listing. To display this window 514, the administrator 239 presses Control-w (window). On this PSAP selection window, the administrator 239 uses the navigation keys 263 to highlight a specific PSAP 216 and presses the Return key 263 to select it. Doing so removes the PSAP selection window 514 and places the name of the PSAP 216 in the new destination form.

Having declared the specific PSAP 216, the administrator 239 moves to the next field to define an alternate destination 215 number and label for the new destination 215. In addition, the "Busy" field is also provided for cases where busy tone 220 will be placed on the caller's line 203 if the primary destination 215 is unavailable.

To define the alternate destination 215, the administrator 239 may complete either the alternate destination number field or the alternate destination label field. Filling out either will present the corresponding data in the other field. With the cursor located on either of these fields, the administrator 239 presses Control-w to present a pop-up window 14 of destination index numbers and labels. The administrator 239 highlights and then selects a destination 15. This causes the window 514 to close and the selected destination number and label is placed in the alternate destination fields of the new destination form.

Once the fields for the new destination 215 have been completed, and before returning to selection mode, the new destination 215 is saved into the destination table database 470 (see also FIG. 10, table 259). To do this, the administrator 239 presses Return. This presents a confirmation on the message line 288A "Entry Updated." Pressing Control-u (undo) cancels any changes made to the record and returns the platform administrator 239 to selection mode. In the case where the administrator 239 entered edit mode on an existing destination 215 but then made no changes, the confirmation does not appear. Once all editing to the Destination Table is complete, the administrator 239 presses Control-x to exit upwards in the interface navigational hierarchy to the platform configuration selection screen.

ESN Table (FIG. 38): The ESN table 390 portion of the interface allows the administrator 239 to define each unique combination of emergency service providers (ESPs) 211. The ESN table 390 defines the ESPs that relate to each caller TN. This table 390 may consist of up to 1000 (000-999) entries. The editable fields for each entry are displayed on four lines. Each page of the table contains three entries. All entries are assigned an index number that appears to the far left are of line one of each entry. The remaining lines associated with each entry are indented six character positions to facilitate searching by index number. The platform administrator 239 is provided the capability to add new ESNs and delete or edit existing ESNs. When the platform configuration selection screen 222 (FIG. 30) is presented, the default highlighting is an option #1 ALI/DMS Interface. Highlighting the ESN table 390 option and pressing the Return key 263 presents the first page of the ESN Table (FIG. 38). The user is placed in selection mode when the screen 222 is displayed. In selection mode, pressing Tab or the up/down cursor keys 263 moves the high intensity cursor bar from one index number to the next. To perform the various editing tasks on a ESN (add/modify/delete) the platform administrator 239 invokes the desired state. To add a new ESN entry to the table 390, the administrator 239 presses Control-a. This action invokes the presentation of a data form (window 514) which pushes the present record and all following records down one position. This form presents each administrable field in low intensity highlight; those fields with default values are displayed.

The visitation order for each ESN record begins on line one of the record with a ESN record comment field (1-40 characters, no record required). Once this field is completed, the administrator 239 declares the destination 215 to be associated with the ESN. The administrator 239 may key in the number or may display a pop-up selection window 514 and select a destination number and label from the listing. To display this window 514, the administrator 239 presses Control-w. On this selection window 514, the administrator 239 uses the navigation keys 263 to highlight a specific destination and presses Return to select it. The next field allows the administrator 239 to configure the system 20 so that all E9-1-1 calls 201 that would normally be routed to the ESN should instead be routed to a busy signal 220.

The administrator 239 then moves to define the first of four selective transfer points 225 to be associated with the ESN. Each selective transfer point 225 will be displayed as both an index number and label. Once the fields for the new ESN have been completed, and before returning to selection mode, the new ESN is saved into the ESN table database 470. To do this, the administrator 239 presses the Return key 263. This presents a confirmation on the message line "Entry Updated." Once all editing to the ESN table 390 is complete, the administrator 239 presses Control-x to exit upwards in the interface navigational hierarchy to the platform configuration selection screen.

Selective Transfer Table 378 (FIG. 27): The Selective Transfer Table portion of the interface allows the administrator 239 to declare each selective transfer point 225 associated with the system 200. There can be up to 500 (000-499) selective transfer points 225 associated with the system 200. Each ESN includes from one to four selective transfer points 225 which can be selected from this table 378. The same selective transfer points 225 can be associated with many ESNs. When the platform configuration selection screen 222 is presented, the default highlighting is on option #1 ALI/DMS Interface. Highlighting the selective transfer table option and pressing the Return key 263 presents the first page of the selective transfer table 378.

Each page of the selective transfer table 378 may display up to ten selective transfer points 225. Each record in the table 378 consists of four editable fields. The first field is the three-digit selective transfer point ID. The second field is the destination number. The platform administrator 239 may type in the three-digit destination number to be connected with the selective transfer point 225. Doing so also displays the destination label associated with the number. If the destination number is not known, the platform administrator 239 may press Control-w from this field to display the destination selection window 514. From this window 514, the platform administrator 239 may select the desired destination 215. The last two fields define the selective transfer point label. These fields consist of a maximum of fifteen alpha-numeric characters. These are the fields that are displayed to the PSAP attendant 221 on the ALI Data screen 222 with each emergency call. The platform administrator 239 is placed in selection mode when the screen 222 is displayed. In selection mode, pressing the Tab key 263 or the up/down cursor keys 263 moves the high intensity cursor bar from one index number to the next. To perform the various editing tasks on a selective transfer point 225 (add/modify/delete), the platform administrator 239 invokes the desired state.

Once the label and TN fields for the new selective transfer point 225 have been completed, and before returning to selection mode, the new record is saved into the selective transfer table database 470. To do this, the administrator presses the Return key. This presents a confirmation on the message line 288A "Entry Updated." In the case where the administrator 239 entered edit mode on an existing selective transfer point 225 but then made no changes, the confirmation does not appear. Once all editing to the selective transfer table 378 is complete, the administrator 239 presses Control-x to exit upwards in the interface hierarchy to the platform configuration selection screen 222.

TN/ESN Table 213 (FIG. 42): The telephone number/emergency service number (TN/ESN) table 213 determines where each E9-1-1 call should be routed. Updates to this table 213 are received on a regular basis. The TN/ESN table 213 is launched from the platform configuration menu (FIG. 30). This table 213 contains three editable fields at the top of the screen 222 followed by two columns of ten records each. Each field appears blank initially (default setting) with the exception of the range field which is defaulted to twenty (the maximum number of records that can be displayed at once). The cursor navigation begins with the numbering plan digit (NPD) field, moving onto the starting TN field, followed by the range field. The platform administrator 239 presses the TAB or ARROW keys 263 to move the cursor through the three editable fields. Pressing RETURN initiates the search for records from within the TN/ESN tape to build the table 213. Control-x permits the platform administrator 239 to exit the TN/ESN table screen 222. It can be executed at any time except when a search is under way. Any search periods lasting longer than two seconds will include a message 240 displayed on message line 288A (screen line 24) that reads, "Search in progress. Please wait."

The editable fields include:

| Field | Acceptable Entry | Field Size |
|---|---|---|
| NPD | Numbers 0-3 | 1 |
| Starting TN | Numbers (Seven-digit unformatted entry will be automatically formatted.) | 8 |
| Range | Numbers | 2 |

A minimum of one of the first three fields must be modified before a successful search can be initiated. For example, if only the NPD field is modified, a search will result in all TNs, and associated ESNs for the TNs, starting with the lowest and displayed in ascending order.

PSAP Parameters (FIG. 44): The administrator 239 selects option #4 from the application data administration main menu 415 (FIG. 60) to configure the PSAP Parameters portion of the ADA. PSAP parameters are configured on a PSAP-by-PSAP basis. Before the administrator 239 reaches the PSAP parameters main menu 415, a PSAP 216 must be selected. Once the PSAP parameters option is selected from the application data administration main menu 415, a PSAP Selection screen 222 is presented (FIG. 46). From the PSAP selection screen 222, the administrator 239 selects a PSAP 216. This screen 222 displays up to twenty PSAPs 216. The first two fields of each PSAP record include the four-character PSAP mnemonic and the fifteen-character PSAP label. These two fields are followed by a field which indicates the present state of each PSAP 216. When the administrator 239 enters the PSAP parameters section of the ADA interface to administer an existing PSAP 216, selecting a PSAP presents the PSAP parameters menu screen 222 (FIG. 44). However, the first time a PSAP 216 is created on the system 200, the first screen 222 displayed is the PSAP features form (FIG. 25) where the PSAP 216 can be defined. Similarly, when a new PSAP 216 is added to the list of existing PSAPs 216 on the system 200, the PSAP parameters menu screen 222 (FIG. 44) is by-passed and the PSAP features form (FIG. 25) is immediately displayed. As a selection screen 222, the platform administrator 239 is placed in selection mode when the screen 222 is displayed. From this selection window 514 (FIG. 46), the platform administrator 239 may add a new PSAP 216 or delete an existing PSAP 216. To modify the name or label of an existing PSAP 216, the platform administrator 239 navigates to the PSAP feature form (FIG. 25). In selection mode on the screen 222 in FIG. 46, pressing the Tab key 263 or the up-/down cursor keys 263 moves the high intensity cursor bar from one PSAP 216 record to the next. Pressing Return selects the PSAP to be administered and presents the main menu of PSAP parameters (FIG. 44). Pressing Control-c presents a window 514 of command help so that these commands (Control-a: Add, Control-d, Delete) need not be committed to memory.

To add a new PSAP 216, the administrator 239 presses Control-a. This action by-passes the PSAP parameters menu screen 222 and immediately presents the PSAP features form (FIG. 25). From this form, the platform administrator 239 can define the basic PSAP parameters. To delete a PSAP 216 (FIG. 46), the administrator 239 first highlights a PSAP 216 and then presses Control-d (delete). This action causes all the fields to be low intensity highlighted and the confirmation on the message line 288A (screen line 24) reads, "Delete the highlighted PSAP from the database? (y/n)? Once the confirmation is made, the screen 222 returns to selection mode.

A final read-only field is displayed on line nineteen of the screen 222. This field indicates the date and time that this screen 222 was displayed on the terminal. The label and field read: "PSAP Status as of [mm/dd/yy] [hh:mm:ss]." To return to the ADA main menu (FIG. 60) for the selection screen, the administrator 239 presses Control-x.

PSAP Parameters Menu Screen 222 (FIG. 44): This is the screen presented to the user once a PSAP selection has been made, unless a new PSAP is being created. This screen (FIG. 31) presents the six menu options that comprise the PSAP Parameters portion of the ADA interface. Those options include:

PSAP Features Form

Night Service Schedule Form

To select a menu option, the administrator uses the Tab and the cursor keys to place the highlighting on the desired option. The default cursor position when each new screen is presented is the upper left most field. Additionally, the administrator has the option of pressing the number associated with the option to move to the first screen associated with the option.

PSAP Features Form

The PSAP Features form (FIG. 25) contains 14 administrable fields that allows the user to configure basic information needed for the PSAP to become a functioning entity of the E9-1-1 system. As with all PSAP Parameters screens 222, the selected PSAP 212 is displayed in the upper left-hand portion of the screen 222. The highlighted cursor appears first on the PSAP name (4-character mnemonic). The next field in the visitation order is the 20 character PSAP label. This field is followed by the PSAP mode which is a cyclical field (ON- LINE/OFF-LINE). The next field in the visitation order is the PSAP status field (ABANDONED/ACTIVE/NIGHT SERVICE). The cursor next falls to the NPD field (single digit: 0–3) in the visitation order. The third field is the cyclical Call Capacity field (LIMITED/UNLIMITED) followed by the Call Capacity Depth field (2 digits).

The fifth, sixth, and seventh fields are provided for the PSAP primary notification line 241, backup notification line and the PSAP hunt group TNs (7-digits each). This is followed by the cyclical ALI Retrieval field (ENABLED/DISABLED) and the cyclical Call Distribution field (ANY STATION ANSWER).

Once the administrator 239 is ready to save the changes to the form, he or she presses Control-x. This action presents a confirmation message 240 on line 24: "Save changes to the PSAP Features Form?" From here the administrator 239 may press y (yes) to have the changes saved and return to the next highest level—the PSAP Parameters Menu screen 222 (FIG. 44), press n (no) to cancel the changes and return to the PSAP Parameters Menu screen, or press c (cancel) to cancel the changes but remain on the PSAP Features form (FIG. 25).

PSAP Night Service Schedule Form: The platform administrator 239 may modify the times when Night Service goes into effect and when it is removed for each PSAP 216. From the PSAP Parameters Menu screen 222 (FIG. 44), the administrator 239 highlights the second option and presses Return. As a shortcut, the administrator may also press number key "2" which will take the user immediately to the PSAP Night Service Schedule screen 222 (FIG. 24). The Night Service Schedule screen 222 (FIG. 24) displays the hours of the day in 2 hour increments vertically down the left side of the screen 222. The days of the week are displayed horizontally across the top portion of the screen 222.

The administrator 239 uses the cursor keys 263 to navigate to the location that reflects the day and time that Night Service is to begin. After pressing "Return," the administrator 239 can key in the four digits required to indicate the start time $t_s$. The time input can be accurate to the minute. The twenty-four hour format is HH:MM; inputting the colon or a leading zero for single digit hours is not required. Only numerical inputs are acceptable and error checking will occur. By pressing down the cursor key 263, the highlight cursor returns. The administrator 239 then cursors down to the time $t_e$ that is desired for Night Service to end. Once the last digit of the time is entered, the administrator 239 is able to cursor down off the Night Service stop time $t_e$. The days loop so that pressing down from the last block on Tuesday, for example, will move the cursor to the top time block on Wednesday.

The administrator 239 then cursors down to the two hour block in which Night Service is to end. By again pressing "Return," the administrator 239 can enter the Night Service end time $t_e$ and then cursors off the time block. This action causes the window 514 to disappear and for all the two hour cells between the start time $t_s$ and the end time $t_e$ to be displayed as a block indicating a Night Service interval $\Delta t_{ns}$.

To delete a Night Service block, the administrator 239 places the cursor somewhere in the highlighted block and presses "Control-d." This action removes the inverse video and the start and stop times from the screen 222. The administrator 239 can also expand or compress a night service interval $\Delta t_{ns}$. This is done by cursoring to either the start or stop time of the interval, typing in the new time, and pressing Return. The screen 222 will be updated with more or fewer time blocks highlighted to indicate the change. There is one restriction, if expansion of a Night Service interval $\Delta t_{ns}$ is desired, the expanded interval $\Delta t_{ns}$ cannot overlap an existing interval $\Delta t_{ns}$. If this is desired, one interval $\Delta t_{ns}$ should be deleted before the other interval $\Delta t_{ns}$ is expanded.

Each incoming E9-1-1 call 201 received during a Night Service interval $\Delta t_{ns}$ is sent to a designated location. The default location is the designated alternate destination 215. However, the administrator 239 has the option of changing this Night Service designation to another destination 215. This is done by placing the cursor in a Night Service interval $\Delta t_{ns}$ and pressing "Control-t." This moves the cursor to the routing field on line 21. In this field, the user may key in a destination or press "Control-w" to display a selection window 514 of all the valid destinations in the system 200 (FIG. 33). From this window 514, the administrator 239 can first highlight and then select the destination 215 to be the Night Service destination for all E9-1-1 calls 201 during that Night Service interval. Selecting a destination 215 from this window 514 causes the window 514 to disappear and the selected destination to appear in the field on line 21. Once the administrator 239 is ready to save the changes to the form, he or she presses Control-x. This action presents a confirmation message 240 on line 24: "Save changes? (y/n/c)." From here the administrator 239 may press y (yes) to have the changes saved and return to the next highest level—the PSAP Parameters Menu screen 222 (FIG. 44), press n (no) to cancel the changes and return to the PSAP Parameters Menu screen, or press c (cancel) the changes but remain on the PSAP Features form (FIG. 25).

Remote Administration From PSAP Terminal: Administration may be performed from the location of a PSAP 216 by an attendant 221 using an attendant workstation 212. The PSAP attendant workstation 212 can be placed in several different states depending upon the status of the AP 234 and the switch 218. The PSAP 216 can be placed into any of the three operational states, which directly impact the extent to which the attendant 221 can interact with the C.E.R.S. system 200 to perform administration. The operational states of the workstation are divided into two major segments that define what functions the attendant 221 can perform at any particular time. The major segments include the state of each particular PSAP workstation 212 and the line status for each PSAP workstation 212.

In the active state of a PSAP 216, emergency calls are directed to the PSAP. The PSAP 216 is fully operational. Input from any key 263 may be acceptable depending upon the state of the workstation 212 and the telephone line 245 connected to the workstation 212.

In the Night Service state, E9-1-1 calls 201 that are normally routed to the PSAP 216 are redirected to a designated night service destination 215. In this state, all functionality of the workstation 212 is available to the attendant 221 including the pickup key 263. The availability of the pickup key 263 is necessary for the race condition that may exist when an E9-1-1 call 201 to another PSAP 216 is being transferred to a specific PSAP workstation 212 at approximately the same time. When a PSAP 216 goes into Night Service, all idle workstations 212 are placed automatically in the "Not Receiving Calls" mode. Once the PSAP 216 is completely in Night Service, no further E9-1-1 calls 201 will be directed to or can be transferred to the PSAP 216. Attempting to transfer an E9-1-1 call 201 to a PSAP 216 in Night Service results in an audible indicator that alerts the caller 202 of "do not disturb" on the PSAP lines.

As described below, from the PSAP administration menu 513 (FIG. 60) the attendant 221 can place the PSAP 216 back in the Active state. When the PSAP 216 emerges from Night Service, all workstations 212 remain in the "Not Receiving Calls" state until placed in the "Receiving Calls" state.

The Abandoned state may be administered by the attendant 221 placing the PSAP 216 in the "Abandoned" state from any of the workstations 212. Then, E9-1-1 calls 201 that normally routed to the PSAP 216 are redirected to the designated destination 215. In this state, all keyboard-based functionality is available to the attendant 221.

When the PSAP 216 is placed in the Abandoned state, all workstations 212 are placed automatically in the "Not Receiving Calls" mode. Once the PSAP 216 is completely in the Abandoned state, no further E9-1-1 calls 201 will be directed to or can be transferred to the PSAP 216. Attempting to transfer a call 201 to a PSAP 216 in the Abandoned state results in an audible indicator that alerts the caller 202 of "do not disturb" on the PSAP lines. From the PSAP administration menu 513 (FIG. 50), the attendant 221 can return the PSAP 216 to the Active state. When the PSAP 216 emerges from the Abandoned state, all workstations 212 remain in the "not receiving calls" state until manually placed in service.

Each PSAP workstation 212 can be in one of two states. In the Receiving Calls state, input from any key 263, except the "Help", "Admin." keys, may be acceptable depending upon the state of the telephone line 245 connected to the workstation 212.

Not Receiving Calls state: The major distinction between this state and the "Receiving Calls" state is that in the "Not Receiving Calls" state the attendant 221 can perform some tasks not allowed during the "Receiving Calls" state. When an E9-1-1 call 201 arrives at the PSAP 216, its presence is communicated to the attendant 212 via a blinking "EMERGENCY CALL WAITING" label (screen 222, line 4, FIG. 11) and a wall-mounted ringer. By pressing a "Pick Up" key 263, the attendant's workstation 212 automatically returns to the "Receiving Calls" state and the E9-1-1 call 201 will be directed to his or her specific workstation 212. While in the PSAP Administration portion of the interface, the attendant 221 is not able to directly answer an E9-1-1 call 201 or initiate any of the other call processing functions that would otherwise be available in the "Not Receiving Calls" state.

The line status for a particular workstation 212 can be in one of six state:

Idle: This state describes those periods when the phone 227 (FIG. 1) is "on-hook." Allowable keyboard inputs are dependent upon the current screen display. This state pertains only to E9-1-1 calls 201, i.e., calls processed by the C.E.R.S. system 200.

XFR Allowed: This state involves those periods when the attendant 221 has gone off-hook. This state includes those periods when the attendant 221 is communicating with one party and thus a transfer is permitted.

XFR in Use: This status indicator reflects those periods when a three party call has been established. With three parties connected, no additional transfers can be initiated.

Transferring: This indicator reflects the state when the system 200 is in the process of transferring a call 201. It is typically a state of short duration.

Ringing: This status indicates when an attendant's specific workstation phone 227 is ringing. This can occur when a call 201 is transferred to a specific workstation 212, for instance, when a call 201 is transferred to a Spanish speaking attendant. When such a call 201 arrives at a workstation 212, the line status indicator blinks "Ringing" in inverse video if the phone set 227 is "on-hook." In addition, using a phone set 227 with a light that flashes when ringing calls further attention to the fact that the phone set 227 and not a wall-mounted annunciator (not shown) was ringing.

Unknown: This status indicates a state caused by a software error where the psap process 361 has lost track of the state of the specific call 201. This confusion disappears when the call 201 is dropped and the line status returns to idle.

Not Available: This status indicates that the telephone set 227 at that workstation 212 is not operating properly. In all likelihood, it indicates that the line has been left in idle state for too long a period. However, it may indicate that there is a problem with the line 245 and reprovisioning by the switch 218 is required.

Function Key Description: The labeling for the keycaps is identical for both the VT220 and microcomputer keyboards 228. Key color coding and relative position is very similar. The VT220 keyboard 228 (FIG. 16) contains a bank of twenty function keys 263 as well as four PF keys. To ensure that the layout of the VT220 keyboard 228 remains essentially the same as the keyboard layout for the microcomputer interface, only twelve of the function keys 263 are utilized for the C.E.R.S. application 200.

The following Function Key Chart identifies certain function key locations on the keyboard 228, the feature label and a description of the feature. The identified function keys 263 on the keyboard 228, the editing keypad, and the upper row of the numerical keypad are used in the following manner:

| Function Key Chart | | | |
|---|---|---|---|
| PC | VT | Feature | Description |
| F4 | F8 | Admin | This key allows the attendant 221 to administer certain parameters for the PSAP 216. This key 263 is only available when the workstation 212 is in the "Not Receiving Calls" state. For some features within the administration menu (updating the transfer directory, generating reports, changing passwords, or modifying the Night Service schedule 262), the attendant is required to input a password sequence before accessing a menu-based series of screens 222. Other features located under the administration main menu (FIG. 50), such as manually entering or leaving Night Service or PSAP Abandonment, are available to all attendants 221 without requiring password access. |
| F7 | F11 | Prev | This key 263 allows the attendant |

-continued

Function Key Chart

| PC | VT | Feature | Description |
|---|---|---|---|
|  |  | Scrn | 221 to page backward in any mode of the application where multiple screens 222 exists, for example, Transfer Directory screens, or the Help screens. This key 263 is only available when a previous screen 222 exists. Otherwise, pressing this key 263 emits a beeping tone. |
| F8 | F12 | Next Scrn | This key 263 allows the attendant 221 to page forward in the XFR Directory and Administration portions of the application where multiple screens exist. This key 263 is only available when additional screens 222 beyond the displayed screen exist. Otherwise, pressing this key 263 emits a beep tone. |
| F9 | F13 | Print ALI | This key 263 allows the attendant 221 to selectively print out a copy of the ALI data for a particular call 201. In addition, the PSAP 216 can be configured by the platform administrator 239 to have all ALI records sent to the PSAP printer 255 automatically. |
| F10 | F14 | Call Origin | This key 263 allows the attendant 221 to toggle between displaying information regarding the origination and transmission path of the E9-1-1 call 201. This information can be of great value when attempting to trouble shoot a system problem. While the attendant 221 can blank out this information from the main screen 222, the information is carried with the ALI data to the printer 255. This key 263 functions during all screen states. |
| F11 | F15 | Clear Scrn | This key 263 clears the ANI, ALI, the four selective transfer points 225, and call origin information from the main screen 222. This key 263 is active in all states. |
| F12 | F16 | Attdt Status | This key allows the attendant 221 to toggle between the "Receiving Calls" and "Not Receiving Calls" modes. If the PSAP 216 is placed in Abandonment or Night Service, this key 263 is not operational. The "Not Receiving Calls" mode increases the functionality available to the attendant 221. In the "Not Receiving Calls" state, the attendant 221 can initiate certain operations via keystroke that are not available during the "Receiving Calls" mode. Those actions include: performing PSAP administration, and entering the Help screens. |
| Home | Insert Here | Call History | This key allows the attendant 221 to cycle through up to the last four calls 201 that were handled at the workstation 212. This key 263 is available when the ALI Data screen 222 is displayed. Once the attendant 221 completes an E9-1-1 call 201 and returns to "Idle," a "Call History 1" indicator appears above the ALI data for the call 201. Pressing the "Call History" key 265 once recalls the second most recently completed call 201. Each successive press of the key 265 move to the next call 201 back in temporal order. This action continues with each press of the key 265 until the fourth previous call (or the last call 201), if less than four calls 201 have been processed,is displayed. Each previous call 201 displayed is identified with a label (Call History 1-4) to ensure that the attendant 221 is aware that the ALI data displayed is not part of an active call 201. If an attendant 221 uses the "Call History" feature while on an active call 201, the active call 201 will be labeled "Current Call" to quickly distinguish it from the completed calls in the "Call History" array 620. |
| Page up | Remove | Call Back | This key allows the attendant 221 to dial the TN of the caller 202 whose NPD + TN information appears on the screen 222. |
| Delete | Select | XFR Dir | This key 263 presents the directory of fixed transfer points 225 (FIG. 49). The directory consists of five fixed groups with each group containing one or more screens 222 of 14 entries each. The maximum number of entries per group is 99. The entire directory can contain a maximum of 210 entries. This key 263 is active regardless of workstation state. |
| End | Prev Scrn | Hold | This key 263 allows the attendant 221 to place one call 201 on hold for an indeterminate amount of time. This key 263 is available when the workstation 221 is in the "Active" state. The "Hold" key toggles between placing a call 201 on hold and retrieving the call 201. When a call 201 is placed on hold, the label "Caller on Hold" is displayed on the far right portion of line 4 (FIG. 53). This label remains displayed until the attendant 221 retrieves the call 201. In the event that the caller 202 on hold goes on-hook (abandons), the attendant 221 is made aware of this event only after he or she presses the "Hold" key 263 in an attempt to reconnect the call 201. At that time, the message 240 "Caller on Hold has abandoned" appears on the message line 288A. |
| Page Down | Next Scrn | Pick UP | This key 263 allows the attendant 221 to direct an incoming E9-1-1 call 201 to the workstation 212. This key 263 is available regardless of workstation state when an E9-1-1 call 201 has been directed to the PSAP 216 unless the attendant 221 is in the administration portion of the interface. If the attendant 221 is on-hook when the "Pick Up" key 263 is pressed, the AP 234 first rings the attendant's phone set 227. When the attendant 221 goes off-hook, he or she is immediately connected to the ESR 202. |
|  | PF2 | Forced Discon | This key 263 allows the attendant 221 to drop the emergency call trunk 206. It is only available when the attendant 221 is connected with an emergency caller 202. The "Forced Discon" key 263 operates differently if it is pressed during a |

Function Key Chart

| PC | VT | Feature | Description |
|---|---|---|---|
| | | | two-party or three-party call. In a two-party call, pressing the "Forced Discon" key 263 provides the same result as pressing the "Drop Out" key 263, returning the attendant 221 to the dialing state. In a three-party call, pressing the "Forced Discon" key 263 removes the emergency caller 202 from the call 201, but allows the attendant 221 and the ESP 211 to continue communicating. |
| * | PF3 | Cncl XFR | This key 263 allows the attendant 221 to drop the ESP 202 from the call 201. The attendant 221 and ESR 211 remain connected in a two-party call. In the event that the attendant 221 initiates a transfer to an incorrect action before the ESP 202 answers, it allows the attendant 221 to initiate a new transfer action. In a three-party call, this key 263 drops the attendant 221 out of the call 201 while leaving the ESR 211 and ESP 202 connected in a two-party call. In either case, the attendant line reverts to dial tone after a short delay. |

When the PSAP attendant 221 begins a work shift, the terminal is in the "Not Receiving Calls" state. In this state, the attendant 221 can perform all the functions available during the "Receiving Calls" state as well as perform some other tasks that are not available to the attendant 221 while in the "Receiving Calls" state. E9-1-1 calls 201 directed to the PSAP 216 will be reflected on a "Not Receiving Calls" screen 222 (FIG. 23) by the blinking EMERGENCY CALL WAITING indicator (line four).

In the "Not Receiving Calls" state (FIG. 23), the label in the upper right hand corner of the screen 222 reads in reverse video: "Not Receiving Calls." In addition, in this state the attendant 221 can press the "Admin." key 263, which is unavailable to the attendant 221 while the workstation 212 is Receiving Calls, and from there choose from a menu 213. Under normal operating conditions, the attendant 221 places the workstation 212 in the "Receiving Calls" mode to begin call taking. By pressing the key 263 labeled "Attdt Status", the attendant 221 places the workstation 212 in the "Receiving Calls" mode. This is reflected on the screen 222 (FIG. 15A) by the "Not Receiving Calls" label being replaced with the "Receiving Calls" label and by the line status label and field being displayed on line four. The section of the screen 222 on line two provides information on the availability of the PSAP 216 (FIG. 15B) (Active, Abandoned, or Night Service) and the individual workstation ID and workstation status (Receiving Calls or Not Receiving Calls). Line four information includes line status (Idle, Transfer Allowed, Transfer in Use, Ringing or Unavailable), the "Emergency Call Waiting" indicator and the "Caller on Hold" indicator.

When the E9-1-1 call 201 arrives at the PSAP 216, a wall-mounted ringer (not shown) announces the call 201. The call 201 will be routed to the first attendant to go off-hook and press the "Pick Up" key 263. The "Pick Up" key 263 enables the attendant 221 to make connection with the emergency caller 202. Even when a workstation 212 is "Not Receiving Calls", the presence of an E9-1-1 call 201 is reflected on any screen 222 present at the PSAP 216. By pressing the "Pick Up" key 263, the workstation 212 is automatically returned to the "Receiving Calls" state and the screen 222 displayed (FIG. 15B).

The exception to this operating philosophy is the administration portion of the interface. While in the administration portion of the interface, the attendant 221 will not have the "Pick Up" key 263 immediately available. To answer the call 201, the attendant 221 must first exit the administration portion of the interface and then press the "Pick Up" key 263. This restriction is placed on the interface so that changes to the PSAP administration screens 222 can be saved before exiting.

Whenever the attendant 221 initiates an action via keystroke input that is sent to the switch 218, a status indicator lets the attendant 221 know that the input was received. This "Working" indicator in the far right portion of line six (FIG. 15A) appears until the anticipated response from the switch 218 occurs.

The field labeled "Emergency Call Waiting" located at the center of line four gives the attendant 221 at each workstation 212 a visual indication of the waiting E9-1-1 call 201. This label appears on each PSAP workstation 212 as a E9-1-1 call 201 is directed to that particular PSAP 216. It disappears from all PSAP screens 222 once one of the attendant 221 presses the "Pick Up" key 263. In addition, when all attendants 221 are occupied with an E9-1-1 call 201 and another call 201 arrives at the PSAP 216, the indicator appears again and begins blinking until an attendant 221 accepts the call 201.

In the event that all other workstations 212 at the PSAP 216 are "Not Receiving Calls", attempting to disable the last workstation 212 results in the following confirmation window 514 displayed in the center of the screen 222 accompanied by an alerting double beep:

"This action will cause your PSAP to become abandoned since you are the last attendant position 'Receiving Calls'. Do you want to abandon your PSAP (Y/N) ?"

Placing all PSAP workstations 212 in the "Not Receiving Calls" mode will result in PSAP Abandonment. E9-1-1 calls 201 are then rerouted to the designated abandonment destination 215.

The attendant 211 answers an E9-1-1 call 201 by picking up the handset 227 and pressing the "Pick Up" key 263. If the attendant 221 presses the "PickUp" key 263 before going offhook, the E9-1-1 call 201 is directed to that workstation 212 and the system rings the attendant's individual phone set 227. To accept a second E9-1-1 call 201, the attendant 221 presses the "Hold" key 266. This places the original caller 202 on hold and allows the attendant 221 to take the waiting E9-1-1 call 201. A "Caller on Hold" indicator or message 240 appears on the screen 222 line four as a reminder to the attendant 221. Once two calls 201 have been accepted, no other E9-1-1 calls 201 can be processed until the attendant 221 finishes with the second or active call 201o If the attendant 221 goes on-hook with a caller 202 on hold, the system 200 will blink the "Caller on Hold" message 240 in inverse video to make the attendant 221 aware of the forgotten call 201 on hold. This message 240 flashes until the call 201 is retrieved or another call 201 is accepted.

Message Line

Line twenty-four of the screens 222 is dedicated to presenting the messages 240 from the AP 234 and messages from the ALI/DMS system 224. These messages 240 are often informational in nature and provide the attendant 221 feedback when invalid keyboard input is attempted. Messages 240 displayed on line twenty-four are seventy-five characters or less in size and can appear on any screen 222 displayed. Most messages 240 displayed originate at the AP 234 and involve invalid keyboard input. These messages 240 are accompanied by a single burst (beep) indicating user error. For such messages 240, the next keyboard action removes the message 240. Messages 240 of an informational nature are accompanied by a double beep.

PSAP Administration: The PSAP attendant 221 can perform a variety of administrative tasks from a workstation 212 that is in the "Not Receiving Calls" mode. There are two categories of tasks within PSAP administration. The first category requires password access; the others do not. By pressing the "Admin." key, the administration main menu 513 is displayed (FIG. 50). With this screen 222, the attendant 221 can select one of three items:

1. Cancel/Activate Night Service;
2. Perform Restricted PSAP Administration; or
3. Abandon/Reactivate PSAP.

The second option, "Perform Restricted PSAP Administrative Tasks", is limited to those users with password access. The first and third options are available to all PSAP attendants 221. Once the attendant 221 calls up the administration screens 222 via the "Admin." key 263, the functionality of the call processing keys 263 is not available. To accept an incoming E9-1-1 call 201 while on an administration screen 222, the attendant 222 first exits the administration portion of the interface before pressing the "Pick Up" key 263. In all other cases while in the "Not Receiving Calls" mode, all call processing functionality is available to the attendant 221, and pressing the "Pick Up" key placing the workstation 212 in the "Receiving Calls" mode and sends the call to the workstation 212.

The attendant 221 can exit the PSAP administration main menu 513 in one of two ways (1) press "Ctrl-x" to exit the screen 222 or (2) press the "Admin." key to exit the screen 222.

PSAP Night Service & Abandonment: From the "PSAP Administration" main menu screen 222 (FIG. 50), the attendant 221 may take the PSAP 216 into or out of Night Service. By the "Enter" key 263, the confirmation window 514 will appear on line twenty-four of the screen 222 and read:

"Cancel Night Service? (Y/N)"

If the PSAP 216 is not in Night Service, the confirmation will read:

"Activate Night Service? (Y/N)"

This action takes the PSAP 216 into or out of Night Service. To close the PSAP Administration main menu 513, the attendant 221 presses the "Admin." key 263 or presses "Ctrl-x".

If an attendant 221 places an active PSAP 216 manually into Night Service, each on-line workstation 212 receives a system message 240 stating that the PSAP 216 will be in Night Service momentarily. Approximately a minute later, a new message 240 appears indicating that the PSAP 216 is now in Night Service. Any attendant can initiate the action to Abandon the PSAP 216 or conversely to bring the PSAP 216 out of Abandonment. By selecting the "Abandon/Activate PSAP" option (#3, FIG. 50) and pressing "Return", a confirmation window 514 at the center of the screen 222 is displayed. The confirmation wording is dependent upon the present state of the PSAP. If the PSAP 216 is in the Active or Night Service state, the confirmation on line twenty-four reads:

"Abandon PSAP? (Y/N)?"

If the PSAP 216 is already in Abandoned, the confirmation reads:

"Reactivate PSAP? (Y/N)"

By pressing "Y", the PSAP 216 is placed in the Abandoned state or in active state depending upon the original state of the PSAP 216. Each workstation 216 at the PSAP 216 receives a message 240 to that effect. Pressing "N" displays the ALI DATA screen 222 (FIG. 15B) with PSAP status unchanged.

Restricted PSAP Administration: Designated PSAP attendants 221 will be able to perform a set of administrative tasks from a PSAP workstation 212 that is in the "Not Receiving Calls" state. Access to the administration screens 222 is possible for those attendants 221 using a valid password and login sequence. With the workstation 212 in the "Receiving Calls" state, pressing the "Admin." key 263 presents the attendant 221 with an error message. Pressing the "Admin." key 263 from a workstation 212 placed in the "Not Receiving Calls" state will display the PSAP Administration main menu 513 (FIG. 50). Selecting the second option, "Perform Restricted PSAP Administration", prompts the attendant 221 to input a login sequence. This login sequence is echoed on the screen 222. Pressing the "Return" key 263 sends the login sequence to the AP 234 and prompts the attendant 221 for a password. The password sequence is not echoed on the attendant's screen 222. By pressing "Return", the password is sent to the AP 234. If correct, the attendant 221 is presented with another menu of administration task options. If either the login or password were incorrect access is denied, but no information as to what portion of the login sequence failed is provided. The error message may read:

"Login Failed. Access Denied."

Finally to input a correct login or password twice returns the workstation 212 to the ALI Data screen (FIG. 15B). To try again, the attendant 221 must begin from the start by pressing the "Admin." key 263. There is only one valid login sequence per PSAP 216. The default login is the four character PSAP name. This login can be changed but only by the platform administrator 239.

The platform administrator 239 is considered the "super user" and can access the entire C.E.R.S. system 200 administration interface from any workstation 212 attached to the system 200. This provides the system administrator 239 the ability to troubleshoot problems and make changes to the platform administration database from a PSAP 216. The platform administrator 239 will call up the same administration interface screens 222 as would be used at the platform 204. Only a single attendant 221 at a PSAP 216 can access the administration screens 222 at any time. Once one attendant 221 at a PSAP 216 has successfully accessed the administration portion of the system 200, all other attempts to gain access are denied. Pressing the "Admin." key 263 from a workstation 212 once another attendant 221 has gained access presents the following error message on line twenty-four: "Access denied. PSAP Administration in Progress."

Once the attendant 221 has correctly entered his or her password, the PSAP Administration submenu 513 (FIG. 51) is presented. From this screen 222 the attendant 221 can select one of four available categories of tasks to administer as well as quit the administration portion of the system, e.g.

Administer the Night Service Schedule

The user of the administration screens 222 must always return to the PSAP Administration main menu screen 222 (FIG. 50) to quit administration. This is done by pressing Control-x.

Figure 23:
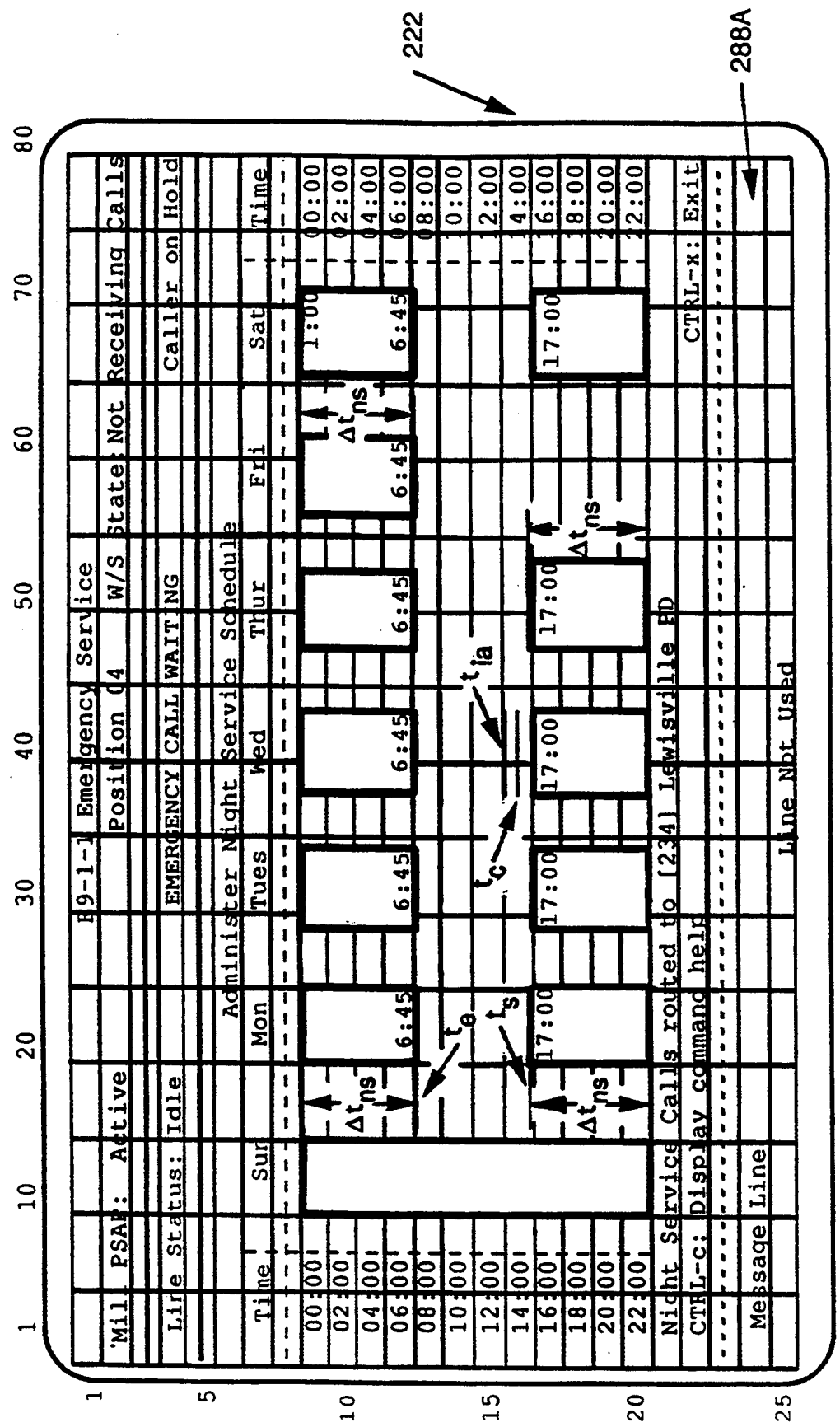
FIG. 23 is a diagram of a screen of a workstation illustrating night service schedules for a particular PSAP.

Administer Night Service Schedule: The PSAP manager 259 is able to modify the times when Night Service goes into effect and when it is removed. From the PSAP Administration submenu 513 (FIG. 51), the attendant 221 selects the second option by cursoring until the highlight bar is over "Administer Night Service Schedule" and presses "Enter". Will take the user immediately to the Night Service Schedule screen 222 (FIG. 23). This administration is the same as that described above for the applications data administration.

Message Formats: Because of the critical nature of the tasks performed by the PSAP attendant 221, the design of the interface must minimize attendant errors messages. Alert messages 240 are therefore infrequent. Messages 240 presented on the screens 222 of the PSAP attendant workstation 212 come from either of two sources: the AP 234 or the ALI/DMS system 224. Attendant errors that impact the telephony portion of the emergency call transfer sequence are generated by the AP 234. When errors are detected, the error message 240 clearly describes what the error is, provides a probable cause if possible, and describes an appropriate corrective action. Normal attendant errors produce a tone of short duration (beep) and display an error message 240 on line twenty-four. The next user input will remove the message from the message line.

In the event the more than one message is sent to a PSAP workstation in a short period of time, an asterisk (*) will appear to the far right of the message line. This symbol indicates that multiple messages have been queued and are awaiting review. When queued messages 240 occur, the attendant 221 presses message acknowledge to remove the displayed message 240 and display the next. Once the last queued message 240 is displayed, the asterisk disappears from the message line 288A.

System Message Formats: System messages 240 covey to the attendant 221 a change in the status of the system 200 or some attempt on the part of the attendant 221 to operate the system 200 in an incorrect manner. These messages 240 are classified as either "critical" or "non-critical". Critical messages 240 are accompanied by a double beep. These messages 240 also override the non-critical messages 240 and are displayed immediately to the attendant 221. Errors committed by the attendant 221 elicit a message 240 and a short duration beep. These messages 240 include the following:

PSAP will be in Night Service momentarily: MM/DD/YY HH/MM

This message appears when the platform administrator 239 prepares to place a PSAP 216 in the Night Service state. This message 240 appears for one minute and then the message 240 changes to "PSAP in Night Service" and remains on the screen 222 until the PSAP returns to the Active state. A double beep accompanies the message 240.

Critical ° PSAP returned to active state on: MM/DD/YY HH/MM.

This message 240 appears once an attendant 221 returns the PSAP 216 to the Active state. Each attendant 221 must manually reactivate his/her workstation 212, (toggle the Attdt Status key from "Not Receiving Calls" to "Receiving Calls"), to receive E9-1-1 calls 201. A double beep accompanies the messages 240.

Critical ° PSAP {XXXX} in Night Service. Direct call to alternate PSAP.

This message 240 appears when the attendant 221 attempts to transfer a caller 202 to another PSAP 216 that is currently in Night Service. A double beep accompanies the message 240.

Critical ° Caller on Hold has disconnected.

This message 240 appears when the attendant 221 attempts to retrieve the call 201 on hold and that caller 202 has abandoned during the hold interval. A double beep accompanies the message 240.

° Call History request failed. Use manual procedures.

This message 240 appears when the attendant 221 presses the Call History key 265 and the request fails because of a system malfunction. A single beep accompanies the message 240.

° Must have a previous call screen displayed to use Call Back.

This message 240 appears when the attendant 221 attempts to initiate a call back when no call 201 is displayed at the workstation screen 222. A single beep accompanies the message 240.

° No call history available.

This message 240 appears when the attendant 221 attempts to display call history and no previous calls 201 have been accepted at the workstation 212. A single beep accompanies the message 240.

Critical ° PSAP abandoned on: MM/DD/YY HH/MM.

This message 240 appears when the PSAP 216 is placed in the Abandoned state. A double beep accompanies the message 240.

Critical ° PSAP in Night Service on: MM/DD/YY HH/MM,

This message 240 appears when the PSAP 216 enters the Night Service state. A double beep accompanies the message 240.

Critical ° PSAP will be abandoned momentarily: MM/DD/YY HH/MM.

This message 240 appears when the AP 234 prepares to place the PSAP 216 in the Abandoned state. A double beep accompanies the message 240.

Call Routing Sequence

Referring now to FIGS. 19 and 20, the switch 218 and the AP 234 interact via the stk process 358 and the tlp process 357, and through the HCI interface 282 to route E9-1-1 calls 201 to call handling destinations 215 and then to ESP's 211. The messages 288 and steps taken during such routing are described below.

1. The emergency service requester (ESR) 202 dials the E9-1-1 call 201. The ESR 202 is calling from a telephone number (TN).

2. The E9-1-1 call 201 is received at the end office 205 of the PSTN 219.

3. At the PSTN 219, ANI data is added to the E9-1-1 call 201. The E9-1-1 call now includes:

i. the number called ("9-1-1"), ii. the ESR's TN (seven digits), and iii. an I-digit, which indicates the attributes of the ANI data (e.g., "is the TN one of a multi-party line" and "cannot obtain ANI data for the E9-1-1 call 201").

4. The E9-1-1 call 201 is sent to the switch 218 via the inbound CAMA trunks 206 using inbound signaling with ANI data being sent during call setup.

5. The switch 218 assigns a unique call reference to the E9-1-1 call 201 (referred to as "call_ref"). The call_ref is a unique value according to the switch 218 to which the E9-1-1 call 201 is sent. The switch 218 also generates call status messages 288 when the switch 218 uses any device which the AP 234 monitors. For example, the switch 218 sends the AP 234 a <dialing> message to notify the AP 234 that the E9-1-1 call 201 was received on the inbound trunk 206. The AP 234 monitors the progress of routing the E9-1-1 call 201 by receiving the call status messages 288 such as <dialing>.

6. The <dialing> message 288 includes:
   i. the identification of the inbound trunk 206 on which the E9-1-1 call 201 was received by the switch 218, and
   ii. the unique call reference value (call_ref) for the E9-1-1 call 201.

7. The AP 234 does not respond to the <dialing> message 288 that indicates that the inbound CAMA trunk 206 was seized. The AP 234 records the <dialing> message and waits for the next call progress message 288. The switch 218 has the hunt group 333 of DNs that do not have terminating devices attached to them. The routing of the E9-1-1 call 201 to the hunt group (PDNs) 333 is done automatically by the switch 218 in response to administration data assigned to the trunk 206.

8. Upon routing the E9-1-1 call 201 to a PDN 333, the switch 218 sends a <route determined> message 288 to the AP 234, so that the AP 234 can further monitor the status of routing the E9-1-1 call 201. An "other parties" information field of this <route determined> call status message 288 contains other DN information related to the E9-1-1 call 201 (i.e. TN of PDN hunt group member) to which the E9-1-1 call 201 was routed. This call status message 288 also includes ANI data for the E9-1-1 call 201.

The switch 218 also sends a <seized> call status message 288 for the PDN 333 to the AP 234, which indicates to the AP 234 that the E9-1-1 call 201 is at the PDN 333. An "other parties" information field of the PDN's <seized> call status message 288 contains other DN information related to the E9-1-1 call 201 (i.e., the trunk 206). Thus, by way of the <route determined> and <seized> call status messages 288, the AP 234 monitors the E9-1-1 calls 201.

In response to the <route determined> message 288 (which includes the TN of the incoming E9-1-1 call 201), the router process 360 submits a request for ALI information to the ali process 364. No response is expected. This request to the ali process 364 forces the ali process 364 to submit a request to the ALI/DMS, and not check the buffers of the ali process 364. In this manner, each unique E9-1-1 call 201 will result in an ALI/DMS request.

9. In response to the <route determined> message 288, the router process 360 accesses the trunk administration table 374 to determine the classification of the incoming trunk 206 with respect to ANI and Selective Routing. (FIG. 19, Step 2).

The router process 360 logs a system error message if ANI was not received on a CAMA trunk 206, if the I-digit is not equal to 0 or 3, or if the ANI data includes anything other than seven recognized digits. If the I-digit is 1 or 4, the wscp process 368 displays a message 240 on the screen 222, such as "possible call from multi-party line".

10. The trunk administration table 374 (FIG. 11) is accessed using the identification of the inbound trunk 206 (which was sent to the AP 234 as part of the <dialing> message 288.) The trunk administration table 374 defines a numbering plan digit (NPD) for the incoming trunk 206 on which the E9-1-1 call 201 was received. The trunk administration table 374 also defines a flag indicating whether or not Selective Routing is to be used for E9-1-1 calls 201 received on that inbound trunk. If Selective Routing is to be used, steps 2-13 described below with respect to FIG. 19 are used to automatically direct the E9-1-1 call 201 to the ESR's primary PSAP 216, based on the ESR's TN and NPD. If not, Default Routing steps 15-26 described below with respect to FIG. 19 are used.

11. Having the NPD from the trunk table 374, and having the ESR's TN from the ANI data, the router process 360 responds to the Selective Routing Flag from the trunk administration table 374 and obtains the emergency service number (ESN) corresponding to such NPD and TN from the TN/ESN table 213.

12. In response to the ESN output from the TN/ESN table 213, the router process 360 accesses the entry (in the ESN table 390) which is assigned this ESN value. Each ESN table 390 defines a call handling destination 215 which should receive the E9-1-1 call 201 by pointing to a specific entry in a destination table 259 which corresponds to that ESN. The destination entry defines:
   i. the destination type (e.g., PSTN 219, or switch DN or PSAP 216),
   ii. the DN of the destination 215, and
   iii. an alternate destination, except for entries that are DNs of the PSTN 219.

FIG. 10 indicates that the destination table 259 for the ESN may indicate a variety of call handling destinations 215 for the ESN to which the destination table 213 relates. When a destination 215 is a PSAP 216, the ESN table 390 may point to up to a selected number of additional entries, up to four entries, in the selective transfer table 378. These entries (or data) represent the selective transfer points 225. When the destination 215 of the E9-1-1 call 201 is a PSAP 216, the router process 360 forwards all of the selective transfer data related to that ESN to the psap process 361, which forwards it to the appropriate wscp process 368. The selective transfer points 225 are displayed on the PSAP screen 222 if the E9-1-1 call 201 is routed or transferred to one of the PSAPs 216 of the system 200. If the destination 215 is not a PSAP 216, the selective transfer data is not used.

Referring to FIG. 10, the destination 215 in the destination table 259 is indicated by the following entries:

1. "dest table index" is the record number entry in table/linear numbering.
2. "dest label" is the short name used to identify the destination 215. This name is displayed to PSAP attendants 221 and written to log files.
3. "dest comment field" is a longer description of the destination 215 used for administration record keeping.

4. "busy signal flag" indicates that the alternate destination 215 for the destination 215 is a busy signal 220.
5. "alternate dest number" identifies an alternate destination to which the E9-1-1 call 201 is directed if the primary destination 215 cannot accept the E9-1-1 call 201.

If the destination is of the type PSTN 219, the DN in the PSTN 219 is pointed to. If the destination is a DN serviced by the switch 218, the DN in the switch 218 is pointed to. If the destination is a PSAP 216, a record in the PSAP table 395 is pointed to, to identify the PSAP 216.

An entry in the ESN table 390 may also indicate that the ESR 202 is to receive a busy signal 220. This allows all E9-1-1 calls 201 destined for a particular ESN to be routed to the busy signal 220 as described in respect to FIG. 19, Steps 7 and 34, for example.

13. Destination Inspection. The router process 360 receives the entry from the destination table 259 by a table lookup. If the call handling destination 215 is a PSAP 216, status information about the PSAP 216 is inspected (FIG. 20, Steps 105, 106 and 104) in the following order before the E9-1-1 call 201 is routed:
  1. PSAP Abandoned: If the router process 360 determines that the PSAP 216 is defined to be in the "abandoned" state, the router process 360 routes the E9-1-1 call 201 to the alternate destination 215 (FIG. 20, Step 109) specified for the destination 215 and performs destination inspection on the new destination (FIG. 20).
  2. PSAP Night Service: If the PSAP Night Service schedule 262 coincides with the current date and time $t_c$, or if the Night Service override is active, the E9-1-1 call 201 is handled according to the Night Service feature.
  3. PSAP Call Capacity: The router process 360 determines whether call capacity is administered (FIG. 25, line 11 of the screen 222). If sod the router process 360 inspects (a) the number of E9-1-1 calls 201 that are currently being handled at the PSAP 216 plus those that are in the hunt group queue 243, against (b) the administered call capacity depth (FIG. 25, line 12). The E9-1-1 call 201 is directed to the PSAP 216 in the event that the number (b) is greater than the number (a), or Alternate Routing is invoked in the event that the numbers (a) and (b) are equal or the number (a) is greater than the number (b).

If the primary destination specified in the destination table 259 is a switch DN, the router process 360 redirects (FIG. 19) the E9-1-1 call 201 to that DN without any further analysis. If the E9-1-1 call 201 cannot be redirected to the DN (i.e., a switch redirect-call command fails because the DN does not exist or is busy), the system 200 will attempt to route the E9-1-1 call 201 to the alternate destination specified through the destination table 259. If the primary destination 215 specified in the destination table 259 is a PSTN DN, the router process 360 redirects the E9-1-1 call 201 to that DN without any further analysis. If the attempt to route the E9-1-1 call 201 to the PSTN DN fails (redirect command fails), the E9-1-1 call 201 will be routed to busy 220.

14. If the destination 215 of the E9-1-1 call 201 is a PSAP 216, the router process 360 causes the switch 218 to redirect the E9-1-1 call 201 from the PDN to the hunt group 333 DN which is associated with that PSAP 216. The hunt group 333 has only one member, which is the common notification line 241 DN of that PSAP 216. E9-1-1 calls 201 at the common notification line 241 of a PSAP 216 can be answered by any attendant 221 at the given PSAP 216.

The router process uses a redirect-call command of the HCI 282 to change the ringing destination from the PDN to the PSAP hunt group 333 (see FIG. 4). The switch 218 generates a call status message 288 when the PSAP hunt group 333 becomes the ringing destination 215. The call status message 288, is sent to the psap process 361. In response to the redirect-call message sent to the switch 218, the switch 218 causes the <route determined> message 288 corresponding to the trunk 206 to be sent to the AP 234, verifying that the E9-1-1 call 201 has been redirected to the hunt group 333. Also, an <idle> HCI message 288 is generated for the PDN.

Before the router process 360 initiates the redirect-call switch request, it sends an incoming call message 288 to the psap process 361. The incoming call message 388 notifies the psap process 361 to expect an incoming E9-1-1 call 201 and identifies the attributes of the E9-1-1 call 201. The incoming call message 288 to the psap process 361 includes:
  1. i.d. of the inbound trunk 206,
  2. ANI-TN if available,
  3. NPD,
  4. call reference value ("call_ref") assigned to this E9-1-1 call 201 by the switch 218,
  5. call routing mechanism (i.e., Selective Routing, Alternate Routing, ... ),
  6. the ESN,
  7. selective transfer labels,
  8. the time at which the E9-1-1 call 201 was received, and
  9. the time at which the E9-1-1 call was routed.

The PSAP process 361 matches (or maps) the incoming call message 288 to the call status message 288 received from the switch 218 for the DN of the PSAP notification line 241. Using the trunk i.d. and ANI-TN found in the message 288 from the router process 360 and the call status from the switch 218. This mapping allows the psap process 361 and the wscp process 368 to display ALI and call routing information to the answering attendant 221.

Any number of E9-1-1 calls 201 can be routed to the DN of the PSAP hunt group 333. The E9-1-1 calls 201 are placed in the hunt group 333 and routed to the common notification line 241 of the corresponding PSAP 216 on a first in first out (FIFO) basis. Each time the notification line 241 becomes idle, the next E9-1-1 call 201 in the hunt group queue 243 is directed to the notification line 241. The psap process 361 is notified of an E9-1-1 call 201 at the notification line 241 by a <seized/new-call> HCI message 288. The E9-1-1 call 201 ringing at that notification line 241 is picked up by the first PSAP attendant 221 to invoke the pickup operation from the attendant's workstation 212.

The AP 234 does not fully determine how many E9-1-1 calls 201 are at a hunt group 333 of a PSAP 216. The router process 360 and the psap process 361 attempt to determine the E9-1-1 calls 201 by tracking the E9-1-1 calls 201 which are directed to the hunt group DN by the AP 234. The above description does not relate to any E9-1-1 Calls 201 that may have been directed to the PSAP 216 via transfers, Switch Default routing, or other calls originated by the platform 204.

15. Routing an E9-1-1 Call 201 to a DN on the Switch 218. When the destination of an E9-1-1 call 201 is a DN on the switch 218, the router process 360 performs the redirection without trying to determine the DN's status. That is, the AP 234 does not check to see if the DN is busy or a valid number on the switch 218. The AP 234 initiates this redirection by sending a command to the switch 218 to redirect the E9-1-1 call 201 and the <route-determined> and <idle> messages 288 are generated as described above with respect to directing an E9-1-1 call 201 to a PSAP 216. The switch 218 indicates that the connection of the E9-1-1 call 201 to the DN has been established by causing the <route-determined> message 288 of the HCI 282 to be sent to the AP 232 and no further action is taken by the router process 360 to ensure that the E9-1-1 call 201 is answered. If the E9-1-1 call 201 cannot be routed to the DN, the switch 218 generates a failure message 288. In response, the router process 360 tries to route the E9-1-1 call 201 to other destination 215 based upon the current routing method. (See FIG. 19, Step 12 or 25).

In the event that the ESR 202 hangs up (e.g., disconnects the E9-1-1 call 201 by hanging up the ESR's handset 207), the incoming trunk 206 is released, and the router process 360 makes a call entry log in the system call log file 408 (FIG. 9) if the E9-1-1 call 201 was not directed to a PSAP 216.

16. Routing an E9-1-1 Call 201 to a DN on the PSTN 219. When the call handling destination 215 of an E9-1-1 call 201 is a DN on the PSTN 219, the router process 360 performs the redirection in the manner described above for the redirection of an E9-1-1 call 201 to a DN on the switch 218. This redirection is also done without trying to determine the status of the DN of the destination 215. The switch 218 indicates that the redirection request was successful by causing the <route-determined/dest seized> message 288 to be sent to the AP 234, in which event no further action is taken by the router process 360 to ensure that the E9-1-1 call 201 is answered. The system 200 does not take steps to assure that the E9-1-1 call 201 is answered because an answer supervision function is not provided to the switch 218 through the PSTN 219. Thus, the DN on the PSTN 219 could actually be busy, but no further action will be taken by the system 200. If the router process 360 cannot redirect the E9-1-1 call 201 it routes the E9-1-1 call 201 to a busy signal 220. (FIG. 19, Steps 12 or 25.) The AP 234 makes no special considerations to modify the dialable number when routing an E9-1-1 call 201 to the PSTN 219. It is assumed that the switch dial plan features of the switch 218 will handle all dial plan and trunk selection issues.

When the incoming trunk 206 is released, the router process 360 makes a call entry in the system call log file 408. The router process 360 determines that the trunk 206 has been released when the router process 360 receives an <idle> call status message 288 associated with the trunk 206.

17. Routing to a Busy Signal 220. When routing to a busy signal 220, the E9-1-1 call 201 is directed to a trunk group of loop back lines 337 (FIG. 4). The outgoing trunks 302 will operate successfully, but the incoming trunk ports, via trunk services assignment, will fail digit translation and result in the generation of a busy signal 220 by the switch 218. These outgoing trunks 302 are administered such that any outgoing calls 318 over these trunks 302 to unassigned numbers on the switch 218 will cause the switch 218 to generate the busy tone 220. If more E9-1-1 calls 201 are directed to the busy signal 220 than there are loop back trunks 302 available, the AP 234 redirect request (the redirect-call command) to the switch 218 will fail and the AP 234 will drop the E9-1-1 call 201 by disconnecting the inbound 9-1-1 trunk 206.

If the E9-1-1 call 201 cannot be routed to the DN of the trunk group 328, the E9-1-1 call 201 is disconnected by releasing the inbound 9-1-1 trunk 206. A system error message 288 is produced describing the failure and all relevant information about the E9-1-1 call 201.

There are three conditions where an E9-1-1 call 201 can be routed to a busy signal 220:
1. when it is specified as the destination 215 for an ESN in the ESN table 390,
2. when it is specified as the alternate destination for an entry in the destination table 259, and
3. when it is the last resort if the router process 360 cannot direct the E9-1-1 call 201 all to any other destination 215 (FIG. 19, Step 34).

18. Default Routing. Default routing is based on the identification of the trunk 206 on which the E9-1-1 call 201 was received by the router process 360. Trunk administration on the AP 234 can specify that every E9-1-1 call 201 received over a particular trunk 206 will be routed to a particular destination 215. This destination 215 is specified by a destination table entry reference in the trunk table 374.

Every trunk 206 has a default destination 215 specified. An E9-1-1 call 201 can be Default Routed for the following reasons (FIG. 19, Step 14):
1. Trunk table administration specifies that all E9-1-1 calls 201 received over a trunk 206 are routed to the default destination 215 (via turning off Selective Routing for the trunk 206).
2. The emergency E9-1-1 call 201 did not include ANI, or ANI was not received correctly or completely.
3. The ANI that was received combined with the NPD assigned to the trunk 206 in the trunk table administration does not match an entry in the TN/ESN table.
4. The ESN produced from the TN/ESN table 213 does not match an entry in the ESN table 390.
5. An administration table (not shown) on the AP 234 contains an invalid reference (such as the ESN table 390 does not reference a valid destination table entry.)

If the default destination 215 defined in the trunk table 374 is not valid, last chance routing is attempted.

19. Switch Default Routing. This performed by the native switch facilities, Call Rerouting/Call Forward No Answer administration for PDN hunt groups 333. Switch Default Routing is invoked by the switch 218 when the AP 234 does not respond within a specified time period to the switch 218 after a E9-1-1 call 201 has arrived at a PDN 333. The AP 234 may not have responded because of a failure of the AP 234, a messaging performance problem, or a failure of the HCI link 283.

The switch default routing DN should be the same as the default routing destination administered on the AP 234 in the trunk table 374 (FIG. 11). However, there is no capability to synchronize these two pieces of data between the AP and the switch. A timer 632 is set by the switch 218 when a E9-1-1 201 is sent to the PDN hunt group 333. The value of the timer 632 is initially set to the call forward no answer value found in the Class of Service Administration for the PDN hunt group 333. The PDN hunt group administration Call Reroute feature redirects the E9-1-1 call 201 to the default DN if the AP 234 does not send commands to the switch 218 to redirect call before the timer 632 expires. This switch default DN can be any DN recognized by the switch 218. If more than one trunk group 328 has the same Switch Default Routing destination, the E9-1-1 calls 201 from both end offices 205 (ESCOs) can be routed to the same PDN hunt group DN 333. If the switch 218 routes using Switch Default Routing, no consideration can be given to PSAP call capacity administration that may have been specified on the AP 234.

20. Alternate Routing. The destination table 259 defines a primary destination 215 and an alternate destination 215 (unless the destination 215 is a DN on the PSTN 219). The alternate destination 215 can be defined as another entry in the destination table 259 or busy signal 220. An entry in the destination table 259 cannot specify itself as the alternate destination 215. AP administration of the AP 234 attempts to enforce this requirement by verifying the administered data before allowing updates to administration data.

If the primary destination 215 cannot receive the E9-1-1 call 201 for any reason (i.e., except that the destination is in Night Service) the destination's alternate destination is used. If the destination is in Night Service the Night Service destination 215 (FIG. 24) is the next destination to which an attempt is made to route the E9-1-1 call 201. If the new destination in the alternate entry cannot receive the E9-1-1 call 201, its alternate specification is used (exception for Night Service). This link list search for a destination 215 that can accept the E9-1-1 call 215 continues until a destination already inspected is inspected again. This prohibits an infinite loop through destination entries. If Alternate Routing does not produce an available destination 215, either because of the link list search loop detection or because the destination entry's reference is invalid, Default Routing is invoked. If Default Routing had already been applied, Last Chance routing is invoked.

21. Last Chance Routing. Last Chance routing involves sequential search through the destination table 259 looking for entries that define a potential destination 215. PSAPs are inspected before DNs. If no destination entry defining an available destination 215 is found, the caller 201 is redirected to a busy signal 220. Any invocation of Last Chance routing causes a system error log entry to be made recording the ESR's TN, the trunk 206, the failure reason, the call history, and the final routing destination 215.

22. Night Service Routing. Night Service Routing is the ability to redirect E9-1-1 calls 201 based on a day and time schedule, the Night Service schedule 371. The destination 215 and Night Service schedule 371 is determined through administration on the AP 234 (FIG. 24). If the primary destination 215 is in Night Service, an attempt is made to route to E9-1-1 call 201 to the Night Service destination 215 (FIG. 19, Steps 106, 114, 115).

23. Abandoned PSAP. The Abandoned PSAP feature operation is shown in FIG. 20, Steps 105, 109, 111 and 116.

Specific Description-Night Service

Figure 75:
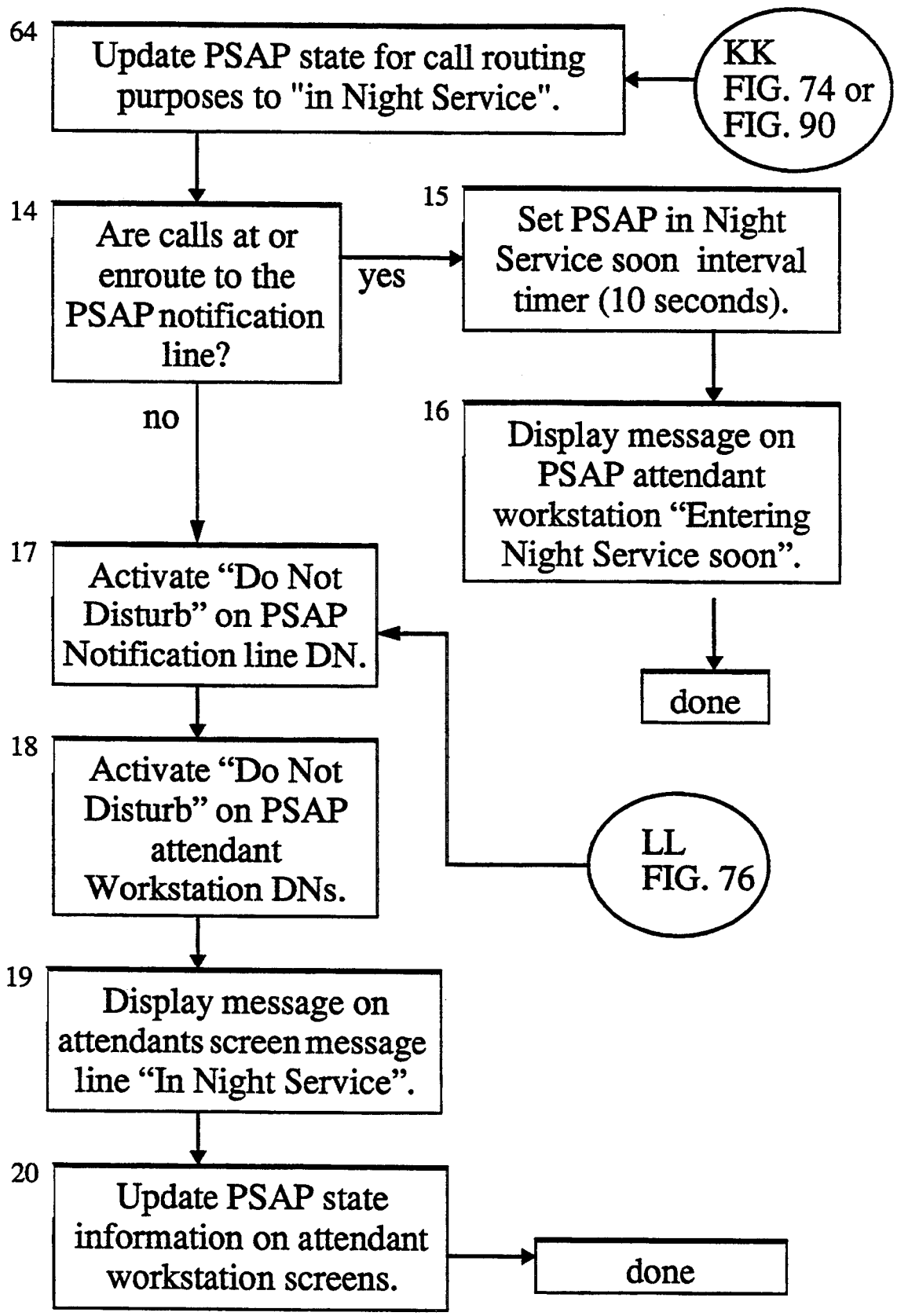

As may be understood from the above description, the term "Night Service" is used to refer to the intentional interruption of the normal operation of a PSAP 216. Generally, such interruption may be scheduled or unscheduled. If scheduled, such interruption may be according to the Night Service schedule 262 (FIGS. 23 and 75). The Night Service schedule 262 defines the interruption to (1) start at a particular time $t_s$, (2) be of a selected duration, or period of time, which is referred to as a "night service interval" ($\Delta t_{ns}$), and (3) end at a particular time ($t_e$). When "in" night service, the PSAP 216 is not available to handle any incoming E9-1-1 calls 201. Since the platform 204 is a state machine, the state or condition of a PSAP 216 may generally be referred to as "active," which represents normal operation of the PSAP 216, or "inactive," which represents interruption of the active state. Thus, when the PSAP 216 is not available to handle incoming E9-1-1 calls 201, it is in the "inactive" state. When the PSAP 216 is not Abandoned and not in Night Service, it is in the "active" state.

A night service interval $\Delta t_{ns}$ may be started or ended on an unscheduled basis by overriding the night service schedule 262. An "in early" override 630 (FIG. 21) places the PSAP 216 into Night Service "early," i.e. before the next scheduled night service interval $\Delta t_{ns}$. If there is no scheduled night service interval, the in early override 630 may still be used to place the PSAP 216 in Night Service. In this event, the PSAP 216 stays in Night Service until an "out early" override 631 is invoked, or until the end of a night service interval $\Delta t_{ns}$ that is scheduled after the in early override 630 is invoked. The "out early" override 631 takes the PSAP 216 out of night service "early," i.e. before the end of a current night service interval $\Delta t_{ns}$. In this sense, the in early and out early overrides 630 and 631, respectively, cause the night service schedule 262 to be ignored or disregarded.

The times $t_s$ and $t_e$ which define a night service interval $\Delta t_{ns}$, and a ten second time period described below, are provided by a timer 632 (FIG. 6) of the VOS operating system. The process 351 which requires a signal 634 to indicate a particular time sends a "timer request" to a timer control process 638 shown in FIGS. 91(a) and 91(b). The timer control process 638 controls which timer requests are sent to the VOS operating system (FIG. 6). The process 351 making the timer request includes in such request a timer event_label. The timer 632 returns the event_label with the signal 634. Referring to FIG. 68, a timer event table 639 relates each event_label to a particular PSAP 216 for which the timer signal 634 is required (e.g., for time $t_s$ for a given PSAP 216 in which is to be placed in Night Service).

Referring to FIGS. 91(a) and 91(b), it may be appreciated that there is one timer 632, yet there may be many times (e.g., $t_s$, $t_e$, for many $\Delta t_{ns}$) which must be signalled during operation of the system 200. The timer control process 638 manages a timer request list 640, and submits to the timer 632 of the VOS operating system only the one timer request which is for the next event to be signalled. In FIG. 68(b), the timer request designated "0600 8/16/91" calls for a signal 634 before the time of the desired signals 634 of the next two timer requests.

The timer control process 638 starts upon receipt of a timer request from the application program 351.

Step 1: The first determination made is whether the timer 632 is actively timing in response to a previously submitted timer request. For example, referring to FIG. 68(b), if the new timer request is submitted after the timer request "0600 8/16/91", then the timer 632 would have started operating with respect to that existing timer request. However, if the timer 632 was not currently operating, then a "no" branch is taken to Step 5. If, however, the timer 632 is timing based on a previous timer request, a "yes" branch is taken to Step 2.

Step 2: This determination relates to the time at which the current timer request requests that the signal 34 be generated by the timer 632. If the "0700 8/16/91" timer request is being processed, and if the "0800 8/16/91" timer request had previously been received then a "yes" branch would be taken to Step 3.

Step 3: Considering the example of the "0700 8/16/91" new timer request, the operation of the timer 632 with respect to the "0800 8/16/91" timer request would be terminated, and a branch would be taken to Step 4.

Step 4: The timer control process 638 then manages the timer request list by inserting the "0600 8/16/91" timer request in the list before the "0700 8/16/91" timer request, and a branch is taken to Step 5.

Step 5: With the "0600 8/16/91" timer request now at the head of the timer request list (FIG. 68(b)), that timer request is submitted to the VOS operating system.

If in Step 2 the new timer request was not requesting a signal 634 prior to the time of any previous timer request in the timer request list 640 shown in FIG. 68(b), then the "no" branch is taken to B, shown on FIG. 91(b).

Step 6: Reference is made in Step 6 to the timer request list 640 to determine whether there are any timer requests on the list 640. Since the new request was not prior to the signal time of the timer request which the timer 632 was then timing, the new timer request could be either the "0700 8/16/91" timer request or the "0800 8/16/91" timer request. Since in this example, there are timer requests on the list 640, a "yes" branch would be taken to Step 7.

Step 7: As indicated in FIG. 68(b), the list 640 is maintained in time sequence, listing the timer requests which request the earliest signal 634 first, etc. In Step 7, the new request, e.g., the "0700 8/16/91" request would be determined to fit between the first and third timer requests shown in the list 640. Then a branch would be taken to Step 8.

Step 8: In Step 8, the "0700 8/16/91" timer request would be inserted into the list 640 as shown in FIG. 68(b). At that juncture, the timer request for the "0700 8/16/91" timer request has been processed.

Step 9: If there were no timer requests on the list 640 of outstanding timer requests, then a "no" branch is taken to Step 9. Here, the incoming timer request would automatically be a timer request requesting the earliest signal, such that this timer request would be placed at the beginning of the list 640, and the timer request would have been processed.

Night Service provided by a schedule 262 or by an in early override 630 allows the C.E.R.S. system 200 to make efficient use of PSAP attendants 221. In particular, as discussed above, historic records for service areas 208 indicate that there are many periods of time during a twenty-four hour day or a seven day week in which a low number of E9-1-1 calls 201 are received by a given PSAP. These periods are referred to as "low traffic" periods and are the opposite of "busy hours." By the present invention, during such low traffic periods the given PSAP 216 can be scheduled (whether during the "day" or the "night") for Night Service. When designating the given PSAP 216 to be in Night Service, it is possible to designate that those E9-1-1 calls 201 which normally would be routed to the given PSAP 216 be routed to another destination 215 rather than to the given PSAP 216. During Night Service, it is not necessary to staff the given PSAP 216 with attendants 221.

The other destination 215 (which may be another PSAP 216) to which such E9-1-1 calls 201 are to be routed will have enough attendants 221 on duty to handle all of the expected or normal number of E9-1-1 calls 201 to be routed to it and to the given PSAP 216 while the given PSAP 216 is in Night Service.

Administration: Among other things, the word "administration" is used to refer to the processes of establishing (1) a night service schedule 262 for each of the PSAPs 216 of the platform 204 and/or (2) the in early override 630 and the out early override 631 for a given PSAP 216. During administration of any PSAP 216, a new night service schedule 262 may be established, or an existing (or current) night service schedule 262 may be revised or deleted, or one of the overrides 630 and 631 may be set. Also, a night service destination 215 may be selected for each night service interval. With respect to E9-1-1 calls 201 which would normally be routed to a given PSAP 216 that is in Night Service, such night service destination 215 is a destination 215 other than the given PSAP 216 to which such E9-1-1 calls 201 are to be routed until the given PSAP 216 returns to the Active state.

As described above, night service administration may be performed to different extents by various personnel who work at the platform 204 or at a given PSAP 216 of the platform 204. To initiate night service administration for a given PSAP 216, the given PSAP 216 is selected. When the screen 222 displays the administration main menu 513 (FIG. 50). For invoking an early or an out early override 630 or 631, respectively, as a part of night service administration, this menu 513 has a "cancel/activate night service" option which is available to all administrators (including PSAP attendants 221) without the use of a password. For administering the night service schedule, such menu 513 also includes a "perform restricted PSAP administration" option, which may be accessed only by a password.

Override Administration: An override entry 630 or 631 in the administered PSAP table 382 (FIG. 21) is set during administration (e.g. at $t_{ia}$ in FIG. 62) as follows. The PSAP administration main menu screen 222 (FIG. 50) is used by the attendant 221 to take the PSAP 216 into or out of Night Service. By highlighting the first option, "Cancel/Activate Night Service" and pressing the "Enter" key 263 of the terminal keyboard 228 (FIG. 16), a confirmation window 514 (not shown) appears on the lower portion of the screen 222. If the PSAP 216 is in Night Service, the message 240 in the confirmation window 514 reads:

"Cancel Night Service? (Y/N)"

If "Y" is pressed and entered, the entry in the administered PSAP table 382 (FIG. 21) for the given PSAP 216 is changed to "out early". If the PSAP 216 is not in Night Service, the message 240 in the confirmation window 514 will read:

"Activate Night Service? (Y/N)".

If "Y" is pressed and entered the PSAP 216 will be administered for Night Service by the override entry in the administered PSAP table 382 (FIG. 21) changing to "in early". To close the PSAP administration main menu 513 (FIG. 50), the attendant 221 presses the "Admin." key 263 or presses "Ctrl-x" (FIG. 16).

The following Night Service Chart refers to files and routines set forth in the Microfilm Appendix, where the Steps are those depicted in the flow charts of FIGS. 71-90.

Night Service Chart

| Steps In FIGS. 71-90 | file | routine | line |
|---|---|---|---|
| 1 | rtr_nite_srvc.c | init_nite_srvc () | 156 |
| 2 | rtr_nite_srvc.c | init_nite_srvc () | 209 |
|   | rtr_nite_srvc.c | set_alarms () | 420 |
| 3 | rtr_nite_srvc.c | init_nite_srvc () | 238 |
|   | rtr_nite_srvc.c | set_alarms () | 676 |
| 4 | rtr_alrm_hndlr.c | alarm_handlr () | 154 |
| 5 | rtr_alrm_hndlr.c | alarm_handlr () | 170 |
| 6 | rtr_alrm_hndlr.c | alarm_handlr () | 199 |
| 7 | rtr_alrm_hndlr.c | alarm_handlr () | 172 |
| 8 | rtr_alrm_hndlr.c | alarm_handlr () | 231, 233 |
| 9 | rtr_alrm_hndlr.c | alarm_handlr () | 248 |
| 10 | rtr_alrm_hndlr.c | alarm_handlr () | 269 |
| 11 | rtr_nite_srvc.c | invoke_nite_srvc () | 790 |
| 12 | rtr_alrm_handlr.c | alarm_handlr () | 200 |
|   | rtr_nite_srvc.c | set_alarms () | 421 |
|   | rtr_nite_srvc.c | init_nite_srvc () | 211 |
|   | p_handle_state_change.c | p_handle_state_change () | 270 |
| 13 | rtr_nite_srvc.c | invoke_nite_srvc () | 760 |
| 14 | p_handle_state_change.c | p_handle_state_change () | 253 |
| 15 | p_handle_state_change.c | p_handle_state_change () | 255 |
| 16 | w_ar.c | w_psap_state () | 2469 |
|   | w_ar.c | w_psap_state () | 2557 |
| 17 | p_handle_state_change.c | p_handle_nl_timer | 471 |
| 18 | p_handle_state_change.c | p_dnd_wkst | 346 |
| 19 | w_ar.c | w_psap_state () | 2474 |
| 20 | w_ar.c | w_psap_state () | 2453 |
|   | w_ar.c | w_psap_state () | 2564 |
| 21 | p_handle_state_change.c | p_handle_state_change () | 157, 166, 171 |
|   | rtr_alarm_handlr.c | alarm_handler () | 253 |
| 22 | rtr_alarm_handler.c | end_nite_srvc () | 343 |
| 23 | p_handle_state_change.c | p_handle_state_change () | 174 |
| 24 | w_ar.c | w_psap_state () | 2453 |
| 25 | w_ar.c | w_psap_state () | 2557 |
|   | w_ar.c | w_psap_state () | 2564 |
| 26 | rtr_alrm_hndlr.c | alarm_handler () | 269 |
| 27 | rtr_update_data.c | update_ns_data () | 221 |
| 28 | rtr_nite_srvc.c | set_alarms () | 369 |
| 29 | rtr_nite_srvc.c | cur_tick_ndx () | 397 |
| 30 | rtr_nite_srvc.c | set_alarms () | 409 |
| 31 | rtr_nite_srvc.c | set_alarms () | 436 |
| 32 | rtr_update_data.c | update_ns_data () | 249 |
| 33 | rtr_update_data.c | update_ns_data () | 269 |
| 34 | rtr_nite_srvc.c | set_alarms () | 420 |
| 35 | rtr_nite_srvc.c | set_alarms () | 461 |
| 35A | rtr_nite_srvc.c | set_alarms () | 463 |
| 36 | rtr_nite_srvc.c | set_alarms () | 489 |
| 37 | rtr_nite_srvc.c | set_alarms () | 508, 509 |
| 38 | wal_night_override.c | wal_night_override () | 154 |
| 39 | rtr_update_data.c | ns_over_update () | 61 |
| 40 | rtr_update_data.c | ns_over_update () | 68 |
| 41 | rtr_update_data.c | ns_over_update () | 99 |
| 42 | rtr_update_data.c | ns_over_update () | 84 |
| 43 | rtr_update_data.c | ns_over_update () | 106, 176 |
| 44 | rtr_update_data.c | ns_over_update () | 108 |
| 45 | rtr_update_data.c | ns_over_update () | 130 |
| 46 | rtr_update_data.c | ns_over_update () | 138 |
| 47 | rtr_update_data.c | ns_over_update () | 150 |
| 48 | rtr_update_data.c | ns_over_update () | 121, 141, 184 |
| 49 | rtr_nite_srvc.c | init_nite_srvc () | 164, 231 |
| 50 | rtr_nite_srvc.c | init_time_ns_check () | 1040 |
| 51 | rtr_nite_srvc.c | init_time_ns_check () | 1066 |
| 52 | rtr_nite_srvc.c | init_time_ns_check () | 1054 |
| 53 | rtr_nite_srvc.c | init_time_ns_check () | 1078 |
|   | rtr_nite_srvc.c | set_alarms () | 420 |
| 54 | rtr_nite_srvc.c | init_time_ns_check () | 1057 |
|   | rtr_nite_srvc.c | init_nite_srvc () | 228 |
| 55 | rtr_nite_srvc.c | init_time_ns_check () | 1076 |
| 55 | rtr_nite_srvc.c | set_alarms () | 397 |
| 56 | rtr_nite_srvc.c | init_time_ns_check () | 1088 |
|   | rtr_nite_srvc.c | set_alarms () | 454 |

-continued

Night Service Chart

| Steps In FIGS. 71-90 | file | routine | line |
|---|---|---|---|
| 57 | rtr_nite_srvc.c | init_time_ns_check () | 1102 |
| 58 | rtr_nite_srvc.c | init_time_ns_check () | 1125 |
| 59 | rtr_nite_srvc.c | init_time_ns_check () | 1104 |
| 60 | rtr_nite_srvc.c | init_time_ns_check () | 1134 |
| 61 | rtr_nite_srvc.c | init_time_ns_check () | 1136 |
| 62 | rtr_nite_srvc.c | init_time_ns_check () | 1145 |
| 63 | rtr_nite_srvc.c | init_time_ns_check () | 1112, 1125 |
| 64 | rtr_alarm_hndlr.c | alarm_handler () | 202 |
|  | rtr_nite_srvc.c | set_alarms () | 423 |
|  | rtr_nite_srvc.c | init_nite_srvc () | 214 |
| 65 | rtr_alarm_hndlr.c | alarm_handler () | 258 |
| 66 | p_handle_state_change.c | p_handle_state_change () | 179 |
| 67 | p_handle_state_change.c | p_handle_state_change () | 180 |
| 68 | rtr_alarm_hndlr.c | alarm_handler () | 180 |
| 69 | rtr_nite_srvc.c | invoke_nite_srvc () | 773 |
| 70 | rtr_nite_srvc.c | invoke_nite_srvc () | 808 |
| 71 | rtr_nite_srvc.c | init_time_ns_check () | 1052 & 1066 |
| 72 | rtr_update_data.c | update_psap_data () | 1603, 1605 |
| 73 | rtr_update_data.c | update_psap_data () | 1607, 1612 |
| 74 | rtr_update_data.c | update_psap_data () | 1603, 1614 |
| 75 | rtr_update_data.c | update_psap_data () | 1626 |
| 76 | rtr_update_data.c | update_psap_data () | 1651 |
| 77 | rtr_ns_utils.c | rtr_ns_check () | 266 |
| 78 | rtr_ns_utils.c | rtr_ns_check () | 282 |
| 79 | rtr_ns_utils.c | rtr_ns_check () | 288 |
| 80 | rtr_ns_utils.c | rtr_ns_check () | 284 |
| 81 | rtr_ns_utils.c | rtr_ns_check () | 301 |
| 82 | rtr_ns_utils.c | rtr_ns_check () | 325 |
| 83 | rtr_ns_utils.c | rtr_ns_check () | 328 |
| 84 | rtr_ns_utils.c | rtr_ns_check () | 327 |
| 85 | rtr_ns_utils.c | rtr_ns_check () | 341 |
| 86 | rtr_ns_utils.c | rtr_ns_check () | 343 |
| 87 | rtr_ns_utils.c | rtr_ns_check () | 344 |
| 88 | rtr_nite_srvc.c | invoke_nite_srvc () | 760 |
| 89 | rtr_nite_srvc.c | invoke_nite_srvc () | 773 |
| 90 | rtr_nite_srvc.c | invoke_nite_srvc () | 775 |
| 91 | rtr_nite_srvc.c | invoke_nite_srvc () | 786 |
| 92 | rtr_nite_srvc.c | invoke_nite_srvc () | 790 |
| 93 | rtr_nite_srvc.c | invoke_nite_srvc () | 802 |
| 94 | rtr_nite_srvc.c | invoke_nite_srvc () | 808 |
| 95 | p_handle_state_change.c | p_handle_state_change () | 465 |
| 96 | p_handle_state_change.c | p_handle_state_change () | 466 |

Step 38: The Night Service Chart and FIG. 81 direct attention to Step 38 which refers to a wal_night_override.c file. A wal_night_override () routine therein, starting at line 57, responds to the commands from the keyboard 228 starting with the selection of the first option "cancel/activate night service?" Referring to line 67, a database record corresponding to the PSAP table 382 (FIG. 21) for the given PSAP 216 is read. Then, after determining that the given PSAP 216 is not Abandoned (line 91), there is a read (lines 97–114) of the database record (FIG. 21) for the given PSAP's Night Service schedule 262. As noted, the message 240 in the confirmation window 514 is different depending on whether the given PSAP 216 is or is not in Night Service. This state is determined at line 121, and the instructions at lines 126–143 cause the appropriate message 240 to be displayed in the confirmation window 514, as follows, according to the current state:

Chart NS2

| State | Message |
|---|---|
| in night service | cancel night service Y/N? |

-continued

Chart NS2

| State | Message |
|---|---|
| not in night service | activate night service Y/N? |

In either case, when "Y" is selected, the database record is updated (lines 150–151). At line 153 the selection of the in early override 630 (FIG. 21) or the out early override 631 is made according to the state existing prior to administration. There, nite_mode==FALSE indicates that the state is not in Night Service, and "Y" indicates selection of the in early override 630. When nite_mode==TRUE, the out early override 631 is selected. When "Y" is selected, in either case, at lines 160–161 an instruction to modify the database record causes messages to be sent to the psap process 361 and to the router process 360.

Chart NS3 lists the times of day (t with a subscript) in any twenty-four hour period in which the Night Service state (NS) related and events may occur.

Chart NS3

| Time of Day | Event |
|---|---|
| $t_s$ | Scheduled time for NS to start |
| $t_e$ | Scheduled time for NS to end |
| $t_{ie}$ | Time for NS to start "early" |
| $t_{ia}$ | Time at which $t_{ie}$ was administered |
| $t_{oe}$ | Time for NS to end "early" |
| $t_{oa}$ | Time at which $t_{oe}$ was administered |
| $t_c$ | Current time, e.g., at which initialization is occurring |

The normal operation of the given PSAP 216 involves the handling of E9-1-1 calls 201 routed to it. Such normal operation is interrupted due to a night service interval $\Delta t_{ns}$ by changing an entry for the variable Psap_tbl[i].state in the PSAP table 382 (FIG. 21). This results in changing an entry for the variable Psap_tbl[i].ns_state in a night service state table (FIG. 91) in the router process memory 392 which corresponds to the given PSAP 216. When the latter entry is "in night service", the router process 360 is prevented from routing further E9-1-1 calls 201 to that given PSAP 216 until that given PSAP 216 is no longer in Night Service.

The state of any given PSAP 216 is indicated, for example, by a night service entry for the given PSAP 216 in the router process memory 392. Such entry, and thus such state, may be set (or established) according to the night service schedule 262, if any, existing for the given PSAP 216 upon initialization of the platform 204. Once the platform 204 is in operation, the night service schedule 262 that was previously administered may cause the state of the given PSAP 216 to change, such as from Night Service to Active, or visa versa. Also, during operation of the platform 204, the night service schedule 262 for the given PSAP 216 may be changed as a result of new administration of the C.E.R.S. system 200. Finally, an override condition 630 or 631 may be changed via administration. Depending on the change in such night service schedule 262 or override condition 630 or 61, the state of the given PSAP 216 may immediately or eventually change as directed by the newly administered night service schedule 262 or override condition 630 or 631.

Platform Initialization/Night Service

General: Considering the relationship between (1) a night service schedule 262 for the given PSAP 216 and (2) the initialization of the platform 204, reference is made to FIG. 71. FIG. 711 indicates that Step 1 applies to each PSAP 216 of the platform 204.

Step 1: Determines whether a given PSAP 216 should be in Night Service immediately upon initialization of the platform 204. For a given PSAP which should immediately be in Night Service, the "yes" branch is taken to Step 2. For another PSAP 216 which should not immediately be in night service, the "no" branch is taken to Step 3.

Step 2: Night Service is "invoked" for the given PSAP 216. As described below, this causes the given PSAP 216 to immediately be in Night Service.

Step 3: The timer 632 is set to signal the start $t_s$ of the next scheduled night service interval $\Delta t_{ns}$, if any, for the other PSAP 216 which is not immediately in Night Service.

Platform Initialization/Night Service Detailed Description

The following Step numbers relate to the Steps identified in FIGS. 71-90.

Figure 71:
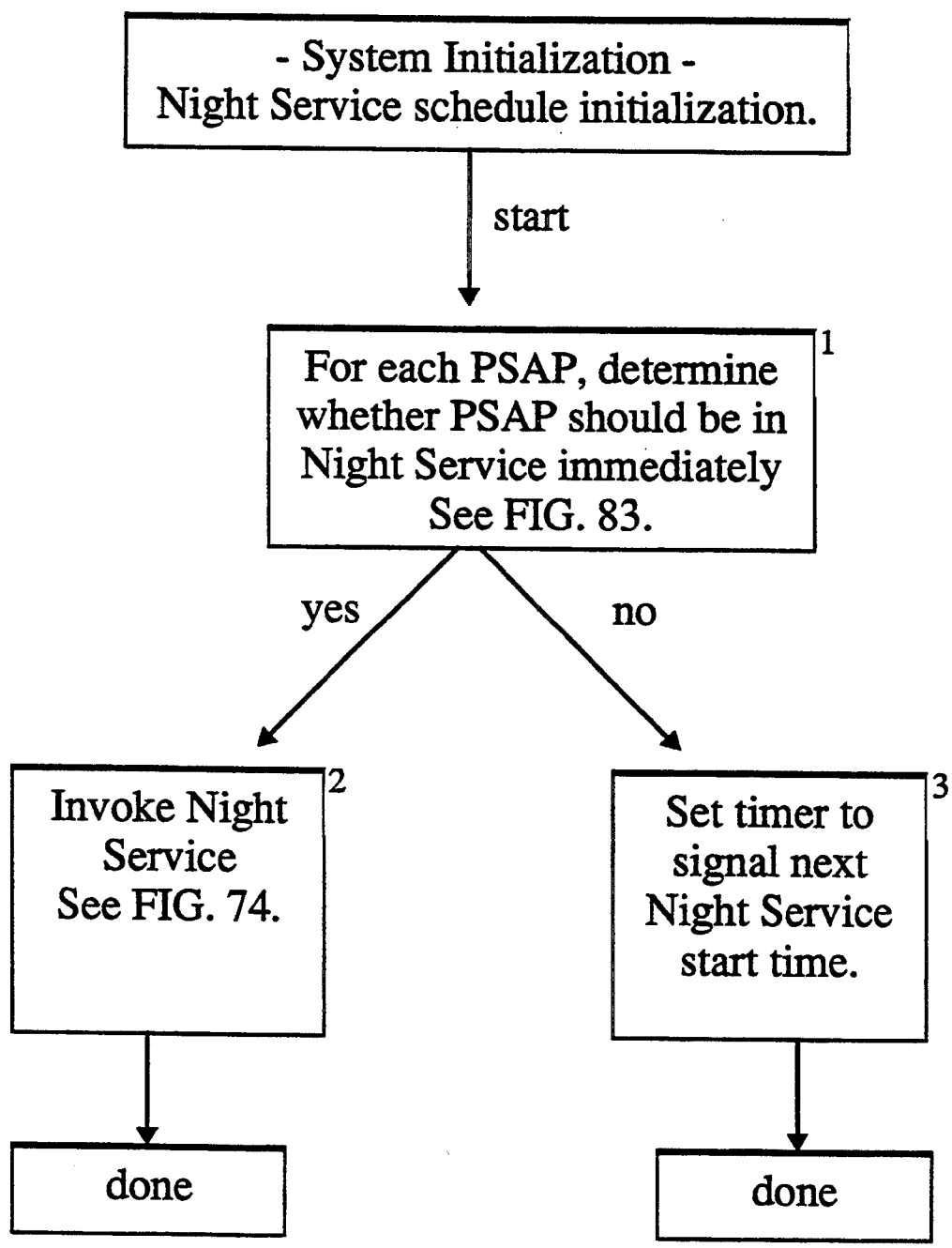
FIGS. 71–90 are flow charts which indicate steps performed by instructions during the operation of the night service feature of the present invention.

Step 1: In greater detail, reference is made to Chart NS1 which relates the steps in FIGS. 71 through 90 to various files, and to routines in such files. Such files and routines are set forth in the Microfilm Appendix. For Step 1, Chart NS1 identifies the rtr_nite_srvc.c file, and line 156 in an init_nite_srvc( ) routine. The init_nite_srvc( ) routine starts at line 130 and is called by the rtr_init( ) routine of the rtr_init.c file at line 322. At line 142 of the init_nite_srvc( ) routine, "Psap_tbl[ ]" is the router process memory 392 for all of the PSAPs 216. The number inserted in the "[ ]" is the index for a given PSAP 216. At line 156, the init_nite_srvc( ) routine includes an instruction to perform Step 1 for each PSAP 216. Step 1 in FIG. 71 is shown in greater detail in FIGS. 83-85 as including Steps 49 through 62 and 71.

Figure 61:
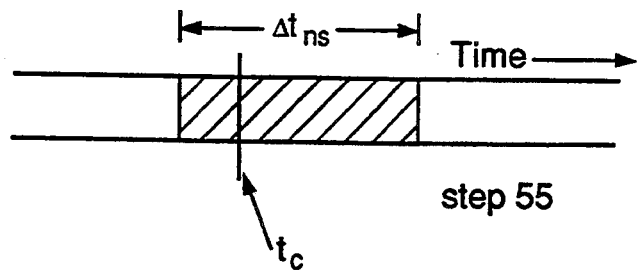
FIGS. 61–65 and FIGS.66(a)–(c) are schematic diagrams showing initialization of the C.E.R.S. system with respect to night service intervals and overrides.

Step 49: Is performed by the init_nite_srvc( ) routine starting at line 164 of the rtr_nite_srvc.c file. In general, it may be understood that if no override 630 or 631 is set or established as of the time of initialization $t_c$, the given PSAP 216 would be in Night Service immediately upon initialization only IF the time of initialization $t_c$ is in a night service interval $\Delta t_{ns}$ (FIG. 61). However, if there is an override 630 or 631 set as of the time $t_c$ of initialization, then there are many situations in which the given PSAP 216 could be immediately in Night Service. For example, referring to FIG. 61 (in early override 630), an attempt may have been made to have the given PSAP 216 enter Night Service on an unscheduled basis via overriding an active part of the night service schedule 262. FIG. 61 shows that at 6:45am, the given PSAP 216 is scheduled to become active, and is to stay in the Active state until 17:00 hours. An in early time $t_{ia}$ is shown at 16:00 hours. The in early time $t_{ia}$ at which the in early override 630 is set for the given PSAP 216 is a time at which the given PSAP 216 is not in Night Service. The current time $t_c$ is the time at which the C.E.R.S. system 200, or the platform 204, is being initialized. FIG. 61 shows that the current time $t_c$ is in this example after the time $t_{ia}$ at which the in early flag 630 had been set. It is noted that for ongoing operation of the C.E.R.S. system 200, the current time $t_c$ would be only moments after the time $t_{ia}$ at which the in early override 630 was set. In this example, the current time $t_c$ is shown in FIG. 61 as still not in the night service interval $\Delta t_{ns}$ next following such in early time $t_{ia}$ (i.e. starting at 17:00 hours). Therefore, the scheduled Active state at the current time $t_c$ would be ignored and Night Service would be invoked for the given PSAP 216.

Figure 83:
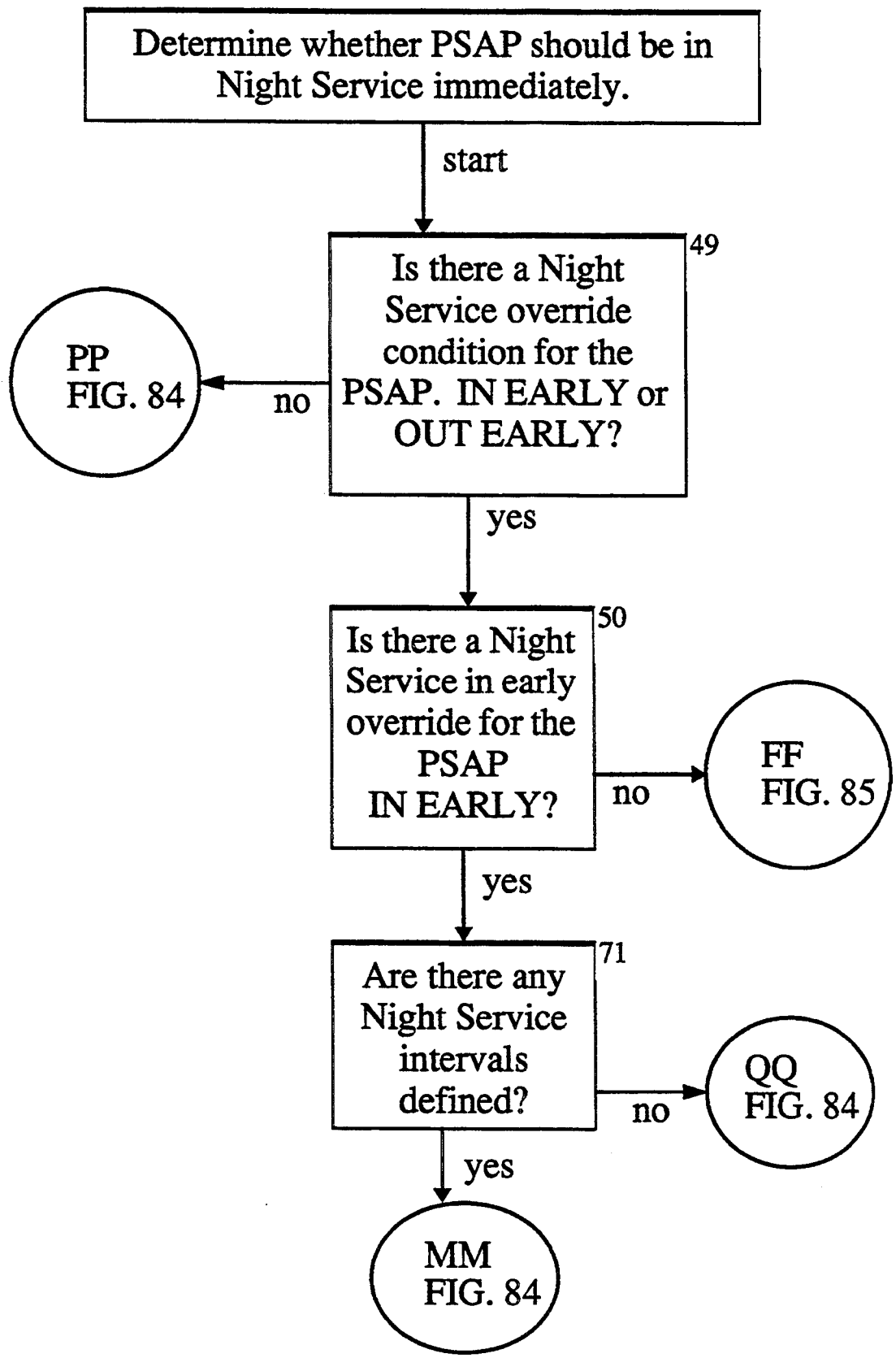

Step 49 includes an instruction at lines 164 and 165 to determine whether, for the given PSAP 216, there is then an in early override 630 or an out early override 631 condition set. If such condition is set as of the time of initialization $t_c$, the PSAP table entry (FIG. 21) Psap_tbl[i].ns_ override will be set to "in early" or "out early", as appropriate such table entries are referred to, or represent, override "flags" and may respectively be called an in early flag 630 and an out early flag 631. FIG. 21 shows that there is a third override flag or setting 633, namely "DISABLED", which does not override an Active state nor a Night Service state. If lines 164 and 165 are answered "no", this means that the DISABLED override flag 633 was set. FIG. 83 indicates that Step 55 is performed as described below. If lines 164 and 165 are answered "yes", FIG. 83 indicates that Step 50 is performed. At line 175 of the init_nite_srvc( ) routine, the init_time_ns_check_( ) routine is called to perform Step 50, described below.

Step 50: The init_time_ns check( ) routine is in the rtr_nite_srvc.c file and starts at line 982 where certain parameters are passed in. These include parameters representing the override flag 630 or 631 ("override_ flag") and the override time ("override_time"), which is denoted "$t_{ia}$" for the in early flag 630 and "$t_{oa}$" for the out early flag 631. At line 1040 Step 50 determines whether the override was an "in early" override flag. If Psap_tbl[i].ns_override (FIG. 21) was set to the in early flag 630 (as indicated by override_flag==IN EARLY at line 1040), then Step 71 is performed.

Figure 62:
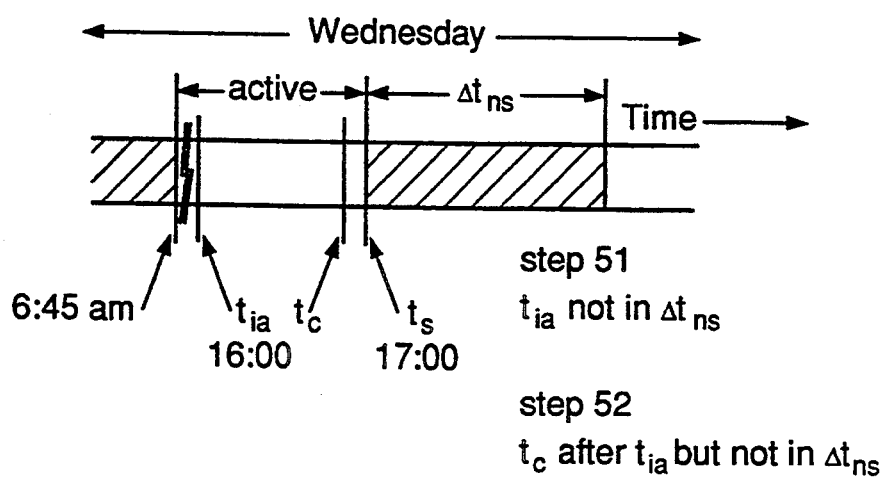
Figure 65:
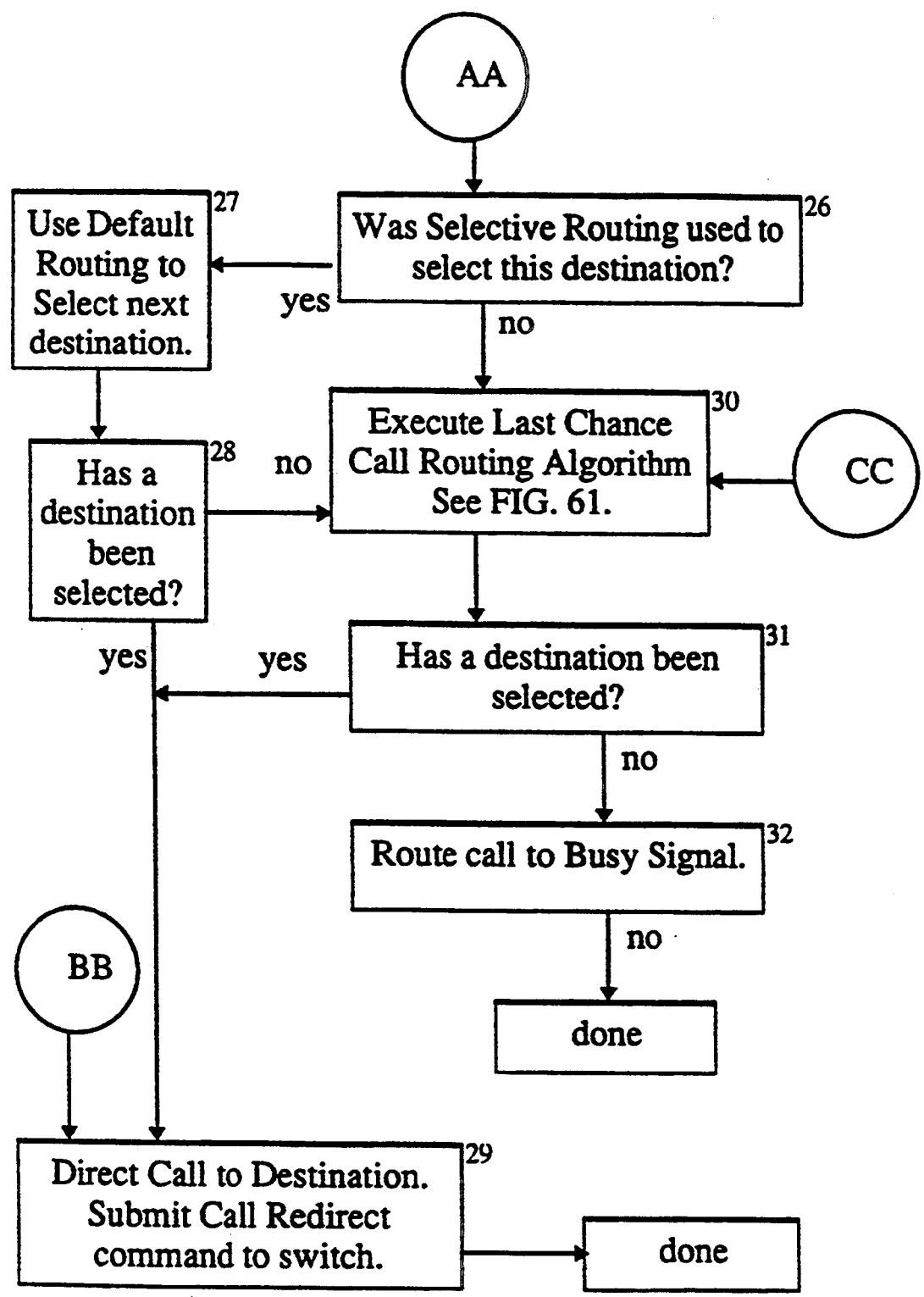

Step 71: Still referring to FIG. 83, a "yes" branch is taken from Step 50 to Step 71. There are many situations in which the given PSAP 216 will be in Night Service immediately upon initialization when the in early override 630 was set. First, if the in early override 630 was set and there are no night service intervals (FIG. 65) (Step 71). Second, where the time $t_{ia}$ at which the in early flag 630 was administered was not in $\Delta t_{ns}$, but the current time $t_c$ is in such interval $\Delta t_{ns}$ (FIG. 63) (Step 55). Third, where the current time $t_c$ is after the time $t_{ia}$, but before the night service interval $\Delta t_{ns}$ next following the time $t_{ia}$ (Step 52) (FIG. 62).

The init_time_ns check( ) routine refers to a number of indices, which are described in Chart NS4.

| | | Chart NS4 | |
|---|---|---|---|
| Index | Value | Event | Line |
| over_ndx | ==−1 | override was not set during a NS interval ($\Delta t_{ns}$) | 1027 |
| over_ndx ($\Delta t_{ns}$ during which override was set) | !=−1 | override was set during NS interval $\Delta t_{ns}$. | 1031 1066 |
| over_nxt_ndx (time override was set) | ==−1 | There was $\Delta t_{ns}$ when $t_{ia}$ was set | 1029 |
| cur_ndx (night service interval) | !=−1 | $t_c$ is in a NS interval $\Delta t_{ns}$ | 1079 |
| cur_ndx | ==−1 | $t_c$ is not in $\Delta t_{ns}$ | |
| over_nxt_ndx | !=−1 | $t_{ia}$ was not in $\Delta t r_{ns}$ and a $\Delta t_{ns}$ is defined | 1052 |
| | function call | | 1039 |
| over_ndx | !=−1 | $t_{oa}$ was set during $\Delta t ns$ | 1102 |

Figure 2:
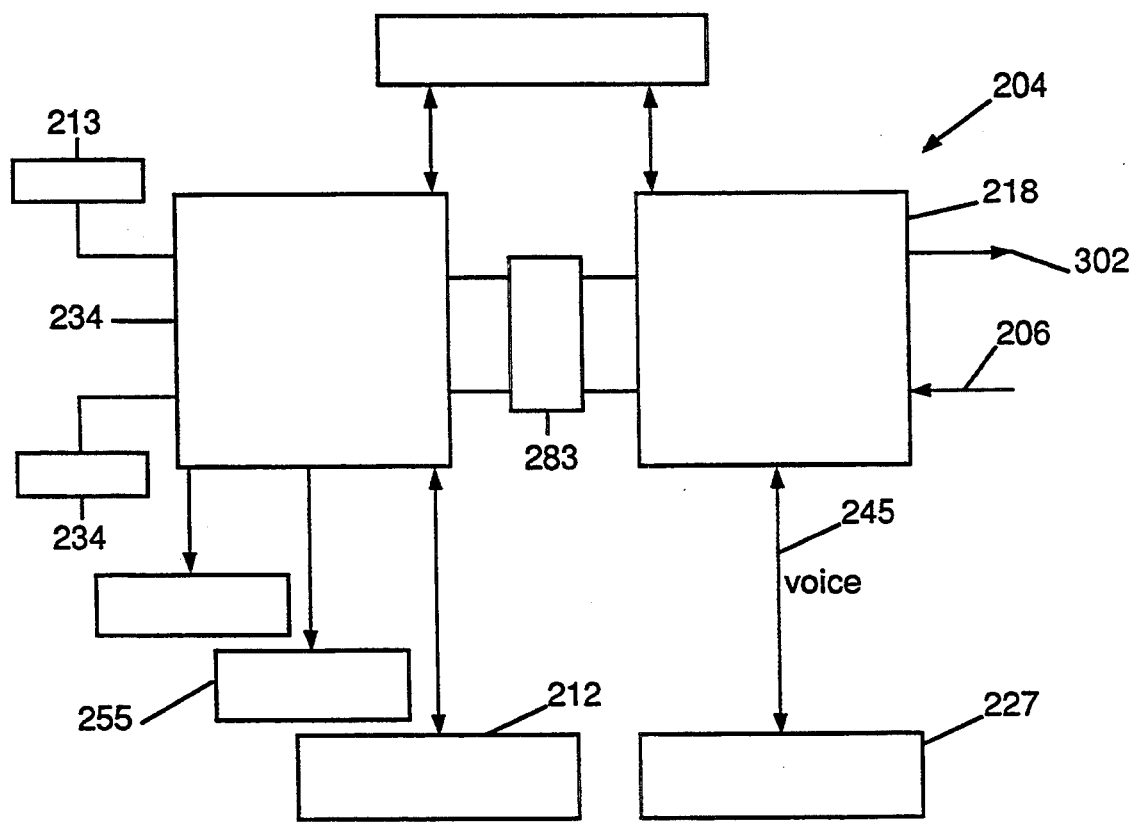
FIG. 2 is a schematic diagram of an applications processor (AP) and a switch of the platform, indicating the components of the system with which the C.E.R.S. system interfaces.

Chart NS1 refers Step 71 to lines 1052 and 1066, which in effect are IF and ELSE instructions. At line 1052, Step 71 determines whether over_nxt_ndx was not set (i.e., asks IF it is !=−1). If !=−1, the override time $t_{ia}$ was not in a night service interval $\Delta t_{ns}$, and a night service interval was defined (FIG. 2). In that event, a "yes" branch is taken to Step 51. Otherwise, a "no" branch is taken to Step 53.

Figure 64:
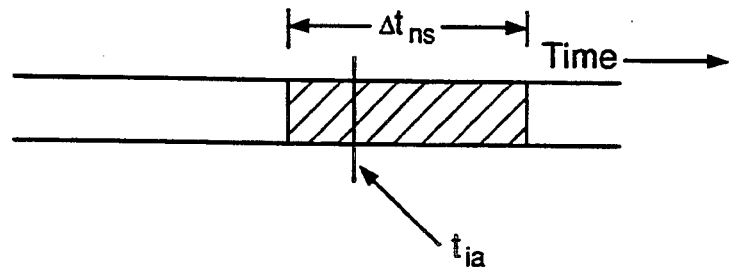

Step 51: A yes branch from Step 71 is taken to Step 51 at line 1066. Referring to FIG. 64, IF it is determined that over_ndx !=−1, meaning that the time $t_{ia}$ at which the in early override 630 was set is within a night service interval $\Delta t_{ns}$, the in early override 630 was unnecessary and a "yes" branch is taken to Step 54. However, IF over_ndx==−1, then as shown in FIG. 62, that time $t_{ia}$ is before the $\Delta t_{ns}$ starting at 17:00 hours and a "no" branch is taken to Step 52.

Step 52: Determines whether the current time $t_c$ is past the start time $t_s$ of the next night service interval $\Delta t_{ns}$ (FIG. 61). The instruction at line 1054 makes this determination. If "yes," Step 54 is performed because the in early override 630 is unnecessary and the override 633 may be set to DISABLED. IF "no," at line 1076 the disable override 633 is FALSE and the in early override 630 will be effective to cause the given PSAP 216 to be in Night Service at time $t_c$, which is unscheduled and occurs despite the night service schedule 262 which does not call for the given PSAP 216 to be in Night Service (FIG. 62).

Figure 91:
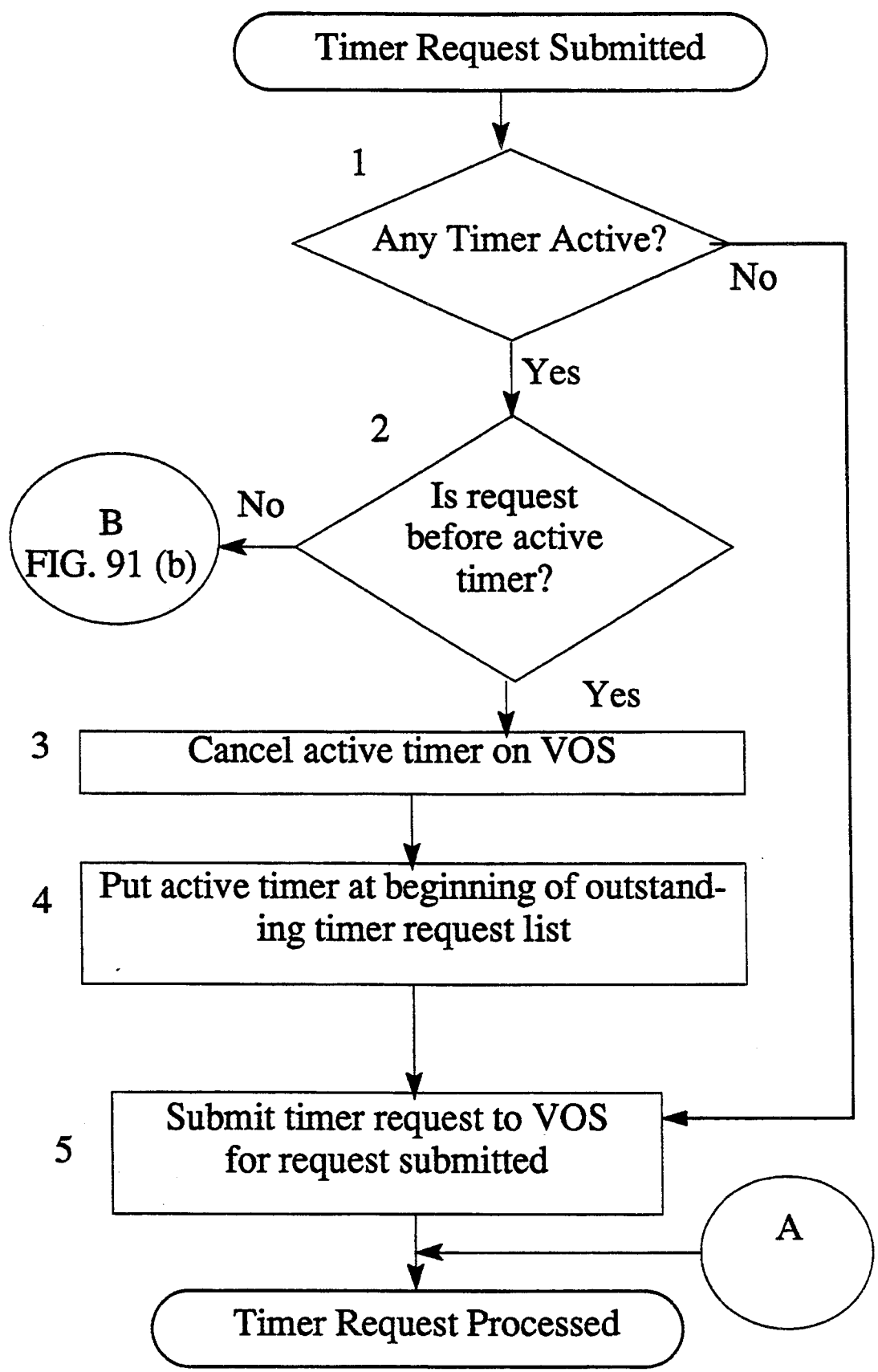
FIGS. 91(a) and 91(b) are flow charts illustrating a timer control process for determining which timer requests are processed.
Figure 91:
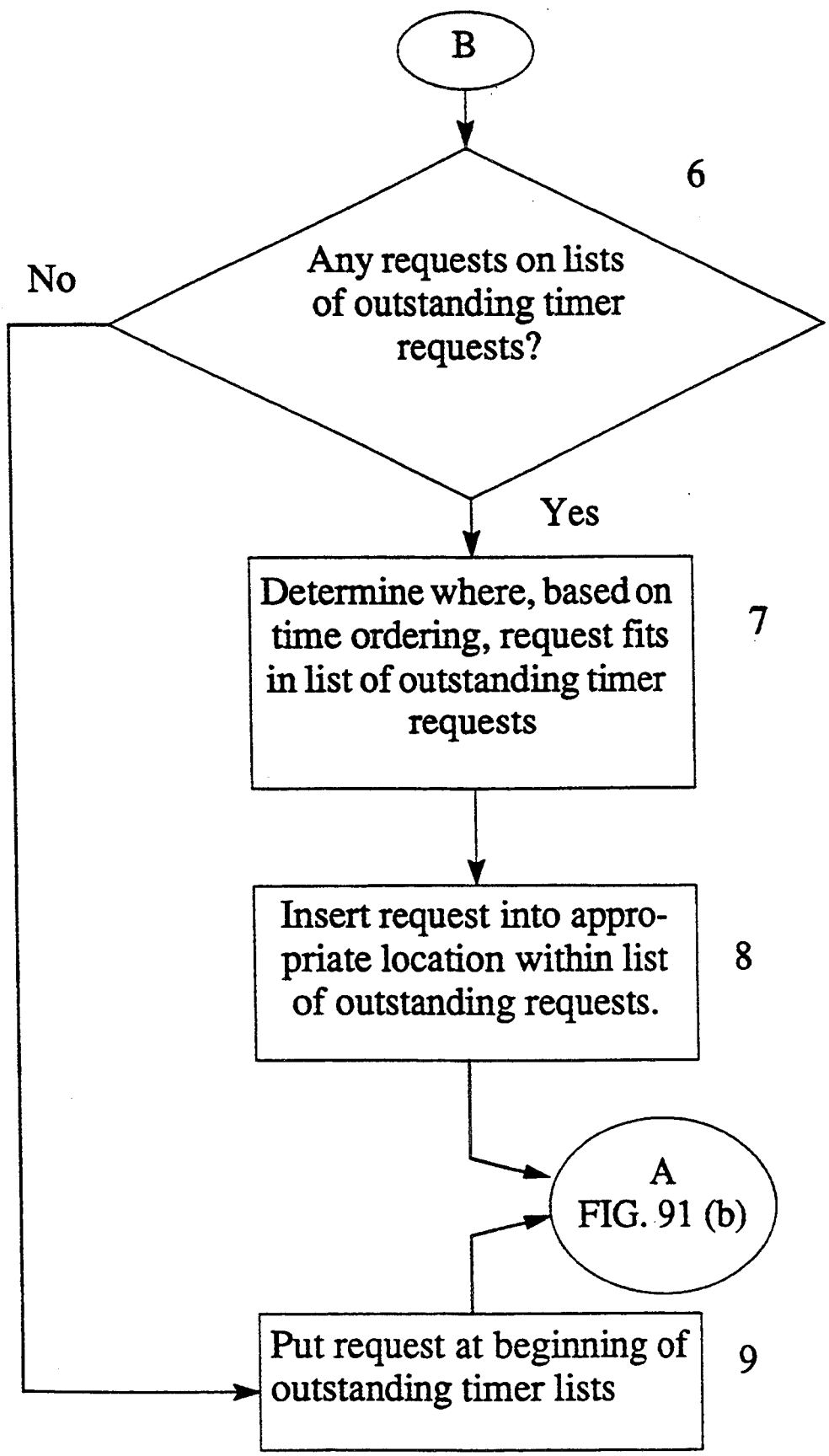

Step 54: Since the "yes" results in Steps 51 and 52 may essentially be that $t_{ia}$ occurred in $\Delta t_{ns}$ or $t_c$ is in $\Delta t_{ns}$, respectively, at line 1057 the in early override 630 is disabled, which is indicated by the TRUE return. This TRUE return is used in the init_nite_srvc( ) routine at line 228 which asks IF there is the TRUE return. If "yes," then the entry for Psap_tbl[i].ns_override in the administered PSAP table 382 (FIG. 21) is changed to indicate "DISABLED", as is the router memory 392 (FIG. 91).

Step 53: As noted in Step 52, a "no" determination results in the disable override 633 being FALSE. In that case, the init_time_ns_check( ) routine returns TRUE (at line 1078) to line 177 in the init_nite_srvc( ) routine. If the init_time_ns_check( ) routine returns TRUE to lines 175-177, and other conditions exist (see instructions at lines 179-214), Night Service is invoked in Step 2, line 209 (FIG. 71). If the init_time_ns_check( ) routine does not return TRUE, the "else" instruction at line 216 updates or sets the variable Psap_tb[i].ns_state in the router memory 392 (FIG. 91) to indicate not in night service.

Figure 84:
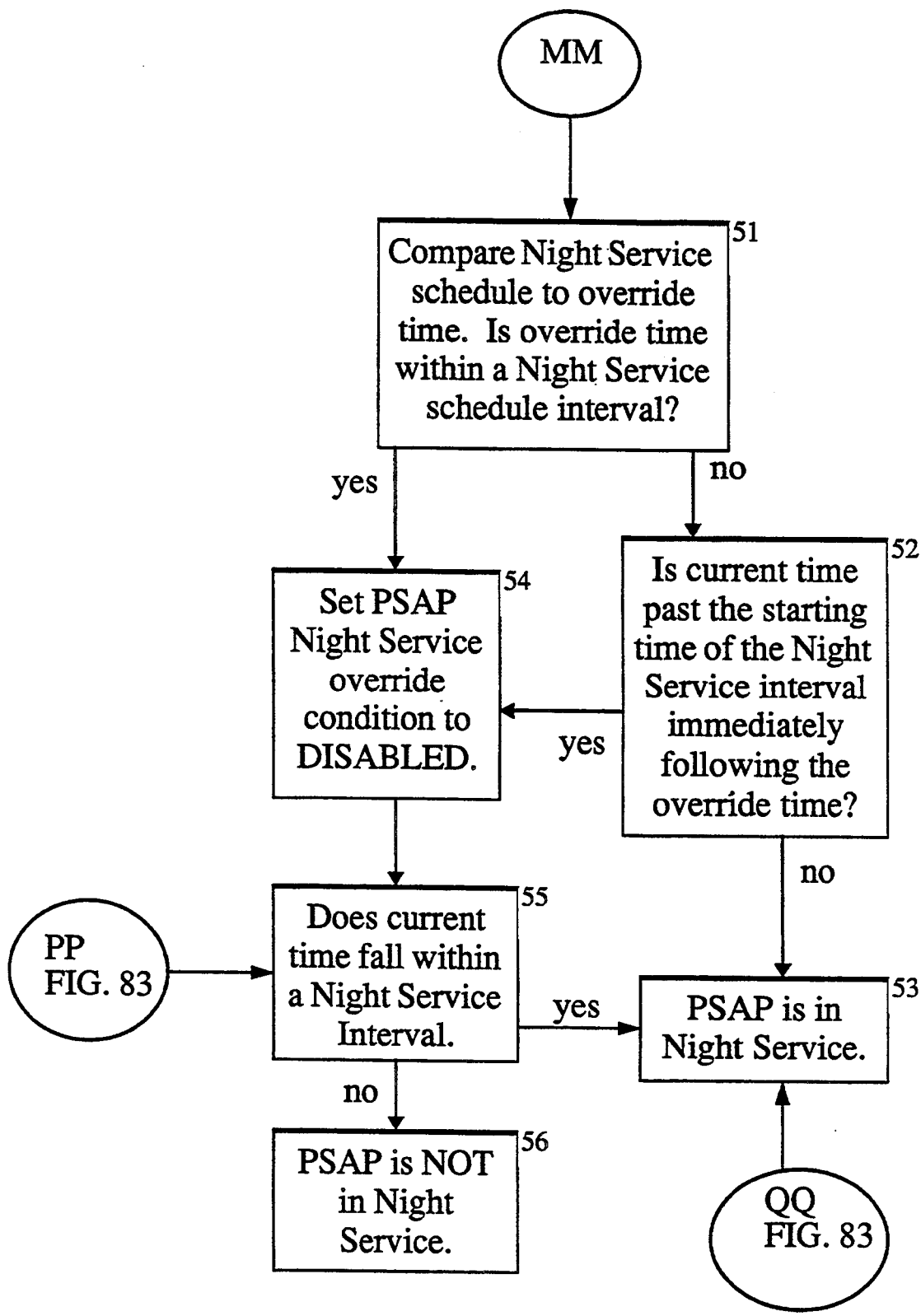

Step 49—Override Disabled: Referring again to the init-_nite_srvc( ) routine and to Step 49, Chart NS1 also refers to line 231 corresponding to a "no" branch to a Step 55 (FIG. 84). This branch is taken when the override 633 currently (at $t_c$) is disabled.

Step 55: As shown in FIG. 84, there are three branches to Step 53, one from Step 52 described above, one from Step 71 described above, and one from Step 55. Referring to the "no" branch from Step 49 to Step 55 (and then to Step 53), the "no" is a "no" answer to the IF at lines 164 and 165. That "no" is represented by an ELSE at line 231, and at line 238 the set_alarms( ) routine is called. When Step 55 is performed following Step 49, the set alarms ( ) routine at line 397 determines whether the current time $t_c$ is in a night service interval $\Delta t_{ns}$, shown as "yes" in FIG. 9a. If "yes," the "yes" branch is taken to Step 53 (line 420) whereas if "no," a "no" branch is taken to Step 56 (line 454).

When Step 55 is performed following Step 54, the init_time_ns_check ( ) routine is used as described above with respect to Steps 71, 51, 52 and 54. At line 1076, because the "IF" instructions at lines 1052 and 1066 were not TRUE, the disable flag is FALSE so that the instruction at line 1079 is performed. IF TRUE, then the night service interval $\Delta t_{ns}$ must have been scheduled, so the TRUE return at line 1086 is returned to line 175.

Step 56: Referring to FIG. 84 and to the situation in which the current time $t_c$ is not in a night service interval $\Delta t_{ns}$, a "no" branch is taken to Step 56. Following Steps 51, 52 and 54, Chart NS1 refers Step 56 to line 1088, which indicates that if line 1088 is reached without executing line 1078 (i.e., ret=FALSE line 1005) the PSAP 216 is not in Night Service. Following Step 49, Chart NS1 refers the set_alarms( ) routine at line 454 at an else determination that $t_c$ is not in $\Delta t_{ns}$. Following line 454, in Step 56 the override 630 or 631 is disabled (lines 491–492) and if there are any night service intervals $\Delta t_{ns}$ on the day that the system 200 is initialized, the timer 632 is set to signal the start $t_s$ of the next night service interval $\Delta t_{ns}$ (line 512).

Step 57: It may be recalled that in Step 49, the "yes" branch indicated that it was determined that some override 630 or 631 was set. In FIG. 83, the "no" result of Step 50 is that the override 631 for the given PSAP 216 was not in early. In this event, the "no" branch is taken to a Step 57 on FIG. 85. Chart NS1 indicates that Step 57 is performed by the init_time_ns_check routine starting at line 1102. The instruction at line 1102 follows the determination at line 1090 indicating that the out early override 631 was set.

Figure 67A:
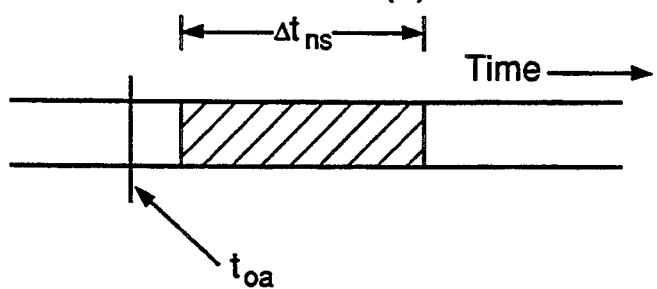
FIGS. 67(a)–(d) are timing diagrams which relate the time at which an out early override was set with respect to a night service interval.
Figure 67B:
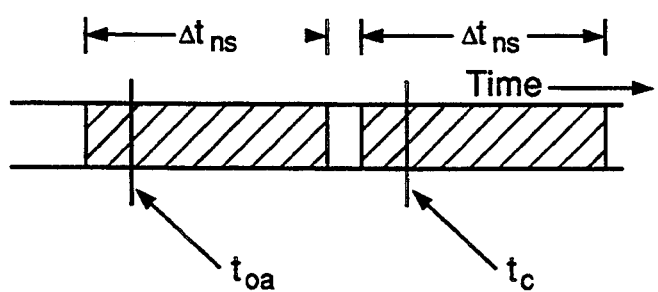
Figure 67C:
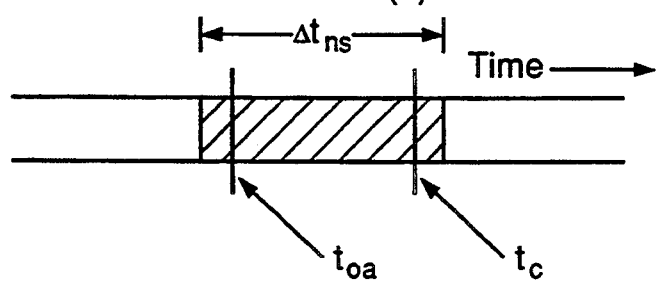

As a preface to this determination, reference is made to FIG. 67(a) and 67(c) which show two situations which may exist at the time $t_{oa}$ at which the out early override 631 was set. FIG. 67(a) indicates that $t_{oa}$ was not in a night service interval $\Delta t_{ns}$. Thus, there was no night service interval $\Delta t_{ns}$ from which to exit "early." FIG. 67(c) indicates that $t_{oa}$ and $t_c$ are in a night service interval $\Delta t_{ns}$. Therefore, the out early override 361 could be acted on at the current time $t_c$ to take the given PSAP 216 out of Night Service. In Step 57, at line 1102, over_ndx indicates when the override 361 was set relative to a night service interval $\Delta t_{ns}$. In the event that $t_{oa}$ was within a night service interval $\Delta t_{ns}$, a "yes" branch is taken to a Step 59.

Step 59: Determines whether the current time $t_c$ is within the same night service interval $\Delta t_{ns}$ as the override time $t_{oa}$. If $t_c$ and $t_{oa}$ are not in the same night service interval $\Delta t_{ns}$(FIG. 67(b)), then the override flag 631 may be ignored. In this event, Chart NS1 indicates that a "no" branch is taken to a Step 63. If "yes," then the out early override 631 should be followed and a "yes" branch is taken to Step 62.

Step 63: If $t_{oa}$ and $t_c$ did not occur within the same night service interval $\Delta t_{ns}$, then at line 1112 the override 631 is disabled. If the "no" branch is taken from Step 57, the ELSE instruction at line 1115 applies, and at line 1125 the out early override is disabled.

Figure 85:
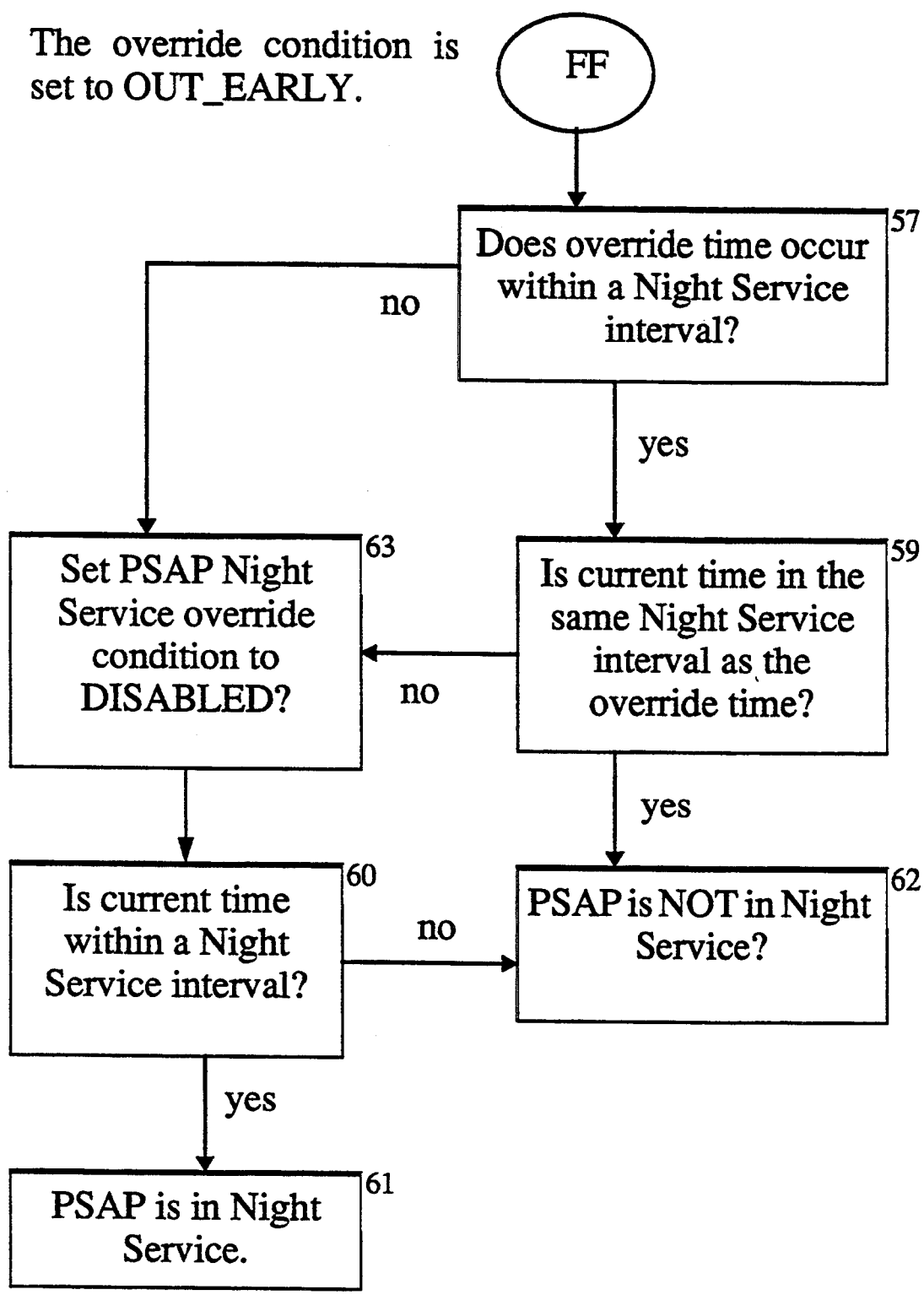
Figure 86:
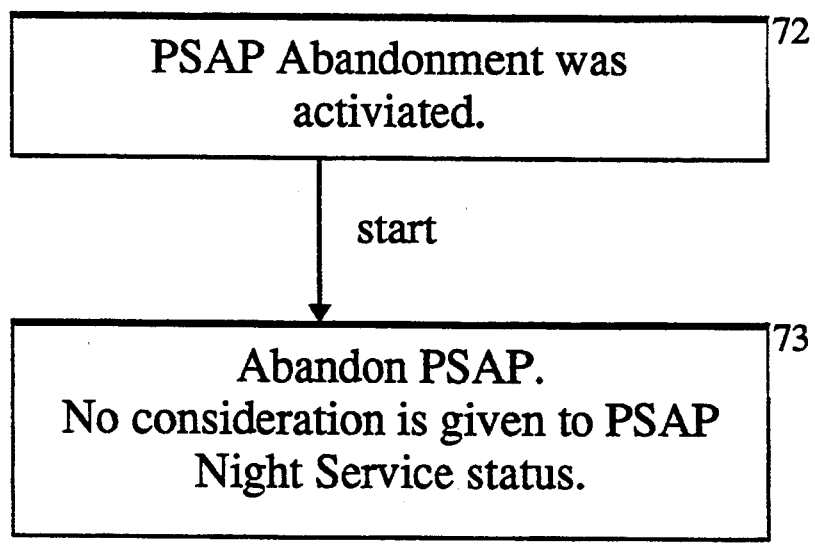
Figure 87:
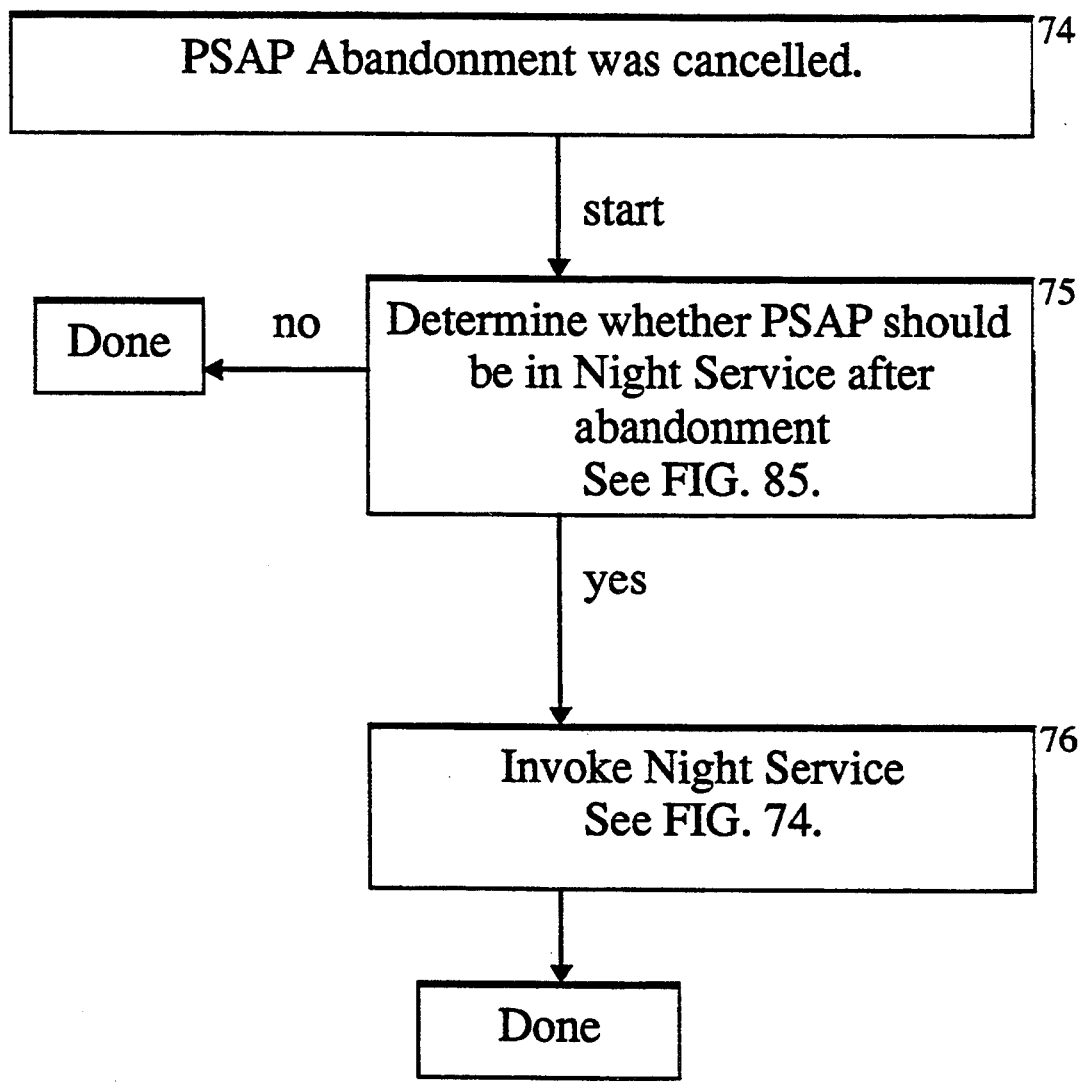

Step 60: FIG. 85 indicates that a Step 60 follows Step 63, and determines whether $t_c$ is within a night service interval $\Delta t_{ns}$. The out early override 631 was disabled in Step 63. Therefore, if $t_c$ is in $\Delta t_{ns}$, a "yes" branch is taken to Step 62. Otherwise, a "no" branch is taken to Step 61.

Step 61: In Step 61, line 1136 returns a "TRUE" message 288 to the calling routine init_nite_srvc(), and at line 1142 the return is noted as having been based on the night service schedule 262. Thus, even though the purpose of the out early override 361 was to take the given PSAP 216 out of Night Service early, the given PSAP 216 was already out of the night service interval $\Delta t_{ns}$ that existed at the time $t_{oa}$, such that at the current time $t_c$ of initialization, the given PSAP 216 is in Night Service (FIG. 67(b)).

Figure 67D:
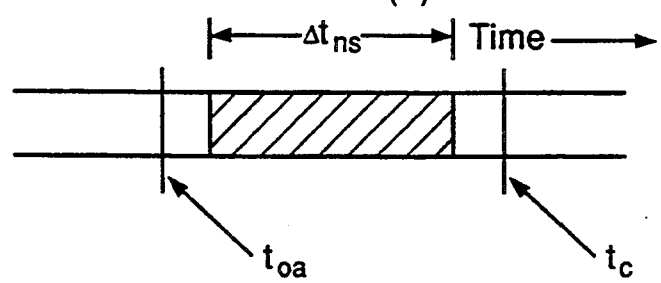

Step 62: If Step 60 determines that the current time $t_c$ is not in a night service interval $\Delta t_{ns}$ (FIG. 67(d)), a "no" branch is taken to a Step 62 where the same routine indicates that the given PSAP 216 is not in Night Service by returning "ret" (at line 1145) to the init_nite_srvc( ) routine at line 216. There, the instruction at line 221 update the state of the administered PSAP table 382 (FIG. 21) to "not in night service".

Referring again to FIG. 71 and summarizing, Step 1 determined whether the given PSAP 216 should immediately be in Night Service. The "yes" branch from Step 1 is taken in various initialization situations. First, in response to an in early override 630, where Steps 71, 51, 52 and 53 determined that the given PSAP 216 should immediately be in Night Service (FIG. 84). Second, without any override, Step 55 (FIG. 84) determined that upon initialization the given PSAP 216 should immediately be in night service due to a scheduled Night Service interval $\Delta t_{ns}$. Third, even though an out early override 631 has been set, it was not effective (steps 57 and 59), but the current time $t_c$ is in a night service interval $\Delta t_{ns}$.

Figure 81:
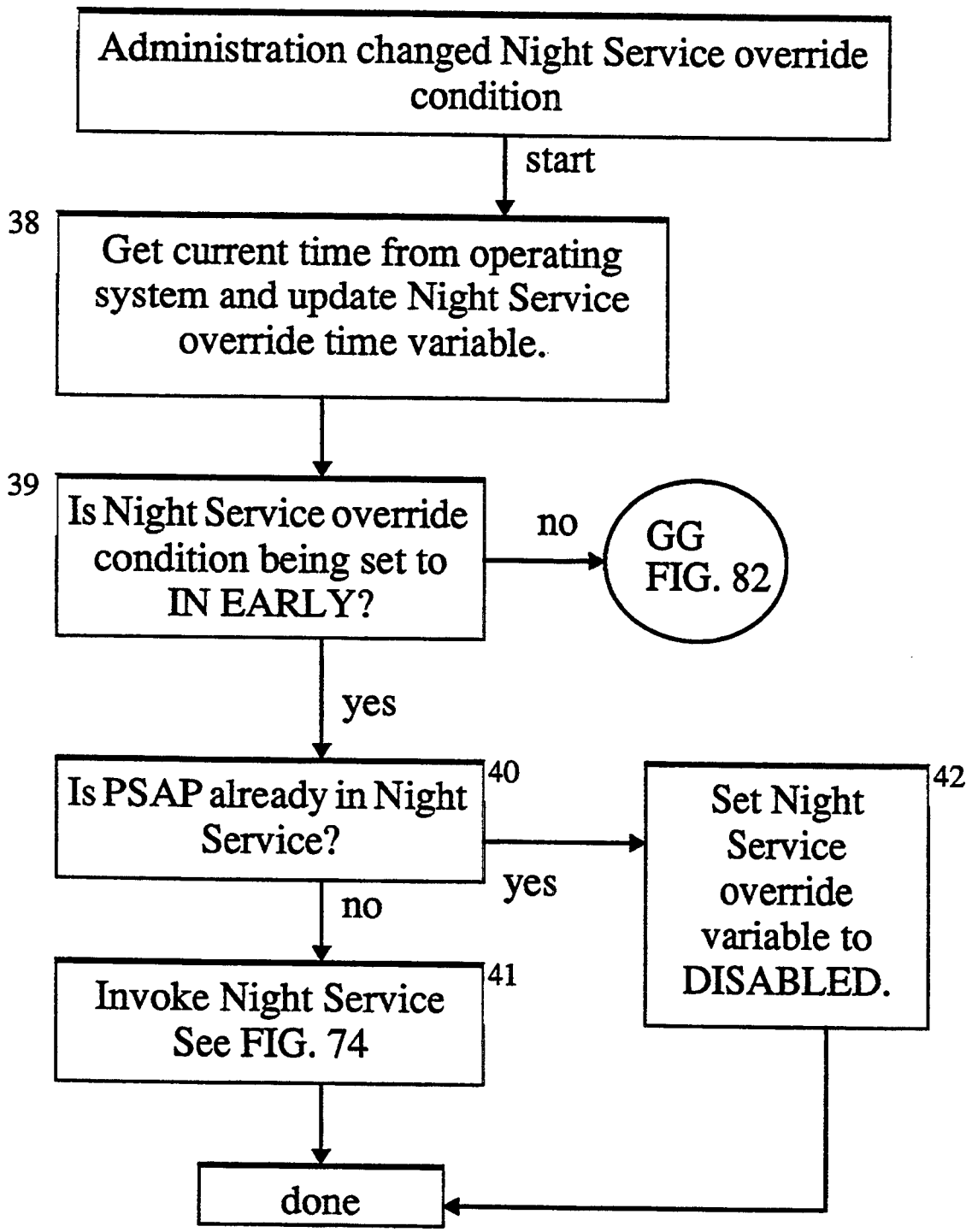

Thus, via Steps 53 or 61, upon initialization the init_nite_srvc( ) routine is called to invoke Night Service. Night Service may also be invoked when (1) a PSAP night service timer 632 signals (FIG. 72), (2) administration changed the night service schedule 262 for the given PSAP 216 (FIG. 78), or (3) when administration changed the night service override condition 630 to in early (FIG. 81).

Figure 74:
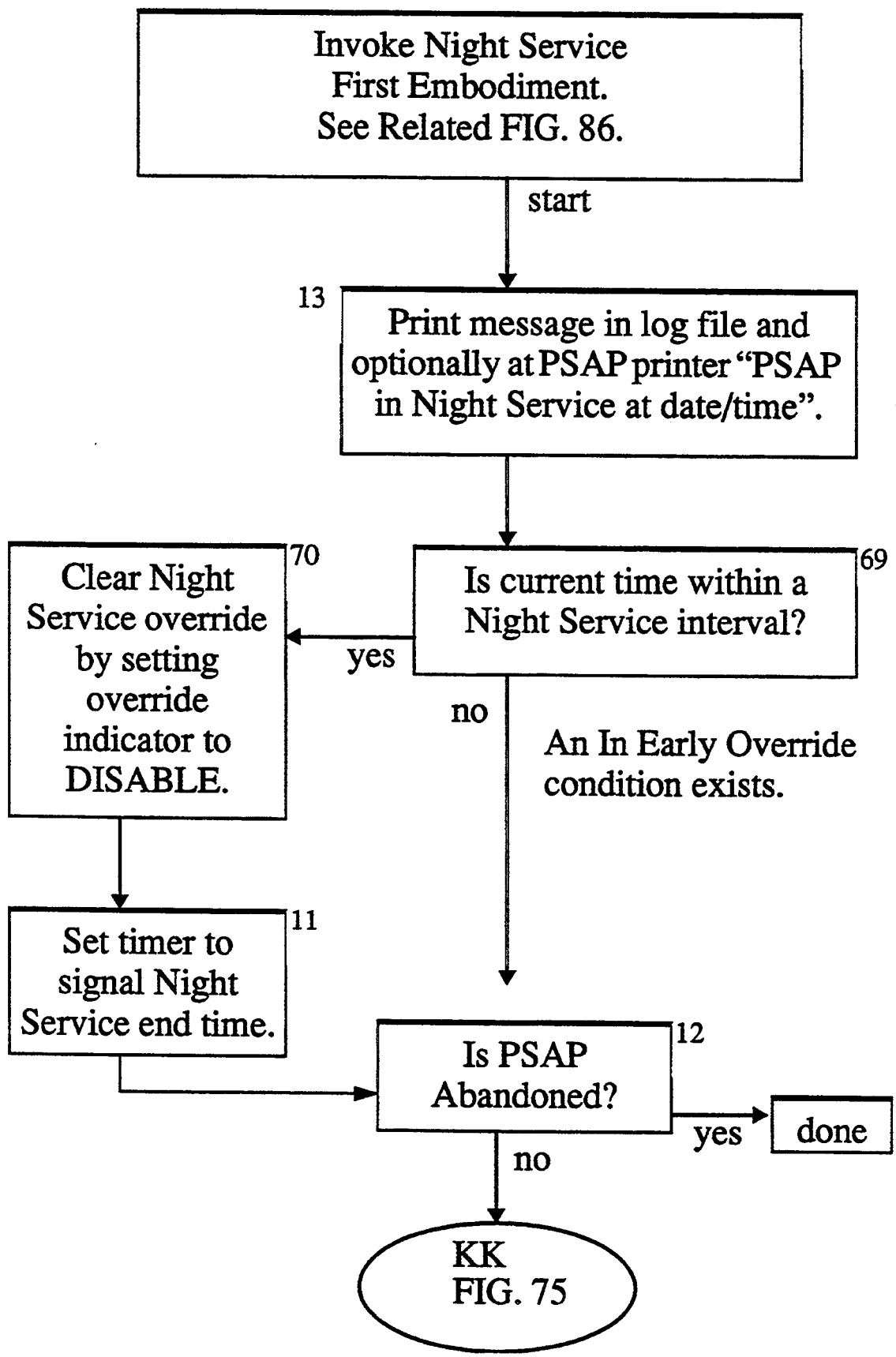

Invoking Night Service: Referring now to FIGS. 74 and 75, when Night Service is invoked as a result of any of the above discussed events, a call is made to the invoke_nite_srvc( ) routine, which starts at line 676 of the rtr_nite_srvc.c file. In general, the steps taken to invoke Night Service for a given PSAP 216 depend on whether Night Service was (1) scheduled or (2) invoked by an in early override 630. A preferred embodiment of invoking Night Service is as follows. At line 760, op_lib_state causes a message 288 to be printed in the log file 408 (FIG. 59) stating "PSAP in night service at day/time." Optionally, this message 288 is printed at the PSAP printer 255 (FIG. 9).

Step 69: Also, in Step 69, a determination is made as to whether the current time $t_c$ is in a night service interval $\Delta t_{ns}$. If $t_c$ is in $\Delta t_{ns}$, then an in early override 630 must be disabled. Thus, a "yes" step is taken to Step 70. If $t_c$ is not in $\Delta t_{ns}$, the given PSAP 216 must be entering Night Service via an in early override 630. A "no" branch is taken to Step 12.

Step 70: The override flag 633 is disabled at line 808.

Step 11: Also, because the night service interval $\Delta t_{ns}$ will have an end time $t_e$, the timer 632 is set to signal $t_e$ (line 790).

Step 12: Having determined that the given PSAP 216 should be in Night Service, Step 12 determines whether the given PSAP 216 is Abandoned. If so, the PSAP 216 is not in Night Service. If the given PSAP 216 is not abandoned, then a branch is taken to FIG. 75.

Figure 90:
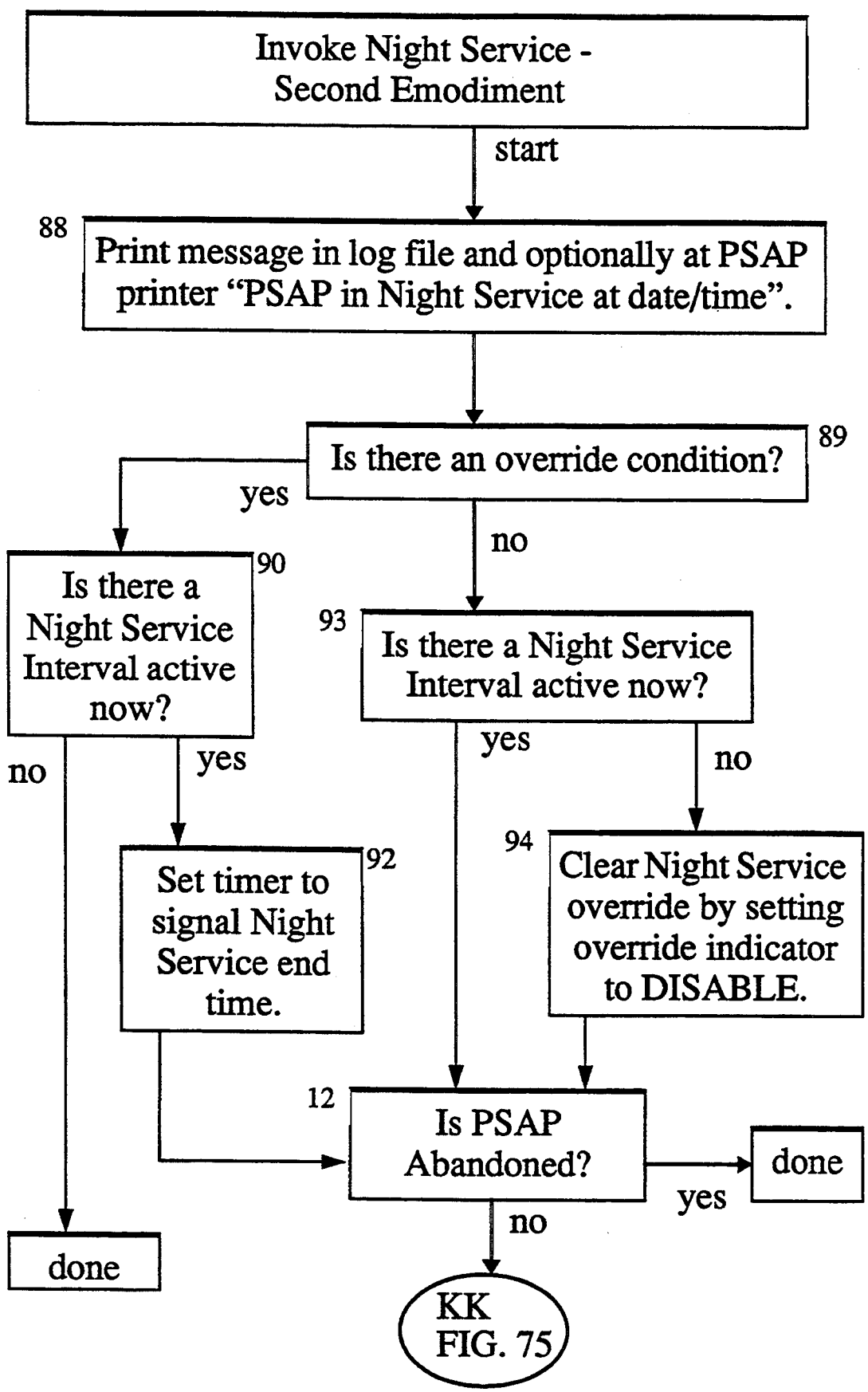

An alternate embodiment for invoking Night Service is shown in FIG. 90.

Step 88: This is the same as Step 13.

Step 89: Next, a determination is made at line 773 of the invoke_nite_srvc ( ) routine as to whether an override condition 630 or 631 is set.

Step 90: If there is no override 630 or 631, and if the given PSAP 216 is at the current time $t_c$ in $\Delta t_{ns}$, then a "yes" branch is taken to Step 92.

Step 92: With the given PSAP 216 in $\Delta t_{ns}$ at the current time $t_c$, the timer 632 is set to signal the time $t_e$ of the current $\Delta t_{ns}$.

Step 93: If an override 630 or 631 was set, at line 802 a determination is made as to whether there is a night service interval $\Delta t_{ns}$ at the current time $t_c$. This could occur during initialization, for example. If not, then the override 630 or 631 is effective and Step 12 is performed as described above.

Step 94: If there is a night service interval $\Delta t_{ns}$ at $t_c$, then in Step 94 an in early override 630 that was set would not be effective at $t_c$, and it is set to DISABLED.

Invoke Night Service Given PSAP Not Abandoned

Step 64: Once it is determined that the given PSAP 216 is not in the Abandoned state, at line 202 of the alarm_handler ( ) routine is updated to in night service (FIG. 75).

Step 14: The given PSAP 216 should not be rendered inactive by actually being in the Night Service state until there are no E9-1-1 calls 201 enroute to it. To permit E9-1-1 calls 201 enroute to the given PSAP 216 to be answered, Step 14 is performed at line 253 of a p_handle_state_change ( ) routine. There, a p_check_nl_status( ) routine is called, and starts at line 370 of the same file. At line 398, the p_check_nl_status ( ) routine returns TRUE if it determines that an incoming E9-1-1 call 201 is currently ringing at the PSAP primary notification line 241 to the PSAP 216 or currently in the PSAP hunt group queue 243. This indicates that an E9-1-1 call 201 is enroute to the given PSAP 216, and a "yes" branch is taken to Step 15. If the return at line 400 is FALSE, a "no" branch is taken to Step 17.

Step 15: The PSAP 216 should continue "active" so as to be in condition to answer the E9-1-1 calls 201 enroute to it. Chart NS1 indicates that Step 15 is performed by the p_handle_state_change( ) routine at line 255. At line 254, the NL_seized is set to FALSE, such that NL_seized will be FALSE if no further E9-1-1 calls are enroute to the given PSAP 216. At line 255 the timer 632 is set to signal in ten seconds. After the timer 632 is set for ten seconds, at line 258 a state change is sent, at line 259 the state is changed and at line 260 the state of the given PSAP 216 indicates that Night Service will begin soon (FIG. 21).

Step 16: The wscp process 368 also responds to the change of state to "night service soon." Referring to a w_ar.c file, at lines 2439 and 2527, a w_psap_state( ) routine causes an alert message 240 to be displayed on the screen 222 of the workstations 212 of the given PSAP 216, as follows:

"Entering Night Service Soon."

Step 95: The change in the PSAP state (line 259) is responded to by the case "PS_NIGHT_SERVICE_SOON", at line 465 of the p_handle_nl_timer() routine. Line 465 calls the p_check_nl_status() routine. If an E9-1-1 call 201 is still enroute to the given PSAP 217, the timer 632 is again set to ten seconds. Step 95 is performed again. If no E9-1-1 call 201 is enroute, ELSE applies at line 470 of the p_handle_nl_timer() routine, and a "no" branch is taken to Step 17.

Step 17: At line 471, the p_handle_nl_timer() routine calls the p_dnd_wkst( ) routine, which starts at line 321 and places a "do not disturb" on the notification line 241 of the given PSAP 216.

Step 18: Next, at line 346, the p_dnd_wkst( ) routine places a "do not disturb" on the workstation's attendant lines 245 of the given PSAP 216. This prevents the E9-1-1 calls 201 at given PSAP 216 from being routed to those workstations 212 until the night service interval $\Delta t_{ns}$ ends.

Step 19: To indicate "in night service" on the message lines 240A of the attendants' screens 222 at the given PSAP 216, the w_psap_state( ) routine is again called, and at line 2444 causes the "in night service" display on the message line 240A.

Step 20: The w_psap_state( ) routine updates the workstation status field to "receiving calls" and a screen update occurs.

In summary, all of the situations which may exist at the time of initialization of the C.E.R.S. system 200 either result in the given PSAP 216 being immediately in Night Service, or in the Abandoned or Active states.

Timer Signal Occurs During Active Service of Given PSAP

Figure 72:
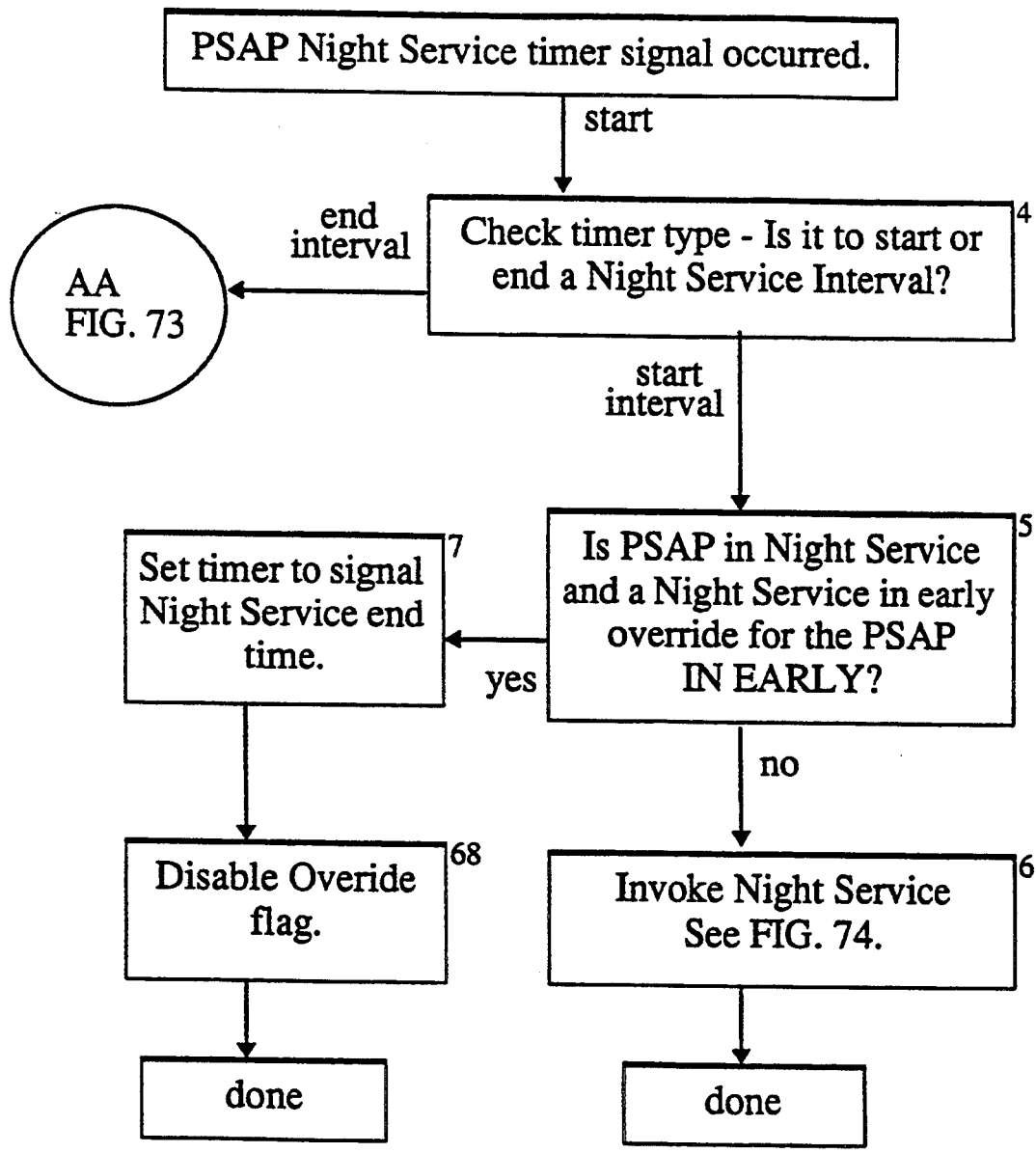

Referring to FIG. 72, the referenced situation is when the PSAP night service timer 632 produces the signals 634. As described above, the timer signal 634 is related to a particular PSAP, such as the given PSAP 216. However, each timer signal 634 is not, as such, related to the start time $t_s$ or the end time $t_e$ of a night service interval $\Delta t_{ns}$.

Step 4: Still referring to FIG. 72, when the timer 632 generates a signal 634, Step 4 determines whether the signal 634 is indicating the start $t_s$ or the end $t_e$ of a night service interval $\Delta t_{ns}$. For Step 4, Chart NS1 refers to the alarm_handler( ) routine at lines 154 and 206 for the two possible situations, the signal 634 indicates a start (line 154) or the signal 634 indicates the end (line 206)). At line 154, the start_label is a number unique to the given PSAP 216 and assigned by the requesting process 351 to indicate that the signal 634 from the timer 632 indicates a start time $t_s$. For convenience of description, the timer 632 is referred to as a start timer 636. In setting a start timer 636, the unique number is used to relate the start timer 636 to the given PSAP 216. When the start timer 636 generates the signals 634, the alarm_ptr accesses the unique timer number. The alarm event table 639 (FIG. 68(a)) stores data for all outstanding timer requests being handled by the timer control process 638 for all PSAPs 216. Each entry in the timer event table 639 (FIG. 68(a)) identifies the PSAP 216 with which the timer 632 is associated. The alarm_ptr identifies/selects a particular entry for the timer 632 that just expired (or signaled), and at line 154 determines whether the selected timer 632 is a start timer 636. This determination is based on whether the event_label of the selected timer 632 matches the start_label of the PSAP 216 that is associated with the timer 632. (See FIG. 68(a) where start label XXX matches event_label XXX for PSAP$_1$). The Nite_srvc_tbl[psap]start_label entry indicates that the timer signal 634 indicates the start time $t_s$.

Step 5: If the alarm 634 indicates the start of Night Service, Step 5 determines whether the given PSAP 216 is already in Night Service (line 168) and in Night Service via an in early override 630 for the given PSAP 216 (line 170). If both determinations are "yes", then the timer signal 634 may be ignored because the given PSAP 216 is in Night Service due to the in early flag 630. In that event, a "yes" branch is taken to Step 7. Otherwise, a "no" branch is taken to Step 6.

Step 7: If the "yes" branch is taken to Step 7, at line 172 the timer 632 is set to signal the end $t_e$ of the next night service interval $\Delta t_{ns}$. This is done by the call at line 172 to the set_end_timer ( ) routine, which starts at line 604 of the rtr_nite_srvc.c file. Once the day in which the current time $t_c$ occurs equals the day in which the end time $t_e$ occurs (ELSE, line 644), the end timer 637 is set at line 653 and the result is success at line 657 and TRUE at line 659.

Step 68: Since the "yes" branch was taken from Step 5, there was an in early override 630. Having set the timer 637 to signal $t_e$, the override flag 633 is then set to DISABLED at line 181, the PSAP table 382 (FIG. 21) is updated accordingly at line 180 and the state ("in night service") of the given PSAP 216 is not changed. Thus, even though the timer signal 634 signalled the start of the next night service interval $\Delta t_{ns}$, the given PSAP 216 was already in Night Service and it was necessary to set the timer 634 to end the current night service interval $\Delta t_{ns}$.

Step 6: If Step 5, lines 168 or 170 determine that the given PSAP 216 is not (at the current time $t_c$) in Night Service or that there is no "in early" override 630, the "else" instruction at line 191 indicates that Night Service will be invoked. In Step 6, at line 199 the invoke—night—service( ) routine is called as shown on FIG. 72 as described above with respect to FIGS. 75 and 76. This results in either (1) Night Service not being invoked because the given PSAP 216 is Abandoned (Step 12), or (2) invoking Night Service and setting the PSAP 216 up for Night Service (FIG. 75).

Timer Signalled End of Night Service Interval

Step 4: Referring again to FIG. 72, Step 4 could also result in the "else" instruction at line 206 of the rtr—alrm—hndlr.c file. There, the comment notes that an end timer 637 went off, and an "end" branch is taken to FIG. 73.

Figure 73:
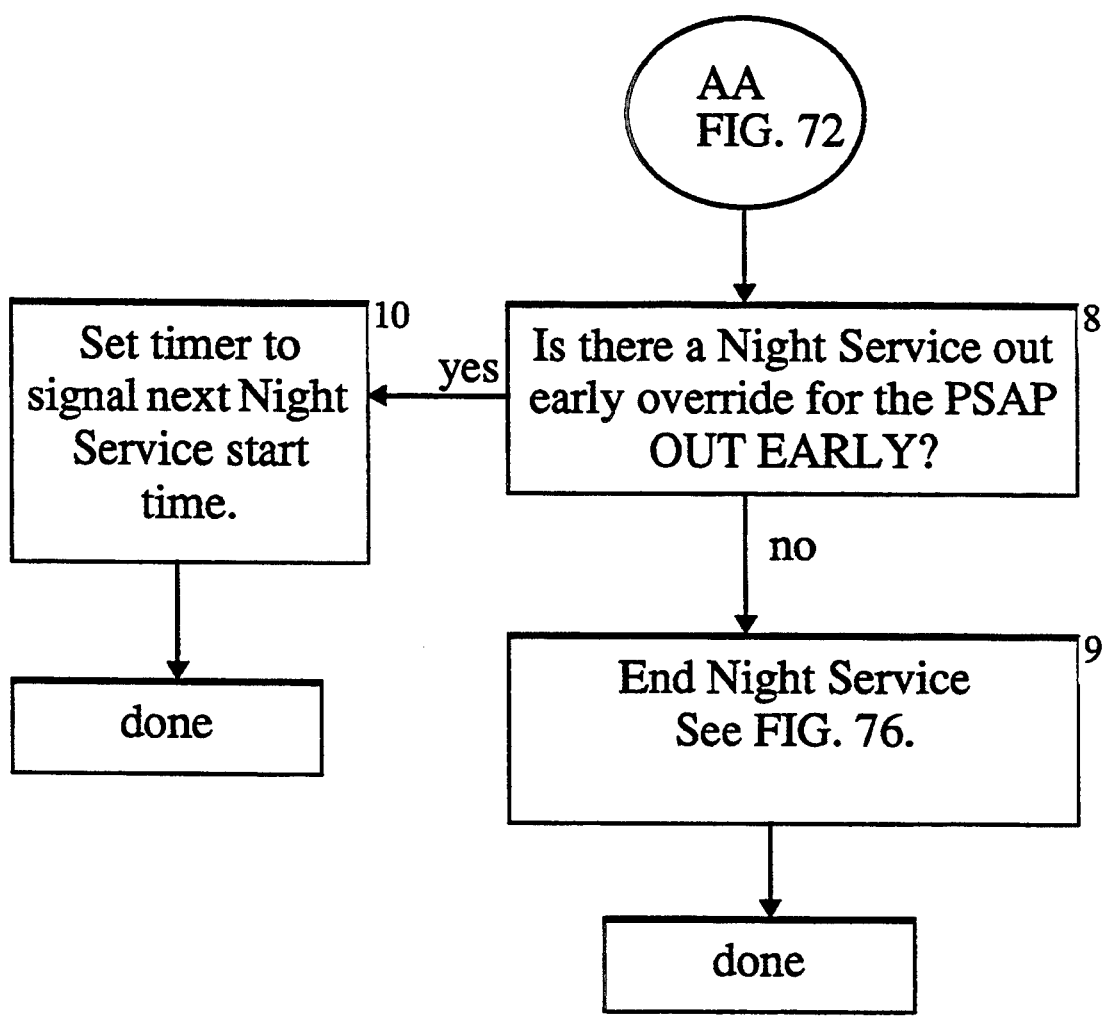

Step 8: In FIG. 73, Step 8 starts at line 231, where it is determined that at time $t_c$ the state of the given PSAP 216 is or is not in Night Service. For the state of the given PSAP 216 to not be in Night Service when an end signal 634 occurred, there must have already been an out early override 631 which caused the given PSAP 216 to be out of Night Service early. In the "not in night service" case, the line 233 determination is made that there is an out early override 631. In that event a "yes" branch is taken to Step 10.

Step 10: At line 269, the timer 636 is set to signal the time $t_s$ of the start of the next night service interval $\Delta t_{ns}$.

End Night Service

Figure 76:
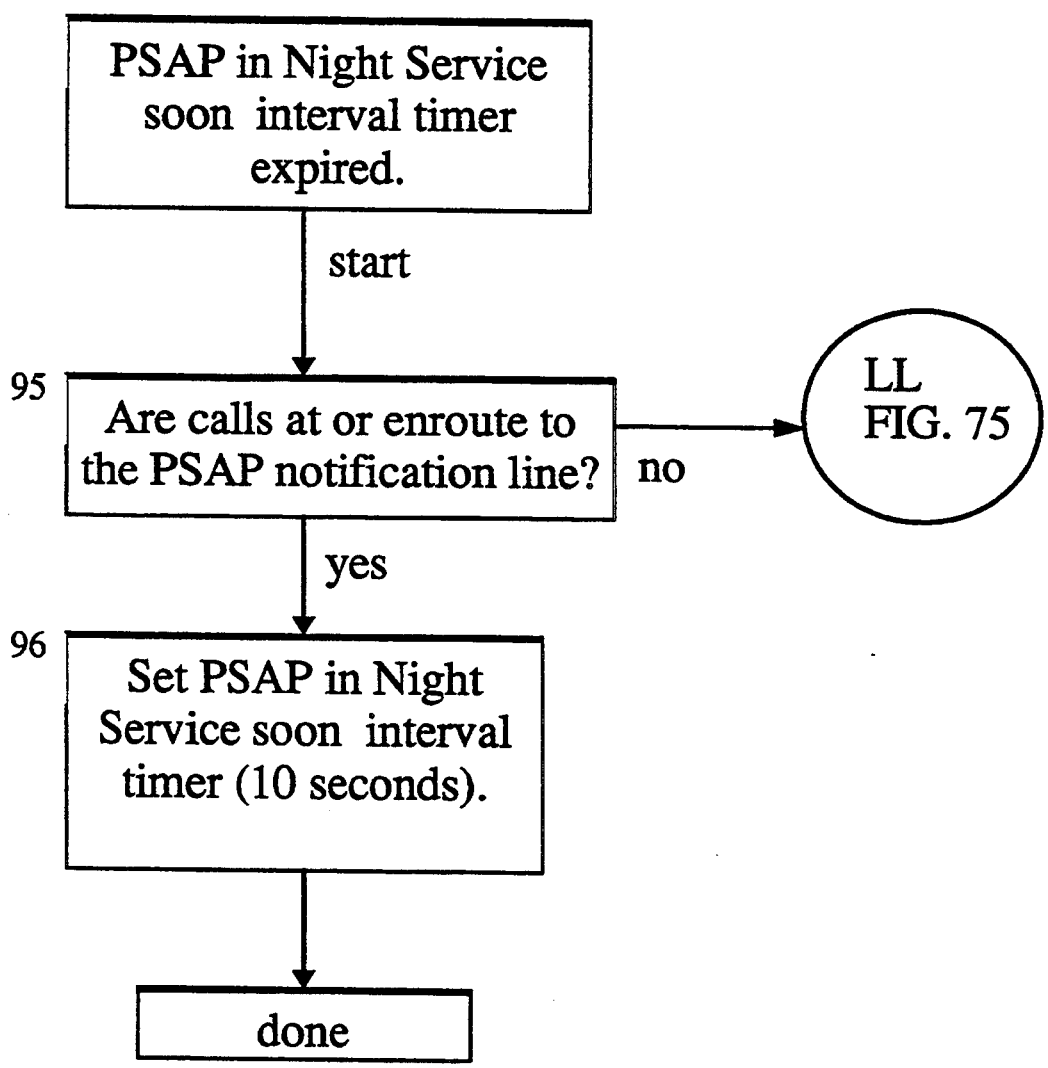

Step 8 may result in a determination that the given PSAP 216 is in Night Service or that there is no out early override 631. In that event, a "no" branch is taken at line 246 ("else") and the end-nite—srvc ( ) routine is called (FIG. 76).

Step 22: At line 248, the end—nite—service( ) routine is called in the rtr—alarm—handler.c file, and starts at line 286. At line 330 the psap process 361 is notified of the end of Night Service. If that message 288 is successfully received by the psap process 361, the result at line 336 is SUCCESS. Further, at line 342 the administered psap table 382 (FIG. 21) is updated to indicate the "in night service" state. At line 343 a "PSAP exiting night service at time—" message 288 is printed in the log 408 (FIG. 59) and at the printer 255 of the given PSAP 216.

Figure 77:
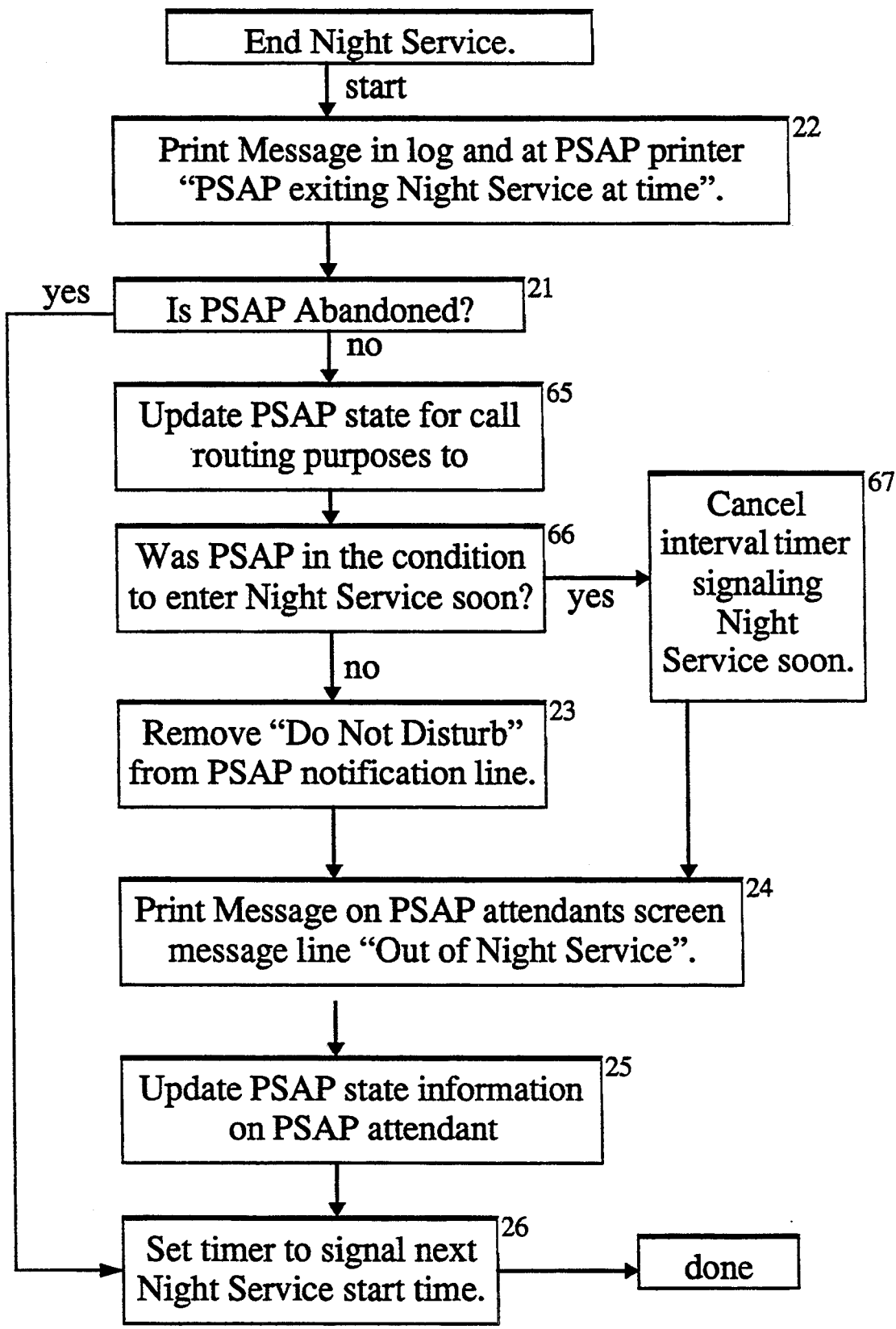
Figure 78:
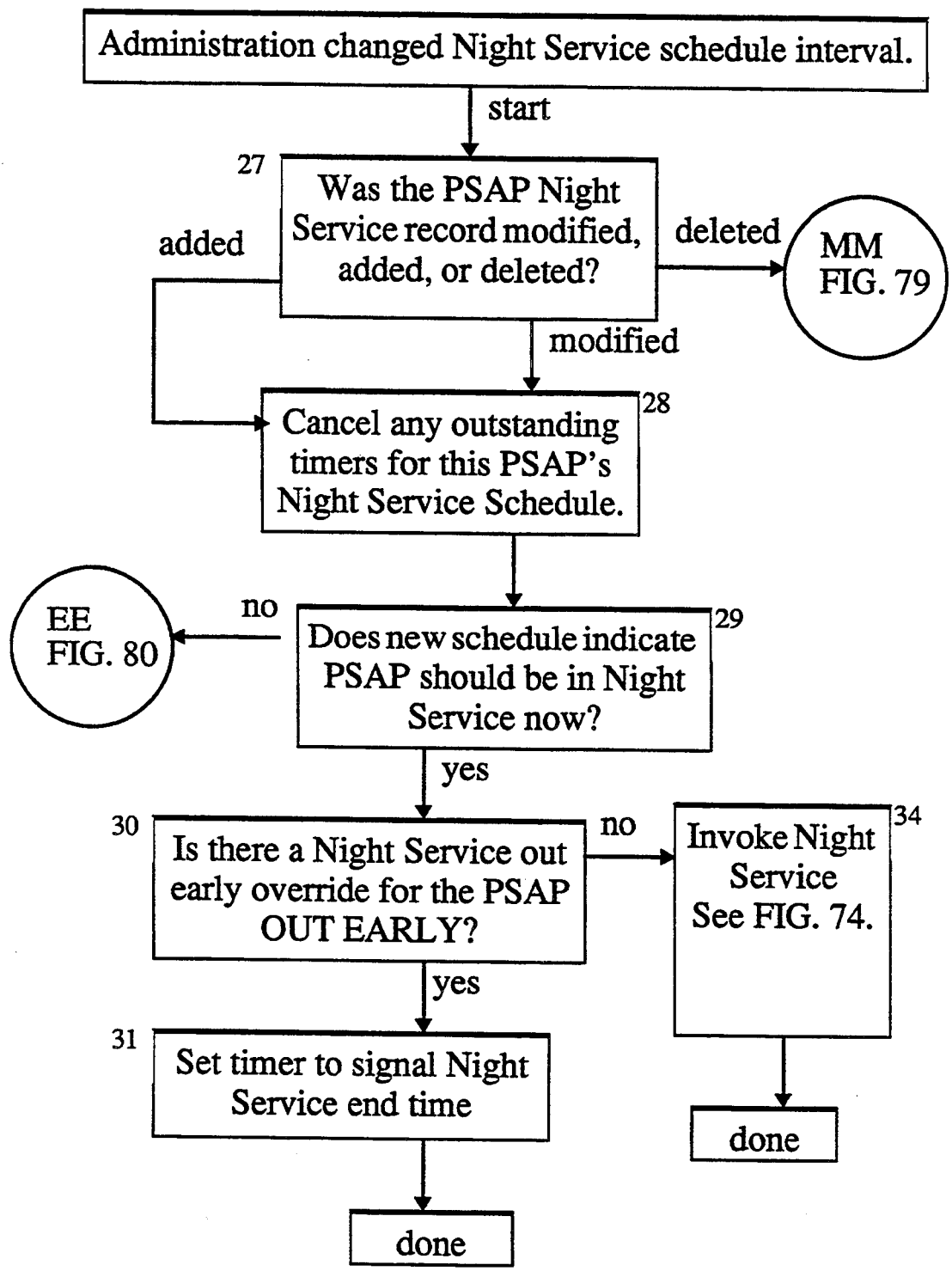
Figure 79:
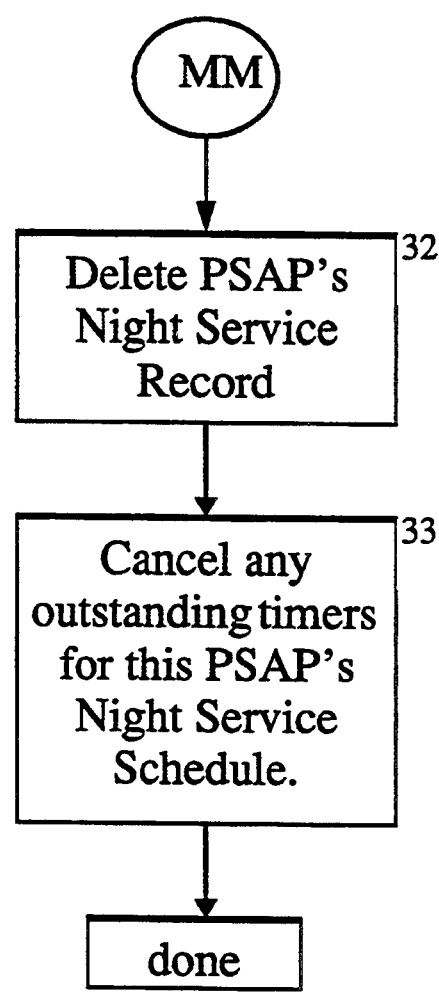

Step 21: As shown in FIG. 77, the next determination is whether the given PSAP 216 is Abandoned. Chart NS1 refers to lines 157, 166 and 171 in the p—handle—state—change ( ) routine. A Q—DEACT—NITE—SERVICE message from Step 22 (line 309) relates to the p—handle—state—change( ) routine, where line 151 identifies the Q—DEACT—NITE—SERVICE case. Starting at line 151 of the p—handle—state—change( ) routine, the switch command at line 157 initiates the reading of the possible states of the given PSAP 216. Chart NS1 also refers to line 253 of the alarm—handler ( ) routine. If the given PSAP 216 is Abandoned, a "yes" branch is taken to Step 26, if not, a "no" branch is taken to Step 65.

Step 65: Still referring to the alarm-handler( ) routine, following the determination that the given PSAP 216 is not Abandoned (line 253), at line 258 the state of the given PSAP 216 is changed to ACTIVE in the administered PSAP table 382 (FIG. 21).

Step 66: Returning to the p—handle—state—change( ) routine, it is recalled that when Night Service is invoked, there may be a delay in invoking Night Service if E9-1-1 calls 201 are enroute to the given PSAP 216. This is indicated by the "in night service soon" at line 179 (FIG. 21, table 388). If "yes," a "yes" branch is taken to Step 67, otherwise a "no" branch is taken to Step 23.

Step 23: If the PSAP 216 is not in the "in night service soon" state, it is in Night Service and the case at line 171 applies. Chart NS1 shows that Step 23 is performed by the p—handle—state—change( ) routine at line 174 which removes the "do not disturb" from the notification line 241 of the given PSAP 216. This allows E9-1-1 calls to be routed to the given PSAP 216 from the queue 243. At line 176 the PSAP state is changed to PS—ACTIVE.

Step 24: With the PSAP 216 in the PS—ACTIVE state, a call is made to the w—psap—state( ) routine, to Step 24, lines 2423 and 2527. The message line 240A is changed such that the screen 222 shown in FIG. 15B is updated to indicate to the attendants 221 that the given PSAP 216 is out of Night Service (is "Active").

Step 25: Also in the w—psap—state ( ) routine, lines 2422 and 2534, state information is updated on to screens 22 of the attendant workstations 212.

Step 67: If the given PSAP 216 is in the condition to be in night service soon, the "yes" branch from Step 66 is taken to Step 67. Chart NS1 indicates that the p—handle—state—change( ) routine operates at line 180 to cancel the ten second interval timer 632 that signalled night service soon. The timer 632 will then be ready for the next time Night Service is invoked.

Step 26: In either event determined by Step 21 (the given PSAP 216 is or is not Abandoned), the set—alarms ( ) routine is called at line 269 of the alarm—handler ( ) routine. The timer 636 is set to signal the start time $t_s$ of the next night service interval $\Delta t_{ns}$. Upon setting the timer 636, all Steps will have been taken to end the Night Service state of the given PSAP 216.

Invoking Night Service Resulting From Administratively Changed Night Service Schedule As noted above, both the platform administrator 239 and a PSAP attendant 259 may change the administration of a PSAP 216. Depending on the nature of the change to the night service schedule and the state of the PSAP 216 at the time the schedule is changed, (1) Night Service may be immediately invoked, or (2) the timer 636 set to signal the start time $t_s$ of the next night service internal $\Delta t_{ns}$, or (3) the timer 632 set to signal the end time $t_e$ of the current night service interval $\Delta t_{ns}$ (in which event the timer 632 is referred to as an end timer 637).

Administration of NS Schedule: Considering changes to a night service schedule 262, reference is made to FIG. 78.

Step 27: At lines 221, 249 and 273 of an update_ns_data routine in a rtr_update_data.c file, a determination is made as to whether the night service record in the table 382 (FIG. 21) was added to, deleted or changed. A new night service record is added only when a new PSAP 216 is being added to the C.E.R.S. system 200. If added to, an "added" branch is taken to Step 28.

Step 28: Since a PSAP 216 is added by this change, a determination is made as to whether this PSAP 216 has been administered. This determination is made at line 336 of the set_alarms ( ) routine. If the PSAP 216 is administered starting at line 369, the set_alarms( ) routine cancels any timers 632, 636 and 637 which may have been set for the new PSAP 216.

Administrative Modification of NS Schedule: Step 27, line 273 determines that an existing night service record in the table 382 (FIG. 21) has been changed, and a "modified" branch is taken to Step 28, where any outstanding timers 632, 636 and 637 for the existing PSAP 216 are canceled.

Step 29: The set-alarms( ) routine also determines whether such added or modified night service record currently calls for the new or existing PSAP 216 to be in Night Service. The cur_tick_ndx( ) routine is called at line 397 and if its return is not −1, then a "yes" branch is taken to Step 30, indicating that such PSAP 216 should currently be in Night Service according to the current schedule 262.

Step 30: If the current time $t_c$ is in a night service schedule 262 of the current record, the PSAP 216 may still not be in Night Service if an out early override 361 has been set. At lines 408 and 409 a determination is made as to whether there is an out early override 361. If not, a "no" branch is taken to Step 34, else a "yes" branch is taken to Step 31.

Step 34: Night Service is invoked at line 420 by calling the invoke_nite_srvc( ) routine (FIG. 75) which is performed as described above.

Step 31: If there is an out early override 631 when the record for such new or existing PSAP 216 has been added or changed, respectively, the timer 637 is set to signal the end of the current night service interval $\Delta t_{ns}$. This is performed at line 436. Because the end timer 637 may only be set up to twenty-four hours ahead, at the end of the current twenty-four hour period, the set_alarms ( ) routine then set the timer 636 for the start time $t_s$ of the next $\Delta t_{ns}$ (at line 508).

Figure 80:
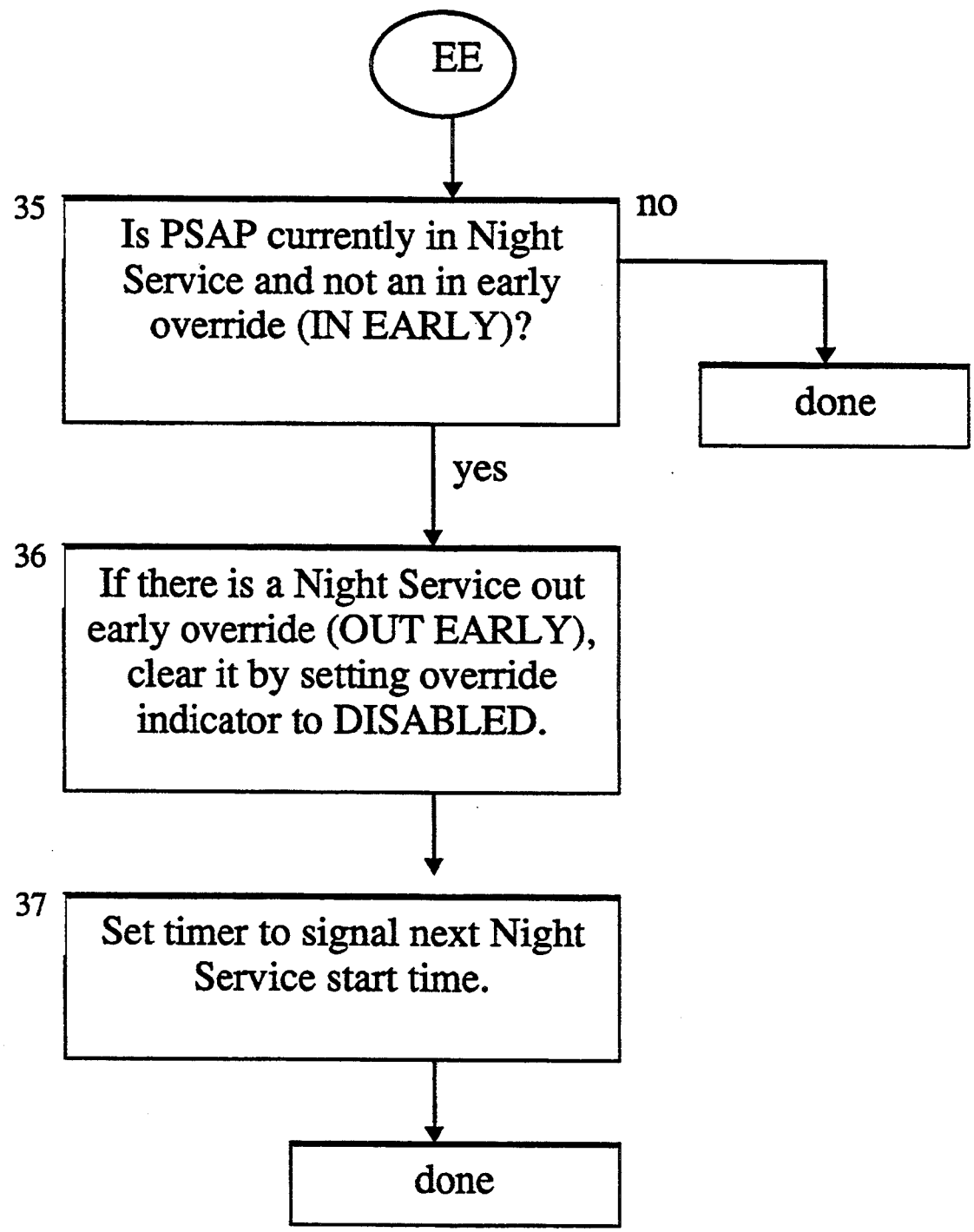

PSAP Not Currently In Night Service Per Added/Modified Record: At Step 29, if it is determined that according to the new night service schedule 262 the new or existing PSAP 216 should not currently be in Night Service (time $t_c$ should not be in a night service interval $\Delta t_{ns}$), then a "no" branch is taken to Step 35 (FIG. 80).

Step 35: The else at line 454 represents the "no" branch. To be sure that the administered PSAP table 382 (FIG. 21) is correct, a determination is made at time $t_c$ as to whether such table 382 indicates that the PSAP 216 is in Night Service but there was no in early override 360. If not, the PSAP 216 is not in Night Service, which is the desired state according to the new night service schedule 262. If "yes", a "yes" branch is taken to Step 35A.

Step 35A: Since the new night service schedule 262 indicates that the given PSAP 216 should not be in Night Service, the end night service function is called at line 463 of the set_alarms( )routine of the rtr_nite_servc.c file.

Step 36: Having ended the current night service interval $\Delta t_{ns}$ for the given PSAP 216 in response to the new or modified night service record indicating that at $t_c$ the given PSAP 216 should not be in $\Delta t_{ns}$, any out early override 361 which may have been set is not applicable since there is no $\Delta t_{ns}$ at time $t_c$. If an out early override 361 has been set, at line 491 the override 633 is set to DISABLED.

Step 37: Since there is no current $\Delta t_{ns}$, at line 498 the timer 636 is set for the $t_s$ of the next $\Delta t_{ns}$ (lines 501-509).

Step 32: Referring again to Step 27, the third determination could be that the PSAP 216 was being "dropped" from the C.E.R.S. system 200. In that event, the night service record would have been deleted and Step 32 is performed by the update_ns_data ( ) routine at line 249. This is done by setting the Nite_srvc_tbl [key]administered to FALSE. The "key" is referenced to the given PSAP 216, indicating that the given PSAP 216 is no longer a part of the C.E.R.S. system 200.

Step 33: Also, any timer 632 that was set for this given PSAP 216 is canceled at line 269.

Administration Changed Night Service Override Condition

Step 38: Referring to FIG. 81, reference was made above to override administration. There, Step 38 was described and related to the selection by an administrator 239 of a new override condition. Step 38 ended with updating the databases 470 of the psap process and the router process 360 (FIG. 65) with the new override condition.

Step 39: FIG. 81 indicates that Step 39 follows the database update, and at line 61 asks IF the new override condition is in early. ELSE refers to FIG. 10, whereas a "yes" branch is taken to Step 40. This determination is necessary for determining an error condition, because in early is not appropriate if the given PSAP 216 is already in Night Service.

Step 40: At line 68, a determination is made that the given PSAP 216 is in Night Service, Step 42: If the determination in Step 49 is yes, the in early override 630 is ignored by disabling it (line 82).

Step 41: With both an in early override 630 and the given PSAP 216 not in Night Service ("no" branch to Step 41), the given PSAP 216 is put in the Night Service state by "invoking" night service at line 99. This calls the invoke_nite_srvc() routine, described above with respect to FIG. 74.

Out Early Override 631 Set by Administration

Figure 82:
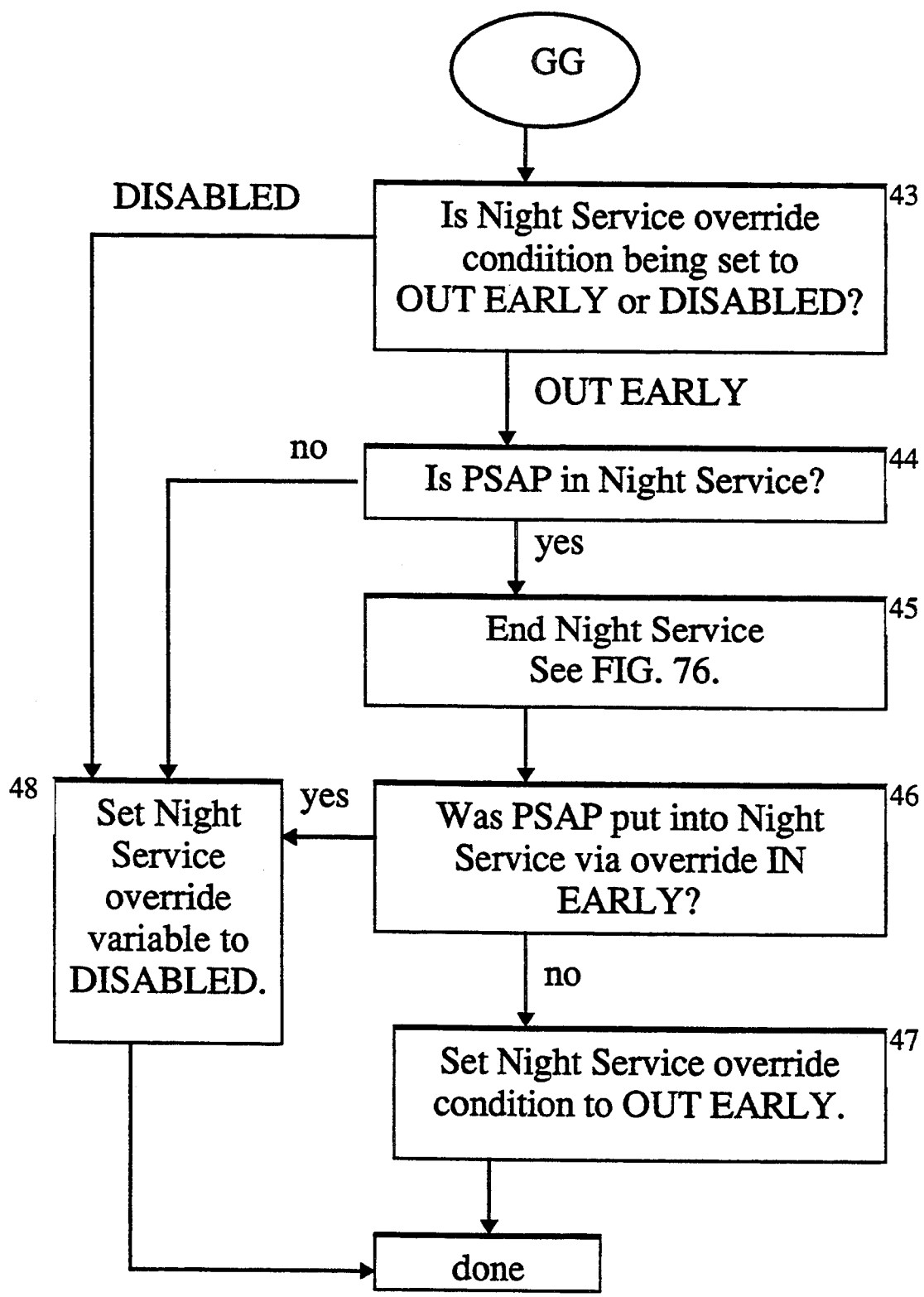

Step 43: Referring to FIG. 82, as noted above, the ELSE at line 106 corresponds to the IF at line 61, and the third possible override condition 633 is at line 176 (DISABLED). Considering the out early override condition 631, it is meaningful if the given PSAP 216 is currently in Night Service. Step 43 determines whether the override 631 is out early. If so, an "out early" branch is taken to Step 44.

Step 44: At line 108, if the given PSAP 631 is not in Night Service, the out early override 631 is ignored, and Step 48 is performed as described below. If at time $t_c$ the given PSAP is in Night Service, the out early override 631 is effective (FIG. 21c) and a "yes" branch is taken to Step 45.

Step 45: At line 130, the end_nite_srvc() routine is called. If it returns SUCCESS as described above with respect to FIG. 6, another inquiry is made in Step 46.

Step 46: Here, the manner in which the given PSAP 216 went into Night Service is determined. The choices are two, (1) via scheduled night service (schedule 262), or (2) via an in early override 630. If (2), the determination thereof at line 138 causes a "yes" branch to be taken to Step 48, described below, where the in early override 630 (no longer needed) is disabled. A no branch (not invoked by an in early override 630) is taken to Step 47.

Step 47: This concludes the instruction by administration to set the override to the new out early condition. The ELSE at line 143 corresponds to the IF at line 138. The administered PSAP table 382 (FIG. 21) for the give PSAP 216 is updated to indicate that the newly administered out early override 361 caused the given PSAP 216 to exit Night Service.

Step 48: The disable override flag 633 occurs as follows. If in Step 43 it was determined that the disabled condition is to be set via the new override flag 633, line 184 is performed. If the PSAP 216 is not in Night Service in Step 44, line 121 is performed. If Step 46 determined that an in early override 630 was set, the disabled condition occurs at line 141 where the flag 633 is set to disabled.

PSAP Abandonment Activated

As described above, any given PSAP 216 may be placed in the Abandoned state by administration using the PSAP Administration screen 222 (FIG. 50A).

Step 72: In this event, the update_psap_data ( ) routine responds to the updating of the PSAP state flag to "abandoned."

Step 73: In response to the state flag, at line 1607 the psap_ptr is updated to the "PS_ABANDONED" state, and at line 1612 the psap process 361 is sent a state update.

PSAP Abandonment Cancelled

When administration cancels the Abandoned state for a given PSAP 216, the night service schedule 262 for that PSAP 216 controls whether that PSAP 216 should immediately be in Night Service.

Step 74: At line 1603, a change in the state from Abandoned is found. At line 1614, it is determined that the Abandoned state for a given PSAP 216 has been cancelled.

Step 75: In response to the cancellation of the Abandoned state, the instruction at line 1626 calls the rtr_ns_check ( ) routine to determine whether the given PSAP 216 should immediately be in Night Service. If no, no further action is taken. If yes, Night Service is invoked as described above. The determination of Step 75 is described below with respect to FIG. 26.

Should PSAP 216 Be In Night Service After Abandonment!

Step 77: Is performed by the rtr_ns_check ( ) routine starting at line 266 of the rtr_ns_utils.c file. In general, it may be understood that if no override condition 630 or 631 is set or established as of the time $t_c$ of canceling the Abandoned state, the given PSAP 216 would be in Night Service immediately upon canceling the Abandoned state only IF the time $t_c$ of such canceling is in a nigh service interval $\Delta t_{ns}$ (FIG. 69(a)). However, if there is an override condition 630 or 631 set as of the time $t_c$ of such canceling, then there are many situations in which the given PSAP 216 could be immediately in Night Service. For example, referring to FIG. 69(b), an attempt may have been made to have the given PSAP 216 enter Night Service on an unscheduled basis via an in early flag 630 overriding an active part of the night service schedule 262. In FIG. 69(b), the current time $T_c$ is the time at which the Abandoned state was canceled, FIG. 69(b) shows that the current time $t_c$ is at the same time $t_{ac}$ at which abandonment had been canceled. It is noted that for ongoing operation of the C.E.R.S. system 200, the current time $t_c$ would be only moments after the time $t_{ac}$ at which abandonment had been canceled. In this example, the current time $t_c$ is shown in FIG. 69(c) as still not in the night service interval $\Delta t_{ns}$ next following such in early time $t_{ad}$. The scheduled active state at the current time $t_c$ could be ignored and Night Service could be invoked for the given PSAP 216 if an in early override flag 630 had been set in the active part of the night service schedule 262, i.e. at time $t_{ia}$.

Step 77 includes an instruction at line 266 to determine whether, for the given PSAP 216, there is then an in early override 630 or an out early override 631 set. If such override condition is set as of the time of initialization, the PSAP table entry (FIG. 21) Psap_tbl[i].ns_override will be set to "in early" or "out early". If line 266 is answered "no", this means that the override flag 633 was set to DISABLED, and FIG. 88 indicates that Step 78 is performed as described below. If lines 266 is answered "yes", FIG. 88 indicates the Step 81 is performed starting at "else" at line 291.

Step 81: The rtr_ns_check( ) routine is in the rtr_ns_utils.c file at line 227 where certain parameters are passed in. These include parameters representing the override time ("override_time"), which is denoted "$t_{ia}$" for the early flag 630 and "$t_{oa}$" for the out early flag 631. At line 301 Step 81 determines whether the override was an "in early" override flag 630. If Psap_tbl[i].ns_override (FIG. 21) was set to in early (as indicated by override_flag = = IN EARLY at line 301), then Step 82 is performed.

Figure 63:
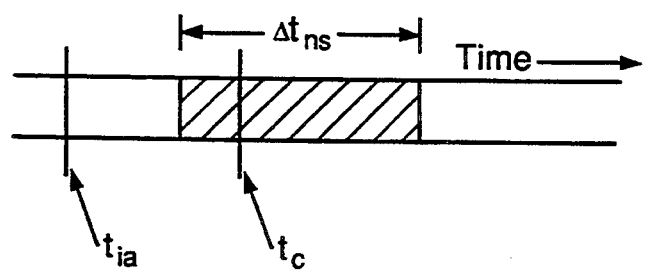
Figure 66:
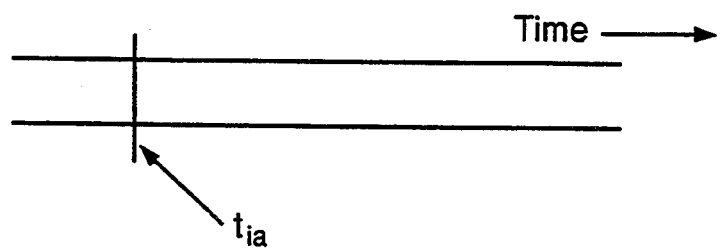
Figure 66A:
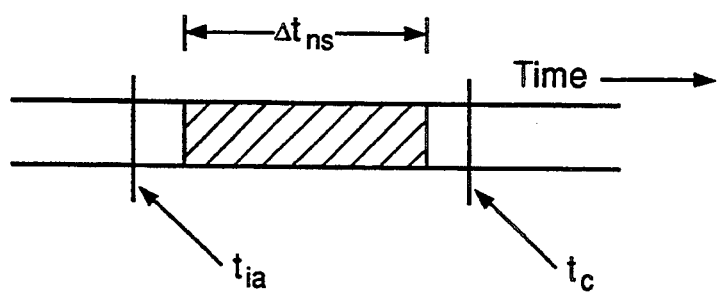
Figure 66B:
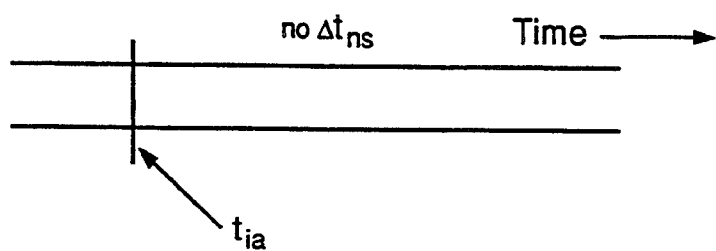
Figure 66C:
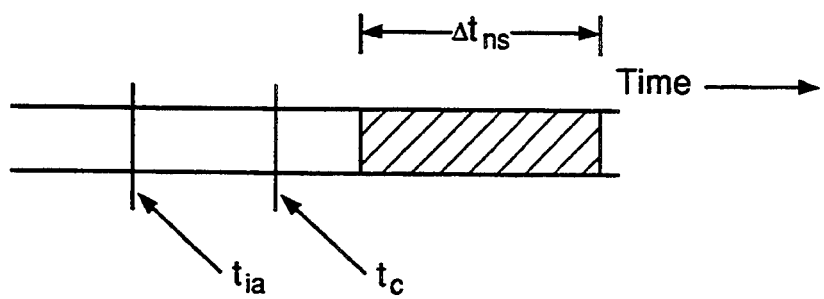

Step 82: Still referring to FIG. 88, a "yes" branch is taken from Step 81 to Step 82. There are four situations in which the given PSAP 216 will be in Night Service immediately after canceling the Abandoned state when the in early override 360 was set. First, if the in early override 360 was set and there are no night service intervals $\Delta t_{ns}$ (FIG. 66(b)). Second, where the time $t_{ia}$ at which the in early flag 360 was administered was not in a night service interval $\Delta t_{ns}$, but the current time $t_c$ at which the abandoned state was canceled is in such interval $\Delta t_{ns}$ (FIG. 63). Third, in FIG. 6(a) where the time $t_{ia}$ of an in early override and the current time $t_c$ are not in a night service interval $\Delta t_{ns}$. Finally, in FIG. 61(f) where the time $t_{ia}$ of an in early override 630 is before a night service interval $\Delta t_{ns}$, and $t_c$ is after that interval $\Delta t_{ns}$.

Chart NS1 refers Step 82 to line 325. If either ndx = = −1 (no $\Delta t_{ns}$ at $t_c$) or ndx = = j ($t_c$ is between $t_{ia}$ and $t_e$ of the $\Delta t_{ns}$ next following $t_{ia}$), then a "yes" branch is taken to Step 84. Otherwise, a "no" branch is taken to Step 83.

Step 84: A "yes" branch from Step 82 is taken to Step 84 at line 327 which returns TRUE to line 1626 of a rtr_update_data.c file, in an update_psap_data ( ) routine and the given PSAP 216 is in the Night Service state.

Step 83: If the return is not TRUE at line 327, line 328 does not return TRUE, and the given PSAP 216 is not in Night Service.

Figure 89:
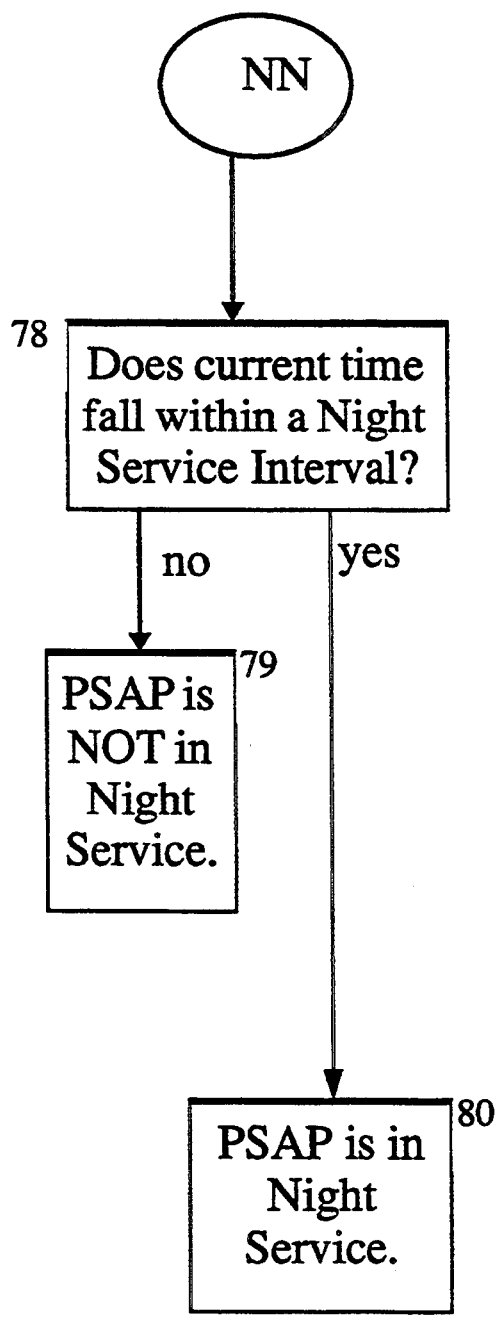

Step 78: As shown in FIG. 89, when Step 78 is performed following Step 77, the rtr_ns_check ( ) routine at line 282 determines whether the current time $t_c$ is in a night service interval $\Delta t_{ns}$, shown as "yes" in FIG. 89. If "yes," the "yes" branch is taken to Step 80 (line 284) whereas if "no," a "no" branch is taken to Step 79 (line 288).

Step 85: It may be recalled that in Step 77, the "yes" branch indicated that it was determined that some override 630 or 631 was set and Step 81 was performed. The "no" result of Step 81 is that the override for the given PSAP 216 was not the in early override 630. In this event, the "no" branch is taken to a Step 85. Chart NS1 indicates that Step 85 is performed by the rtr_ns_check ( ) routine starting at line 341. The instruction at line 341 follows the determination at line 330 indicating that the out early override 631 was set.

Figure 69A:
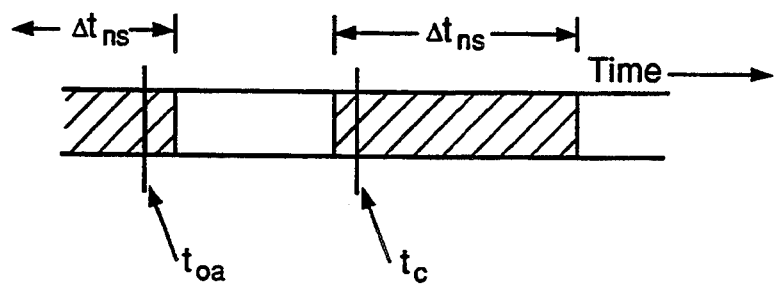
FIGS. 69(a) through (c) are timing diagrams illustrating night service states which may occur upon canceling the Abandoned state of a PSAP.
Figure 69B:
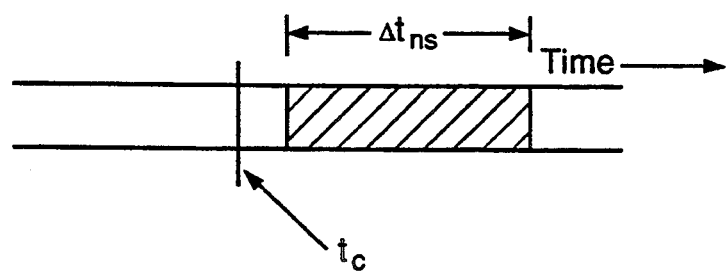
Figure 69C:
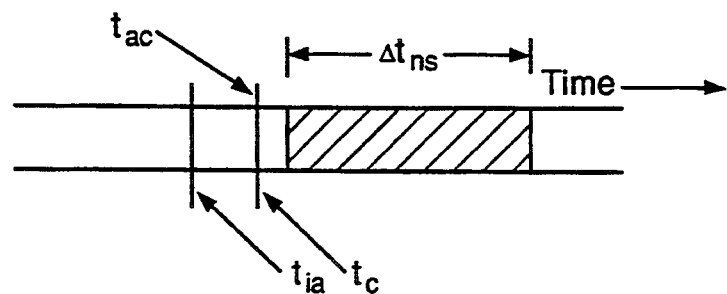
Figure 70:
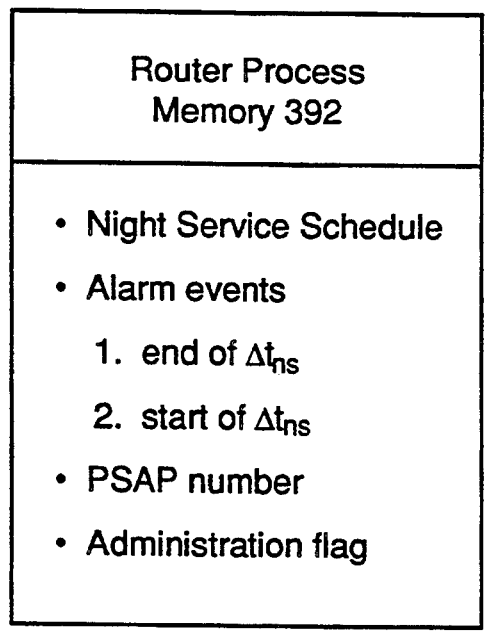
FIG. 70 is a schematic diagram illustrating data stored in memory in the router process for administering night service for a PSAP.

As a preface to this determination, reference is made to FIG. 69(a) which shows a situation which may exist at the time $t_{oa}$ at which the out early override was 631 set. FIG. 69(a) indicates that $t_{oa}$ was in a night service interval $\Delta t_{ns}$, but there is a different current (at $t_c$) night service interval $\Delta t_{ns}$. Therefore, the out early override 631 could not be currently acted on to take the given PSAP 216 out of Night Service.

In step 85, night service in the event that $t_{oa}$ is not within the current night service interval $\Delta t_{ns}$, but $t_c$ is taken to curent interval $\Delta t_{ns}$ (FIG. 67(b)), a "yes" branch is taken to a Step 86. If not currently in a night service interval $\Delta t_{ns}$, or if $t_{oa}$ was in an interval $\Delta t_{ns}$ and $t_{ia}$ is not in an interval $\Delta t_{ns}$, then a "no" branch is taken to Step 87.

STep 86: In Step 86, line 344 does not return a message 288 "TRUE" to the calling routine. Thus, even though the purpose of the out early override 631 was to take the given PSAP 216 out of Night Service early, the given PSAP 216 was in the Abandoned state at the time $t_{oa}$, such that at the current time $t_c$ the out early override 631 is not effective and, the given PSAP 216 is in Night Service (FIG. 67(b)).

Step 87: If Step 85 determines that the current time $t_c$ is not in a night service interval $\Delta t_{ns}$ (FIG. 67(d)), or if $t_{oa}$ is not in the current $\Delta t_{ns}$ (FIG. 67(d), a "no" branch is taken to a Step 87 where the same routine indicates that the given PSAP 216 is not in Night Service. The state of the administered PSAP table 382 is updated to "not in Night Service".

Figure 88:
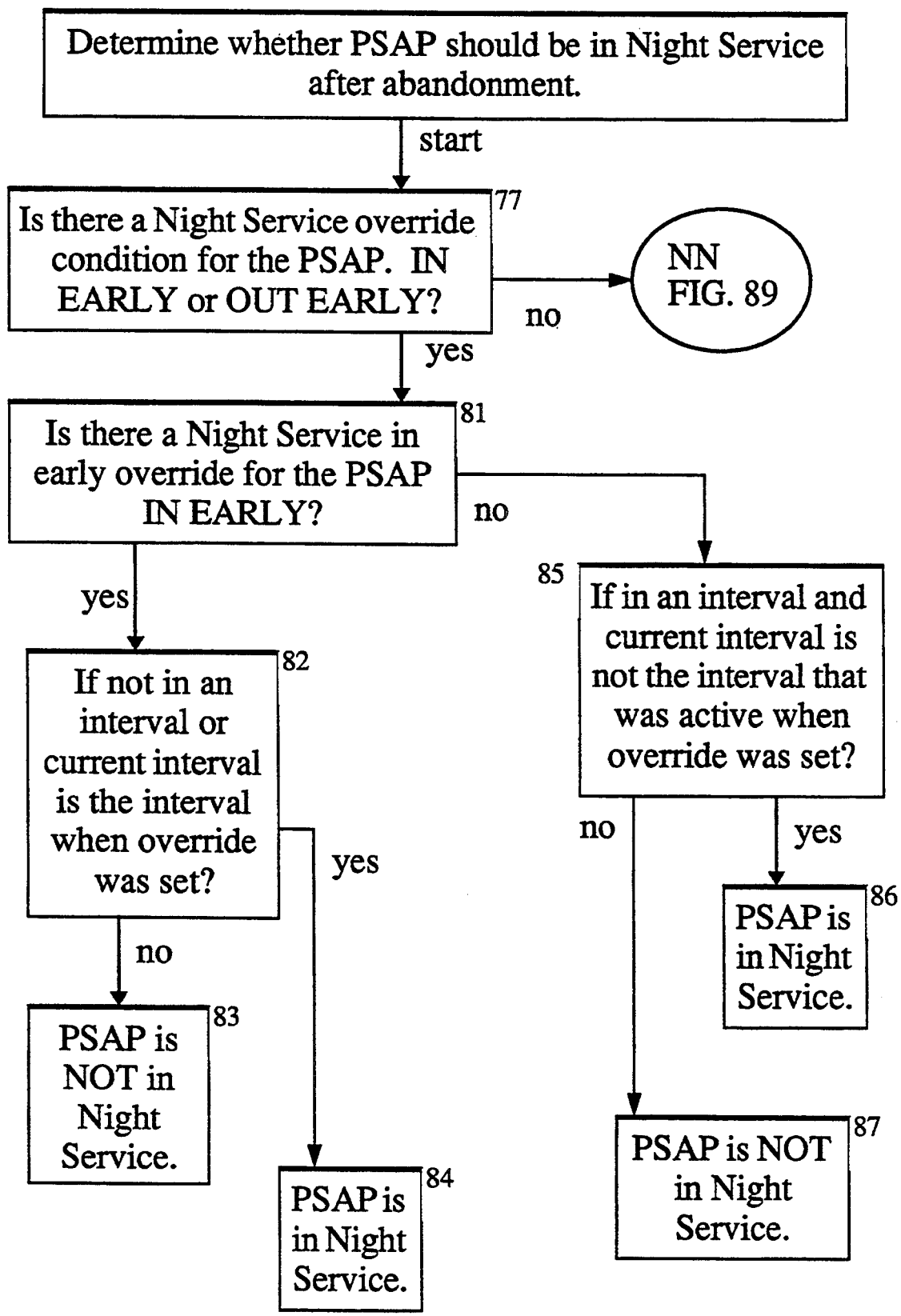

Referring again to FIG. 87 and summarizing, Step 75 determined whether the given PSAP 216 should immediately be in Night Service. The "yes" branch from Step 75 is taken in various post-abandoned state situations. First, in response to an in early override 630, where Step 82 determined that the given PSAP 216 should immediately be in night service (FIG. 88). Second, where there is an out early overide 631 and the override time $t_{oa}$ and the current time $t_c$ do not coincide in a night service interval $\Delta t_{ns}$ (FIG. 67(b)). Third, without any override, Step 78 (FIG. 61) determined that upon charge of state from Abandoned the given PSAP 216 should immediately be in Night Service.

So, via Steps 78 and 80, or 82 and 84, or 85 and 86, the init_nite_srvc( ) routine is called to invoke Night Service as described above in respect to FIG. 75.

While the preferred embodiment has been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. A system for initializing operation of means for routing emergency calls to a selected means for answering calls, said answering means having an active condition and an inactive condition, said system comprising:
   first means for determining whether said answering means should be in said inactive condition upon the initial operation of said routing means;
   means effective upon said first determining means determining that said answering means should be in said inactive condition upon said initial operation of said routing means for causing said answering means to be in said inactive condition, said causing means comprising:
   means for defining an interval of time during which said answering means is to be in said inactive condition;
   second means for determining whether said particular time of initializing said routing means is within said interval of time; and
   means effective upon a determination that said time of initializing is not within said interval of time for rendering said causing means effective to maintain said answering means in said inactive condition during said interval of time.

2. A system for initializing said operation according to claim 1, said causing means further compromising:
   means for providing a signal to indicate the end of said inactive condition of said answering means.

3. A system according to claim 1, further comprising:
   means effective upon said first determining means determining that said answering means should not be in said inactive condition upon said initial operation for causing a signal to occur to indicate the time at which said answering means is to enter said inactive condition.

4. A system according to claim 1, wherein said initializing occurs at a particular time, said causing means further comprising:
   means for defining a night service interval of time during which said answering means is in said inactive condition;
   means for overriding said causing means, said overriding means having a disabled condition and an override condition, in said override condition said overriding means causing said ansering means to selectively be in said active condition or in said inactive condition;
   second means for determining if said particular time of initializing is within said night service interval; and
   means effective upon a determination that said time of initializing is within said night service interval for causing said overriding means to be in said disabled condition and for rendering said defining means effective to indicate the end of said night service interval.

5. A system for administering the state of an emergency telephone call answering station adapted to be in an active state or an inactive state according to a plurality of schedules selected for controlling the availability of said station to answer said call, said schedules being administrable to provide a first schedule and a second schedule, a next one of said states temporally following a current one of said states according to one of said schedules, comprising:
 means for administering said first schedule to either add to, modify or delete said first schedule to form said second schedule;
 means for signalling the start and end of said inactive states, said signalling means being set to signal said inactive states which may be in said first schedule; and
 means responsive to the addition to or modification of said first schedule for rendering said signalling means ineffective with respect to the start and end of said inactive states which may be in said first schedule.

6. A method for controlling emergency call routing from an incoming trunk to a selected one of a plurality of call answering stations; each said station being adapted to be in one of an active state or a night service state; said night service state being scheduled to occur during a night service interval of time; said method utilizing a computer having a first table for selectively establishing for each said station an in early condition for overriding said active state, an out early condition for overriding said night service state, and a disabled condition for overriding neither said active nor said night service state; said computer having a second table for indicating for each said station an active state and said night service state; said computer being adapted to be initialized at given time; said method comprising the steps of:
 at said given time, checking said first table to see if one of said in early or out early override conditions is established for a selected one of said stations;
 neither of said in early nor out early conditions is established at said given time for said selected station, comparing said given time to said night service interval for said selected station; and
 if said given time is not within said night service interval causing a signal to occur at the time at which said night service interval is to start for said selected station and setting said second table to indicate that said selected station is in said active state.

7. A method accordint to claim 6, further comprising the steps of
 if one of said in early or out early conditions exists at said given time then determining whether said in early condition exists; and
 if said in early condition exists and if none of said night service intervals is scheduled for said selected station then causing said second table to indicate that said station is said night service state.

8. A method according to claim 6, wherein said first table established said out early condition of said selected station at an override time; said method further comprising the step of:
 if one of said in early or out early conditions exists at said given time, then determining that said out early condition exists.

9. A method according to claim 8 further comprising the step of:
 if said override time was in one of said night service intervals then determining whether said override time and said given time are within the same night service interval.

10. A method according to claim 9 further comprising the step of
 if said override time and said given time are within the same night service interval, causing second table to indicate said active state for said selected station.

11. A method according to claim 8 further comprising the step of:
 if said override time was not in one of said night service intervals then causing said first table to establish said disabled condition.

12. A method according to claim 8 further comprising the step of:
 if said override time was not in one of said night service intervals then determining if said given time is in one of said night service intervals.

13. A method according to claim 8 further comprising the step of:
 if said given time is in said night service interval, then causing said second table to indicate that said station is currently in said inactive state.

14. A method according to claim 13 further comprising the step of:
 if said given time is not in said night service interval, then causing said second table to indicate that said station is currently in said active state.

15. A method for controlling the availability of a call answering station to answer an emergency call routed to it from an incoming trunk; said station being adapted to be in one of an active state or a scheduled unavailable state; said scheduled unavailable state being scheduled to occur during a scheduled unavailable interval of time, said method utilizing a computer having a first table for selectively establishing for each said station an in early condition for overriding said active state, an out early condition for overriding said scheduled unavailable state; and a disabled condition for overriding neither said active nor said scheduled unavailable state; said computer having a second table for selectively indicating for said station said active state and said scheduled unavailable state; said computer being adapted to be initialized at a given time, said method comprising the steps of:
 at said given time, checking said first table to see if one of said in early or out early override conditions is established for said station;
 if neither of said in early nor out early conditions is established at said given time for said station, comparing said given time to said scheduled unavailable interval for said station; and
 if said given time is not within said scheduled unavailable interval causing a signal to occur at the time at which scheduled unavailable interval is to start for said station and setting said second table to indicate that said station is available to answer said emergency call.

16. A method according to claim 15 further comprising the steps of:
 if one of said in early or out early conditions exists at said given time then determining whether said in early condition exists; and
 if said in early condition exists and if none of said scheduled unavailable intervals is scheduled for said selected station then causing said second table to indicate that said station is in said scheduled unavailable state.

17. A method according to claim 15, wherein said first table established said out early condition of said station at an override time, said method further comprising the step of:

if one of said in early or out early conditions exists at said given time, then determining that said out early condition exists.

18. A method according to claim 17 further comprising the step of:

if said override time was in one of said scheduled unavailable intervals then determining whether said override time and said given time are within the same scheduled unavailable interval.

19. A method according to claim 18 further comprising the step of:

if said override time and said given time are within the same scheduled unavailable interval, causing said second table to indicate said active state for said selected station.

20. A method according to claim 17 further comprising the step of:

if said override time was not in one of said scheduled unavailable intervals then causing said first table to establish said disabled condition.

21. A method according to claim 17 further comprising the step of:

if said override time was not in one of said scheduled unavailable intervals then determining if said given time is in one of said scheduled unavailable intervals.

22. A method according to claim 17 further comprising the step of:

if said given time is in said scheduled unavailable interval, then causing said second table to indicate that said station is currently in said scheduled unavailable state.

23. A method according to claim 17 further commprising the step of:

if said given time is not in said scheduled unavailable interval, then causing said second table to indicate that said station is currently in said active state.

24. A method according to claims 16 or 21, said station also being adapted to be in an unscheduled unavailable state said second table also selectively indicating said unscheduled unavailable state for said station, said method further comprising the step of:

causing said second table to indicate that said station is in said scheduled unavailable state only if said station is not in said scheduled unavailable state at said given time.

25. A system for administering the state of an emergency telephone call answering station adapted to be in an active state or an inactive state according to a plurality of schedules selected for controlling the availability of said station to answer said call, said schedule being administrable to provide a first schedule and a second schedule, a next one of said states temporally following a current one of said states according to one of said schedules, comprising:

means for administering said first schedule to either add to, modify or delete said first schedule to form said second schedule; and first means responsive to the adding to or modifying of said first schedule to form said second schedule at a current time for determining whether said current time is within an inactive state of said second schedule.

26. A system according to claim 25, further comprising:

second means for ignoring said determination of said first means that said current time is within said inactive state of said second schedule and setting.

27. A system according to claim 26, further comprising:

means effective if said second means has not ignored said determination for rendering said station unavailable to answer said call.

28. In a system for controlling the availability for operation of a unit for answering an emergency telephone call, said unit being available for operation in an active service interval and not being available for operation in an inactive interval, the improvement comprising:

means for signalling a change in a current one of said intervals;

first means for determining whether the change in said current interval is the end or the start of one of said inactive intervals;

means for setting a record to indicate whether or not a particular unit is currently scheduled for an inactive interval; and means for overriding said record to indicate a new availability of said unit changing from said inactive interval to said active interval or changing from said active interval to said inactive interval regardless of which of said intervals is currently scheduled as indicated by said record.

29. A system according to claim 28, further comprising:

second means responsive to said first determining means determining that said change in said current interval is the start of said inactive interval for determining that said unit is currently not in said inactive interval and that said overriding means has not overridden said record to change said availability to said inactive interval.

30. A system according to claim 29, further comprising:

means responsive to said second means making both of said determinations for causing said record setting means to set said record to indicate that said unit currently is scheduled for said inactive interval.

31. A system according to claim 28, further comprising:

means having an override record for recording said new availability of said unit;

said overriding means being effective to cause said override record to change from a first setting to a second setting for indicating said change to said active service interval or to said inactive interval; and second means responsive to said determining means determining that said change is the start of said inactive interval for determining that said unit currently is in said inactive interval and that said override record is in said second setting for causing said signalling means to signal the end of said inactive interval.

32. A system according to claim 28, further comprising:

second means responsive to said first determining means determining that said change is the end of a current one of said inactive intervals for determining whether said overriding means set said record to indicate changing from said inactive interval to said active service interval.

33. A system according to claim 32, further comprising:
means responsive to said second means determining that said record is set to indicate changing to said active service interval for setting said signalling means to signal a change from said active service interval to said inactive interval.

34. A sytem according to claim 32, further comprising:
means responsive to said second means determining that said record is not set to indicate changing to said active service interval for causing said setting means to indicate that said particular unit is not currently scheduled for said inactive interval.

35. A system according to claim 28, further comprising:
means responsive to said first determining means for setting said signalling means to indicate the end or the start of said inactive interval.

36. A system according to claim 28, further comprising:
means having an override record for recording said new availability of said unit;
said overriding means being effective to cause said override record to change from a first settig to a second setting for indicating said change to said active service interval or to said inactive interval; and
second means responsive to said determining means determining that said change is the start of said inactive interval for determining that said unit currently is in said inactive interval and that said override record is in said second setting for changing said override record to said first setting.

37. A system for controlling the operation of a switching device that routes incoming emergency telephone calls to a public safety answering point at a current time, said switching device having router means for sending first messages related to one of said calls received by said switching device, and said router means having means for receiving return messages indicative of a particular PSAP to which said one call is to be routed, said switching device also having computer means for receiving said first messages and generating said return messages, said PSAP being adapted to be in an active service state to answer said calls routed thereto, during a given interval of time said PSAP being adapted to be in a night service state unavailable to answer saic calls, comprising:
first means for causing said computer means to define a schedule including at least one first interval of time corresponding to said active service state, said schedule including at least one night service interval of time corresponding to said night service state;
second means for causing said computer means to record conditions for overriding said scheduled intervals of time, said conditions including an in early condition and an out early condition;
third means for causing said computer means to signal a change in the service state of a given PSAP, said change being based on said schedule; and
fourth means for causing said computer means to determine whether said signal indicates the start or the end of said night service state.

38. A system according to claim 37, further comprising:
fifth means for causing said computer means to determine whether at the current time at which one said call is to be routed said given PSAP is in said night service state and whether one of said in early conditions is recorded by said second means.

39. A system according to claim 38, further comprising:
sixth means effective upon said fifth means determining that said given PSAP is in said night service state and that said in early condition is recorded by said second means for causing said computer means to set said third means to operate at the end of a current one of said night service intervals to signal the end of said current night service control.

40. A system according to claim 38, further comprising:
sixth means effective upon said fifth means determining that either said given PSAP is not in said night service state and/or that said in early condition is not recorded by said second means for causing said computer means to cause said PSAP to be in said night service state.

41. A system for changing the state of an emergency telephone call answering station adapted to be in an active state or an inactive state, a next one of said states temporally following a current one of said states, comprising:
first means for indicating the start of a next one of said inactive states:
second means for determining whether one or more of said emergency calls are enroute to said station when said state is to be changed to said next inactive state;
third means responsive to a determination that at least one of said emergency calls is enroute to said station for delaying said change in said state to said next inactive state for a selected period of time;
fourth means effective at the end of said period of time for rendering said second determining means effective; and
fifth means responsive to a determination by said second means that none of said emergency calls is enroute to said station for indicating that said station is in said next inactive state.

42. A system according to claim 41, further comprising:
means responsive to said first means for causing a record to be made to indicate that said station is in said next inactive state.

43. A system according to claim 41, wherein said station includes at least one workstation, each of said workstations having a display screen, said system further comprising:
means responsive to said operation of said delaying means for causing said display screens to display messages indicating that said station will soon change to said inactive state.

44. A system according to claim 41, wherein said station may additionally be in an abandoned condition, said system further comprising:
second means for determining whether said station is in said abandoned state; and
means effective when said station is in said abandoned state for rendering said first determining means inoperative so that the state of said station is not changed.

45. A system according to claim 41, wherein said station includes at least one workstation, each of said workstations having a display screen, said system further comprising:

means responsive to said determination that no emergency calls are enroute to said workstation for causing said display screens of said workstations to display on said screen a message indicating that said station is in said inactive state.

46. A system according to claim 45, wherein a first line is connected to said station for carrying emergency call notification messages to said station, and wherein a second line is connected to said station for carrying said emergency calls to said station, said system further comprising:

means responsive to said determination that none of said emergency calls is enroute to said station for preventing said emergency calls from being routed to said station.

47. A system for controlling to which of first and second telephone call answering stations a given incoming emergency call is to be routed, wherein said stations serve an emergency call region in which there is historically a relatively low number of emergency calls during a night service interval of time and historically a relatively greater number of emergency calls during an active service interval of time, and wherein a call router receives said incoming calls and directs each such call to a particular one of said stations, said system comprising:

means for establishing a schedule for each of said first and second stations, one of said schedules designating at least one of said active intervals for said first station, another of said schedules designating at least one of said active intervals for said second station, at least one of said schedules for said second of said stations also designating at least one of said night service intervals; and means responsive to each of said schedules for controlling said router to route all of said incoming calls to said first of said stations during said night service interval designated for said second station.

48. A system according to claim 47, said establishing means further comprising:

a workstation for displaying a period of time having a plurality of increments;

means for selecting for said second station a first interval of time in said period as said night service interval and a second interval of time coincident with said first interval of time as said active service interval of time for said first station;

means for storing a record representing a state of each said first and second stations based on said respective active and night service intervals for said respective first and second stations, a night service state corresponding to said night service interval and an active state corresponding to said active interval; and said controlling means comprising means responsive to said records for causing said router to route to said first station said emergency calls received during said night service interval.

49. A system according to claim 48, further comprising:

timing means for indicating the end of said interval, and means responsive to an indication of the end of said first interval for changing said first record to indicate that said second station is available to answer emergency calls.

50. A system according to claim 48, further comprising:

second means for indicating the current time at which said given call is to be routed; and first means for determining whether said current time is in said first interval.

51. A system according to claim 48, further comprising:

means responsive to the determination that said current time is in one of said night service intervals for updating said record for said second station to represent said night service state.

52. A system according to claim 48, wherein a current time is the time at which one said call is to be routed, further comprising:

means for determining that a current one of said first intervals should end; and means responsive to said determining means for updating said record to represent said active state of said second station.

53. A system according to claim 52, further comprising:

said first determining means comprising flag means for recording an out early flag with respect to said first interval, and second means responsive to said out early flag for determining whether said current time is in said first interval; and said updating means is responsive to said second determining means determining that said current time is in said interval for updating said record to indicate that said second station is in said active state.

54. A system according to claim 48 further comprising:

said storing means also storing a flag record representing a flag to end said active state before the scheduled start of said first interval; and menas responsive to said selecting means selecting said flag for updating said flag record to render said station inactive before the start of said first interval.

55. A system according to claim 54, further comprising:

second means responsive to said selection of said flag for determining that the current time is before the start of said first interval; and means for causing said timing means to be set for indicating the end of said first interval.

56. A system according to claim 48, further comprising:

said flag record also being adapted to represent a disabled flag having no effect on said active and inactive states;

said second means also being for determining that the current time is within said first interval; and means responsive to said determination that the current time is within said first interval for updating said flag record to represent said disabled flag.

57. A system according to claim 48, further comprising:

said storing means comprising a database manager for updating said records following said selecting of said intervals; and said router comprising a memory for storing a second record indicating that at a current time each said first and second station is either inactive or available to answer one of said emergency calls.

58. A system according to claim 57, wherein a plurality of said emergency call answering stations is connected to said router, further comprising:
said router being at a location different from the location of each of said stations and including said displaying means and said selecting means, each of said displaying means and said selecting means being selectively effective with respect to said stations to enable said first interval to be selected for said second station.

59. A system for controlling the availability for operation of a station for answering emergency telephone calls, said station having an inactive state and an active state, comprising:
means for establishing a schedule for said station, said schedule indicating when said station is to be in said active state and when in said inactive state; and
means for overriding said schedule to cause said station to be out early from said inactive state when said schedule indicates that said station is to be in said inactive state or to be in early to said inactive state when said schedule indicates that said station is to be in said active state.

60. A system according to claim 59, said means for overriding, further comprising:
in early means effective when said station is in said active state for causing said station to be in said inactive state.

61. A system according to claim 60, said in early means further comprising:
means for setting an in early flag;
means responsive to said in early flag for determining whether said station is currently in said inactive state; and
means effective when said station is currently in said active satat for causing said station to be in said inactive state.

62. A system according to claim 61, further comprising:
means effective when said station is currently in said inactive state for causing said setting means to set said flag to a disabled condition.

63. A system according to claim 59, further comprising:
said overriding means having a disabled condition in which it does not cause either of said overriding to occur;
means for recording said disabled condition;
means responsive to said overriding means not being set to cause said out early nor said in early overriding for recording said disabled condition of said overriding means.

64. A system according to claim 63, further comprising:
routing means responsive to said disabled condition of said overriding means for routing said telephone calls to said station when said station is in said active state according to said schedule.

65. A system according to claim 59, said means for overriding further comprising:
out early means when said station is in said inactive state for causing said station to be in said active state.

66. A system according to claim 65, said out early means further comprising:
means for setting an out early flag;
means responsive to said out early flag for determining whether said station is currently in said inactive state; and
means effective when said station is in said inactive state for causing said station to be in said active state.

67. A method utilizing a computer for controlling emergency call routing from an incoming trunk to a selected one of a plurality of call answering stations; each said station being adapted to be in one of an active state, a night service state or an abandoned state; said night service state being scheduled to occur during a night service interval of time; said abandoned state being unscheduled; said computer having a first table for selectively establishing for each said station an in early condition for overriding said active state, an out early condition for overriding said night service state; and a disabled condition for overriding neither said active nor said night service state; said computer having a second table for indicating for each said station an active state, said abandoned state and said night service state; said computer being programmed to perform the following functions:
at an administration time, updating said first table for one of said stations to establish one of said out early condition, in early condition or disabled condition and getting said administration time;
if said established condition is said in early condition, and if said one station is not in said night service state at said administration time, then updating said second table for said one station to indicate that said one station is in said night service state.

68. A method according to claim 67, said computer being programmed to perform the following functions:
if said established condition is not said in early nor said disabled conditions, then determining if said second table indicates that said one station is in said night service state; and
if said second table indicates that said one station is not in said night service state, then setting said first table to establish said disabled condition for said one station.

69. A method according to claim 67, said computer being programmed to perform the following functions:
if said established condition is not said in early nor said disabled conditions, then determining if said second table indicates that said one station is in said night service state; and
if said second table indicates that said one station is in said night service state, then updating said second table for said one station to said active state.

70. A method according to claim 69, said computer being programmed to perform the following functions:
if said second table indicated said night service condition for said one station was not due to an in early condition established by said first table, then setting said first table to establish said out early condition.

71. A computer according to claim 69, said computer being programmed to perform the following functions:
if said second table indicated said night service condition for said one station due to an in early condition established by said first table, then settig said first table to establish said disabled condition.

72. A method according to claim 67, said computer being further programmed to perform the following functions:
if said established condition is said in early condition, and if said one station is in said night service state at said administration time, then setting said first table to establish said disabled condition for said one station.

73. In a computer system including a computer for rendering a public safety answering station available or not available to receive incoming emergency telephone calls, said system including table means for storing a plurality of records, said availability of said station being indicated by an active one of said records, said nonavailability of said station being indicated by a night service one of said records, or an abandoned one of said records, an availability schedule being provided to define at least one active interval of time during which said station is available, said schedule also defining a night service interval of time during which said station is not available, the improvement in said system comprising:
first means for causing said computer to store an in early override one of said records to render said active record ineffective;
second means for causing said computer to store an out early one of said records to render said night service record ineffective;
said first and second means being effective at an override time; and
third means for causing said computer to determine if, at a given time within said availability schedule, either said in early one or said out early one of said records is stored.

74. In the computer system according to claim 73, the further improvement comprising:
fourth means for causing said computer to determine if said given time is within said night service interval of time.

75. In the computer system according to claim 74, the further improvement comprising:
fifth means effective if said given time is not within said night service interval of time of said records to indicate that at said given time said station is available to receive incoming telephone calls.

76. In the computer system according to claim 74, the further improvement comprising:
sixth means effective if said given time is within said night service interval of time for causing said computer to store one of said records to indicate that at said given time said station is unavailable to receive incoming telephone calls.

77. In a system for controlling the availability for operation of a unit for answering an emergency telephone call, said unit being available for operation during one or more active service intervals and not being available for operation during one or more inactive intervals, the improvement comprising:
means for preparing a schedule for said unit wherein said schedule includes at least one of said active service intervals and/or at least one of said inactive intervals;
means for causing said preparing means to change said schedule from an original schedule to a new schedule; and
first means for determining whether the change in said schedule was a modification or an addition to or a deletion from said original schedule.

78. A system according to claim 77, further comprising:
means for signalling the start or the end of said inactive intervals, said signalling means initially being set to signal according to said original schedule and being responsive to an update to signal according to said new schedule;
means responsive to said first determining means determining that said change was an addition or modification to said schedule for canceling the operation of said signalling means according to said original schedule.

79. A system according to claim 78, wherein said original schedule was changed at a given time, further comprising:
second means for determining whether said given time is within said changed schedule.

80. A system according to claim 79, further comprising:
means for setting an override flag to render said current and changed schedules ineffective to schedule the availability of said unit to answer said call; and
third means effective at said given time for determining whether said override flag is set.

81. A system according to claim 80, further comprising:
means for setting said signalling means according to said changed schedule to signal the start of the next inactive interval.

82. A system according to claim 80, further comprising:
means responsive to said third means determining that said override flag is not set at said given time for invoking said inactive interval of said station.

83. The system according to claim 77, further comprising:
said means for preparing a schedule being unadministered when no schedule has been prepared for said unit; and
means responsive to said first means determining that said change in said schedule was to delete said schedule for indicating that said schedule is unadministered.

84. The system according to claim 77, further comprising:
means for recording said original and new schedules; and
means responsive to a determination that said change was a deletion for deleting said orignal schedule.

85. A system for controlling the availibility of an emergency call answering station to answer emergency calls, comprising:
means for displaying a period of time having a plurality of increments;
means for selecting an interval of time in said period as an interval; during which said station is to be inactive;
means for storing a first record of at least one said interval for said station; and
means normally effective for routing said emergency calls to said station, said routing means being responsive to said first record for routing said calls received during said interval to a destination other than said station.

86. A system according to claim 85, further comprising:
said means for displaying comprising a workstation at said emergency call answering station;
said storing means comprising a database manager for updating said storing means following said selecting of said interval; and
said routing means comprising a memory for storing a second record indicating that at a current time said station is either inactive or available to answer one of said emergency calls.

87. A system according to claim 85, wherein a plurality of said emergency call answering stations are connected to said routing means, further comprising:
said routing means is at a location different from each of said stations and includes said displaying means and said selecting means, each of said displaying and selecting means being selectively effective with respect to one of said stations so that said interval is selected for said one station.

88. A system according to claim 85, further comprising:
said routing means further comprising timing means for indicating the end of said interval, and means responsive to an indication of the end of said interval for changing said first record to indicate that said station is available to answer emergency calls.

89. A system according to claim 88, further comprising:
means for indicating the current time at which a given one of said calls is to be routed; and
first means for determining whether the current time is in said interval.

90. A system according to claim 89, further comprising:
table means for recording a third record indicative of said station being inactive; and
means responsive to the determination that the current time is in one of said intervals for entering said third record in said table means.

91. A system according to claim 90, further comprising:
means for updating said third record to represent said active state of said station so that said routing means will route said calls to said station before the end of said interval.

92. A system according to claim 91, further comprising:
said updating means comprising flag means for recording an out early flag with respect to said interval, and means responsive to said out early flag for determining whether the current time is in said interval; and
means responsive to said first determining means determining that the current time is in said interval for causing said updating means to update said third record to indicate that said station is active.

93. A system according to claim 90, further comprising:
said table means being for recording a fourth record indicative of a flag to end said active state before the start of said interval; and
means for entering said fourth record in said table means to render said station inactive before the end of said interval.

94. A system according to claim 93, further comprising:
second means for determining that the current time is before the start of said interval; and
means for causing said timing means to be set for indicating the end of said interval.

95. A system for changing the state of an emergency telephone call answering station adapted to be in an active state or an inactive state, said inactive state having been scheduled or unscheduled, a next one of said states temporally following a current one of said states, comprising:

first means for indicating the end of a current one of said inactive scheduled states;
second means for determining whether said station is in one of said unscheduled inactive states;
means for recoding the current state of said station;
means responsive to said second means determining that said station is not in one of said unscheduled inactive states for causing said recording means to record the active state of said station; and
third means for determining whether said state is currently being changed to said inactive state with a delay in said change in said state to said inactive state for a selected period of time.

96. A system according to claim 95, wherein said station includes at least one workstation, each of said workstations having a display screen, said system further comprising:
means "related to/responsive to" said operation of said third means determining that said state is not currently being delayed before being changed to said inactive state, for causing said display screen to display a message indicating that said station is in said active state.

97. A system according to claim 95, further comprising:
means for signalling events relating to said active and inactive states; and
means responsive to said second means determining that said station is not in one of said unscheduled inactive states for causing said signalling means to signal the start of the next one of said scheduled inactive intervals.

98. A system according to claim 95, further comprising:
third means responsive to a determination that said station is in said unscheduled inactive state for signalling the start of the next scheduled inactive state of said station.

99. A system according to claim 95, further comprising:
fourth means responsive to said third means detrmining that said state is currently being delayed before being changed to said inactive state, for canceling said delayed change in state.

100. A system according to claim 95, wherein a first line is connected to said station for carrying emergency call notification messages to said station, further comprising:
fourth means responsive to said third means determining that said state is not currently being delayed before being changed to said inactive state, for allowing said station to receive said telephone calls.

101. A method for controlling the availability of a call ansering station to answer an emergency telephone call at a given time; said station being adapted to be in one of an active state, a night service state or an abandoned state; said night service state being scheduled to occur during a night service interval of time; said abandoned state being unscheduled; said method utilizing a computer having a first table for selectively indicating for said station said active state, said abandoned state and said night service state; said method comprising steps for ending said night service state of said station by:
determining whether said station is in said abandoned state at the given time;
if said station is not in said abandoned state at said given time, then updating said first table to indicate that said station is in said active state.

102. A method according to claim 101, wherein said computer is provided with timer means for signalling changes to and from said inactive state of said station, said method further comprising the step of
whether or not said station is in said abandoned state at said given time, setting said timer means to signal the state of said next night service interval after said active state.

103. A method aqccording to claim 101 further comprising the steps:
determine whether at said given time said station was in condition to enter said night service state; and
if said station was in said condition, at said given time introducing a delay in the time at which said station enters said night service state.

104. A method according to claim 103, wherein said station is provided with a notification line for carrying messages for said station, said notification line having thereon a do not disturb message when said station is in said night service state, said method comprising the step of:
if said station was not in said condition, removing said do not disturb message from said notification line.

105. A method according to claim 101, wherein said station is provided with a video display terminal having a screen for displaying messages, said method further comprising the step of:
if said station is not in said abandoned state at said given time, then causing said terminal to display on said screen messages that said station is out of said night service state and is in said active state.

* * * * *